F. M. CARROLL AND R. M. BLAKELY.
SORTING AND ACCOUNTING MACHINE.
APPLICATION FILED MAR. 2, 1916.

1,361,791.

Patented Dec. 7, 1920.
46 SHEETS—SHEET 1.

FIG. 1.

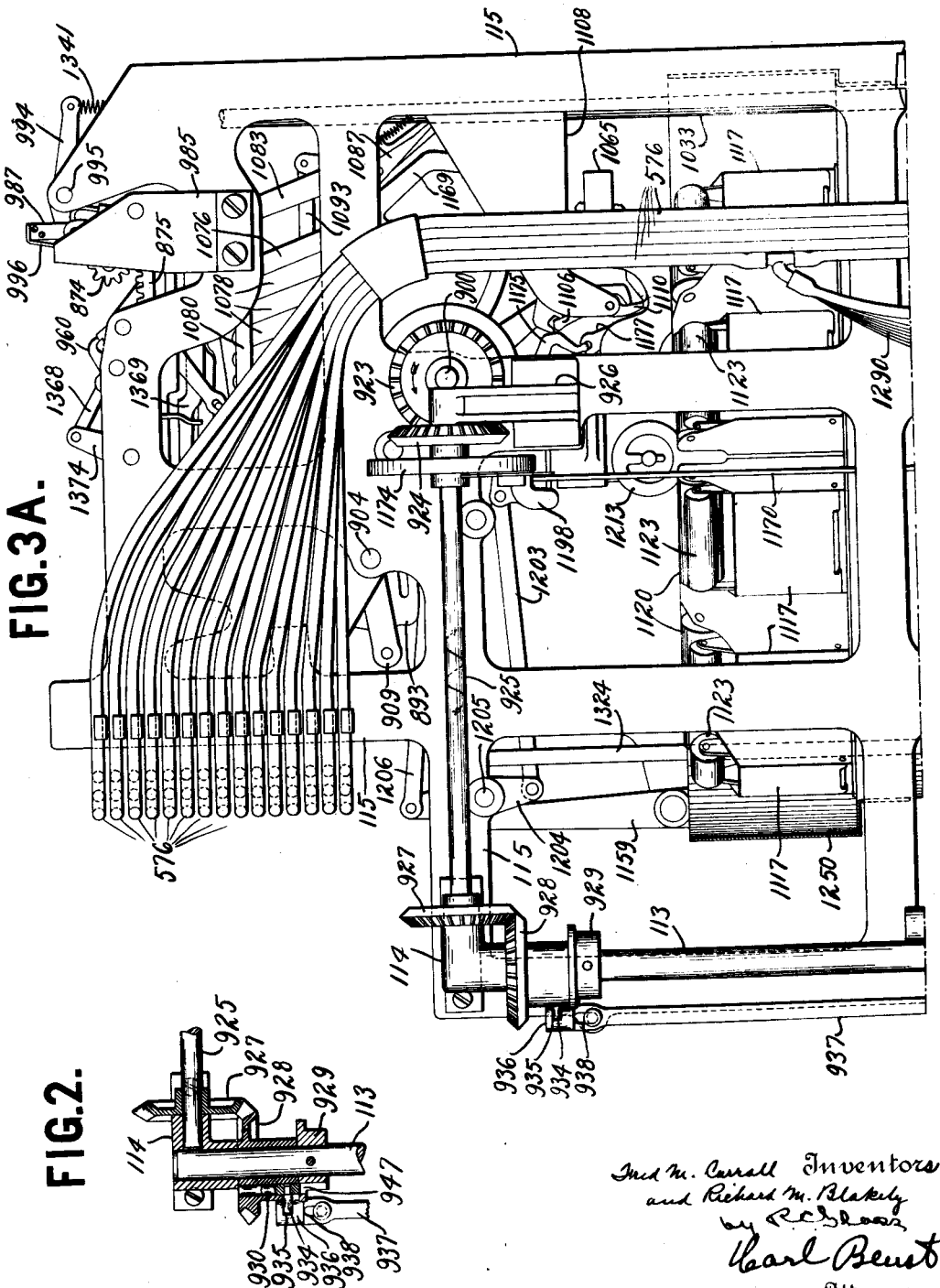

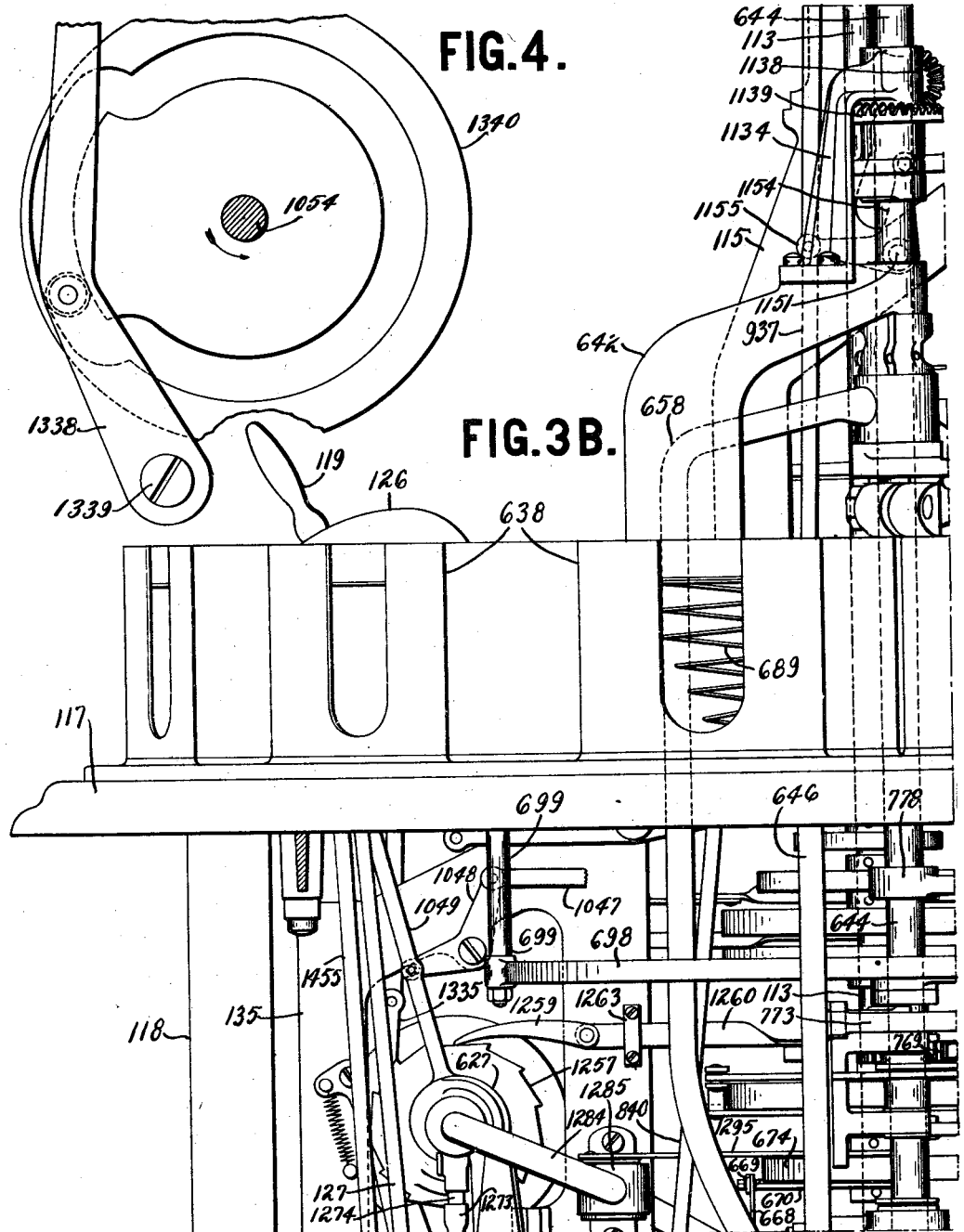

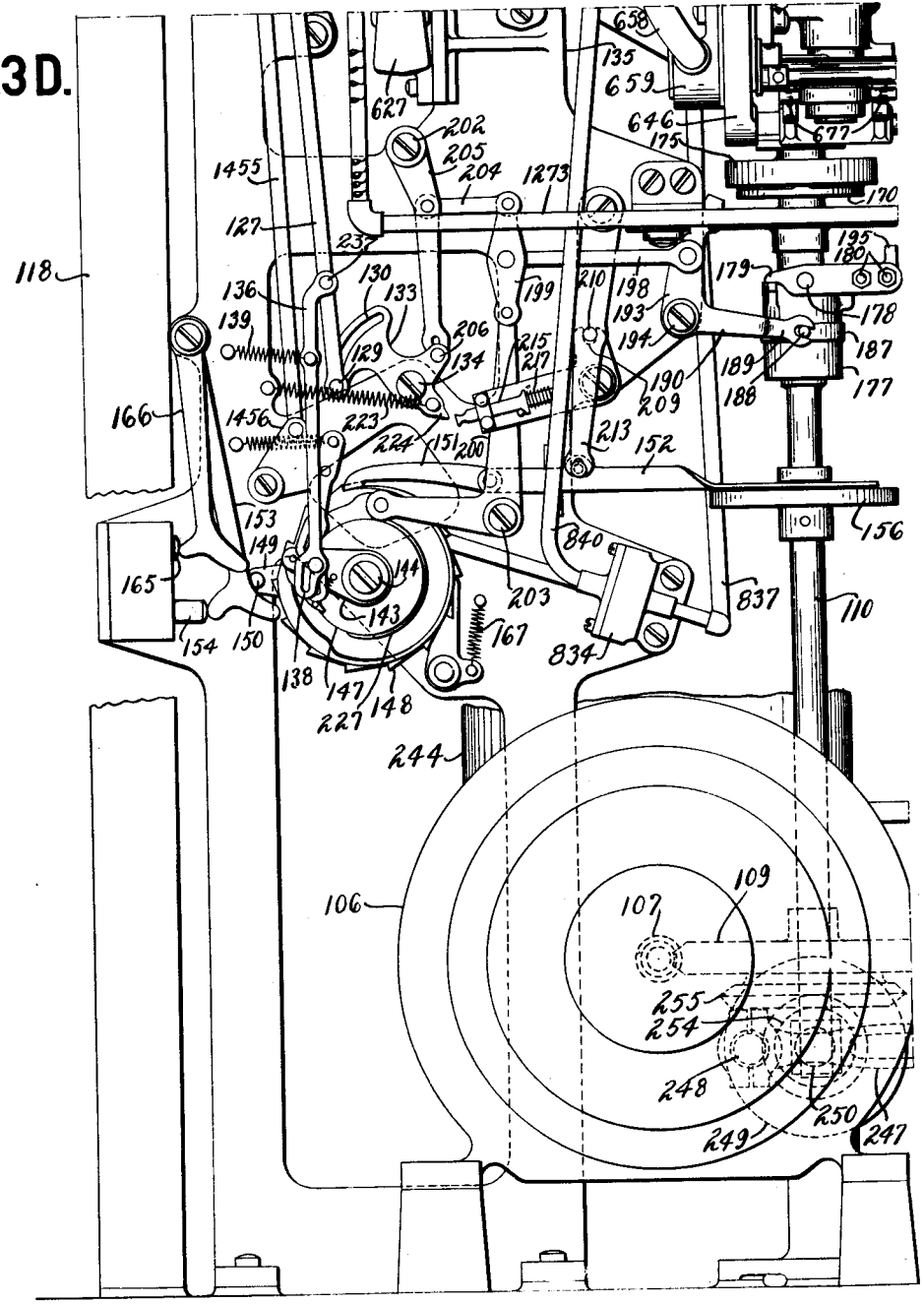

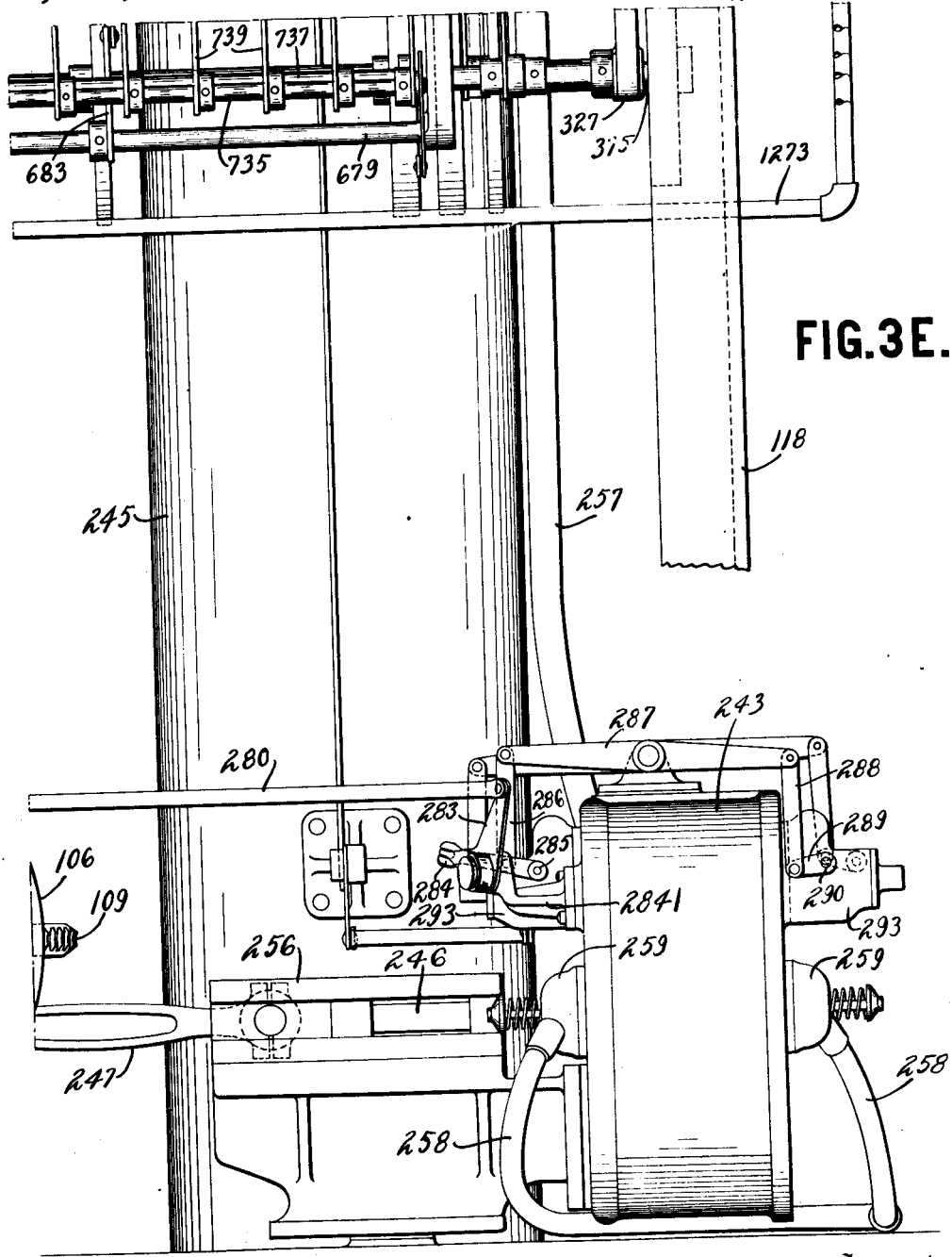

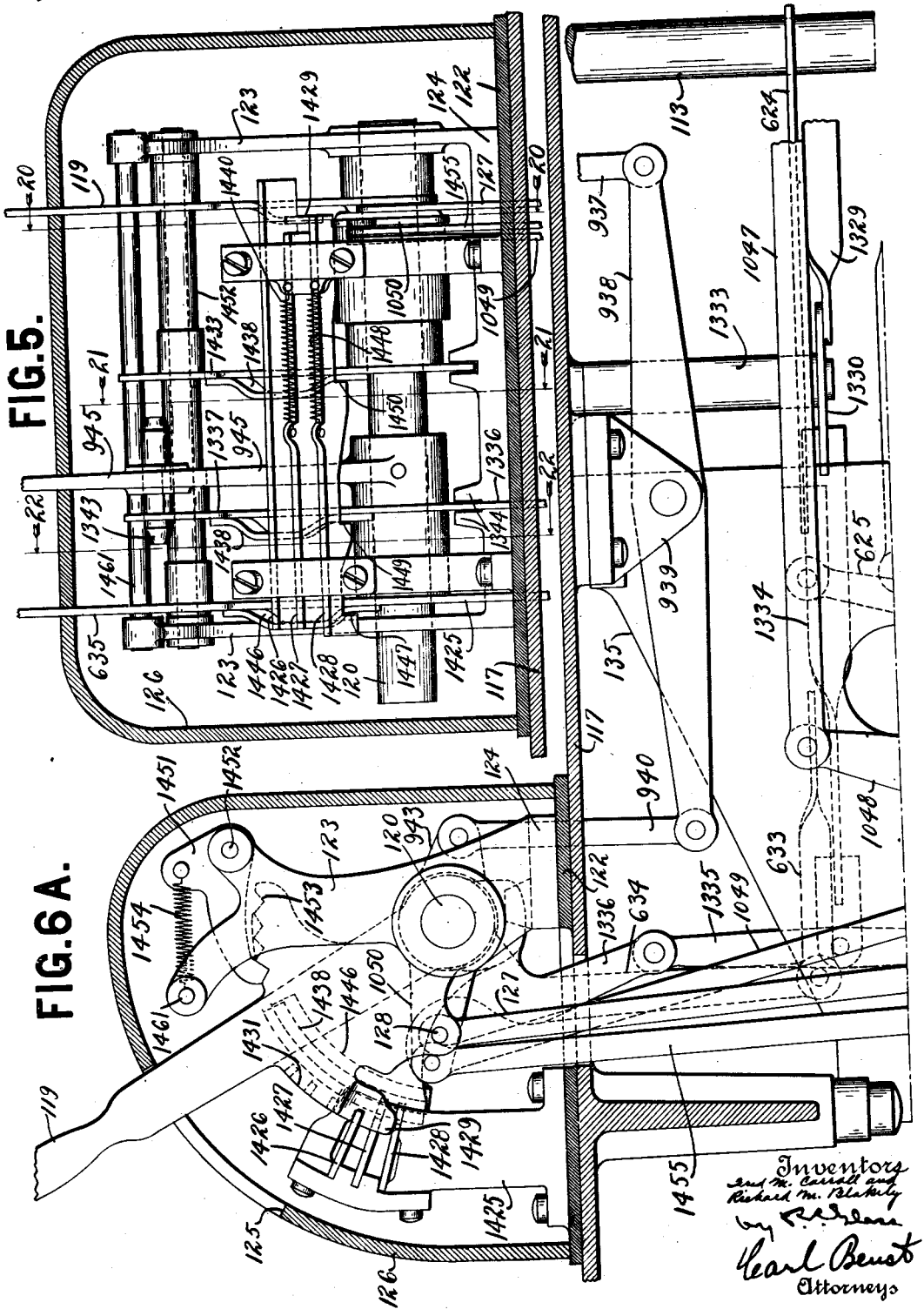

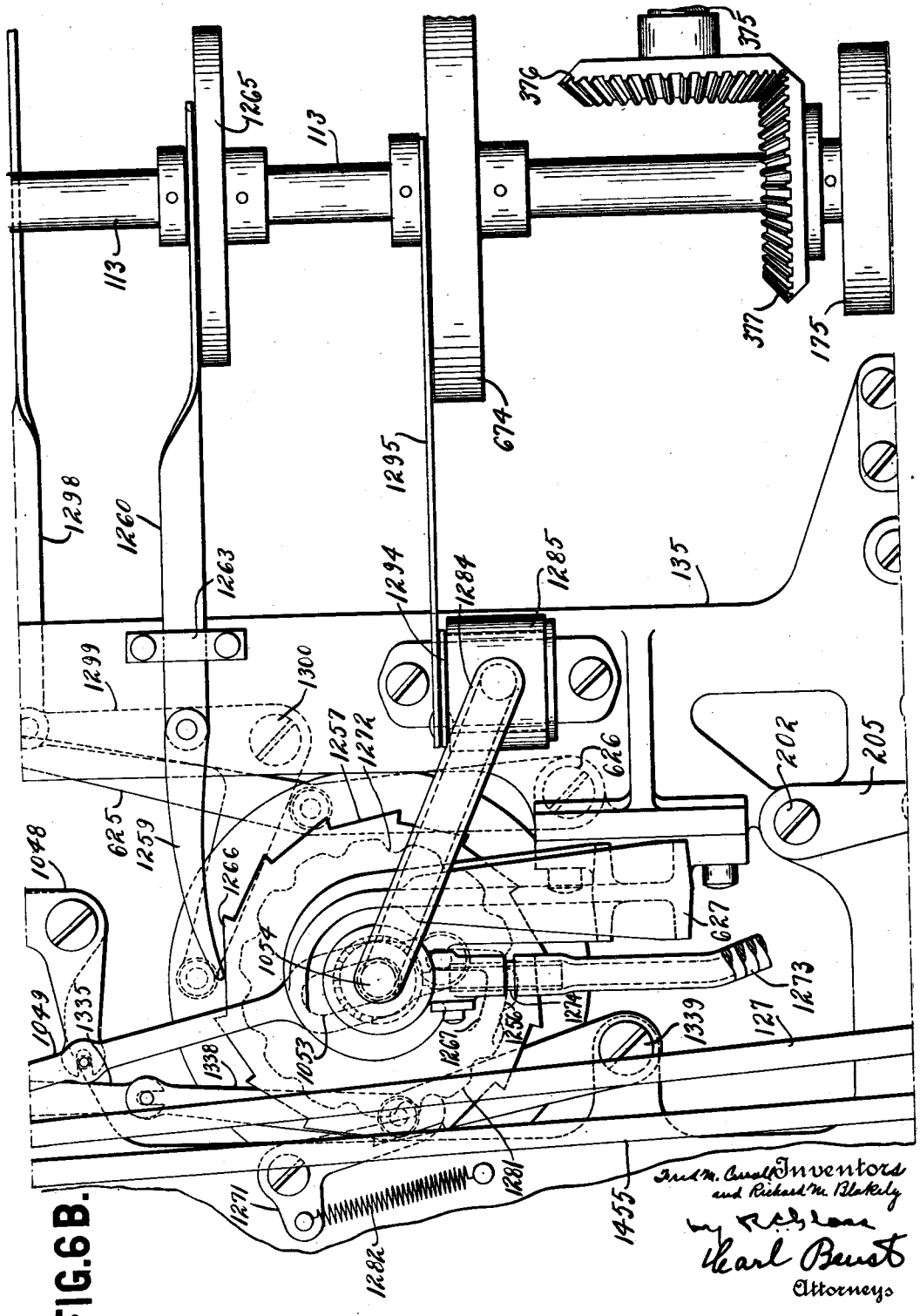

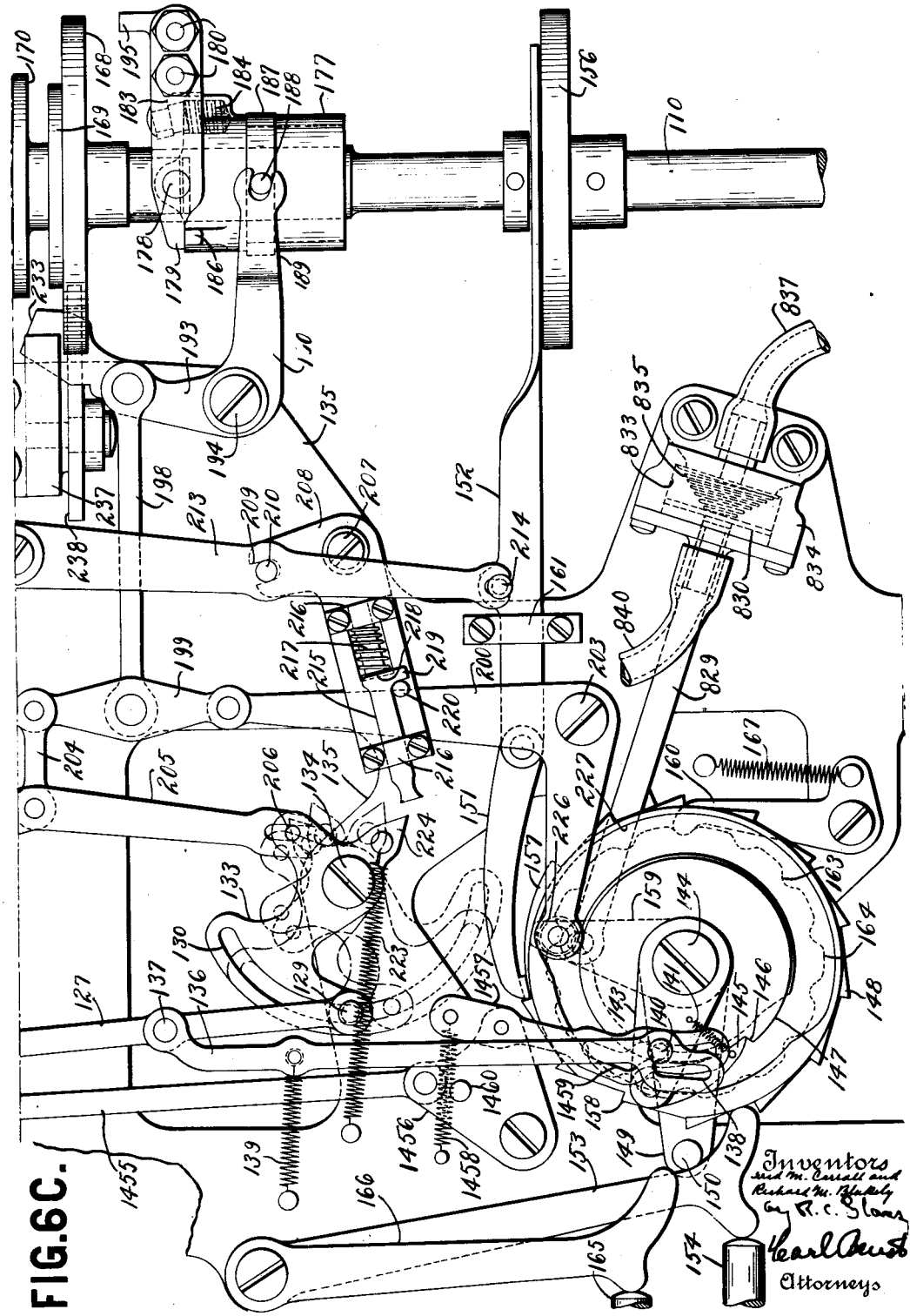

F. M. CARROLL AND R. M. BLAKELY.
SORTING AND ACCOUNTING MACHINE.
APPLICATION FILED MAR. 2, 1916.

1,361,791.

Patented Dec. 7, 1920.
46 SHEETS—SHEET 10.

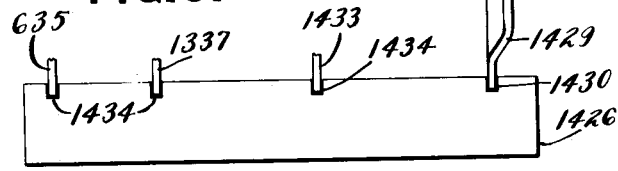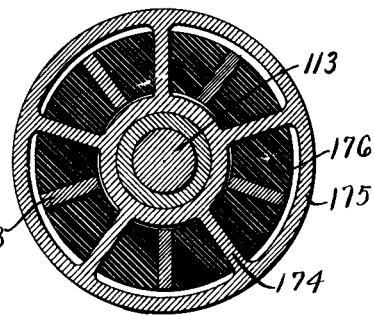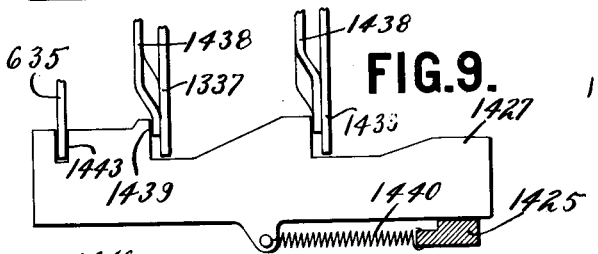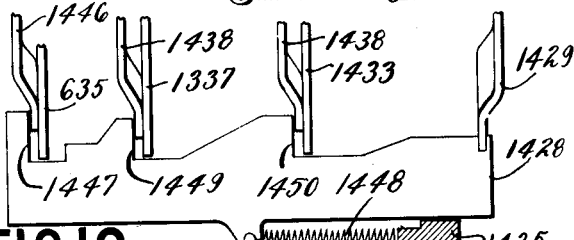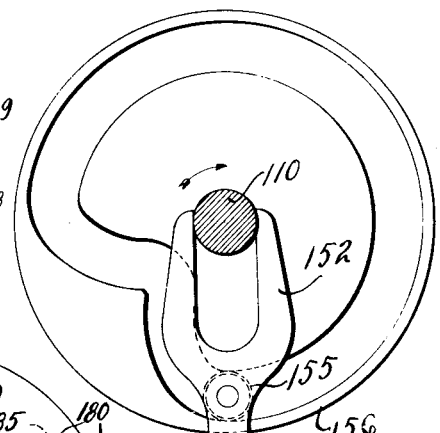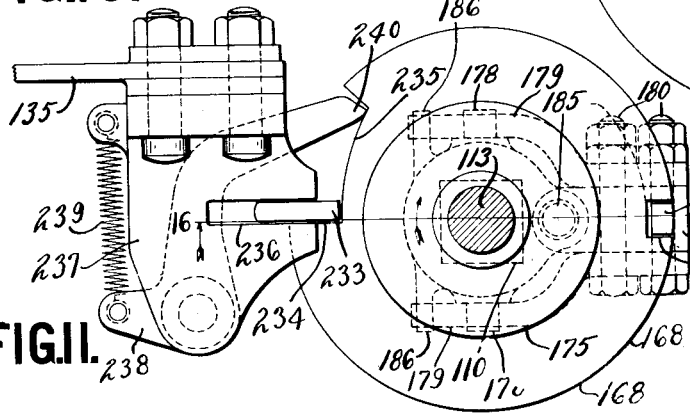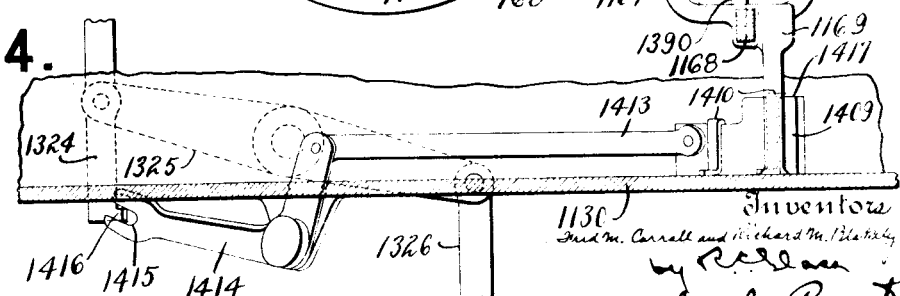

F. M. CARROLL AND R. M. BLAKELY.
SORTING AND ACCOUNTING MACHINE.
APPLICATION FILED MAR. 2, 1916.

1,361,791.

Patented Dec. 7, 1920.
46 SHEETS—SHEET 12.

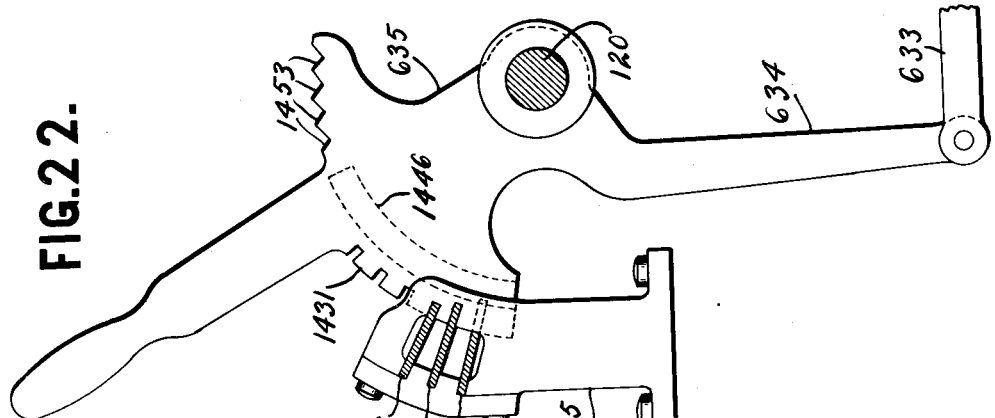
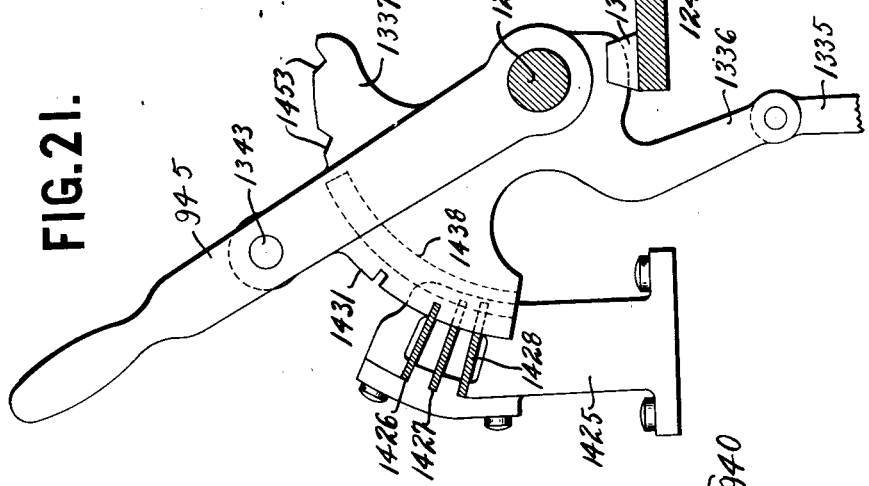
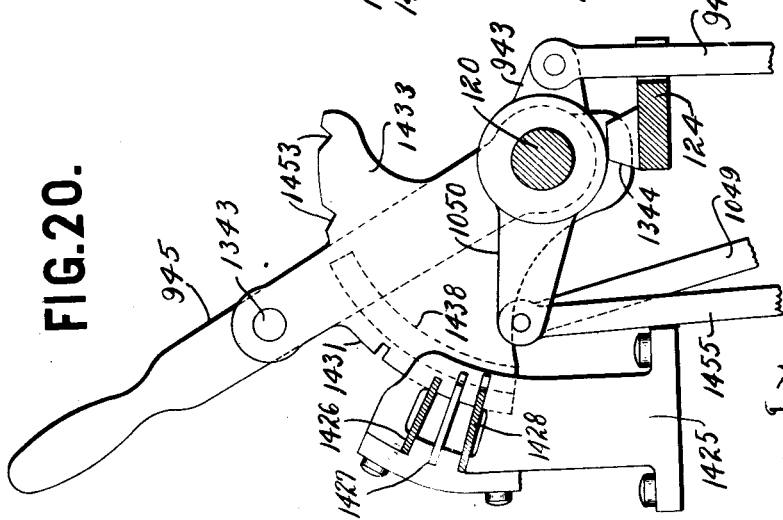

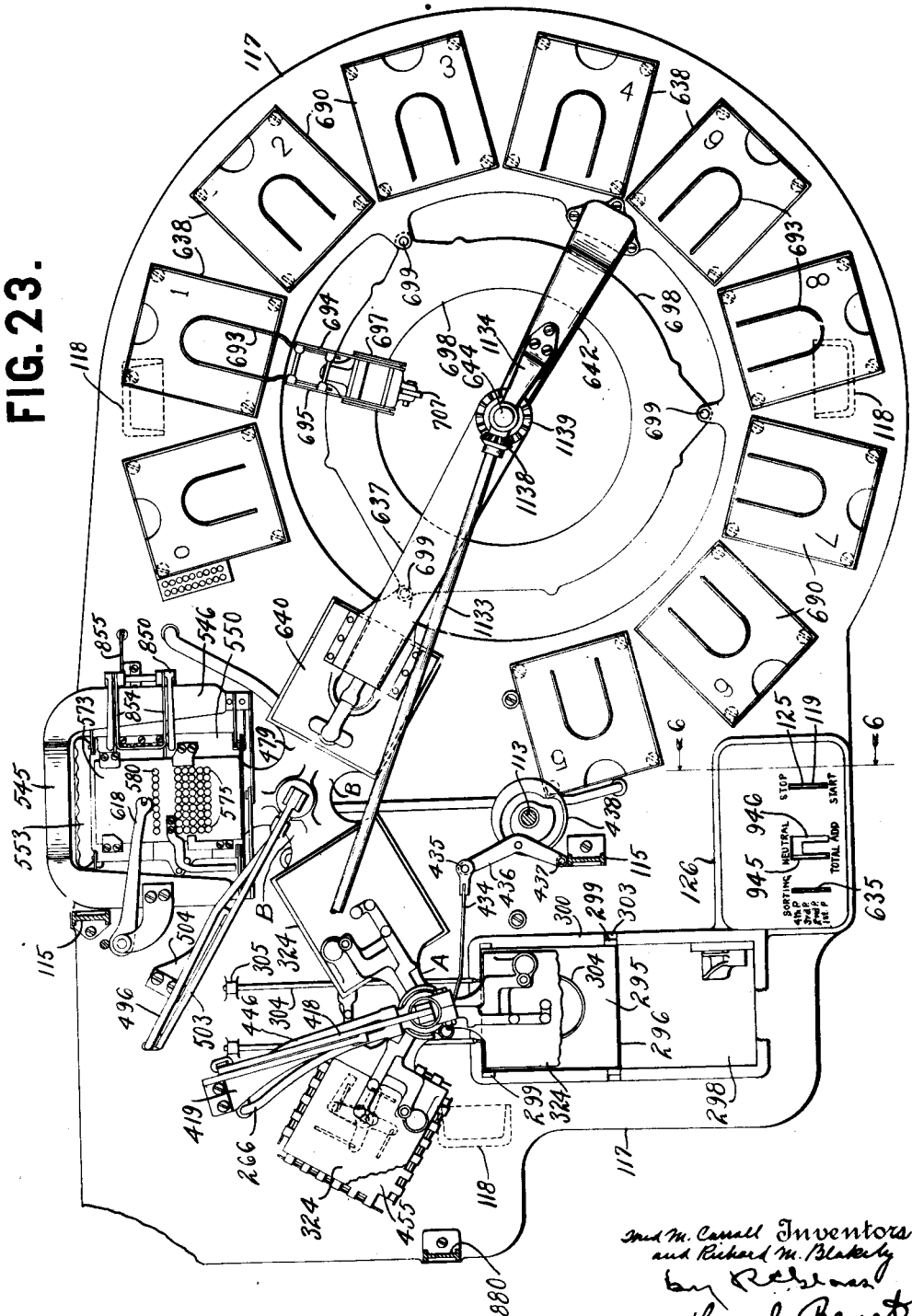

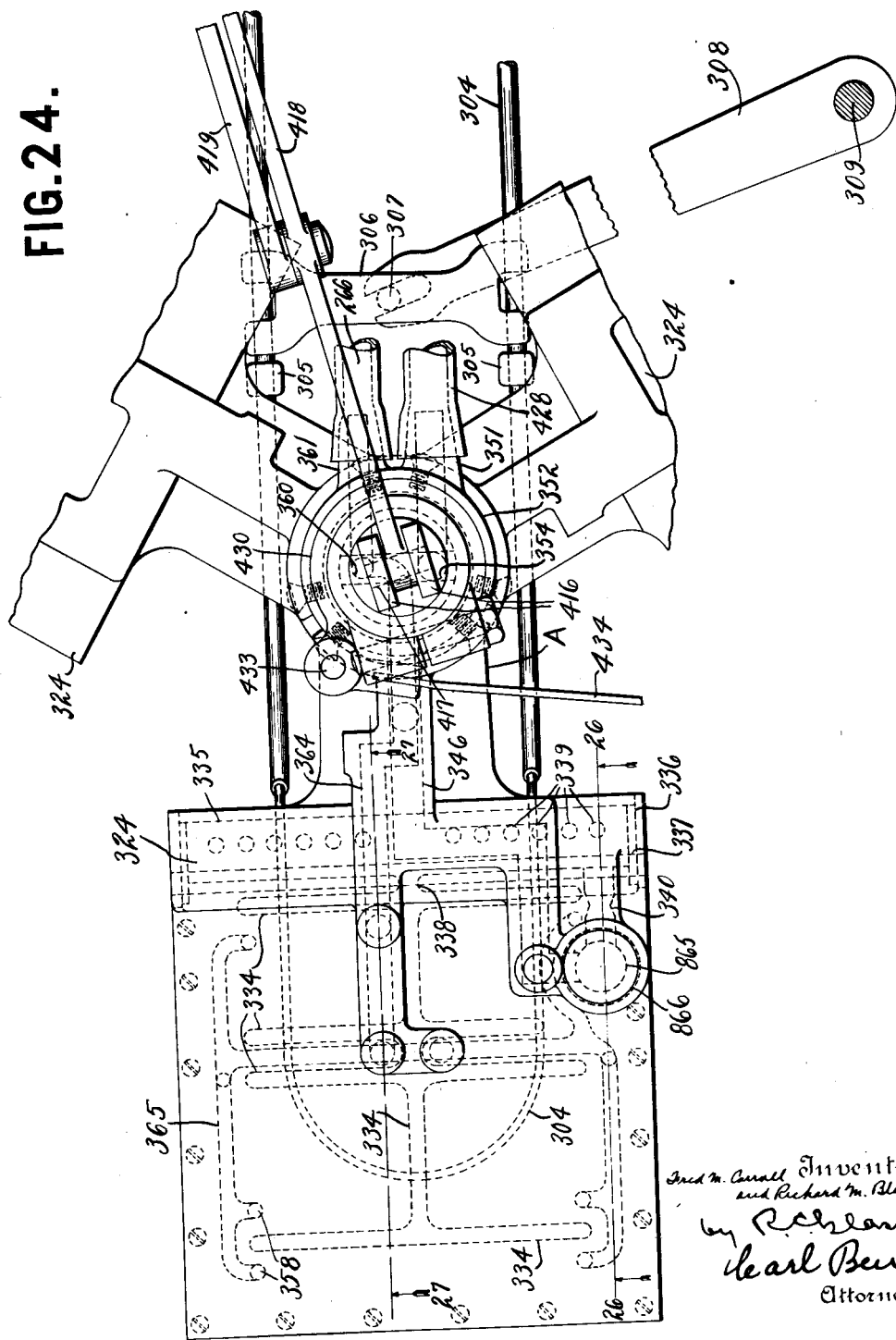

F. M. CARROLL AND R. M. BLAKELY.
SORTING AND ACCOUNTING MACHINE.
APPLICATION FILED MAR. 2, 1916.

1,361,791.

Patented Dec. 7, 1920.
46 SHEETS—SHEET 16.

F. M. CARROLL AND R. M. BLAKELY.
SORTING AND ACCOUNTING MACHINE.
APPLICATION FILED MAR. 2, 1916.
1,361,791.
Patented Dec. 7, 1920.
46 SHEETS—SHEET 17.
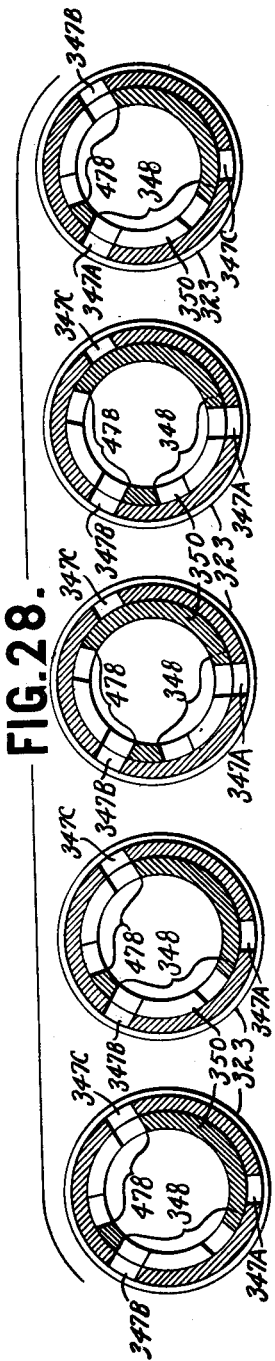
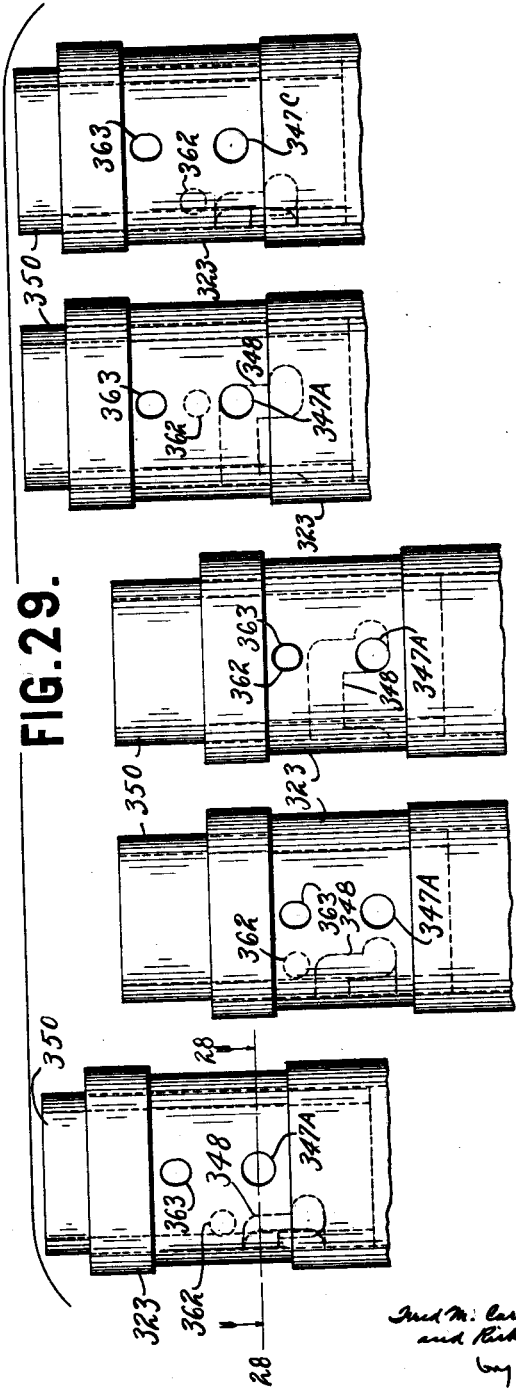

F. M. CARROLL AND R. M. BLAKELY.
SORTING AND ACCOUNTING MACHINE.
APPLICATION FILED MAR. 2, 1916.
1,361,791.
Patented Dec. 7, 1920.
46 SHEETS—SHEET 18.
FIG. 30.
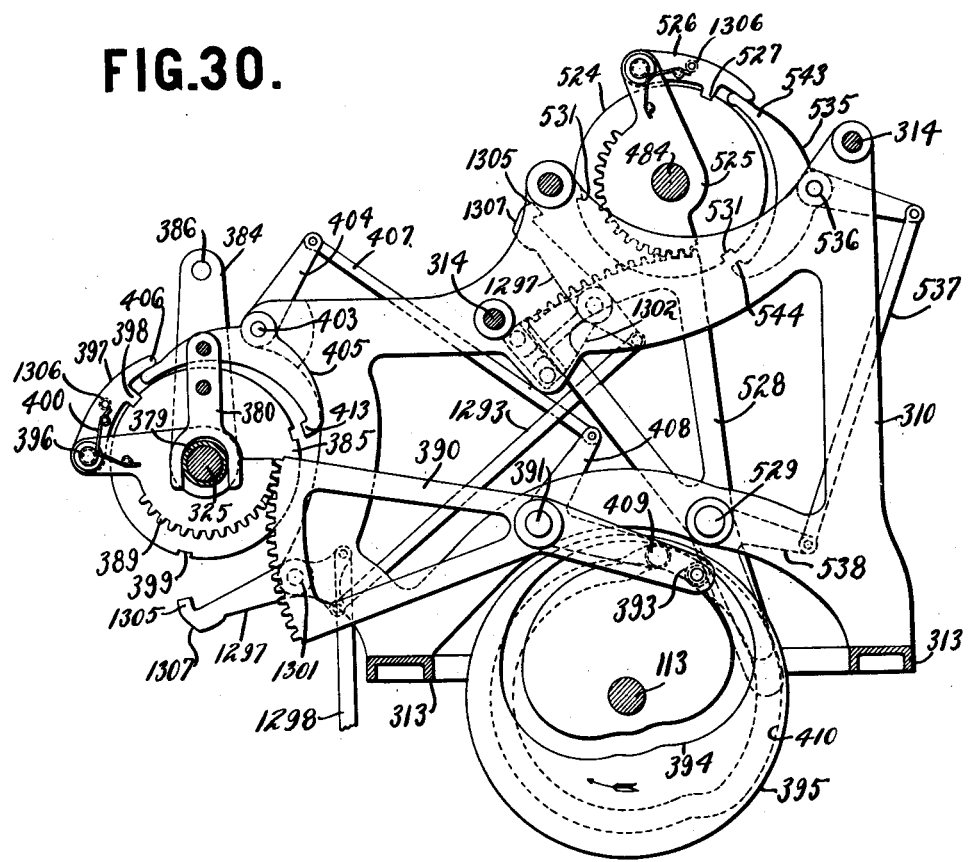
FIG. 31.
FIG. 32.
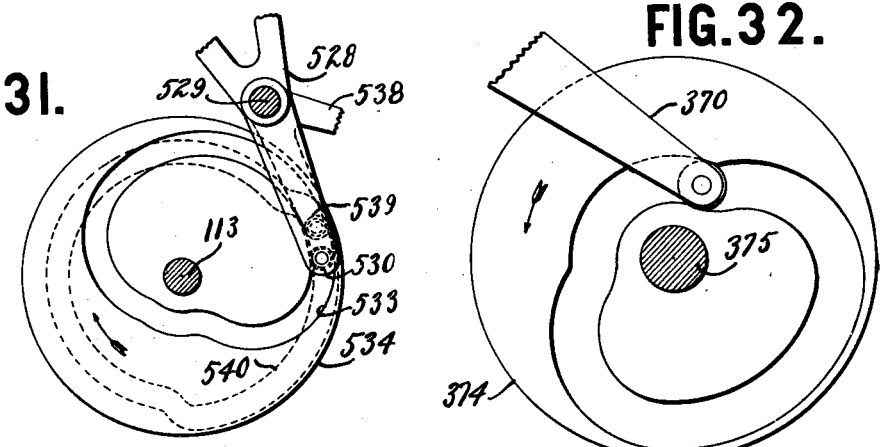

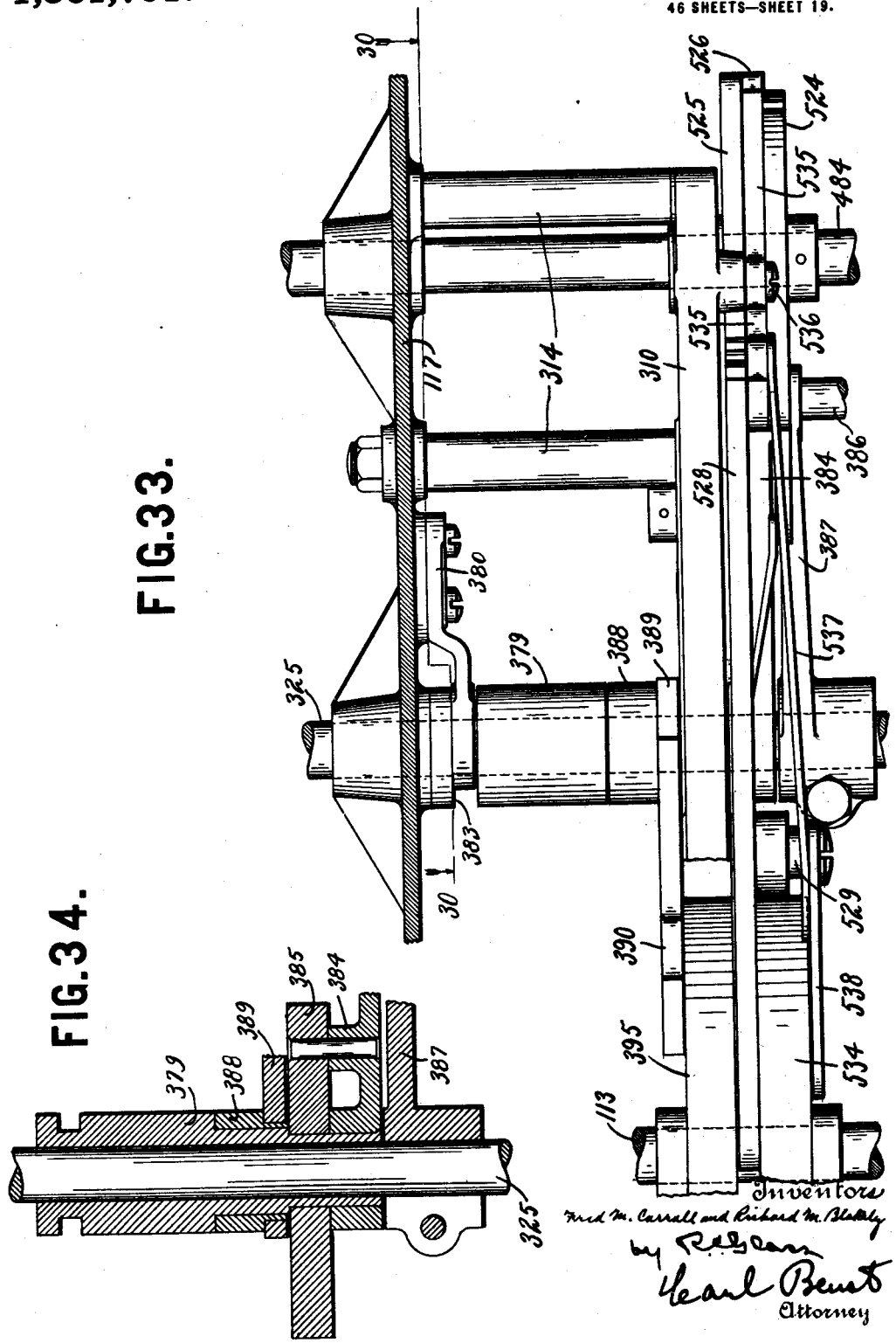

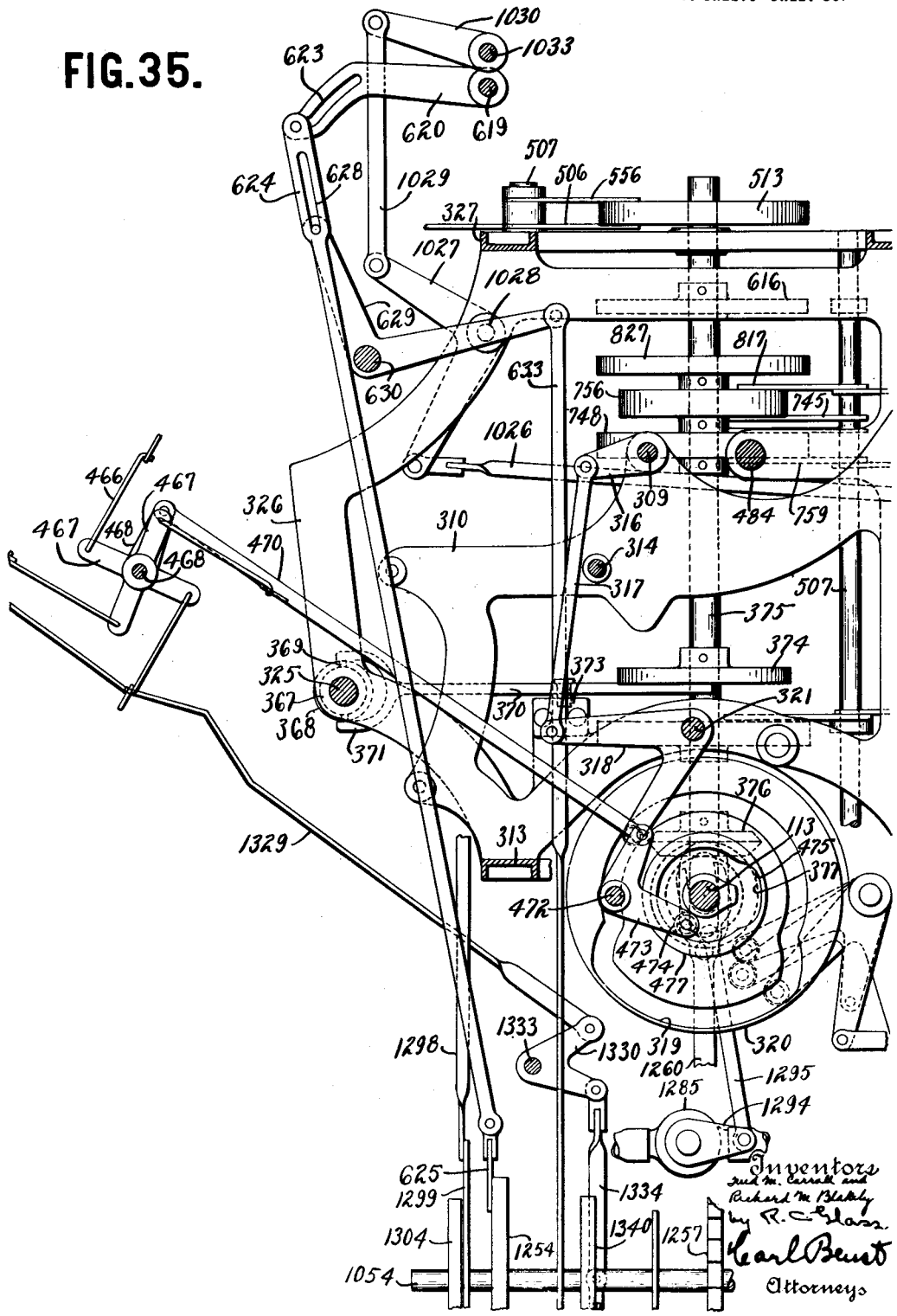

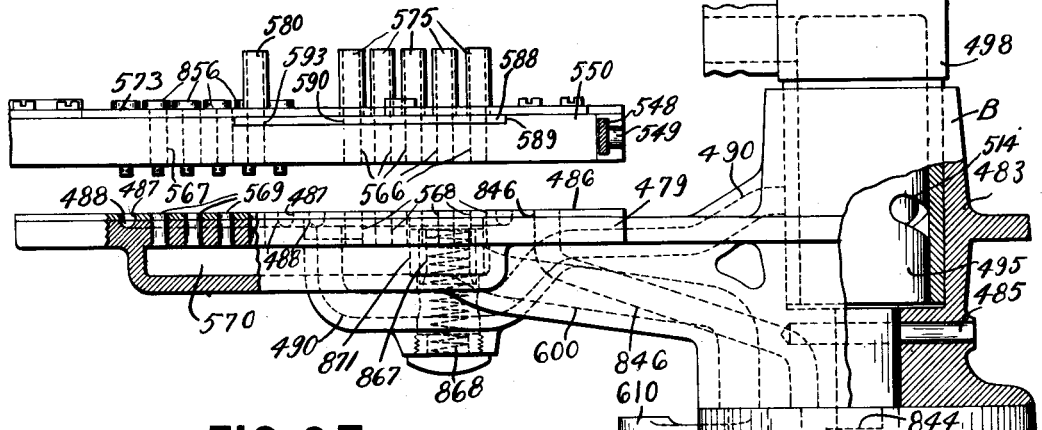
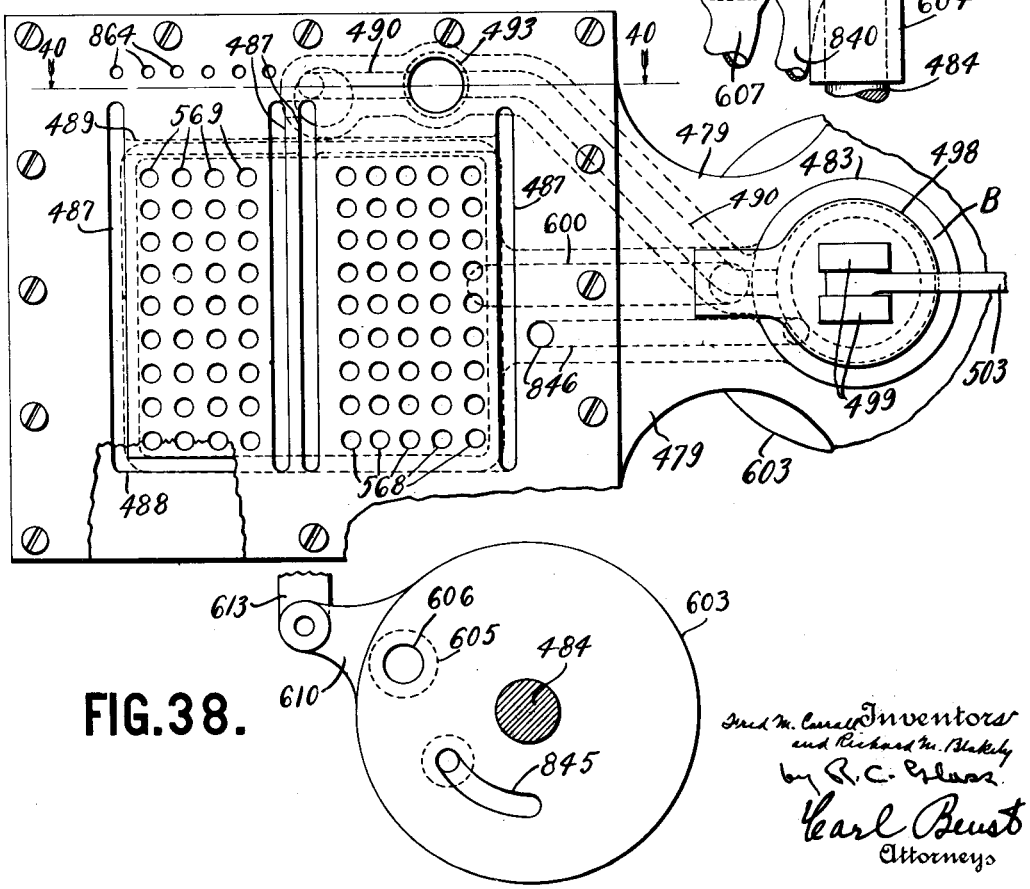

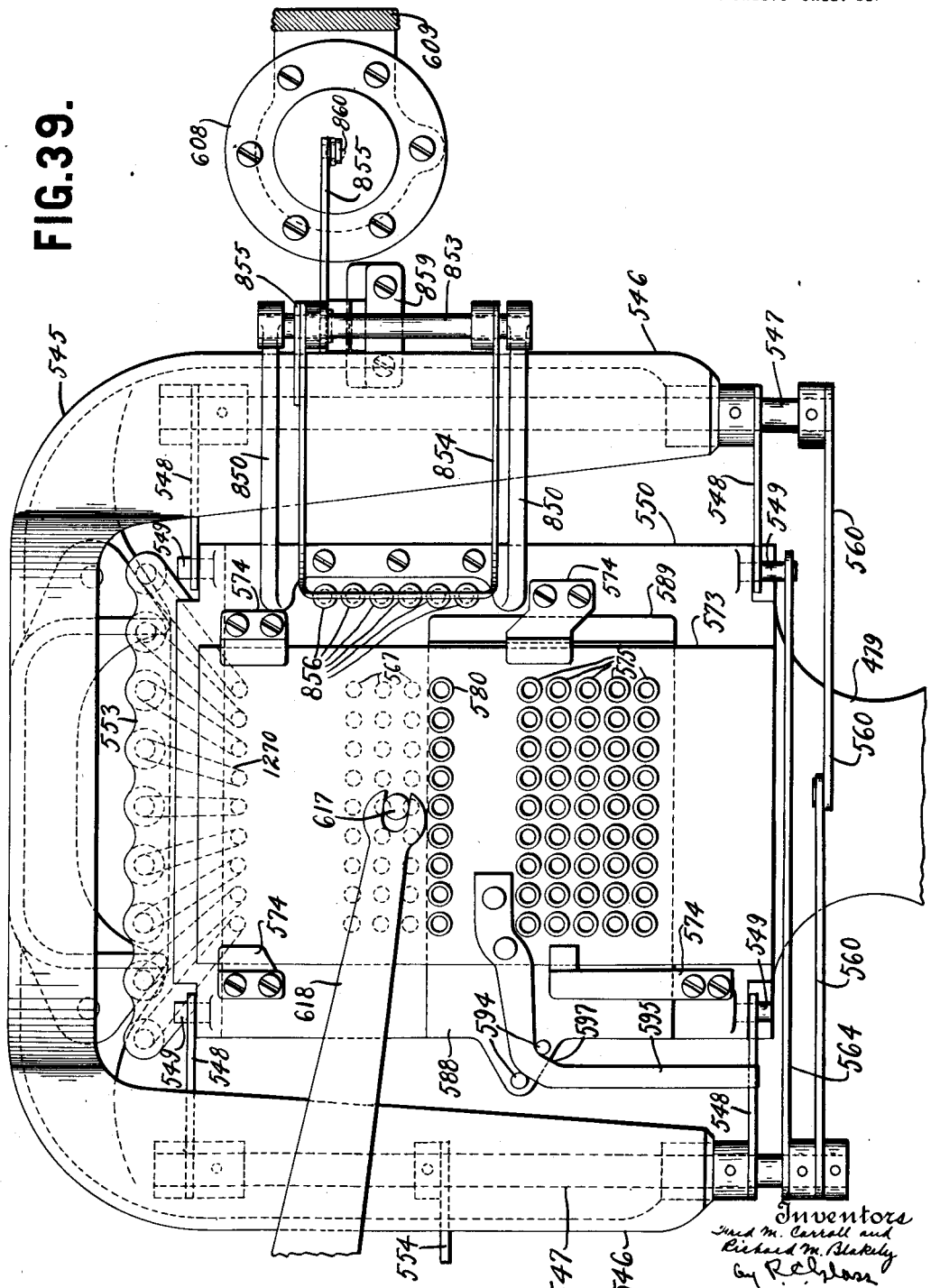

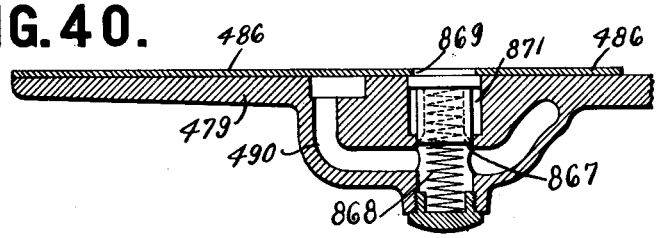
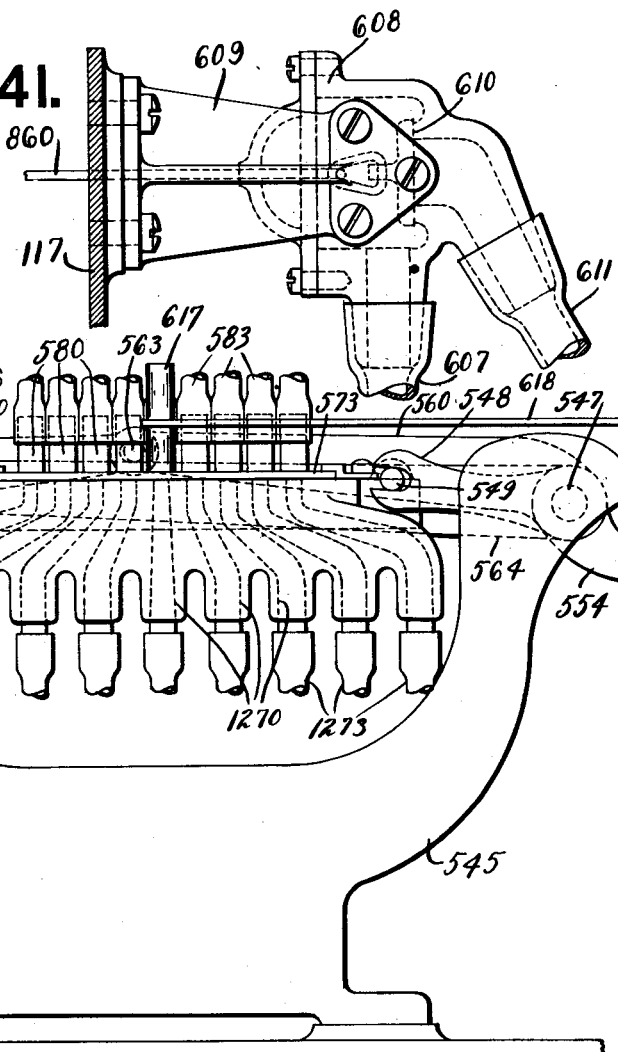
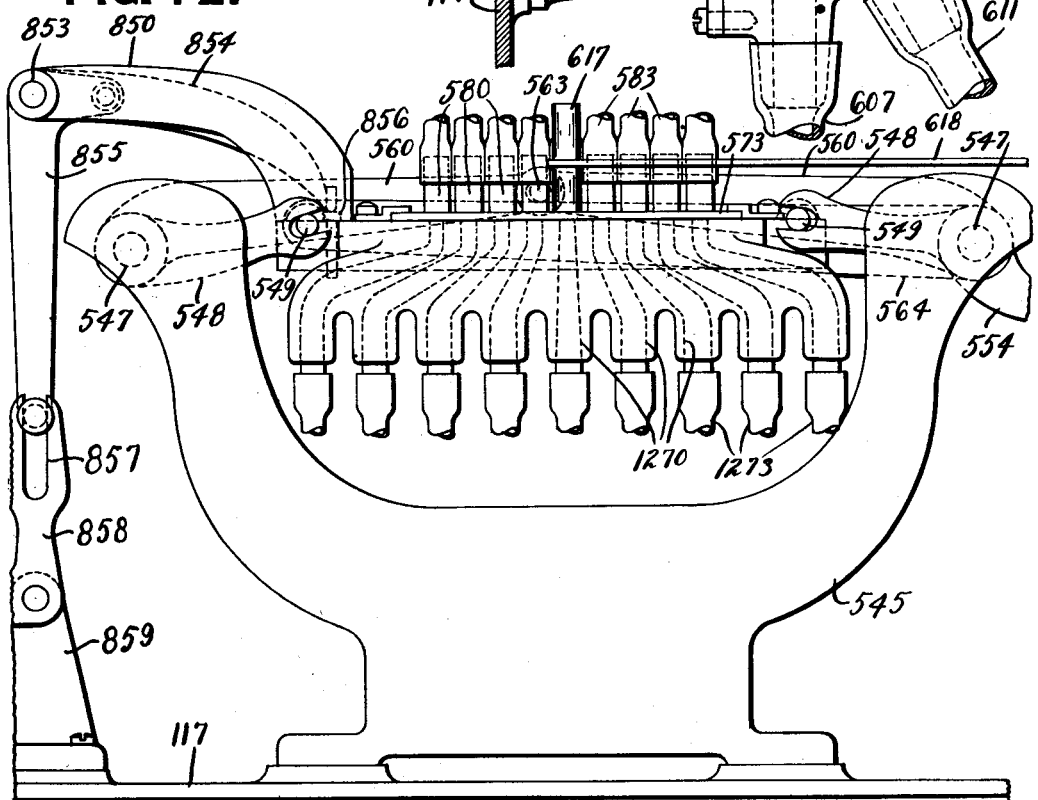

F. M. CARROLL AND R. M. BLAKELY.
SORTING AND ACCOUNTING MACHINE.
APPLICATION FILED MAR. 2, 1916.
1,361,791.
Patented Dec. 7, 1920.
46 SHEETS—SHEET 24.
FIG. 43.
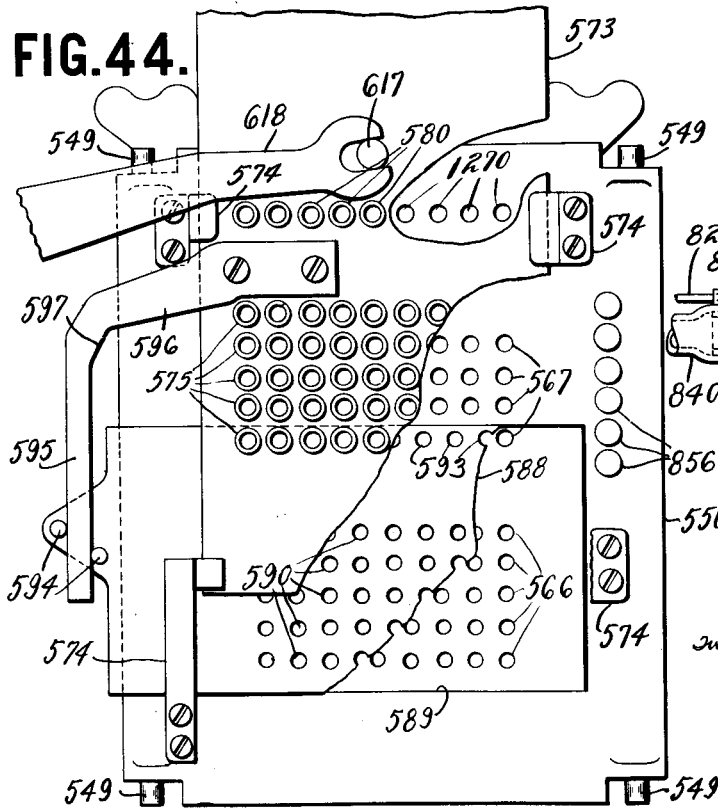
FIG. 45.
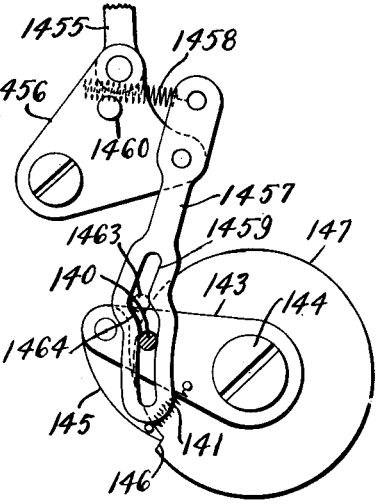
FIG. 44.
FIG. 46.
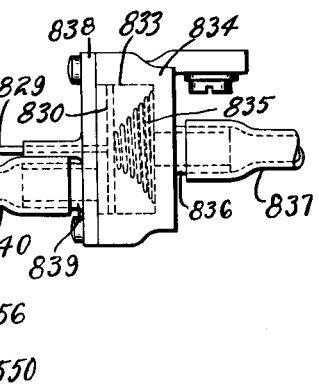

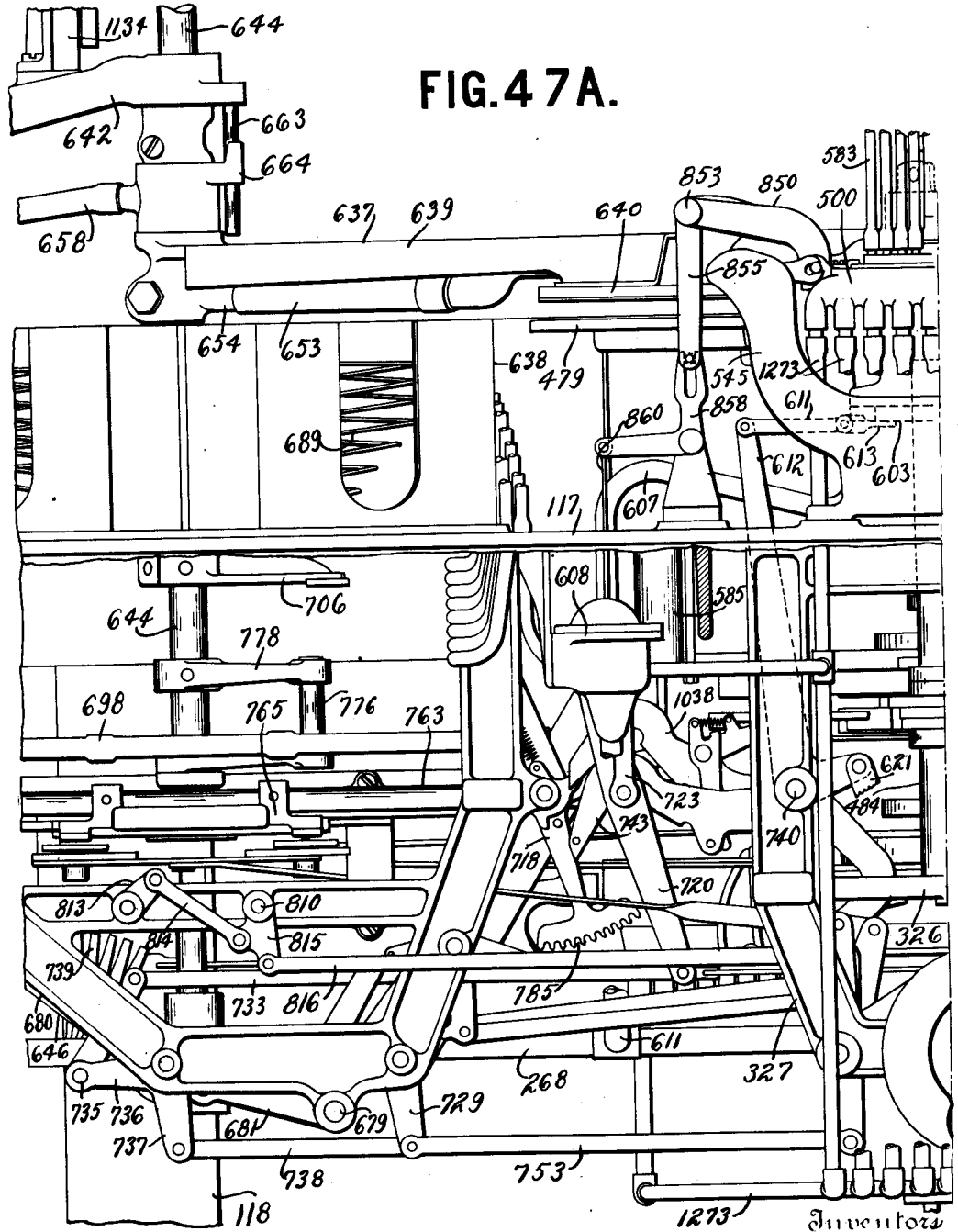

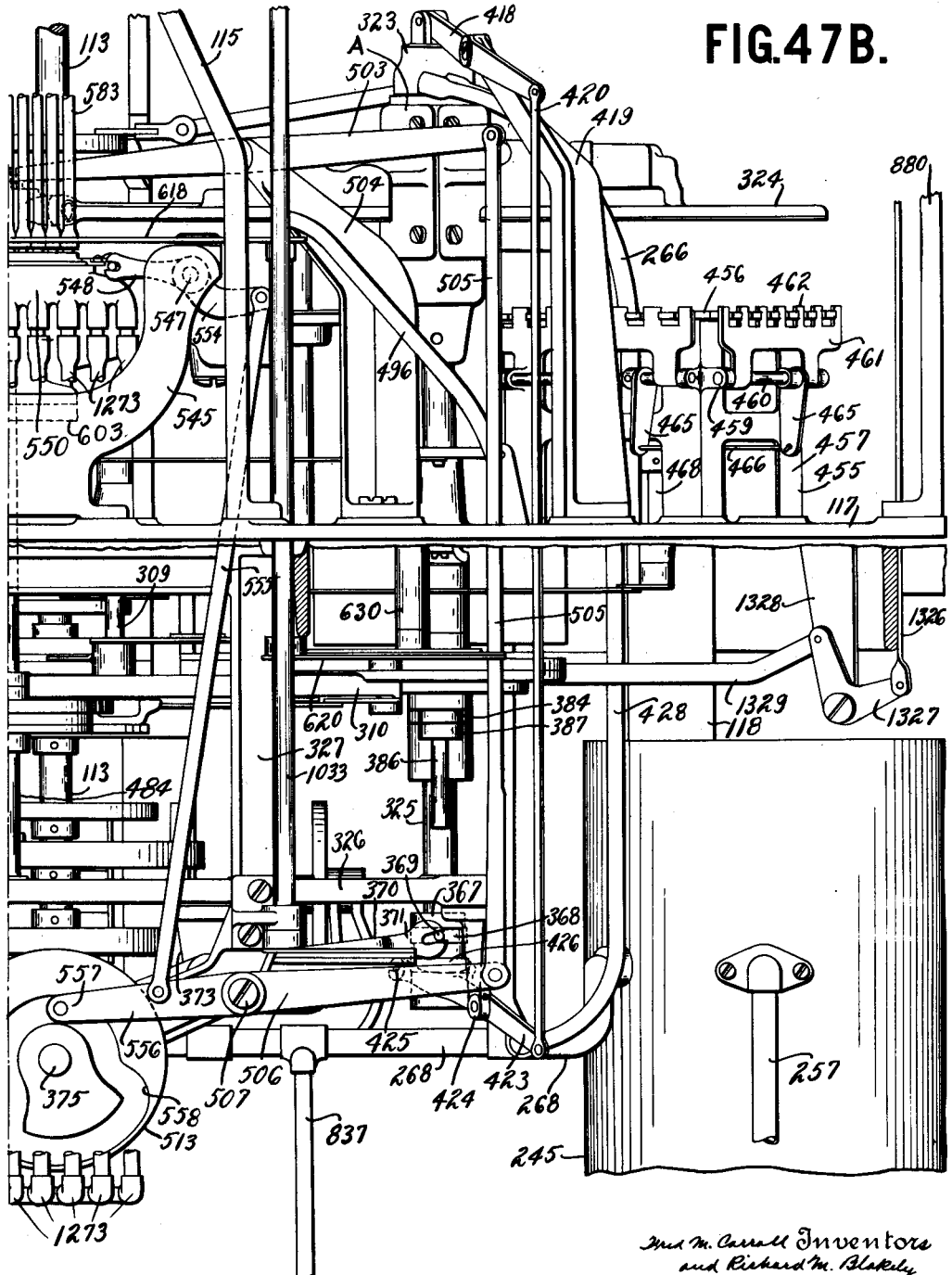

F. M. CARROLL AND R. M. BLAKELY.
SORTING AND ACCOUNTING MACHINE.
APPLICATION FILED MAR. 2, 1916.
1,361,791.
Patented Dec. 7, 1920.
46 SHEETS—SHEET 27.
FIG. 48.
FIG. 50A.
FIG. 49.
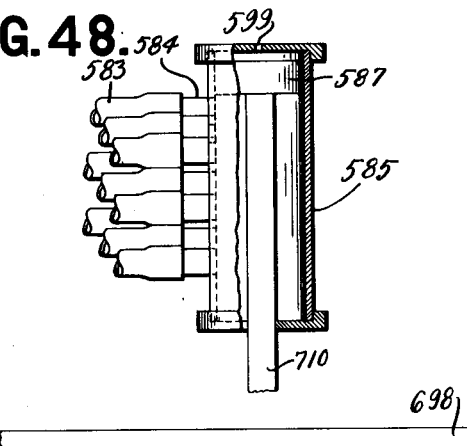
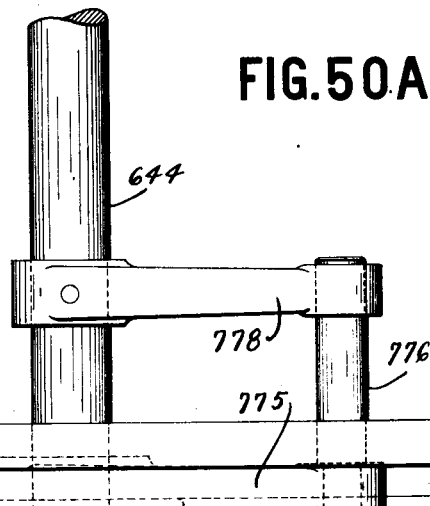
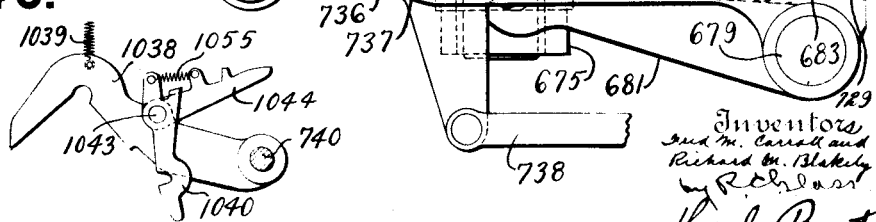

F. M. CARROLL AND R. M. BLAKELY.
SORTING AND ACCOUNTING MACHINE.
APPLICATION FILED MAR. 2, 1916.

1,361,791.

Patented Dec. 7, 1920.
46 SHEETS—SHEET 28.

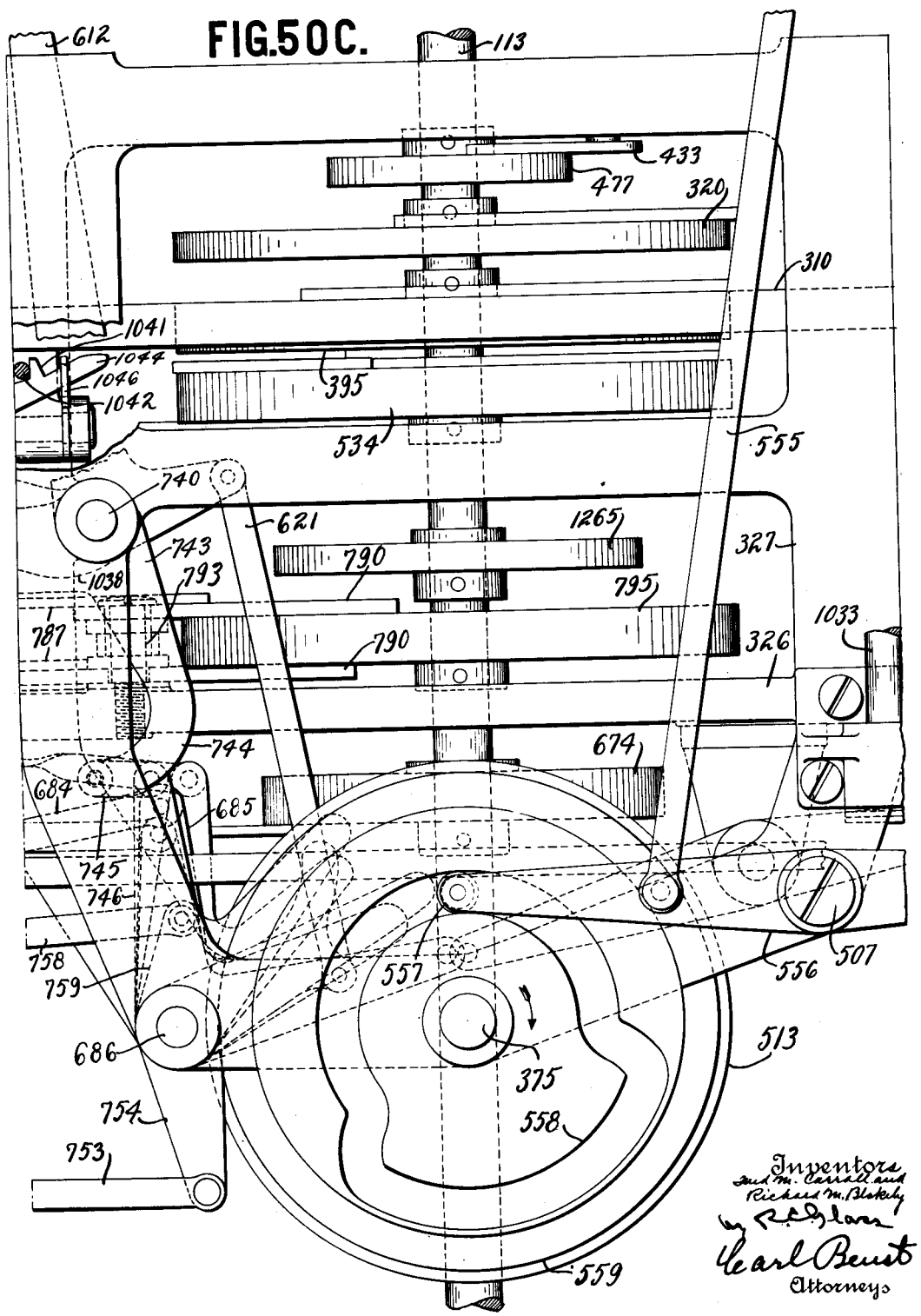

F. M. CARROLL AND R. M. BLAKELY.
SORTING AND ACCOUNTING MACHINE.
APPLICATION FILED MAR. 2, 1916.

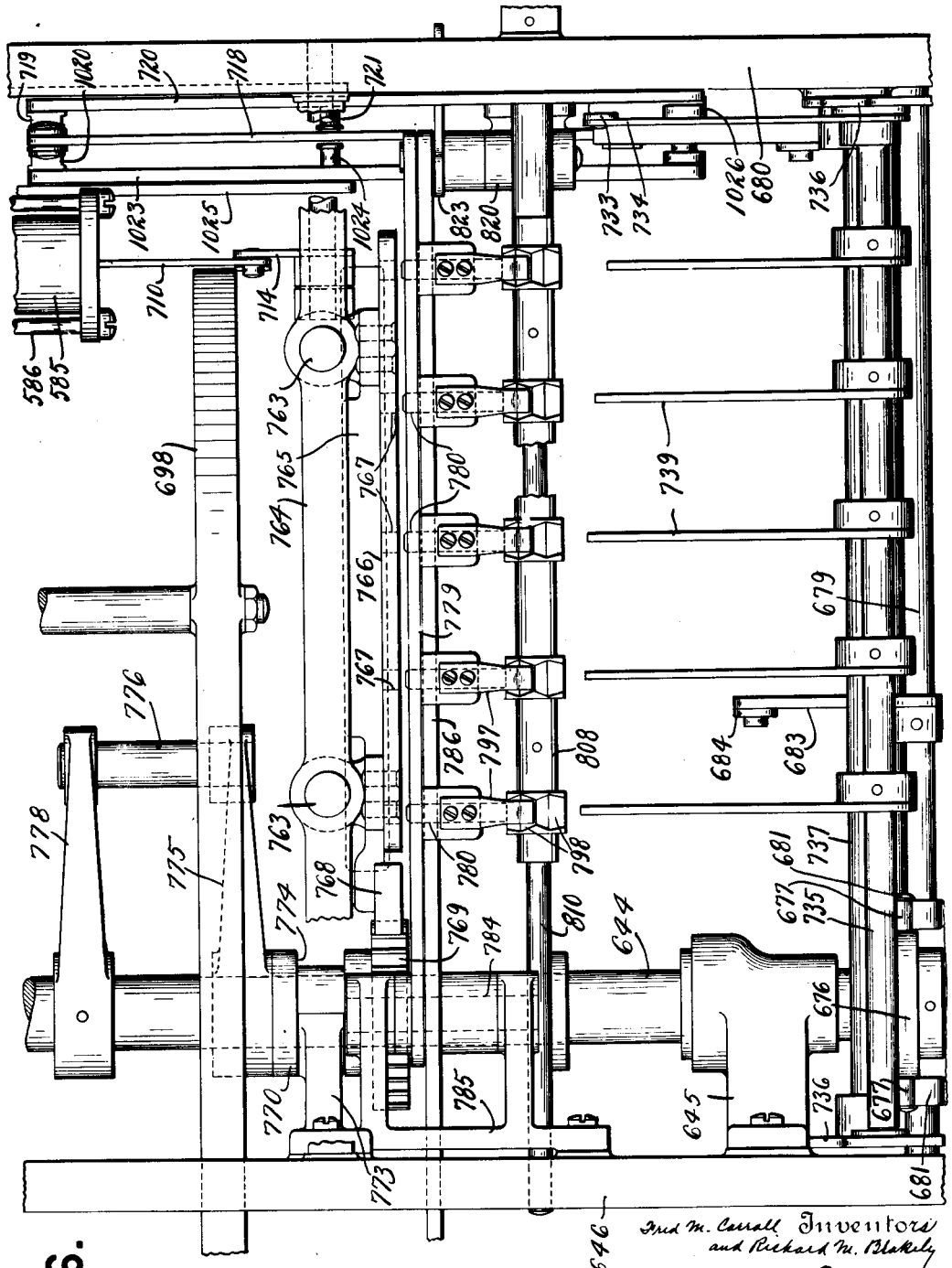

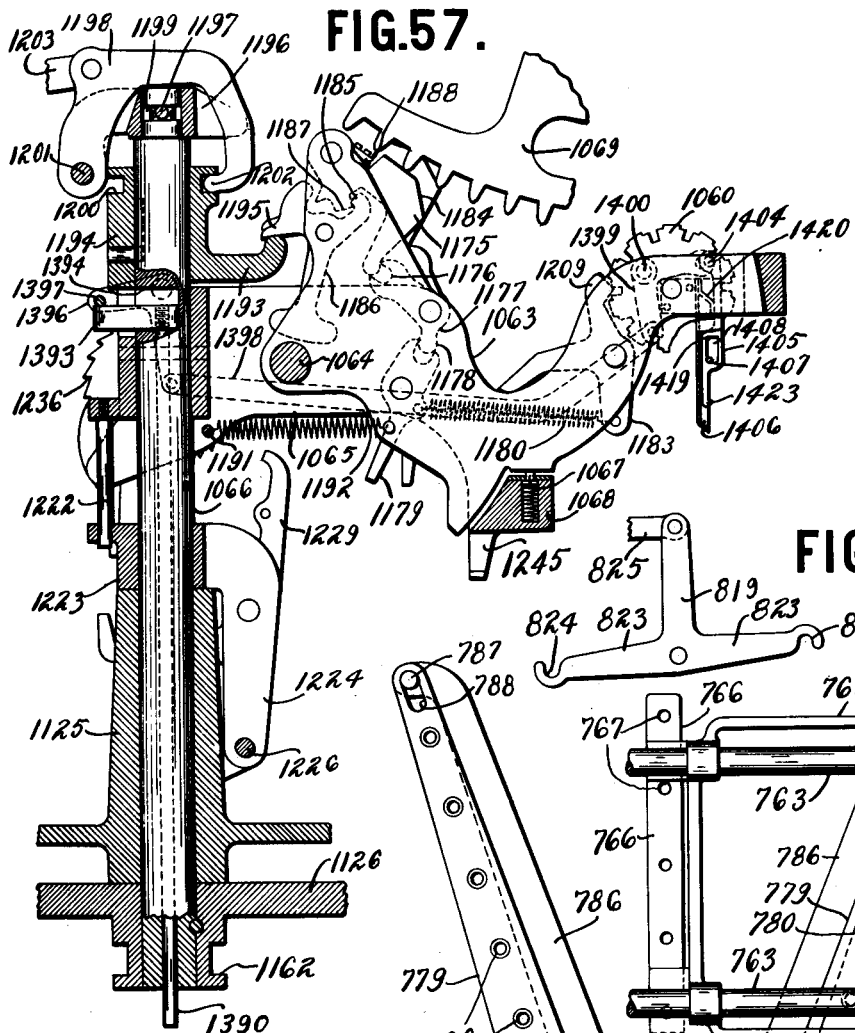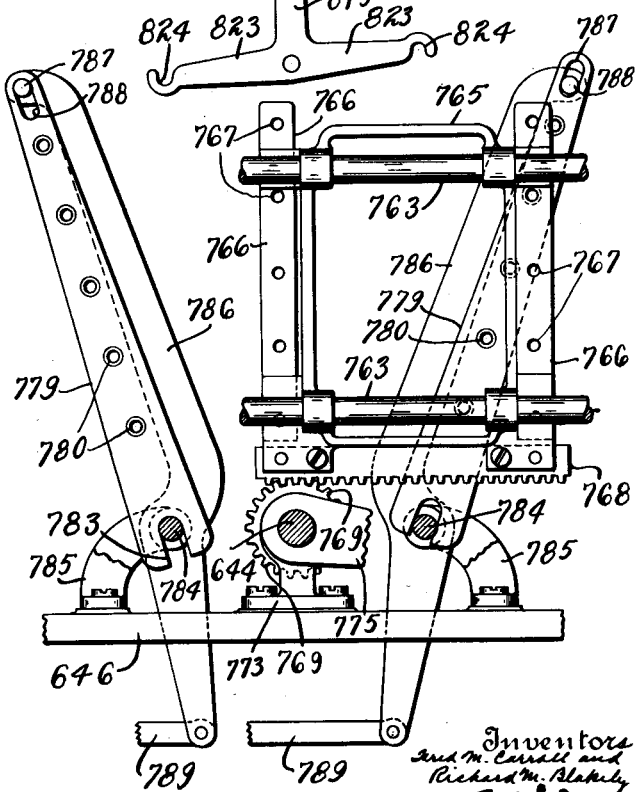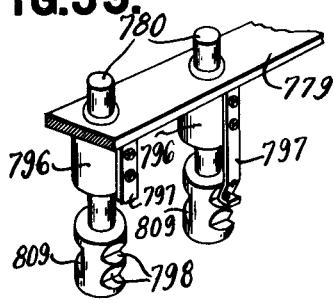

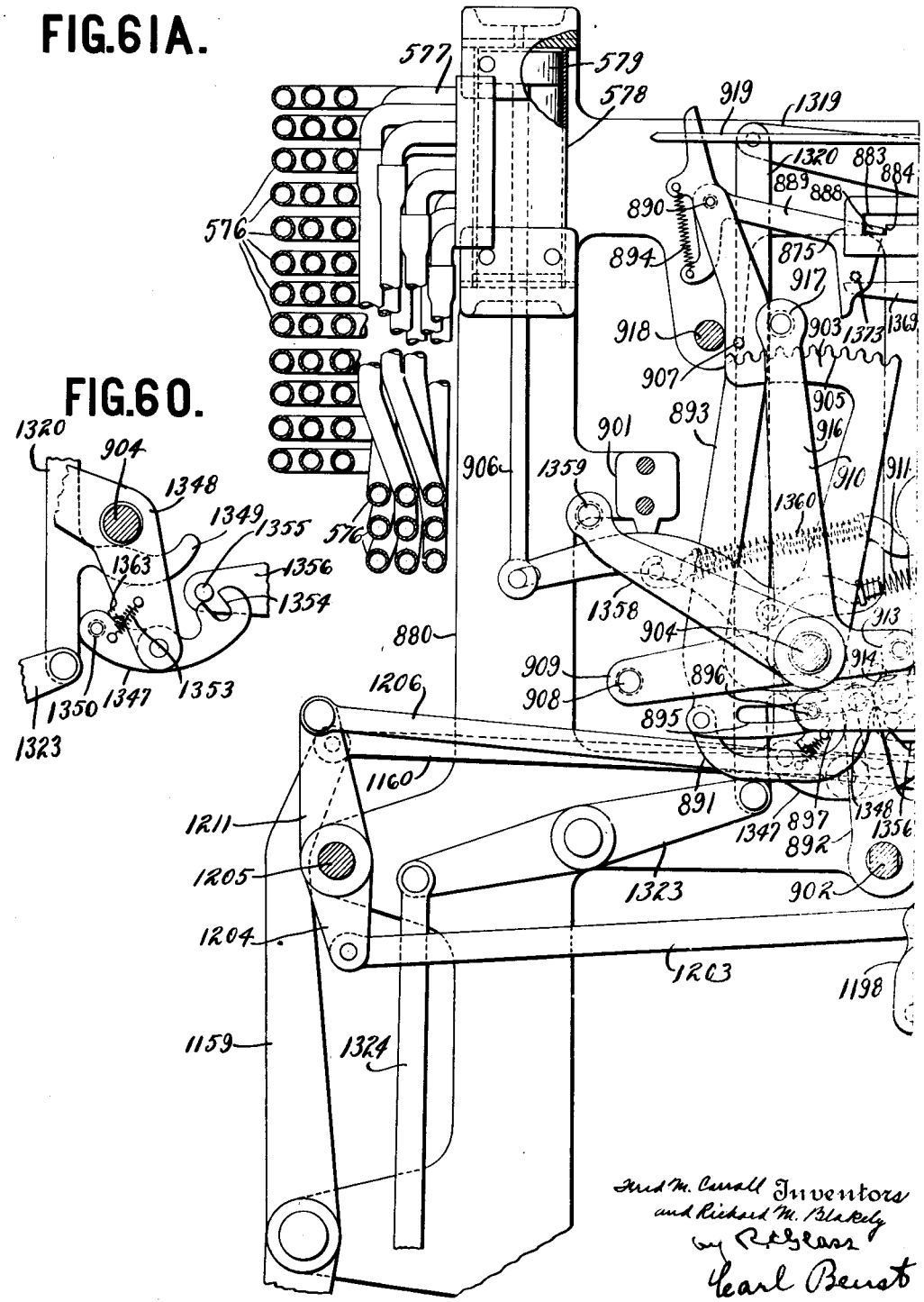

F. M. CARROLL AND R. M. BLAKELY.
SORTING AND ACCOUNTING MACHINE.
APPLICATION FILED MAR. 2, 1916.

1,361,791.

Patented Dec. 7, 1920.
46 SHEETS—SHEET 37.

F. M. CARROLL AND R. M. BLAKELY.
SORTING AND ACCOUNTING MACHINE.
APPLICATION FILED MAR. 2, 1916.
1,361,791.
Patented Dec. 7, 1920.
46 SHEETS—SHEET 38.
FIG.63B.
FIG.64.
FIG.65.
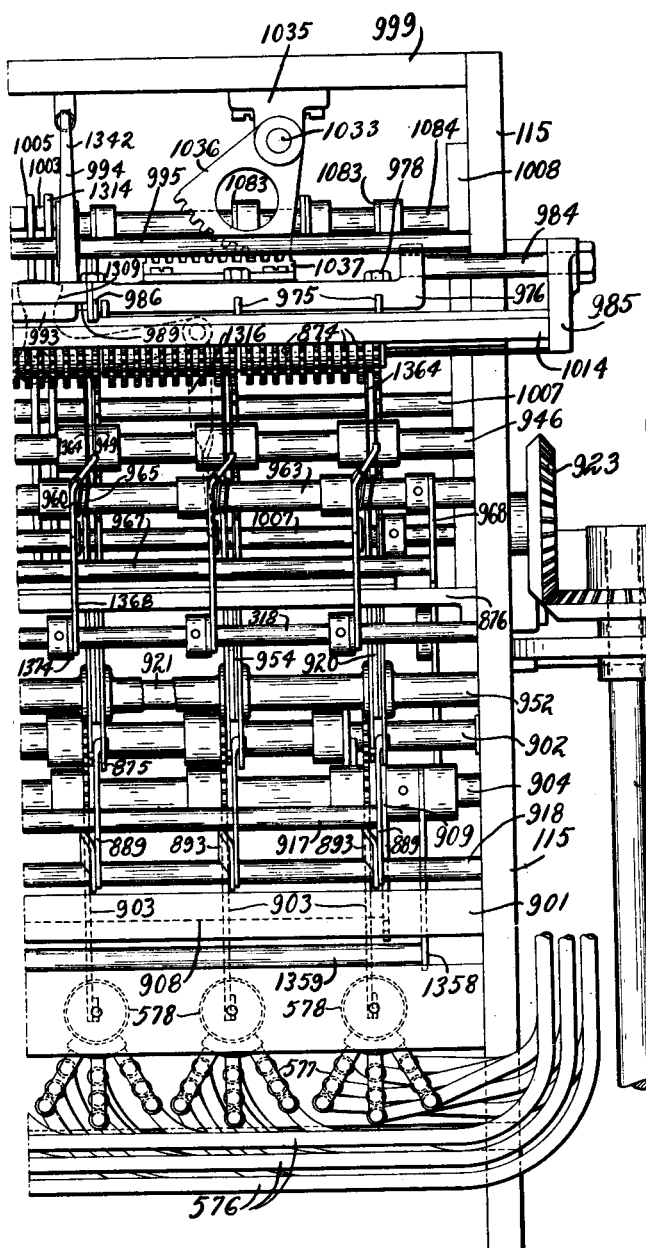
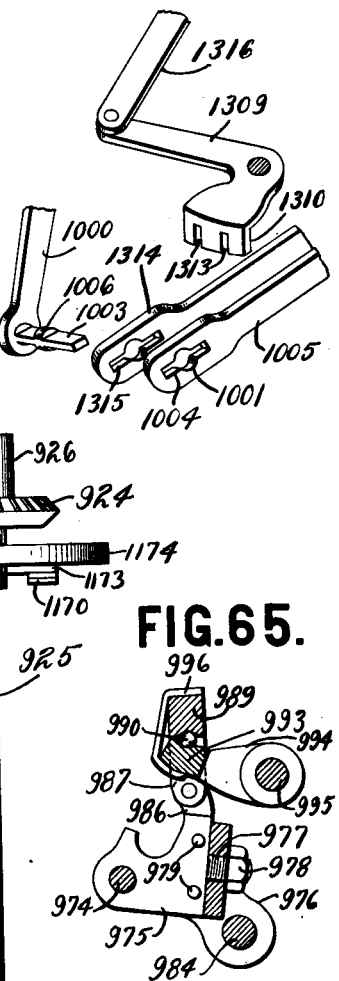

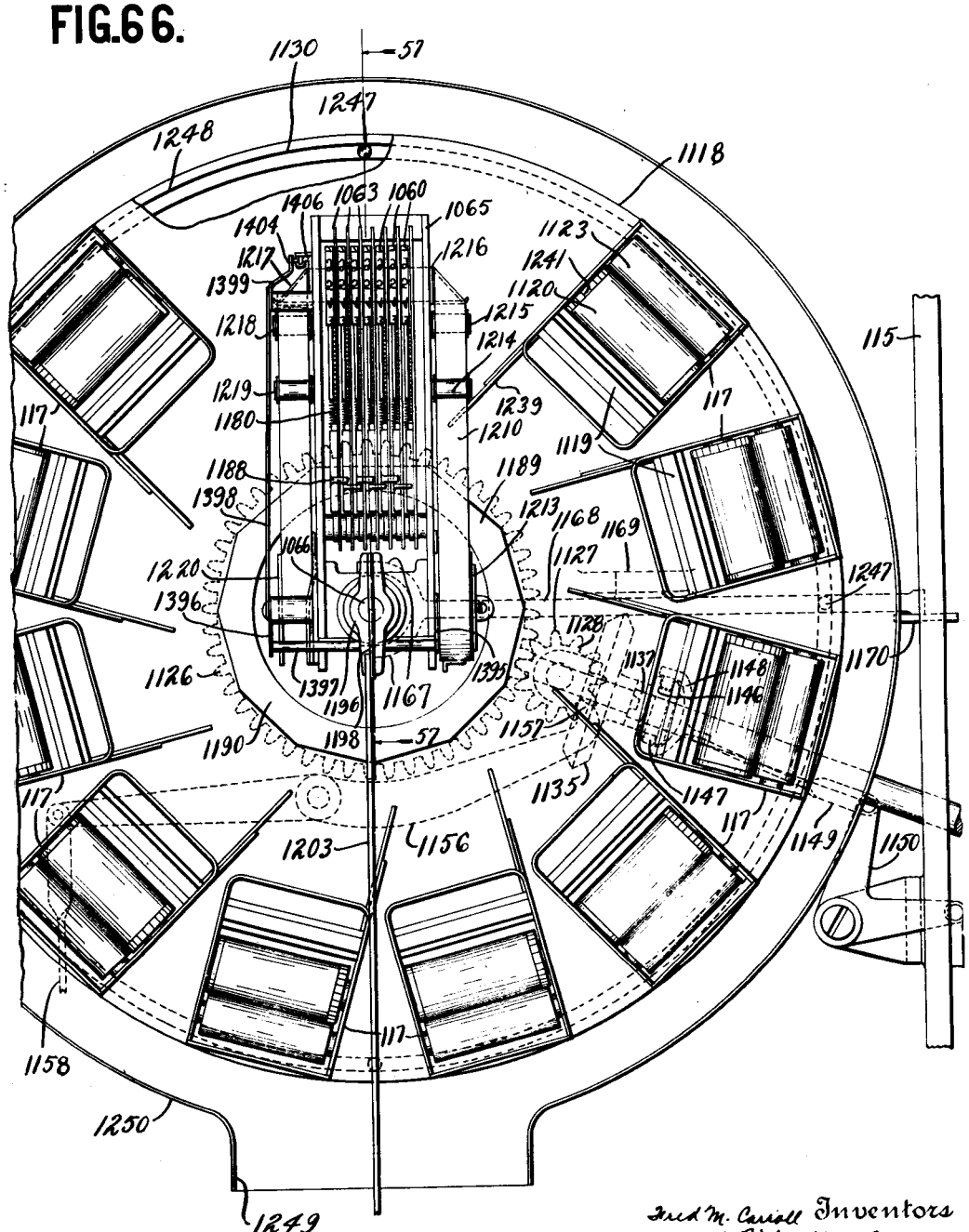

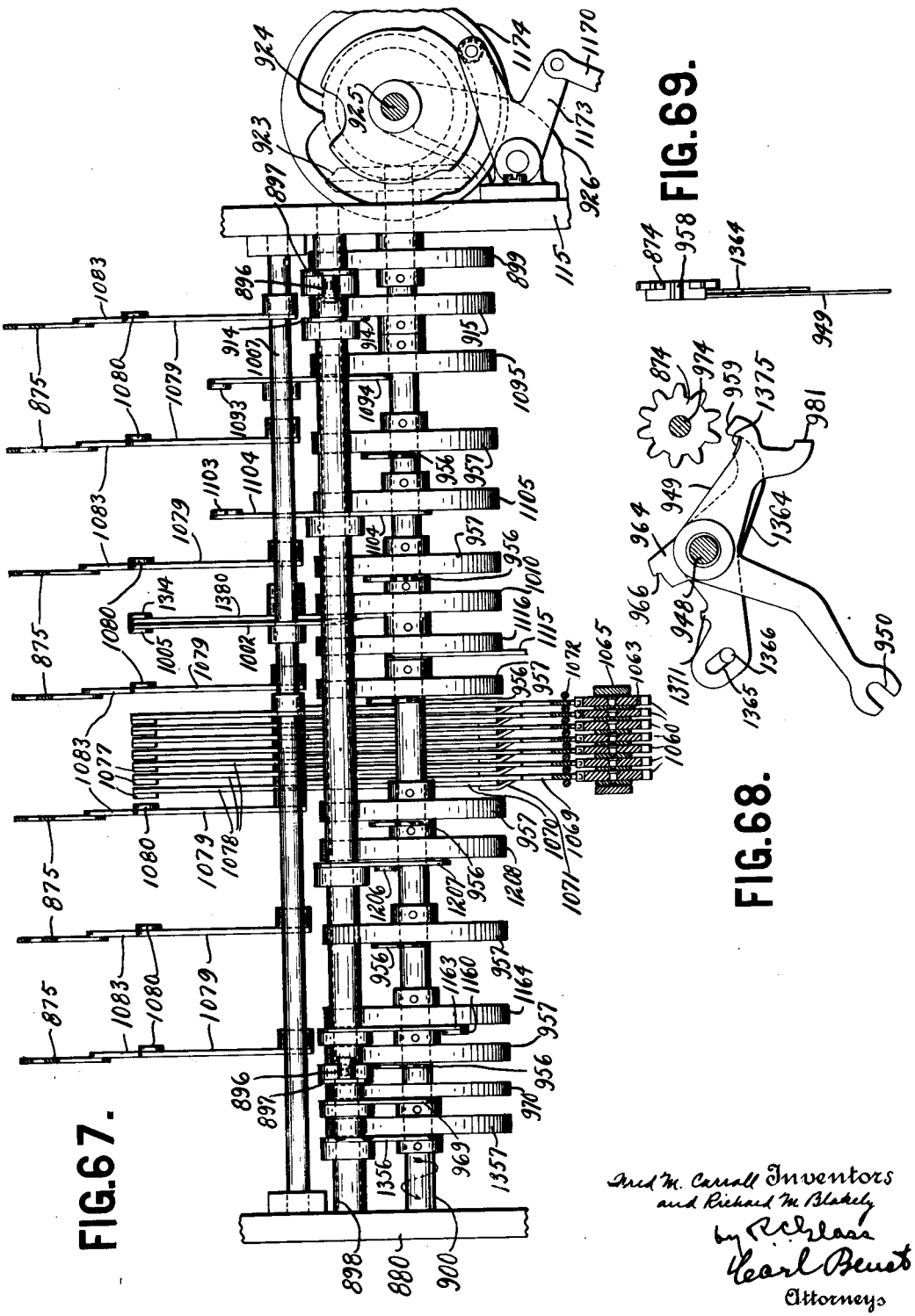

F. M. CARROLL AND R. M. BLAKELY.
SORTING AND ACCOUNTING MACHINE.
APPLICATION FILED MAR. 2, 1916.
1,361,791.
Patented Dec. 7, 1920.
46 SHEETS—SHEET 41.
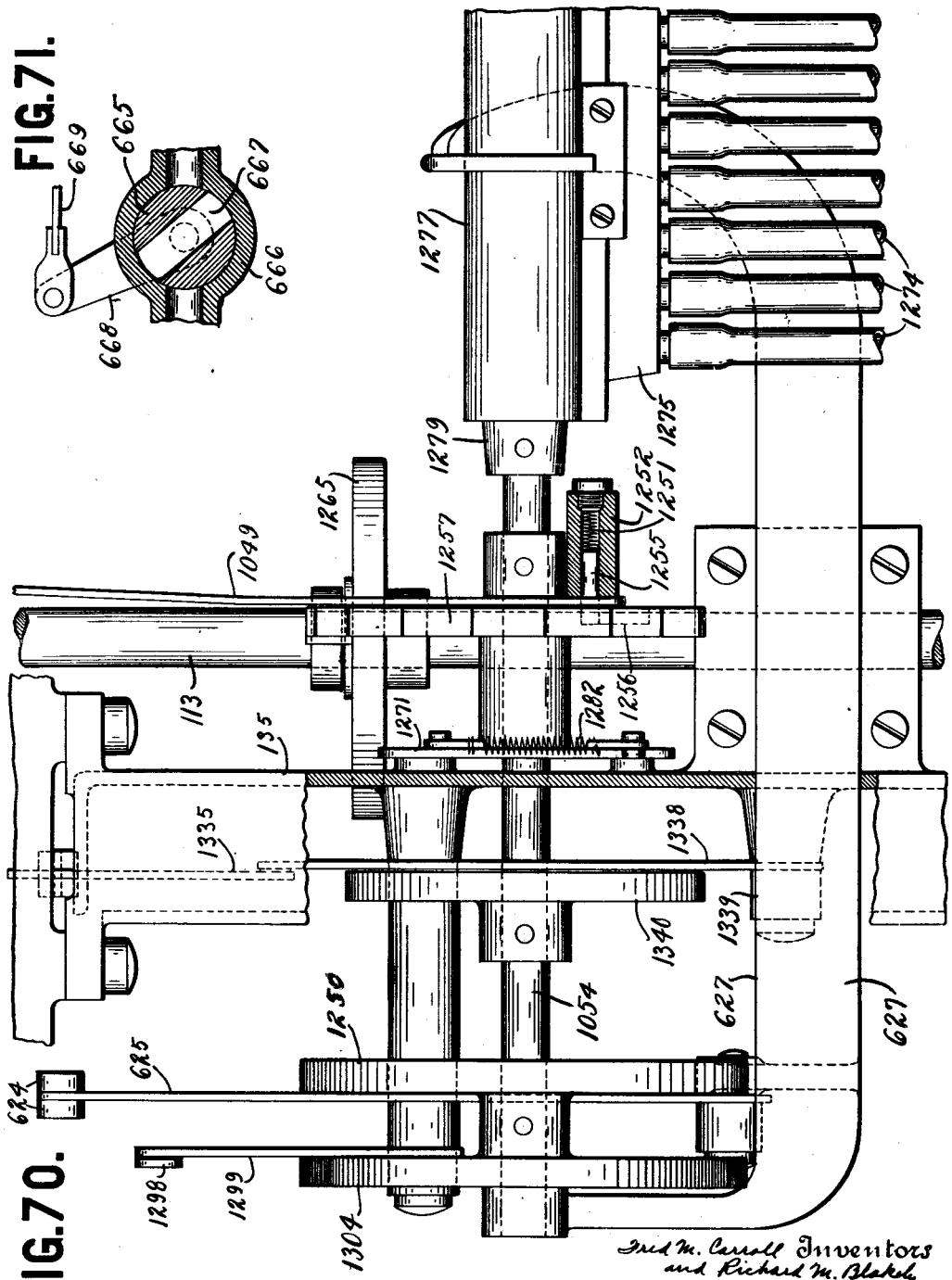

F. M. CARROLL AND R. M. BLAKELY.
SORTING AND ACCOUNTING MACHINE.
APPLICATION FILED MAR. 2, 1916.
1,361,791.
Patented Dec. 7, 1920.
46 SHEETS—SHEET 42.
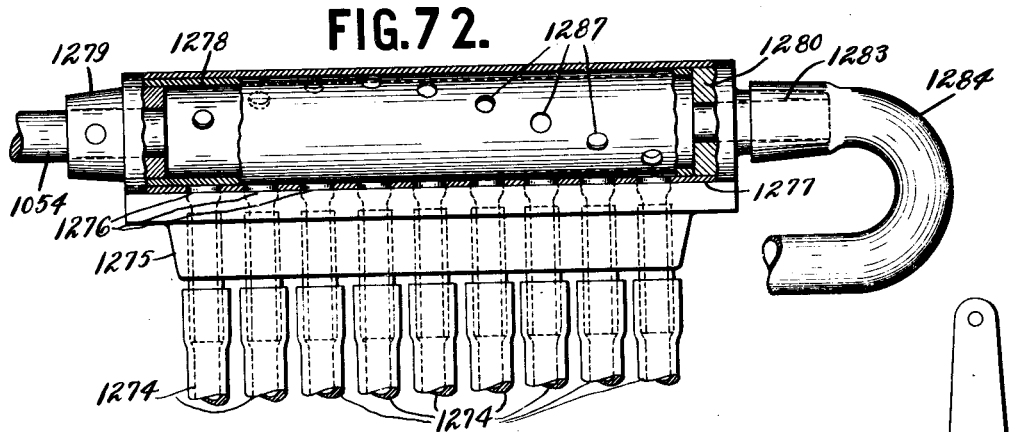
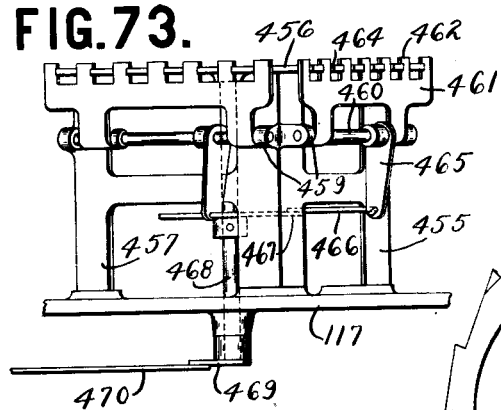
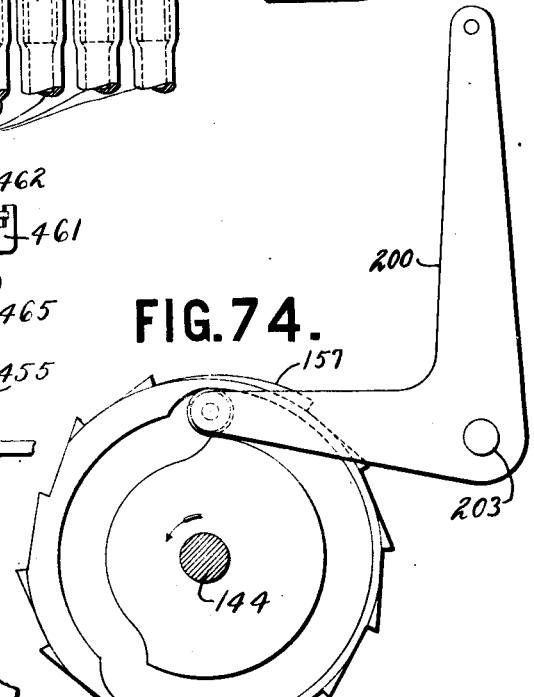
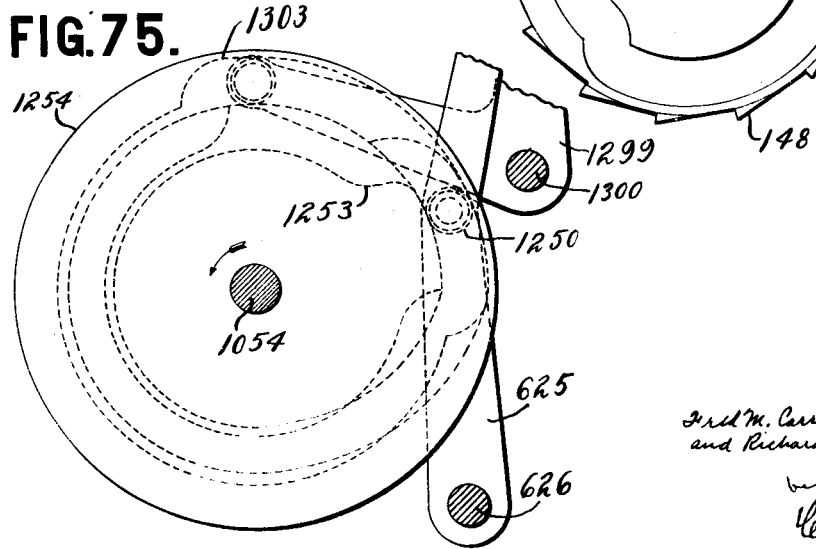

F. M. CARROLL AND R. M. BLAKELY.
SORTING AND ACCOUNTING MACHINE.
APPLICATION FILED MAR. 2, 1916.

1,361,791.

Patented Dec. 7, 1920.
46 SHEETS—SHEET 43.

F. M. CARROLL AND R. M. BLAKELY.
SORTING AND ACCOUNTING MACHINE.
APPLICATION FILED MAR. 2, 1916.

1,361,791.

Patented Dec. 7, 1920.

F. M. CARROLL AND R. M. BLAKELY.
SORTING AND ACCOUNTING MACHINE.
APPLICATION FILED MAR. 2, 1916.

1,361,791. Patented Dec. 7, 1920.
46 SHEETS—SHEET 45.

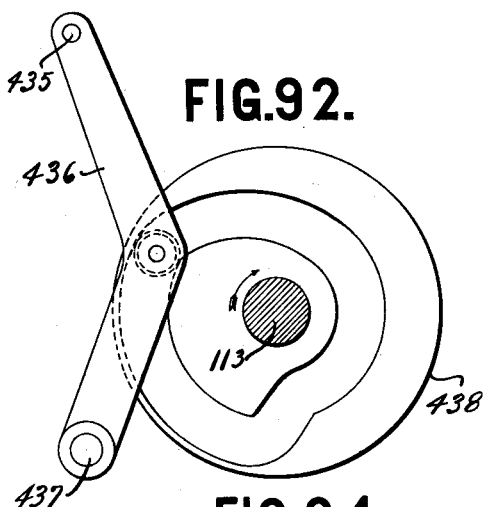
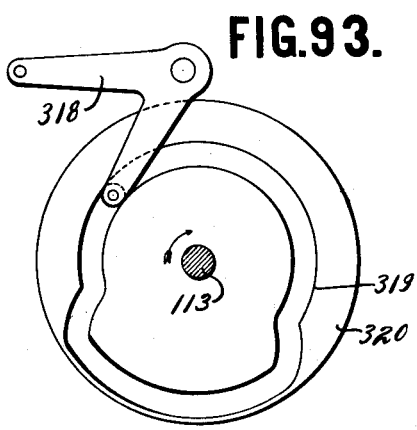
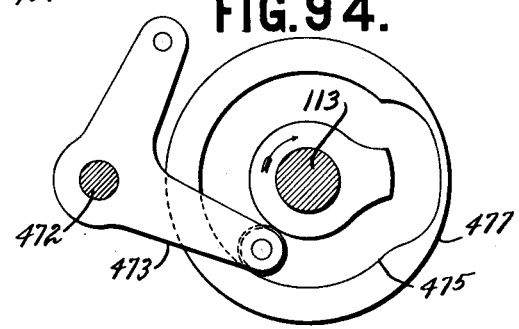
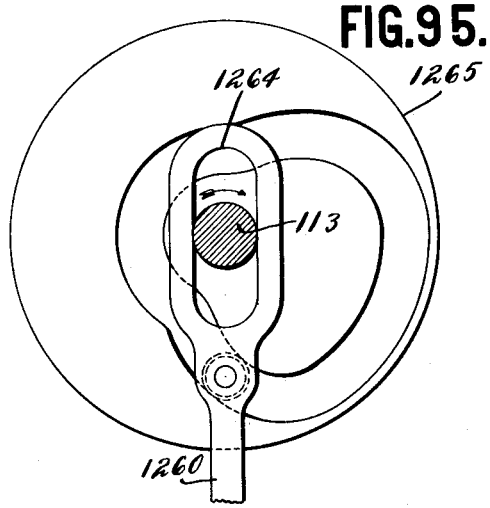
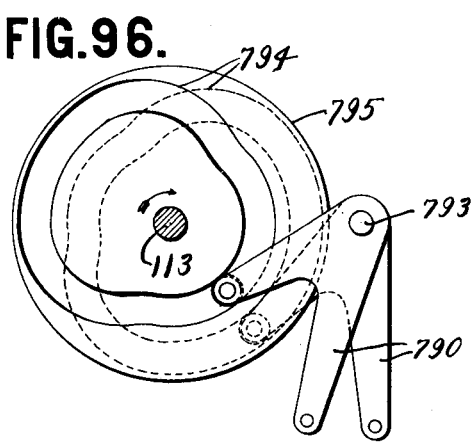
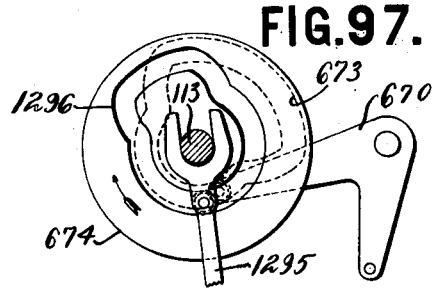

UNITED STATES PATENT OFFICE.

FRED M. CARROLL AND RICHARD M. BLAKELY, OF DAYTON, OHIO, ASSIGNORS TO THE NATIONAL CASH REGISTER COMPANY, OF DAYTON, OHIO, A CORPORATION OF OHIO, (INCORPORATED IN 1906.)

SORTING AND ACCOUNTING MACHINE.

1,361,791.   Specification of Letters Patent.   Patented Dec. 7, 1920.

Application filed March 2, 1916. Serial No. 81,651.

*To all whom it may concern:*

Be it known that we, FRED M. CARROLL and RICHARD M. BLAKELY, citizens of the United States, residing at Dayton, in the county of Montgomery and State of Ohio, have invented certain new and useful Improvements in Sorting and Accounting Machines, of which we declare the following to be a full, clear, and exact description.

This invention relates to auditing, sorting and tabulating machines and the like and comprises mechanism for sorting record slips or checks and accounting and printing mechanisms controlled by the record slips or checks.

In large commercial establishments having a number of departments with a number of clerks in each department it is usually desirable to ascertain the amount of business transacted by each clerk. At the present time in large commercial establishments, such as department stores, duplicate sales slips are made out for each purchase, the original of each slip being given to the customer as a receipt for the purchase while the duplicate is retained in the store. The clerks' totals are then ascertained by the auditing force checking over the duplicates of the sales slips. The ascertainment of the clerks' totals may be accomplished in a number of different ways. In a system extensively used at present the slips are manually assorted and then the totals of the various clerks are obtained by listing the sales made by the various clerks upon an adding machine from the data recorded upon the assorted slips. In some systems machines have been employed for sorting the slips either at the time they are made out or at some later time. Machines have also been designed so that the record slips are used for controlling the entry of amounts of the various sales on a plurality of accumulators representing the various clerks.

It is the principal object of this invention to construct a machine embodying sorting mechanism for sorting the sales slips under the control of perforations in the slips, a plurality of totalizers for accumulating the clerks' totals and printing mechanism for listing the amounts of the sales under the control of the slips as the latter are sorted. By this improved construction it is obvious that the burdensome work of manually sorting the slips and mentally tabulating the totals or obtaining the totals on an adding machine is entirely eliminated. The combination in a single machine of a sorting mechanism with auditing mechanism, such as totalizers and printing mechanism, also presents several advantages as the work can be accomplished more quickly and the cost is less than in systems employing separate machines for accomplishing the various functions.

Another object of this invention is to provide printing mechanism constructed to list separately the sales of the various clerks under the control of the sales slips and to print the clerks' totals under the control of the accumulating or totalizing mechanism. In the present invention a plurality of detail strips are employed and a common set of type carriers is adapted to list the items and print the totals of each list.

Another important object of this invention is to construct the machine so that the sales slips may be sorted and resorted into stacks or piles while the accumulating and printing mechanisms are in inoperative condition, the latter mechanisms being rendered operative so that the amounts on the slips are accumulated on the totalizers and printed on detail strips, only during the operations in which the slips are sorted the last time. With such a construction a limited and convenient number of totalizers and detail strips may be employed, the totalizers being cleared after the final assortment of each pile of slips.

Another object of this invention is to provide a novel pneumatic or other fluid pressure or suction system, comprising circuits, passages or ducts, and controlled by perforations in records for controlling the operation of the sorting, accumulating and printing mechanisms. This pneumatic system also includes novel valve constructions performing various functions.

A further object of this invention is to provide means for automatically controlling the printing mechanism so that the latter prints the clerks' numbers in connection with the various printed lists. In the present invention the type carriers for printing the amounts of the sales and the clerks' totals are also employed for printing the clerks' numbers at the head of the various lists to identify the lists appropriate to the various clerks.

It is also an object of this invention to delay or interrupt the operation of the sorting mechanism and disable the accumulating mechanism during the cycles of operation in which the clerks' numbers are printed by the printing mechanism.

Still another object of this invention is to automatically and in automatic succession clear the totalizers and record the totals. In the present form of embodiment of the invention the various totalizers are selected for operation and the detail strips to be printed upon are determined in total printing operations under the control of said means which controls the printing of the clerks' numbers in connection with each printed list.

Another object of this invention is to delay the operation of the sorting, accumulating and printing mechanisms until the pneumatic system has attained the proper pressure and suction.

Another object of this invention is to provide novel means for automatically stopping the operating mechanism when the supply of sales slips placed in the machine to be sorted is exhausted, this means also being constructed to stop the machine at the end of total printing operations. The operation of the sorting, accumulating and printing mechanisms may also be interrupted or stopped at any time at the will of the attendant.

It is another object of this invention to render the rapid operation of the various parts of the sorting mechanism unnecessary by constructing them so that they coöperate to perform the different functions during a plurality of cycles of operation of the machine. In the present invention the distribution of a slip from the supply pile to the proper one of the resulting piles requires five cycles of operation, the slip being moved to a different position at each cycle. It is understood, of course, that at any time during a sorting operation there are five slips in the process of distribution, one slip being in each position. Therefore the distribution of the slips overlaps, a slip being taken from the pile or stack at one cycle and moved progressively along at each succeeding cycle until it is properly deposited.

It is also an object of this invention to construct novel transfer mechanism for the totalizers.

A still further object of the invention is to provide novel means under the control of the accumulating elements in total printing operations for controlling the operation of the type carriers.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Of said drawings:—

Figure 1 is a diagrammatic view showing the pneumatic system of the present invention.

Fig. 2 is a detail sectional view showing the means for connecting the driving mechanism for the totalizing and printing mechanisms to the main driving shaft.

Figure 3C:
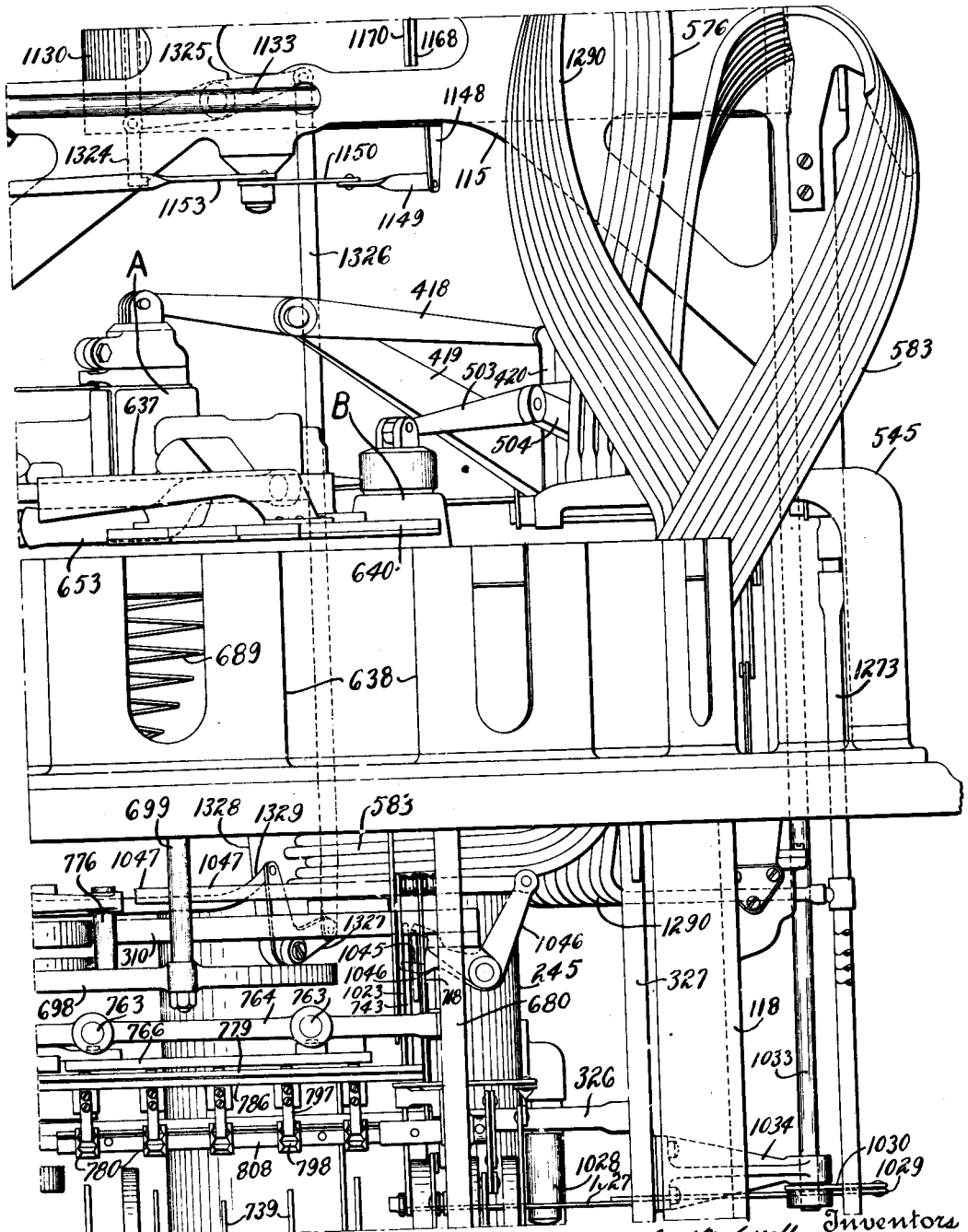

Figs. 3$^A$, 3$^B$, 3$^C$, 3$^D$ and 3$^E$ combined constitute a right hand side elevation of the machine.

Fig. 4 (Sheet 3) is a full sized detail view of the cam for disabling the totalizer engaging mechanism while the lists on the detail strips are being headed with the clerks' numbers.

Fig. 5 is a full sized detail front view of the manipulative devices for controlling the operation of the machine, the hood or casing for the manipulative devices being shown in cross section.

Figs. 6$^A$, 6$^B$ and 6$^C$ combined constitute a full sized cross sectional view through the front portion of the machine, the section being taken on the line 6—6 of Fig. 23.

Figure 7:
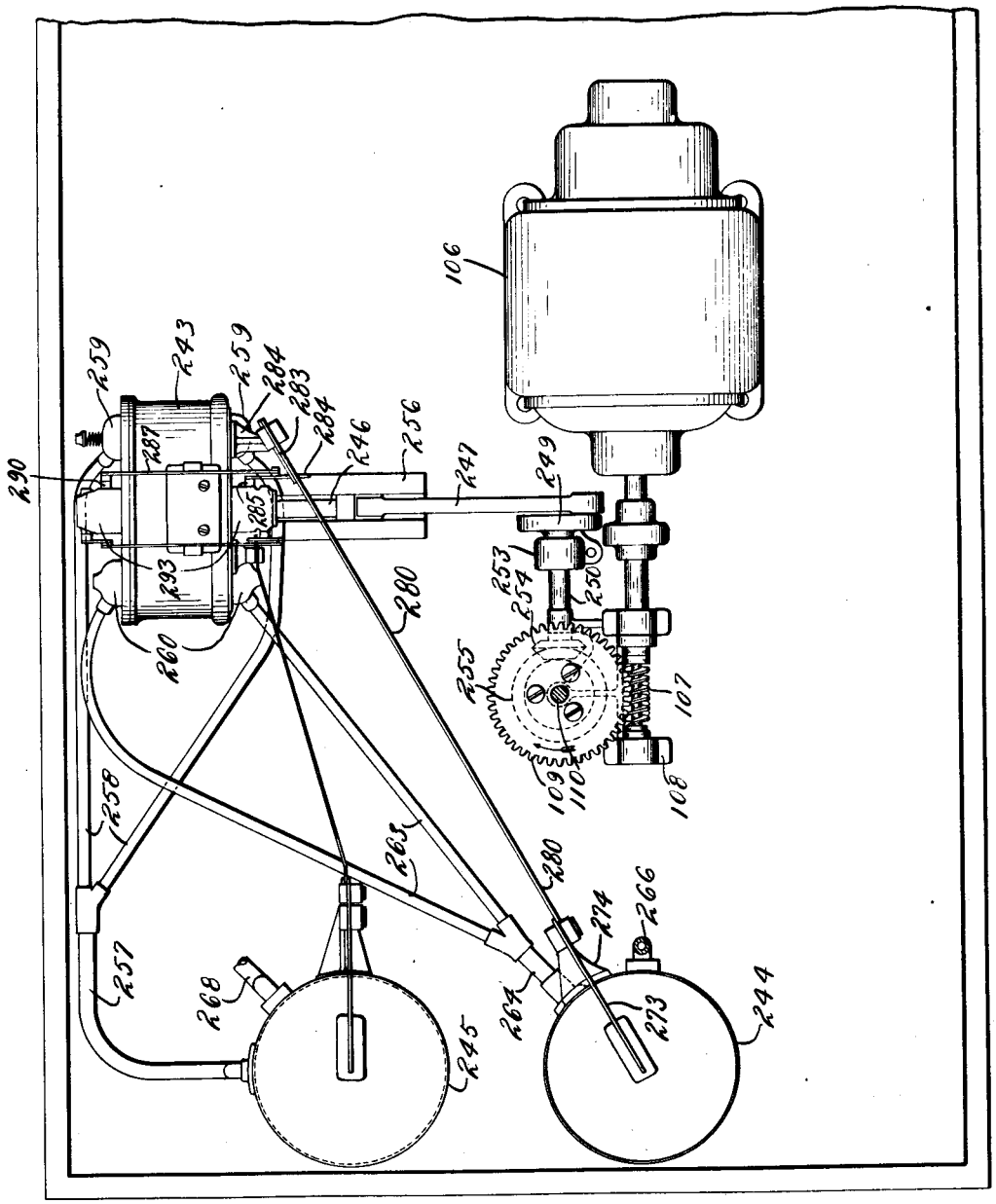

Fig. 7 is a top plan view of the electric driving device, the pneumatic pump and the pressure and vacuum tanks.

Figs. 8, 9 and 10 are detail views of the plates serving as interlocking devices for the manually adjustable levers shown in Fig. 5.

Fig. 11 is a full sized detail top plan view of the clutch for connecting the main driving shaft to the shaft adapted to be rotated by the motor independently of the driving shaft.

Figure 16:
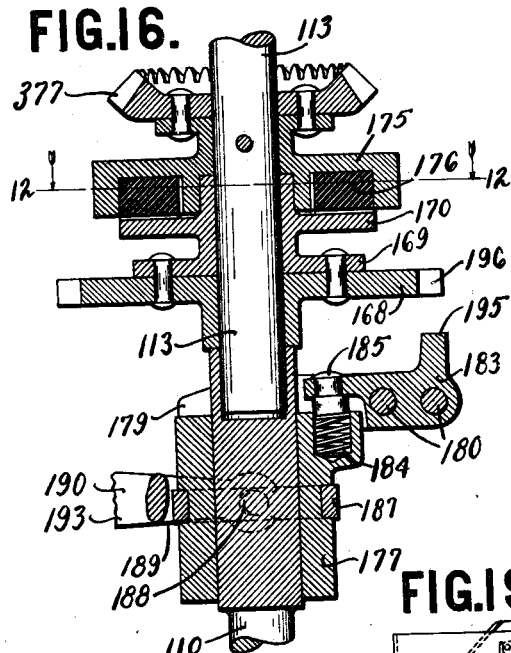

Fig. 12 is a full sized cross sectional view taken through a shock absorbing device as on the line 12—12 of Fig. 16.

Fig. 13 is a full sized detail view of the cam for operating the ratchet shown in Fig. 6$^C$.

Fig. 14 is a full sized detail view of the device controlling operation of the means for feeding the detail strips an extra step during heading cycles of operation and total printing operations.

Figure 15:
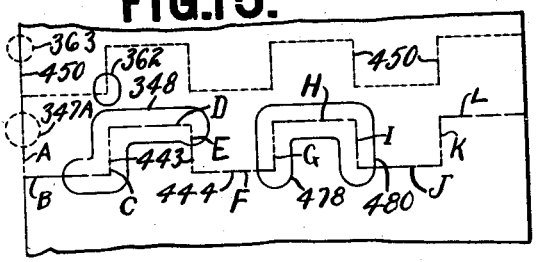

Fig. 15 is a diagrammatic view illustrating the operation of the valve device for slip carrier A.

Fig. 16 is a full sized detail vertical section taken on the line 16—16 of Fig. 11.

Figure 17:
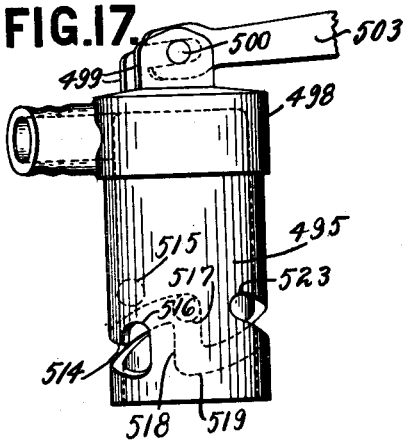

Fig. 17 is a full sized detail view of the cylinder comprising one of the valve members of a valve for slip carrier A.

Figure 18:
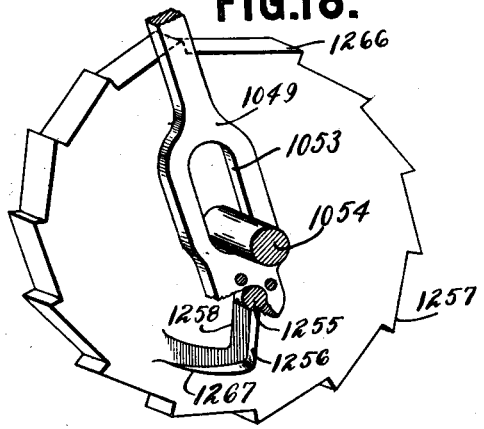

Fig. 18 is a full sized perspective view of part of the device for starting the means controlling the printing mechanism during heading cycles of operation and total printing operations.

Figure 19:
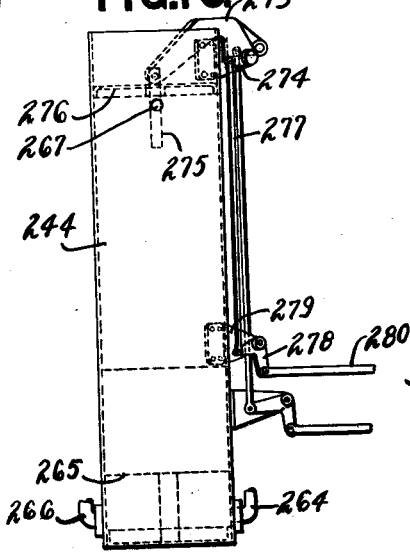

Fig. 19 is a detail side view of the pressure tank.

Fig. 20 is a full sized detail sectional view taken on the line 20—20 of Fig. 5.

Fig. 21 is a full sized detail sectional view taken on the line 21—21 of Fig. 5.

Fig. 22 is a full sized detail sectional view taken on the line 22—22 of Fig. 5.

Fig. 23 is a top plan view of the machine with the totalizing and printing mechanisms omitted.

Fig. 24 is a full sized detail top plan view, partly broken away, of slip carrier A.

Figure 25:
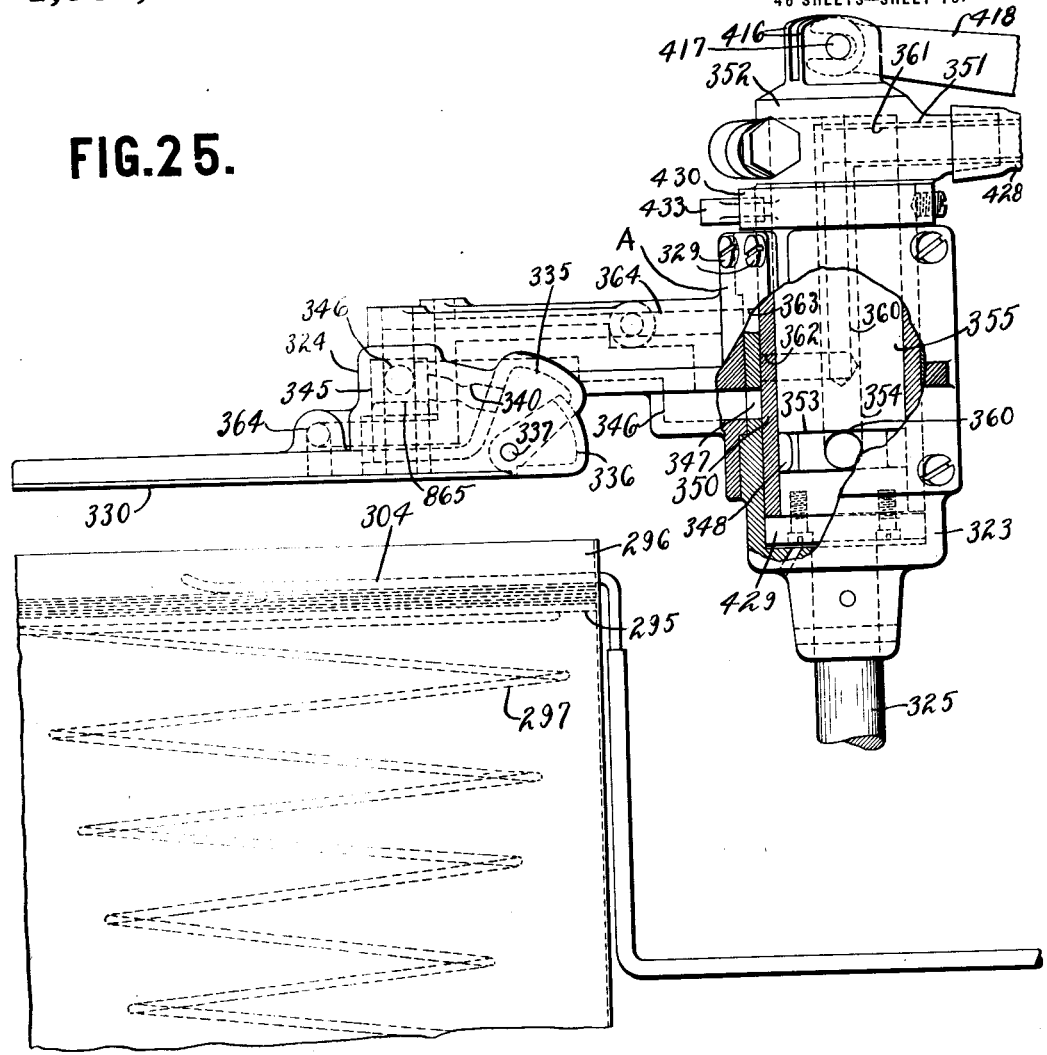

Fig. 25 is a full sized detail side view, partly broken away, of slip carrier A.

Figure 26:
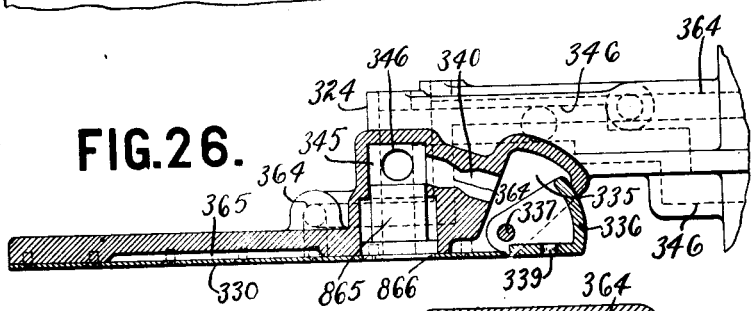

Fig. 26 is a full sized cross sectional view taken on the line 26—26 of Fig. 24.

Figure 27:
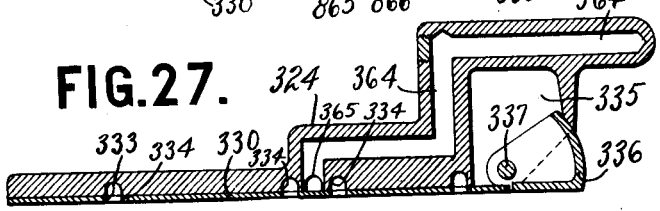

Fig. 27 is a full sized cross sectional view taken on the line 27—27 of Fig. 24.

Fig. 28 comprises five full sized cross sectional views showing the valve device for slip carrier A in different positions. The sections are taken on the line 28—28 of the left hand view of Fig. 29.

Fig. 29 comprises five full sized side views of the valve device shown in Fig. 28. The position of the valve in each of these views in Fig. 29 corresponds to the position of the valve shown directly above in Fig. 28.

Fig. 30 is a detail horizontal sectional view showing the means for rotating slip carriers A and B, the section being taken on the line 30—30 of Fig. 33.

Fig. 31 is a detail view showing the cam for rotating slip carrier B and the cam for operating the locking device for this slip carrier against operation during heading cycles of operation and total printing operations of the machine.

Fig. 32 is a detail view of the cam for imparting vertical movement to slip carrier A.

Fig. 33 is a full sized detail right hand side view of the mechanism shown in Fig. 30.

Fig. 34 is a full sized detail vertical sectional view taken through part of the means for rotating slip carrier A.

Fig. 35 is a top plan sectional detail view showing various parts of the machine to be referred to more fully in the detailed description.

Fig. 36 is a full sized detail side view, partly broken away, of slip carrier B and the translating device.

Fig. 37 is a full sized detail top plan view of one of the arms of slip carrier B.

Fig. 38 is a full sized top plan detail view of the disk constituting a valve for slip carrier B.

Fig. 39 is a full sized detail top plan view of the translating device.

Fig. 40 is a full sized cross sectional view taken on the line 40—40 of Fig. 37.

Fig. 41 is a full sized detail view of the valve operated when there is no sales slip in controlling relation with the translating device.

Fig. 42 is a full sized rear view of the translating device.

Fig. 43 is a full sized detail view of an illustration form of sales slip adapted to control the machine.

Fig. 44 is a full sized detail top plan view, partly broken away, of the translating device.

Fig. 45 is a full sized detail view of the means for preventing operation of the machine after a total printing operation until the control lever is moved to its normal position.

Fig. 46 is a full sized top plan detail view of the device controlling the stopping of the machine when the supply of sales slips to be sorted has been exhausted.

Figs. 47$^A$ and 47$^B$ combined constitute a partial rear view of the machine.

Fig. 48 is a full sized detail view, partly broken away, of the piston cylinder of the differential mechanism controlled by the clerks' perforations in the sales slips.

Fig. 49 is a detail view of the arm for operating the differential mechanism adapted to shift the desired totalizer into coöperative position with the actuating mechanism for the totalizers.

Figs. 50$^A$, 50$^B$ and 50$^C$ combined constitute a full sized detail rear view of the differential mechanism controlled by the clerks' perforations in the sales slips.

Figure 51:
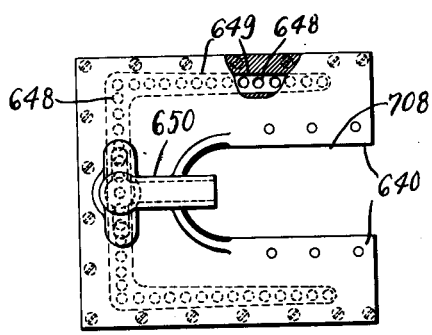

Fig. 51 is a detail top plan view of part of the distributing arm for the sales slips.

Figure 52:
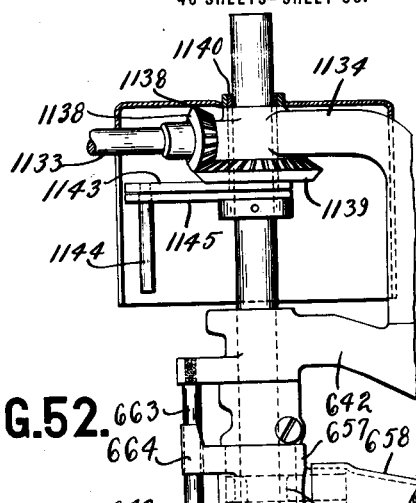

Fig. 52 is a detail side view of the distributing mechanism for the sales slips and shows one of the boxes into which the slips are deposited in cross section.

Figure 53:
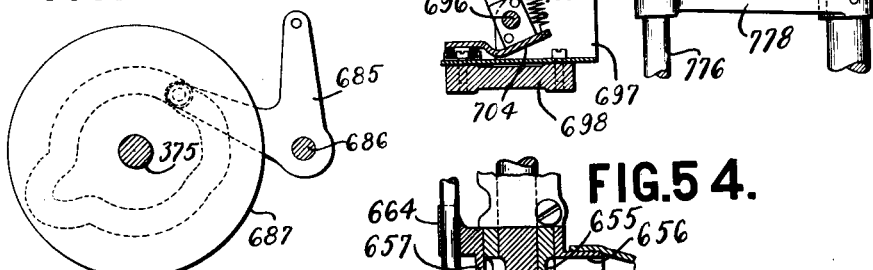

Fig. 53 is a detail view of the cam for raising and lowering the distributing mechanism shown in Fig. 52.

Figure 54:
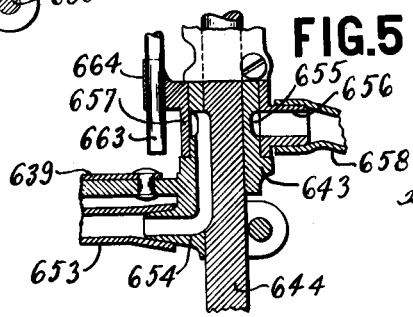

Fig. 54 is a detail vertical section through the hub of the distributing arm and shows the pneumatic connection whereby the air in an air chamber in the distributing arm may be exhausted by the pneumatic system.

Figure 55:
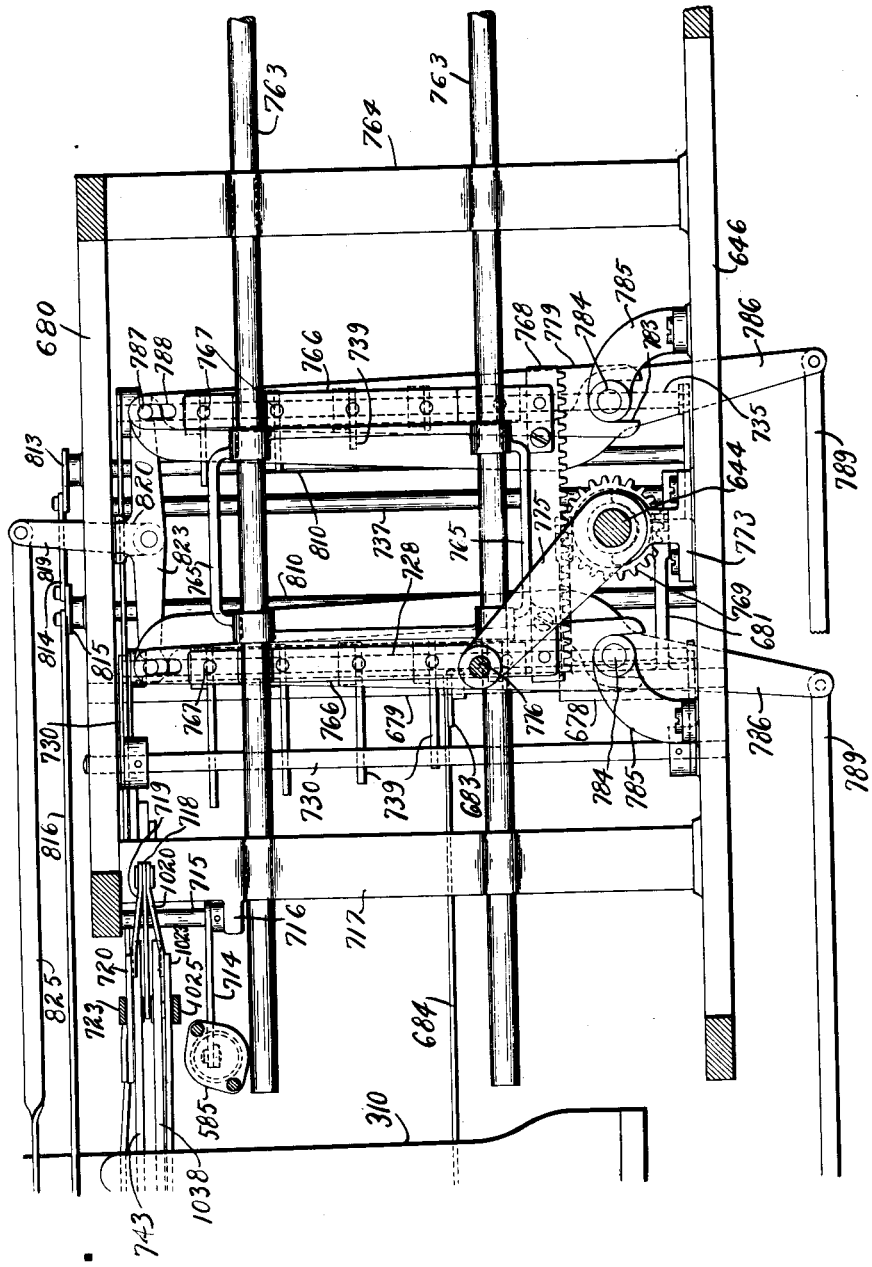

Fig. 55 is a detail top plan view of the differential mechanism controlled by the clerks' perforations in the sales slips.

Fig. 56 is a full sized detail right hand side view of the mechanism shown in Fig. 55.

Fig. 57 is a full sized vertical sectional view through the printing mechanism as on the line 57—57 of Fig. 66.

Fig. 58 is a detail top plan view showing part of the differential mechanism controlled by the clerks' perforations in the sales slips in operated position.

Fig. 59 is a full sized perspective view of two of the pivot pins of the differential mechanism controlled by the clerks' perforations in the sales slips.

Fig. 60 is a full sized detail view of part of the mechanism operated in total printing operations to move the totalizer actuating racks to their "9" positions.

Figs. 61^A, 61^B, and 61^C combined constitute a full sized detail side view of the totalizing and printing mechanisms.

Figure 62:
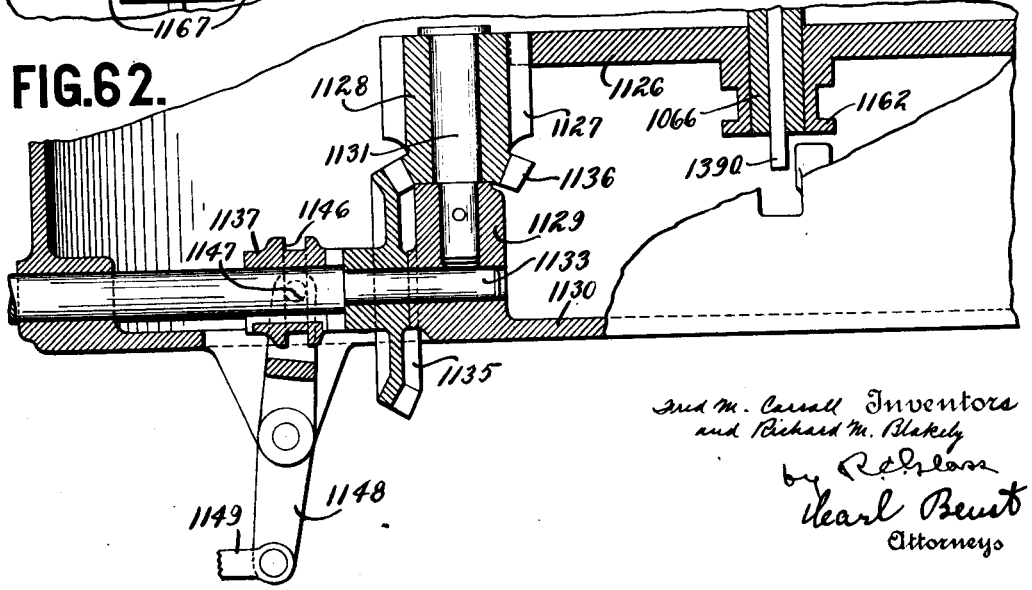

Fig. 62 is a full sized detail cross sectional view through the operating connections for rotating the printing mechanism to position the type carriers over the desired detail strip.

Figure 63A:
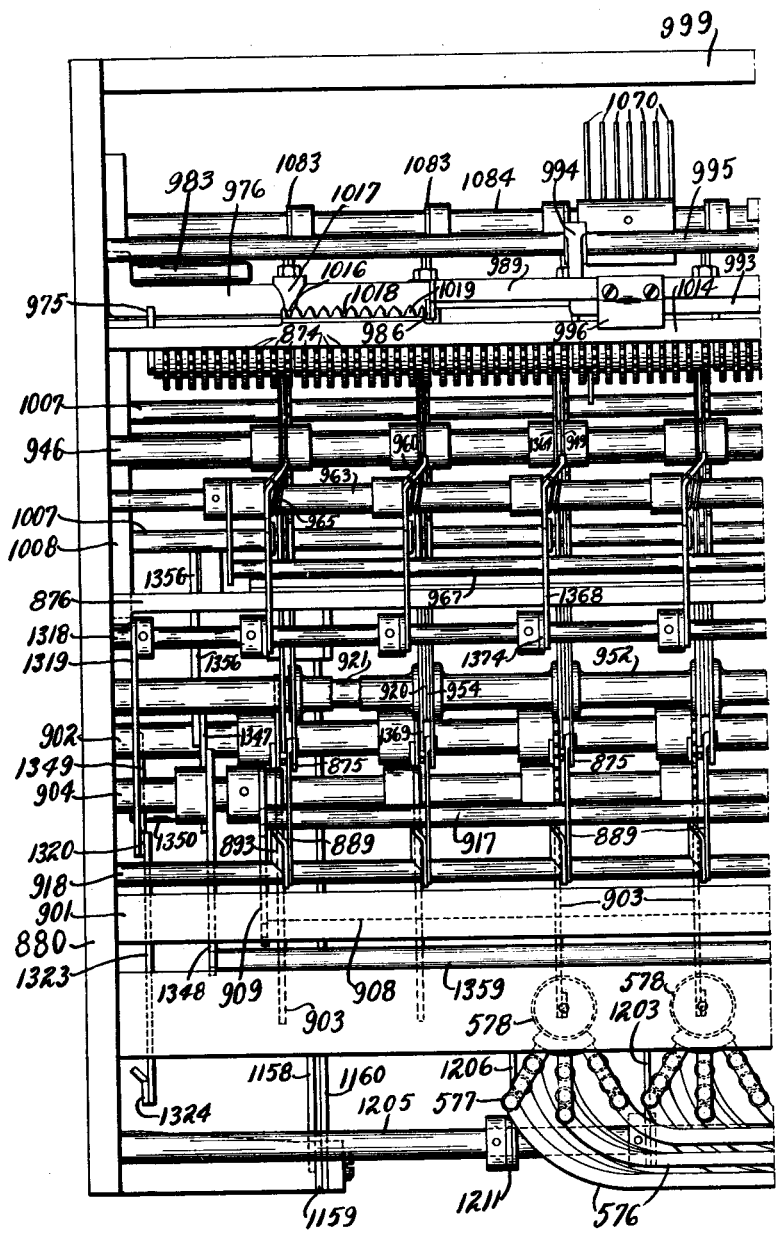

Figs. 63^A and 63^B combined constitute a top plan view of the totalizing mechanism.

Fig. 64 is a detail perspective view of part of the totalizer engaging mechanism, the various elements being separated to show their construction more clearly.

Fig. 65 is a detail cross sectional view through the totalizer frame.

Fig. 66 is a detail top plan view of the printing mechanism.

Fig. 67 is a detail front view of the cams and connections for operating various parts of the totalizing and printing mechanisms. In this view the type carriers and actuating segments are shown in cross section.

Fig. 68 is a detail side view showing a totalizer pinion, a transfer lever and a lever operated by the pinion to control the extent of movement of the amount differential mechanism in total printing operations.

Fig. 69 is a detail rear view of the totalizer pinion and levers shown in Fig. 68.

Fig. 70 is a full sized detail front view of the mechanism operated only during heading cycles of operation and total printing operations.

Fig. 71 is a detail cross sectional view through the valve controlling the partial exhaustion of the air from a groove in the distributing arm.

Fig. 72 is a full sized detail view, partly broken away, of the units automatic device operated during total printing operations and heading cycles of operation.

Fig. 73 is a full sized detail view of the device for properly alining the sales slips on the arms on slip carrier A.

Fig. 74 is a full sized detail view of the cam for operating the clutch device constructed to couple two of the operating shafts of the machine together. This clutch device is shown in Figs. 11 and 16.

Fig. 75 is a full sized detail view of two cams. The cam shown in full lines is employed to disable the rotating means for the slip carriers during heading cycles of operation and total printing operations. The cam shown in dotted lines is employed for shifting a plate of the translating device during heading cycles and total printing operations.

Figure 76:
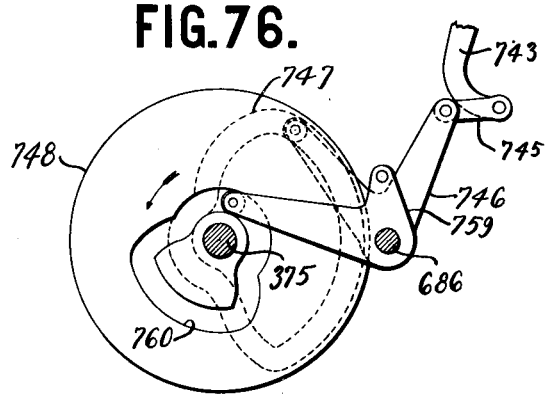

Fig. 76 is a detail of two cams. The cam shown in dotted lines is adapted to operate the operating lever for positioning the selecting fingers of the differential mechanism for the distributing arm. The cam shown in full lines is employed to operate the alining device retaining the part of the mechanism moved differentially under the control of the clerk's perforations in moved positions.

Figure 77:
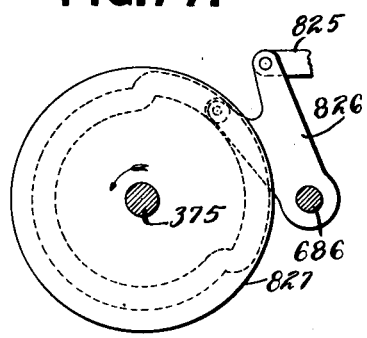

Fig. 77 is a detail view of the cam employed to operate the device for alining the differential mechanism shown in Fig. 58 in normal position.

Figure 78:
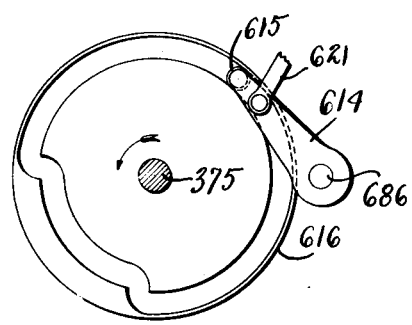

Fig. 78 is a detail view of the cam employed to operate the valve disk for slip carrier B.

Figure 79:
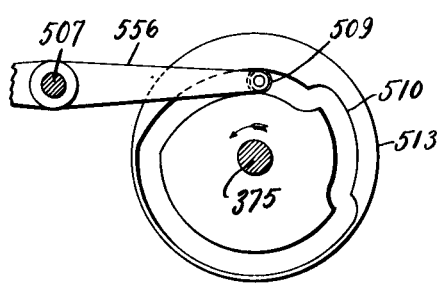

Fig. 79 is a detail view of the cam employed to raise and lower the valve cylinder of the slip carrier B.

Figure 80:
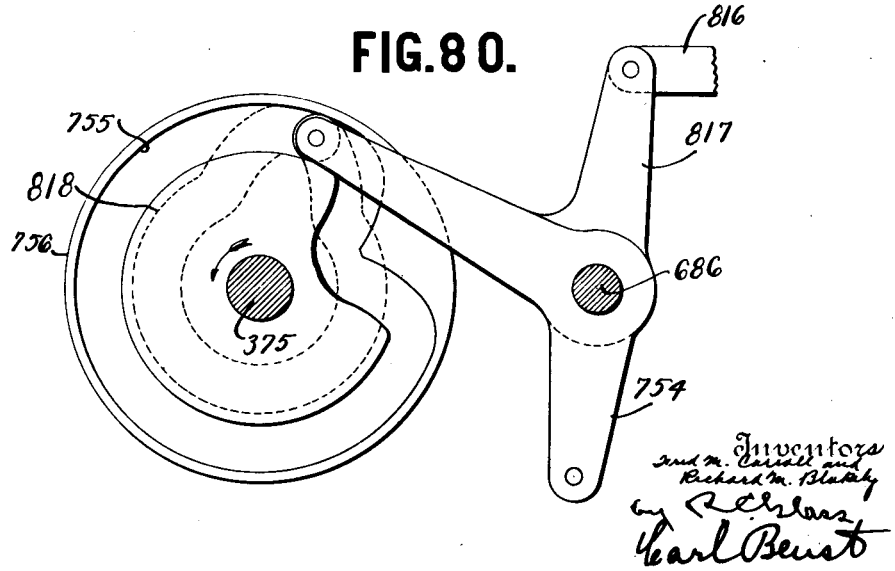

Fig. 80 is a full sized detail view of two cams adapted to operate the mechanisms for elevating and lowering the pivot pins of the differential mechanism controlled by the clerks' perforations in the sales slips.

Figure 81:
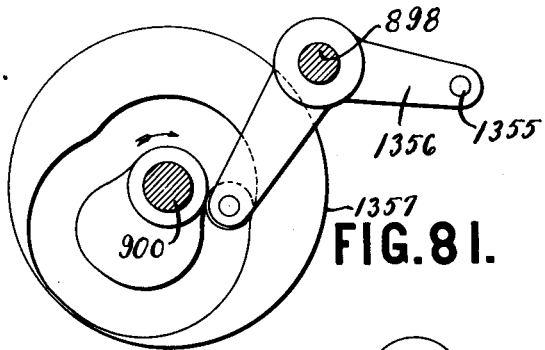

Fig. 81 is a full sized detail view of the cam for operating the device which moves the differential actuating racks for the totalizers to their "9" positions during total printing operations.

Figure 82:
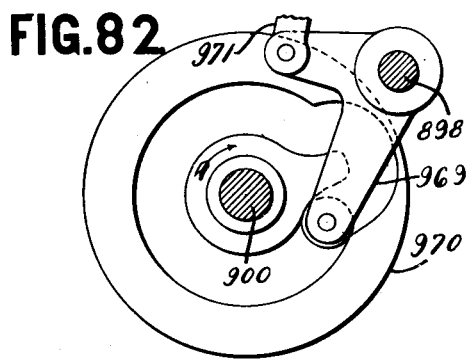

Fig. 82 is a full sized detail view of the cam employed to operate the restoring mechanism for the transfer levers.

Figure 83:
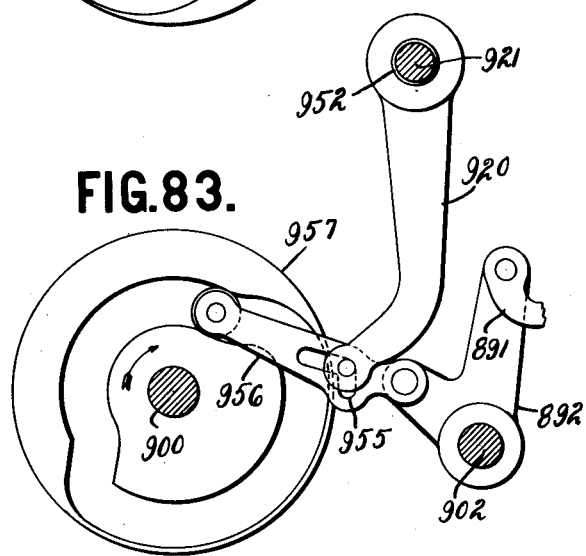

Fig. 83 is a full sized detail view of a cam and connections for moving an actuating rack for the totalizers an extra step of movement when transfers are required.

Figure 84:
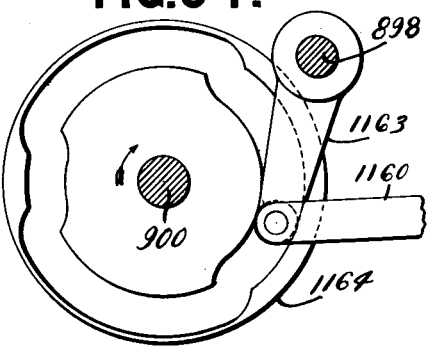

Fig. 84 is a full sized detail view of the cam employed to operate the mechanism which alines the printing mechanism in moved position while printing impressions are being taken.

Figure 85:
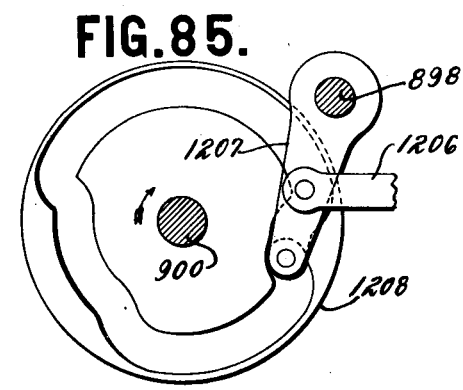

Fig. 85 is a full sized detail view of the cam employed to operate the device releasing the arms, carrying the operated type carriers, when printing impressions are to be made.

Figure 86:
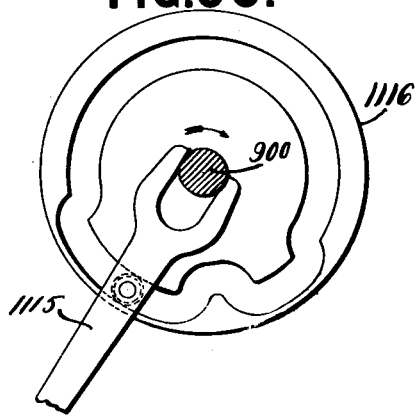

Fig. 86 is a full sized detail view of the cam employed to operate the device for alining the actuating segments for the type carriers in moved positions.

Figure 87:
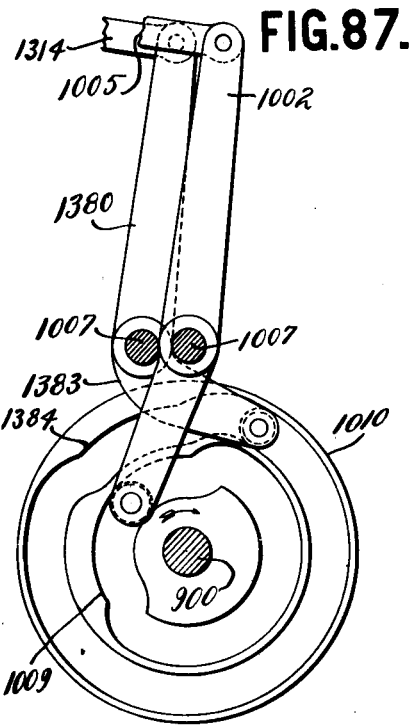

Fig. 87 is a full sized detail view of cams for effecting engagement of the totalizers and actuating mechanism during adding and total printing operations.

Figure 88:
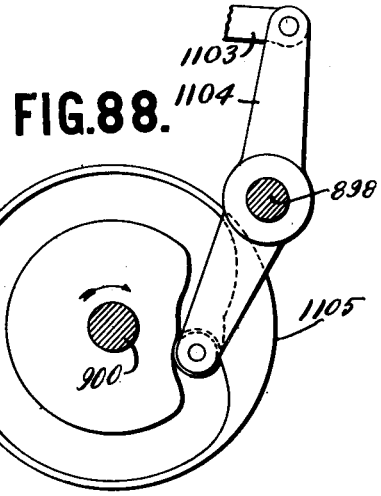

Fig. 88 is a full sized detail view of a cam employed to restore the actuating segments for the type carriers to normal position.

Figure 89:
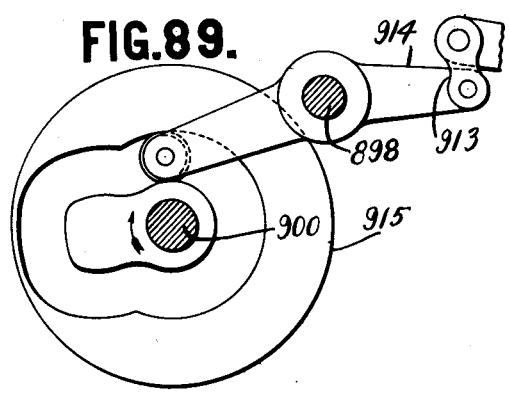

Fig. 89 is a full sized detail view of the cam employed to actuate the actuating racks for the totalizers.

Figure 90:
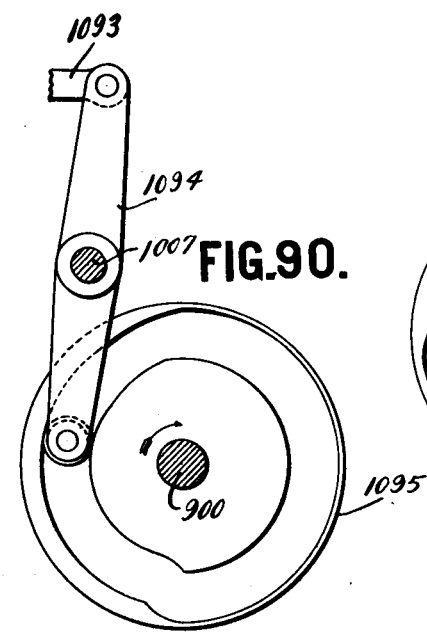

Fig. 90 is a full sized detail view of the cam employed to disconnect the actuating segments for the type carriers from the levers positively connected to the actuating racks for the totalizers.

Figure 91:
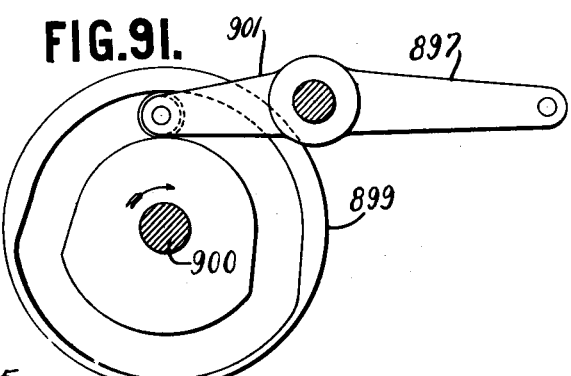

Fig. 91 is a full sized detail view of the cam employed to connect levers for the actuating racks for the totalizers to the segments positioned differentially under the control of the amount perforations in the sales slips.

Fig. 92 is a full sized detail view of the cam employed to rotate the valve tube for slip carrier A.

Fig. 93 is a detail view of the cam employed to operate the bail for retaining the sales slips in the supply box.

Fig. 94 is a full sized detail view of the cam employed to operate the device for alining the sales slips on slip carrier A.

Fig. 95 is a full sized detail view of the cam employed to rotate the horizontal shaft shown in Fig. 70.

Fig. 96 is a detail view of the cams employed to operate the differential mechanism for the distributing arm.

Fig. 97 is a detail view of two cams employed to operate valves.

The various figures constituting a single view have the same figure number with the letters A, B, C, etc., added, the same number being used to show that the figures constitute one view and the letters being used to indicate more or less, the relative order or arrangement of the figures.

In order that the detail description which is to follow may be understood better a general description of the functions performed by the improved machine and the mode of operation thereof will be given here.

The system will be described as being applied to department stores but it is to be understood that the invention may be used with equal facility in other commercial establishments and in many other relations without departing from the scope of the present invention the present form of embodiment being shown for illustrative purposes only.

At the present time a great many department stores have employed cashier-inspectors, each having a number of departments assigned to them. As each sale is made the clerk forwards the goods and the sales slips to the cashier-inspector who is conveniently located and it is the duty of the latter to compare the goods with the entries made on the sales slips. If they correspond one portion of the sales slip is wrapped with the goods and returned to the clerk who hands them to the customer, while the other portion of the slip having thereon a duplicate of the data entered on the sales slip wrapped with the goods is retained by the cashier-inspector. At the end of the day the cashier-inspector turns the duplicate portions of the slips into the auditing department so that they may be audited in order to ascertain the totals of the sales made by the various clerks.

In stores using the present invention for such auditing purposes these cashiers are provided with machines which perforate the duplicate sales slips at the time of the sale or any other desired time the perforations for each sale representing in accordance to their locations on the sales slip, the clerk making the sale and the amount of the sale.

The machine of the illustrated embodiment disclosed herein is adapted more particularly for use in department stores in which there are not more than ten cashiers ordinarily having charge of not more than ten departments in each of which are ordinarily not more than 100 clerks. It is to be understood, of course, that the machine may readily be constructed to audit the business of stores having any number of clerks, departments or cashiers, the present form of embodiment being shown as it is suitable for most practical purposes.

Each clerk is given a composite number containing four figures or digits. The left hand digit represents the cashier under whom the clerk is operating, the second digit from the left the department to which the clerk is assigned, and the two right hand digits the clerk making the sale. For example, if the clerk's number appearing on the sales slip is 1225 this number signifies that clerk 25 in department 200 under the charge of cashier 1000 made the sale. In referring to the positions of the digits of the clerks' numbers these digits will be counted from the left herein.

If a clerk operating under one cashier is transferred to a department under another cashier, as is often the case during sales, the machine is first prepared to sort the slips, taken from the station of the latter cashier, in accordance with the first digits in the clerks' numbers during the first sorting operation. For example, if clerks 2224 and 2225 are transferred to a department under the charge of cashier 1000 the slips are sorted into two piles, groups or divisions during the first sorting operation of the machine, the slips in one pile being those of the clerks ordinarily operating under the cashier 1000 and those in the other pile being the slips of the two transferred clerks ordinarily operating under cashier 2000.

If a clerk under one cashier is not transferred to a department under another cashier but clerks in one or more departments are transferred to other departments under the same cashier the slips are sorted for the first time under the control of the perforations representing the second digits of the clerk's number, the slips in each pile resulting from such assortment being those of the clerks in one department.

If no clerks have been transferred from one cashier to another or from one department to another the slips are sorted for the first time under the control of the third digits in the clerks' numbers and the above operations when the clerks are transferred from one cashier to another or from one department to another are eliminated. After the slips are sorted under the control of the third digits of the clerks' numbers each pile is again sorted so that the sales slips of the various clerks are segregated into piles, there being one pile for each clerk.

Assume that some clerks operating ordinarily under one cashier have been transferred to departments in charge of another cashier and that clerks in departments under the last cashier have been transferred to other departments under her charge.

When the slips are taken from the latter's station to be sorted, they are placed in a box or hopper in the present machine and the machine prepared for sorting the slips in accordance to the first digits in the clerks' numbers. The driving mechanism of the machine during each sorting operation is continuously operated, while the slips are being sorted, the machine being stopped automatically when the last slip in the pile to be sorted has been deposited in the proper resulting pile. There are as many piles of slips resulting from the first sorting operation as there are cashiers represented in the clerks' numbers.

After the first sorting operation the piles of slips are placed in their proper apartments in a cabinet, which is not shown in the accompanying drawings, but which for the sake of convenience will be called cabinet A. One of these piles is then placed in the supply box or hopper in the machine and sorted under the control of the second digits in the clerks' numbers there being as many piles of slips at the end of such operation as there are departments represented in the clerks' numbers. One of these piles of slips resulting from the second sorting operation is next placed in the machine and the machine prepared for the third sorting operation, the other piles of slips resulting from the second sorting operation being placed in their proper apartments in a cabinet, which is not shown, but which for the sake of convenience will be called cabinet B. During this third sorting operation the slips are assorted into piles under control of perforations representing the third digits in the clerks' numbers. One of these piles resulting from the third sorting operation is then placed in the machine while the other piles are put in apartments in a cabinet (not shown) which will be called cabinet C. During the fourth operation the pile of slips are sorted under the control of the perforations representing the fourth digits in the clerks' numbers so that all of the slips of the various clerks are separated into piles, the slips of a particular clerk being in one pile. This being the last sorting operation for these particular slips the latter are taken and properly stored or destroyed as desired, and the operation continued with each pile of slips in cabinet C. In this manner all of the slips of the clerks operating in one department are separated into piles.

After all of the piles of slips in cabinet C have been assorted the second pile from cabinet B is assorted by the machine under control of the third digits in the clerks' numbers and then each of the resulting piles is again sorted. Each of the remaining piles of slips in cabinet B is then treated in the same manner and when all the piles in cabinet B are assorted another pile from cabinet A is treated in the same manner as the first pile taken from this cabinet. When slips taken from one cashier's station have been assorted completely the slips from another cashier's station are taken and the above operations repeated.

For the sake of convenience the four operations of the machine in which the slips are assorted under the control of the first, second, third and fourth digits of the clerks' numbers counting from the left will be termed the first, second, third and fourth sorting operations respectively herein.

The machine is provided with two slip carriers for carrying the slips into position to control the slip sorting or distributing mechanism. Upon each cycle of operation of the machine one carrier, called carrier A herein, is moved into position to pick up the uppermost slip on the pile in the supply box. At the same time a valve is operated and the air in a chamber in carrier A is partially exhausted through a passage by a partial vacuum created in a tank, called the "vacuum" tank herein, whereby the slip is retained on the carrier. Slip carrier A is rotated after it has picked up a slip to carry the slip into coöperative relation with an alining device where it is properly alined on carrier A. Then this carrier is given another step of rotary movement to carry the slip into operative relation with the second slip carrier, called carrier B herein. The slip is then deposited on carrier B and the latter moved to carry the slip into coöperative relation with a translating device. This device is called a translating device as the perforations in the slips through this device control the distributing mechanism and the means controlling the selection and actuation of the accumulating and printing mechanisms.

This translating device comprises a plate provided with a row of air ports or holes which are connected by means of tubes to corresponding holes in a cylinder having a piston controlling the movement of the sorting mechanism and printing mechanism so that the slips are deposited in the proper boxes or receptacles and the amounts are printed on the proper detail strips and added on the corresponding totalizers. This plate is moved preliminary to the operation of the machine by a manually adjustable "sorting" lever so that the above mentioned row of holes in the plate is in coincidence or register with one of the four rows of holes in slip carrier B when the slip is in coöperative relation with the translating device. The sorting lever moves the plate to prepare the machine for sorting the slips in accordance to the first, second, third and fourth digits in the clerks' numbers so that when a slip is moved into coöperative relation with the translating device during the operation of the machine the perforation in the slip by which the slip is to be sorted is in coincidence or register with one of the holes in the plate and one of the holes in the corresponding row of holes in the slip carrier B. At this time a valve is operated and as the valve is in the passage between the holes in the slip carrier B and the vacuum tank the air in the cylinder is partially exhausted through the tube leading to the hole in the plate and in coincidence with the perforation in the slip, whereupon the piston of the cylinder moves differentially until the piston head is over the hole in the cylinder through which the air has been withdrawn. While the piston is in this position and after the valve has been closed slip carrier B is given another movement to carry the slip to a distributing arm which first picks up the slip and is then moved differentially by the differential mechanism controlled by the differentially positioned piston in the cylinder. The distributing arm is moved over a series of ten boxes or receptacles and deposits the slip in the box or receptacle corresponding to the clerks' perforation in the slip controlling the extent of movement of the arm.

There are also five rows of holes in the above mentioned plate of the translating device and these ports are in registry with the perforation representing the amounts in the sales slips when the latter are in coöperative relation with the translating device during the fourth assorting operation of the machine. Each row of amount holes in this plate is connected by tubes to holes in appropriate cylinders. These cylinders have pistons which when the air is partially exhausted from the cylinders move differentially under the control of the amount perforations in the slips. These pistons control the extent of movement of the actuating mechanism for the totalizers and the type carriers during the fourth sorting operation after the detail strips have been headed properly with the appropriate clerks' numbers. The printing and totalizing mechanisms are inoperative during the first, second and third sorting operations and are rendered operative for fourth sorting operations under the control of a manipulative device called the "control" lever herein.

After the first slip has been moved into coöperative relation with the translating device during the fourth sorting operation of the machine it is retained in this position during the following ten cycles of operation and during these cycles of operations the detail strips are headed, that is, the clerks' numbers are printed by the printing mechanism on the corresponding detail strips. The above mentioned plate is automatically operated so that the perforations representing the third, second and first digits of the clerk's number on the first slip control the extent of movement of the pistons for the differential mechanism for the tens, hundreds and thousands type carriers respectively. The cylinder for the differential mechanism for the units type carrier is controlled by a units automatic device which is only operated during the heading of the detail strips and the printing of the totals, this device being prepared for operation by the above mentioned control lever. At each cycle of operation during the heading of the lists the first slip is retained in coöperative relation with the translating device and the units automatic device controls the partial exhaustion of the air in the cylinder for the differential mechanism for the units type carrier whereby this carrier prints a different unit upon each cycle of operation. It can therefore be seen from the above that the first three digits of the clerks' numbers control the tens, hundreds and thousands type carriers so that these three digits are printed on each detail strip, the fourth digit on each strip being one of the units printed under the control of the units automatic device.

During each cycle of operation while the heading of the detail strips is being performed the group of type carriers is swung under the control of the cylinder controlling the differential mechanism for the distributing or sorting arm. This cylinder at this time is controlled by the units automatic device so that upon each cycle of operation the type carriers are carried into printing relationship with a detail strip, the ten strips in this manner being headed with a different clerk's number.

During the heading of the detail strips the totalizer engaging mechanism is disabled so that movement of the differential mechanism for the totalizers and type carriers does not operate the totalizers. After the ten heading cycles of operation the units automatic device is disabled, the totalizer engaging mechanism is enabled, the distribution of the slips is continued and the above mentioned plate of the translating device is shifted automatically back to its fourth position. During each cycle of operation after the detail strips have been headed the pistons controlling the differential mechanism for the totalizers and the type carriers are controlled by the amount perforations in the slips while each slip is in coöperative relation with the translating device, the selected totalizer is shifted into operative relation with the actuating mechanism, and the type carriers are swung into printing relationship with the corresponding detail strip under the control of the perforation representing the fourth digit in the clerk's number. In this manner the amounts on the sales slip of each clerk are separately accumulated on the corresponding totalizers and listed on the corresponding detail strips. From the above it can be seen that during the fourth sorting operation of the machine the clerks' numbers are printed on the detail strips, the amounts on the sales slips of each clerk are printed on the appropriate detail strip and accumulated on the corresponding totalizer, and the slips are sorted into ten piles. The cycles of operation during which the clerks' numbers are printed on the detail strips will be called "heading" cycles of operation herein and those cycles of operation during which the amounts are added on the totalizers will be referred to as the "adding" cycles of operation.

After the fourth sorting operation the machine is prepared for printing the totals on the totalizers at the bottom of the lists on the various detail strips. During such total printing operation the totalizers are successively engaged with the differential mechanism in such a manner that the totalizers are reset to zero, and the totals on the totalizers are set up on the type carriers. A totalizer is engaged at each cycle of operation under control of the above mentioned units automatic device, which also causes movement of the group of type carriers into position to print the totals on the appropriate detail strips. After the total printing operation has been completed the printed portions of the strips may be torn off and properly filed.

*Sales slips.*

An illustrative form of sales slip adapted to control the machine of the present invention is shown in Fig. 43. The slips are made out in the usual manner by the clerks and are preferably perforated by machines located at the cashiers' stations, either at the time of the sales or at any other desired time. The points of intersection of the dash lines 103 indicate the positions at which the slip may be perforated to represent the clerk's number, and the points of intersection of the dash lines 104 indicate the positions at which the slip may be perforated to represent the total amount of the transaction. The slips are perforated to represent "0's" for reasons to be described later. The perforating machines at the cashiers' stations are also adapted to make perforations 105 in the slips, these perforations being made in the same positions in each slip. The function of these perforations 105 will be described later.

*Operating mechanism.*

The machine for illustrative purposes is shown as equipped with an electric motor 106 (Figs. 3ᴰ and 7) but it is to be understood that it is not intended to limit the present invention to use with the particular motor shown or to use with any electric motor at all, as it is obvious that any suitable form of operating mechanism may be employed. This motor is not shown or described in detail as any desired type may be employed and its construction is not essential to the understanding of the present invention. A worm wheel 107 (Fig. 7) journaled in a frame 108 and rotated by the motor meshes with a worm gear 109 (Figs. 3ᴰ and 7) fast on a shaft 110 which is given one complete rotation by the motor through these connections upon each cycle of operation of the machine. The shaft 110 at its lower end is suitably journaled in the frame 108. The upper end (Fig. 16) of the shaft 110 is squared and has a circular recess into which the lower end of a shaft 113 projects. The shaft 113 at its upper end is suitably journaled in a frame or L-bearing 114 (Figs. 2 and 3ᴬ) rigidly mounted on a frame 115 (Figs. 3ᴬ, 3ᴮ and 3ᶜ). The shaft 113 intermediate its ends projects through a horizontal frame 117 (Figs. 3ᴮ—3ᶜ, 6ᶜ and 23) which is supported by vertical frames or bars 118 (Figs. 3ᴮ—3ᴰ, 3ᴮ—3ᶠ and 23) mounted on the base of the machine. The frame 115 is mounted on the frame 117.

When it is desired to operate the machine the operator rocks a hand lever 119 (Figs. 5, 6ᴬ and 23) counter clockwise as viewed in Fig. 6ᴬ from its "stop" to its "start" position (Fig. 23). This lever 119 called the "starting" lever herein, is loosely mounted on a shaft 120 which is mounted to slide axially in side arms 123 of a frame 124 fast on a plate 122 mounted on the horizontal frame 117. The starting lever 119 projects through a slot 125 (Figs. 6ᴬ and 23) formed in a casing or hood 126 within which the frame 124 is mounted. The upper end of a link 127 (Fig. 6ᴬ) is pivotally connected by a pin 128 to the lever 119. The lower end of the link 127 (Figs. 3ᴰ and 6ᶜ) carries a pin 129 projecting into a slot 130 which is formed in a lever 133 loosely mounted at 134 on a frame 135. The frame 135 is mounted on the base of the machine and at its upper end is connected to the frame 117. The upper end of a link 136 is pivotally connected at 137 to the link 127 and the lower end of the link 136 is provided with an inverted L-shaped slot 138. A spring 139, connected at its forward end to a pin on the frame 135 and at its rear end to the link 136, tends to rock the link 136 clockwise (Figs. 3ᴰ and 6ᶜ) about the pin 137 whereby the short horizontal portion of the slot 138 is retained in engagement with a pin 140 projecting from an arm 143 which is loosely mounted on a stud 144 projecting from the frame 135. A pawl 145 (Figs. 6ᶜ and 45) is pivotally mounted on a free end of the arm 143 and a spring 141 normally retains the free end of the pawl in engagement with a shoulder 146 formed in the periphery of a disk 147. The disk 147 is rigidly connected to a ratchet 148 and an arm 149 loose on the stud 144.

From the above construction it can be seen that when the operator rocks the starting lever 119 counter clockwise (Fig. 6ᴬ) to "start" position the links 127 and 136 (Figs. 3ᴰ and 6ᶜ) are lowered. As the pin 140 on the arm 143 is in engagement with the upper end of the slot 138 in the link 136 this downward movement of the link 136 rocks the arm 143 one step in the counter clockwise direction and as the pawl 145 engages the shoulder 146 the disk 147 and arm 149 are rocked with the arm 143. A pin 150 (Figs. 3ᴰ and 6ᶜ) on the arm 149 engages the lower curved portion of the rear edge of an arm 153 which is pivotally mounted at its upper end on the frame 135 and engages at its lower end a push switch 154. The arm 153 is so constructed that when the arm 149 is rocked counter clockwise, as above described, the pin 150 rocks the arm 153 clockwise whereupon the push switch 154 is moved forwardly to close the circuit through the armature of the electric motor 106 and thereby set the motor in operation.

During each of the first ten cycles of operation of the motor the ratchet 148 and therefore the arm 149 is rotated one step in the counter clockwise direction (Figs. 3ᴰ and 6ᶜ) and during the first eight of these cycles the proper pressures in the pneumatic system, to be described later, are attained. The ratchet 148 and the arm 149 are then rotated no further until the last slip in the pile of slips to be sorted is being moved into position to control the sorting mechanism when the ratchet and arm are moved one step. Then during the next two succeeding cycles the ratchet 148 and arm 149 are given two more steps of movement to normal position, the circuit through the motor armature being broken during the last step of movement of the arm 149 to normal position.

To rotate the ratchet 148 and arm 149 a pawl 151 (Fig. 6ᶜ) is pivotally mounted on the forward end of a pitman 152 which is slidably mounted near its forward end in a bracket 161 mounted on the frame 135. The rear end of the pitman 152 (Fig. 13) is bent at right angles to its forward end and is forked to straddle the rotation shaft 110. The pitman 152 carries a roller 155 projecting into a cam groove formed in the upper face of a disk 156 fast on the shaft 110. This cam groove in the disk 156 is so constructed that the pitman 152 is moved rearwardly an invariable distance and then forwardly to normal position near the end of each cycle of rotation of the shaft 110. The forward end of the pawl 151 (Fig. 6ᶜ) has a horizontal projection normally resting on a tooth 157 of the ratchet 148. This tooth 157 is twice as long as each of the remaining teeth of the ratchet. When ratchet 148 is rotated one step by the operation of the starting lever 119 (Fig. 6ᴬ) as above described the radial face of the tooth 157 is brought into such position that during the first rearward movement of the pitman 152 and pawl 151, the pawl 151 engages behind this radial edge of the tooth so that upon forward movement of the pawl and pitman the ratchet 148 and arm 149 are rotated one step in a counter-clockwise direction. Then during each of the ten next succeeding rotations of the shaft 110 the pawl 151 engages the radial edge of the next succeeding tooth of the ratchet 148 to rotate the ratchet and arm 149 one step. At the end of the tenth step of movement of the ratchet 148 (not counting the first step imparted by the operation of the starting lever 119) a tooth 158 of the ratchet is at the top of the ratchet so that when the pawl 151 is moved rearwardly and forwardly it moves idly over this tooth whose point is at a lesser distance from the center of the ratchet than are the other teeth. At such time the radial edge of the tooth 158 is in the same plane as the forward upper edge of an arm 159 loosely mounted on the stud 144 and the outer end of the arm 159 projects slightly above the point of the tooth 158. The upper end of the arm 159 is slightly curved so that when the tooth 158 is at the top of the ratchet the horizontal projection on the pawl 151 moves idly upon the upper end of the arm 159 and the inclined side of the tooth 158. Therefore, during each rotation of the shaft 110 after the tenth rotation the pawl 151 is reciprocated without moving the ratchet 148.

The ratchet 148 and arm 149 (Fig. 6ᶜ) are alined in proper position at the end of each step of movement by the engagement of a nose on the upper end of a pawl 160 with the recesses 163 formed in the periphery of a disk 164 rigidly connected to the ratchet 148. The pawl 160 is pivotally mounted on the frame 135 and a spring 167 serves to retain its nose in engagement with the disk 164.

When the last sales slip is moved into position to control the sorting mechanism the arm 159 is automatically rocked clockwise (Fig. 6$^c$) as will be described later, so that during the same cycle of operation the pawl 151 engages the radial side of the tooth 158 of the ratchet 148 and rotates the ratchet one step further. Then during the last two cycles of operation of the machine the pawl 151 engages the two ratchet teeth between the teeth 157 and 158 whereby the ratchet and hence the arm 149 are restored to normal position. When the push switch 154 (Figs. 3$^D$ and 6$^c$) is moved forwardly to start the motor, as above described, a push switch 165 is moved rearwardly thereby rocking an arm 166 so that the lower curved portion of its forward edge is in the path of movement of the pin 150. The connections between the push switches 154 and 165 whereby one is moved rearwardly when the other is moved forwardly are not shown in the drawings. During the last step of movement of the arm 149 to normal position the pin 150 engages the arm 166 thereby rocking the arm 166 to normal position so that the push switch 165 is moved forwardly and the push switch 154 is moved rearwardly to break the motor circuit. After the motor circuit is broken the momentum of the motor armature, the shaft 110 and operating connections causes the armature and shaft to continue to rotate. However, during this continued rotation of the shaft 110 the pawl 151 moves on the curved edge of the tooth 157 of the ratchet 148 and as this tooth is twice as long as the other teeth the pawl cannot engage its radial side so that the ratchet is not moved during such continued rotation of the shaft 110. After the machine has completed its operation the sorting lever 119 is moved to its "stop" position and as the pin 140 on the arm 143 is in the horizontal portion of the slot 138 in the link 136 the arm 143 is rocked to normal position whereupon the pawl 145 is moved into engagement with the shoulder 146 on the disk 147 by the spring 141.

The shaft 113 (Figs. 3$^B$ and 6$^A$—6$^D$) is called the main operating shaft herein, as it carries various operating cams and is connected by suitable gearing to shafts carrying cams for operating the printing, totalizing and sorting mechanisms. This shaft 113 is not rotated during the first eight cycles of operation of the motor and shaft 110 as these two shafts 110 and 113 are only coupled together at the end eighth cycle of operation of the shaft 110. The operation of the machine during each complete rotation of the shaft 113 is called "a cycle of operation of the machine" herein and therefore the first cycle of operation of the machine is the ninth rotation of the shaft 110. The means for coupling these two shafts together will now be described.

A disk 168 (Figs. 6$^c$, 11 and 16) is loosely mounted on the shaft 113 and the lower end of its hub rests on the upper end of the shaft 110. This disk 168 is rigidly connected to a member 169 which is also loosely mounted on the shaft 113. The member 169 has a horizontal circular flange 170 carrying radial flanges 173 (Fig. 12) which project vertically between radial arms or webs 174 of a hollow disk or member 175 rigidly mounted on the shaft 113. Blocks 176, formed of rubber or other suitable resilient material, are inserted between the flanges 173 and arms 174.

Loosely mounted upon the upper squared end of a shaft 110 is a sleeve 177 (Figs. 6$^c$, 11 and 16). The sleeve 177 is rotated with the shaft but is adapted to be slid vertically on the latter. Pivotally mounted on pins 178 (Figs. 6 and 11) at opposite sides of the sleeve 177 are levers 179. The rear end of the levers are connected together by bolts 180 which project through the levers and through a member 183 between the levers. A spring 184 (Figs. 6$^c$ and 16) is seated in a pocket in the sleeve 177 and is compressed between a pin 185 on the member 183 and the bottom of the pocket, so that the forward ends of the levers 179 are yieldingly retained in engagement with lugs 186 on the sleeve 177. A ring 187 (Figs. 3$^D$, 6$^c$, and 16) is loosely mounted in an angular groove formed in the sleeve 177. The ring 187 is provided with diametrically opposite studs 188 which project through the recesses in the forks 189 formed on a rearwardly extending arm 190 of a bell crank lever 193 pivoted at 194 on the frame 135.

Near the end of the eighth rotation of the shaft 110 the lever 190 is rocked counter clockwise (Fig. 6$^c$) to raise the sleeve 177. When the sleeve is raised a vertical projection 195 on the member 183 engages the lower face of the disk 168 thereby rocking the levers 179 clockwise (Fig. 6$^c$) about their pivots 178 and against the action of the spring 184. At the end of the eighth rotation of the shaft 110 and sleeve 177 the projection 195 is moved under a recess or notch 196 (Fig. 11) formed in the disk 168 whereupon the spring 184 (Figs. 6$^c$ and 16) rocks the levers 179 to normal position so that the vertical projection 195 engages in the notch 196 to couple the shafts 110 and 113 together. It can be seen that the resilient blocks 176 (Figs. 12 and 16) are inserted between the flanges 173 and 174 so that when the shafts 110 and 113 are coupled together the blocks will permit a slight relative movement between the members 169 and 175 and therefore the shaft 113 is not started at the same speed at which the shaft 110 is rotating. These blocks 176 therefore act as a shock absorber and hence relieve the various parts from undue strain when the two shafts 110 and 113 are coupled together.

The means for raising the sleeve 177 to couple the two shafts 110 and 113 together will now be described in detail. The nearly vertical arm of the lever 193 (Figs. 3ᴰ and 6ᶜ) is pivotally connected to the rear end of a link 198 which at its forward end is pivoted to a lever 199 intermediate the ends of the latter. The lower end of the lever 199 is pivotally mounted on the upper end of the vertical arm of a bell crank 200 which is pivotally mounted at 203 on the frame 135. The upper end of the lever 199 is connected by a link 204 to an arm 205 which at its upper end is pivotally mounted by a pin 202 on the frame 135. The lower end of the arm 205 is bifurcated to straddle a pin 206 projecting from the lever 133. Pivotally mounted at 207 on the frame 135 is a lever 208 which is provided with a recess 209 through which a pin 210 on an arm 213 projects. The upper end of the arm 213 is pivotally mounted on the frame 135 and its lower end is provided with a recess through which a pin 214 on the pitman 152 projects. The lever 208 carries a plunger 215 which is slidably mounted in guides 216 on the lever. A spring 217 which is compressed between a shoulder 218 on the plunger and the rear guide 216 tends to retain the plunger in its normal forward position, a projection 219 on the plunger being in engagement with a pin 220 on the lever 208 when the plunger is in normal position.

As above described, when the starting lever 119 is operated to start the machine the link 127 is lowered and as the pin 129 on the lower end of this link engages in the slot 130 in the lever 133 the latter is rocked counter clockwise (Figs. 3ᴰ and 6ᶜ) to the position indicated by the dash lines in Fig. 6ᶜ. A spring 223 which is connected at its forward end to a pin on the frame 135 and at its rear end to a pin on a projection 224 of the lever 133 normally retains the lever 133 in the position shown in Figs. 3ᴰ and 6ᶜ. When the lever 133 is rocked counter clockwise by the lowering of the link 127 the spring 223 does not move above the axis of the lever 133 and therefore serves to retain the lower end of the slot 130 in engagement with the pin 129. This movement of the lever 133 however carries its projection 224 into the path of movement of the forward end of the spring plunger 215. It can be seen that the lever 208 carrying the plunger is rocked clockwise and then counter clockwise to normal position upon each rotation of the shaft 110 by the cam 156 (Fig. 13) through the pitman 152 and the arm 213. During the first clockwise movement of the lever 208 the plunger 215 engages the lower side of the projection 224 thereby rocking the lever 133 counter clockwise (Figs. 3ᴰ and 6ᶜ) from the position to which it was adjusted by the operation of the starting lever 119. During this movement of the lever 133 the spring 223 passes above the axis of the lever 133 whereupon the spring 223 rocks the lever 133 still further counter clockwise until the latter is arrested by the engagement of the upper end of its slot 130 with the pin 129 on the link 127. This position is indicated by the dotted lines in Fig. 6ᶜ. In this position of the lever 133 its projection 224 is out of the path of movement of the plunger 215. The movement of the lever 133 from its normal position to the position indicated by the dotted lines in Fig. 6ᶜ rocks the arm 205 clockwise about its pivot and the lever 199 counter clockwise about its pivotal connection with the lever 200. This movement of the lever 199 draws the link 198 forwardly thereby locking the lever 193 to raise the sleeve 177. The lever 193 at this time, however, is not rocked sufficiently to raise the projection 195 of the member 183 into engagement with the lower side of the disk 168.

During the eighth rotation of the shaft 110 the lever 200 is rocked counter clockwise (Fig. 6ᶜ) and as the arm 205 is stationary during this time the lever 199 is rocked clockwise about its pivotal connection with the link 204. This movement of the lever 199 draws a link 198 forwardly another step thereby rocking the lever 193 a step further counter clockwise to raise the sleeve 177 so that when the recess 196 (Figs. 11 and 16) in the disk 168 is above the projection 195 the projection enters the recess to couple the shafts 110 and 113 together as above described. For the purpose of rocking the lever 200 counter clockwise as above stated (Figs. 6ᶜ and 74) its forwardly extending arm carries a roller 226 projecting into a cam groove 227 formed in the face of the ratchet 148. This cam groove is so constructed that the lever 200 is rocked counter clockwise during the eighth rotation of the shaft 110 to effect the coupling of the shafts 110 and 113, and is also designed to rock the lever 200 to normal position during the last step of movement of the ratchet 148 to normal position to disconnect the two shafts. It will be remembered that the ratchet 148 is given its last step of movement during the last cycle of operation of the machine.

If the operator should desire to stop the operation of the shaft 113 at any time during the first, second or third sorting operation of the machine it is only necessary for him to move the starting lever 119 (Fig. 6ᴬ) to its "stop" position (Fig. 23). The elevation of the link 127 when the starting lever is moved to normal position rocks the lever 133 (Fig. 6ᶜ) slightly clockwise to the position indicated by the dotted dash lines in Fig. 6ᶜ. When the lever 133 is moved to this position its projection 224 is in the path of movement of the plunger 215 so that during counter clockwise movement of the lever 208 the plunger engages the upper side of the projection 224 whereby the lever 133 is rocked still further clockwise until the spring 223 is below the axis of the lever 133. Then the spring 223 rocks the lever 133 to its normal position. This movement of the lever 133 to normal positions rocks the arm 205 counter clockwise and the lever 199 clockwise about its pivotal connection with the lever 200. This movement of the lever 199 through the link 198 rocks the lever 193 clockwise to lower the sleeve 177 and thereby disconnect the shafts 110 and 113. If the starting lever 119 is operated so that the projection 224 of the lever 133 is moved into the path of movement of the plunger 215 before the plunger has been raised the plunger when elevated is merely forced inwardly against the action of its spring 217 by the engagement of its forward end with the lower side of the projection 224. Furthermore if the lever 133 is rocked when the outer end of the plunger 215 is in the path of movement of the point of the projection 224 the plunger will be moved inwardly until it has passed out of engagement with the point when the spring 217 will move the plunger forwardly to normal position relative to the lever 208.

The shaft 110 when it is disconnected from the shaft 113 as above described, continues to rotate as the arm 159 (Fig. 6ᶜ) is not moved from normal position in which position the pawl 151 moves idly on the arm 159 and the tooth 158 of the ratchet 148 and therefore the arm 149 is not moved to normal position to break the motor circuit. When the operator wishes to continue the operation he merely moves the starting lever 119 (Fig. 6ᴬ) to its "start" position as before. This movement of the starting lever rocks the lever 133 to the position indicated by the dash lines in Fig. 6ᶜ so that its projection 224 is in the path of movement of the plunger 215. Then when the plunger is raised it engages the lower side of the projection 224 and the plunger together with the spring 223 moves the lever 133 to the position indicated by the dotted lines. This movement of the lever 133 through the arm 205, link 204, lever 199, link 198 and lever 193 raises the sleeve 177 to connect the shafts 110 and 113.

In order to lock the shaft 113 in normal position until it is coupled to the shaft 110 as above described, the vertical arm of the lever 190 has a projection 233 (Figs. 6ᶜ and 11) which normally engages the radial side 234 (Fig. 11) of a notch 235 formed in a disk 168. When the sleeve 177 is raised to couple the shafts 110 and 113 together the projection 233 is moved out of engagement with the radial side 234 to release the shaft 113. This projection 233 is guided in a slot 236 (Fig. 11) formed in a bracket 237 fast on the frame 135. When the shafts 110 and 113 are disconnected the projection 233 is moved into the notch 235 at the same time and it engages the radial side 234 of the notch positively to arrest the disk 168 in normal position at the end of the rotation. The rubber inserts 176 (Figs. 12 and 16) absorb the shock due to the sudden stopping of the shaft 113, whereby the strain on some of the parts is relieved.

In order to prevent rebounding of the shaft 113 which might be caused by the rubber inserts 176 when the shaft 113 is arrested a lever 238 (Fig. 11) is provided. This lever is pivotally mounted on the bracket 237 and a spring 239 serves to retain its nose 240 in engagement with the periphery of the disk 168. When the radial side 234 of the notch 235 in the disk 168 engages the projection 233 of the lever 193 the nose 240 of the lever 238 engages the opposite side of the notch 235 thereby preventing a rebound of the shaft 113 in the counter clockwise direction as viewed in Fig. 11.

*Pneumatic pump and tanks.*

The pneumatic system of the machine comprises an air pump 243 (Figs. 3ᴱ and 7), a pressure tank 244 (Figs. 7 and 19), a vacuum or suction tank 245 (Figs. 3ᴱ and 7) and a number of tubes or ducts forming air passages or circuits through which air passes to or from the tanks to control the performance of the various functions of the machine. The pump 243 is constructed to exhaust partially the air in the vacuum tank 245 and to store air in the pressure tank 244 under pressure.

The pump 243 is not shown or described in detail herein as its construction is not essential to the understanding of the invention and any desirable form of pump may be employed. Briefly this pump comprises a cylinder in which operates a piston head (not shown).

A piston rod 246 (Figs. 3ᴱ and 7) is connected at its rear end to the piston head and at its forward end to the rear end of a pitman 247 which at its forward end (Figs. 3ᴰ and 7) is connected by a wrist pin 248 to a crank wheel 249 fast on a shaft 250. The shaft 250 is journaled in an upright 253 and in the frame 108, and carries a bevel gear 254 meshing with a bevel gear 255 fast on the shaft 110. The piston rod 246 is guided in a frame 256 mounted on the base of the machine. The shaft 250 is rotated through the intermeshing bevel gears 254 and 255 by the shaft 110 whereupon the crank wheel 249 reciprocates the piston head within the pump cylinder to force air into the pressure tank 244 and partially withdraw the air from the vacuum tank 245.

The air from the vacuum tank 245 is partially exhausted by the pump through a tube 257 (Fig. 7) which has two branches 258 connected to corresponding valves 259 (Figs. 7 and 3ᴱ) of any desired construction on the pump. Air is forced by the pump to the pressure tank 244 through suitably constructed valves 260 (Fig. 7) branch tubes 263 and a tube 264 connecting the branch tubes 263 and the pressure tank.

The construction of the pressure tank 244 is best shown in Fig. 19. The tube 264 is connected to this pressure tank so that air is forced into the tank below a cylindrical weight 265. As the air is forced into this tank the weight 265 is raised and this weight is sufficiently heavy to compress the air to the proper extent for perfomance of the function to be described later. The air is forced out of the tank through a tube 266 which will be referred to later. A hole or opening 267 is formed in the tank to permit the escapement of the air above the weight 265 when the latter is raised.

The vacuum tank 245 (Fig. 7) is constructed similarly to the pressure tank 244 except that the tube 257 and a tube 268 through which air is drawn into the vacuum tank from various parts of the machine are connected to the tank above its weight 265. When the air above the weight in the vacuum tank is partially exhausted by the pumps the weight is raised accordingly. The bottom of the vacuum tank is provided with an opening to permit the entrance of air as the weight is raised. As above stated during the first eight cycles of rotation of the driving motor the shafts 110 and 113 are not coupled together these cycles being employed to obtain the proper pressure in the pressure tank and the proper partial vacuum in the vacuum tanks.

Suitable connections controlled by the cylindrical weights 265 in the pressure and vacuum tanks 244 and 245 control the operation of certain valves on the air pump 243 so that the air cannot be stored under too great a pressure in the pressure tank and too great a vacuum cannot be created in the vacuum tank. These connections (Figs. 3ᴱ, 7 and 19) are similar for the two tanks and therefore only the connections for the pressure tank 244 will be described in detail A lever 273 (Figs. 7 and 19) is pivotally mounted on a bracket 274 on the pressure tank 244, and carries a pin 275 projecting through the top 276 of the tank. A link 277 connects the lever 273 and the horizontal arm of a bell crank lever 278 pivotally mounted on a bracket 279 on the tank. A link 280 is pivotally connected at one end to the downwardly extending arm of the lever 278 and at its opposite end (Fig. 3ᴱ) to one arm of a bell crank lever 283 pivotally mounted on a bracket 284 fastened on the pump 243. The other arm of the bell crank lever 283 projects through a recess formed in the outer end of an arm 284 rigidly mounted on a shaft 285. A link 286 is pivotally connected at its lower end to the arm 284 and at its upper end to the forward end of the lever 287 pivotally mounted on a bracket fast on the top of the air pump. The rear end of the lever 287 is connected by a link 288 to an arm 289 fast on a shaft 290. When the weight 265 (Fig. 19) is in engagement with the pin 275 and the latter is in normal position the proper pressure has been obtained in the tank, but if the weight is raised still further by a greater pressure the pin 275 is raised and through the lever 273, link 277, lever 278, link 280, lever 283, and arm 284 rocks the shaft 285. The rocking of the arm 284 through the link 286, lever 287, link 288 and arm 289 also rocks the shaft 290. These shafts 285 and 290 project through valve chambers 293 on the air pump. The valves in these chambers 293 are not shown in the drawings it being sufficient to state here that the operation of the valves by the shafts 285 and 290 in the manner described above prevents the air pump from forcing more air into the pressure tank until the weight has been lowered so that it does not retain the pin 275 in raised position. Through similar connections other valves in the valve chambers 293 are operated to prevent the air pump from withdrawing too much air from the vacuum tank 245.

*Assorting mechanism-supply box and retaining bail.*

When a pile of sales slips is to be sorted it is placed on a horizontal plate 295 in a supply box or hopper 296 (Figs. 23 and 25). The plate 295 (Fig. 25) rests on a spiral spring 297 which is compressed between the plate 295 and the bottom of the box 296. The supply box 296 is mounted in a rectangular opening 298 (Fig. 23) formed in the horizontal plate 117 and is provided on its sides with laterally projecting lugs 299 which slide on top of the sides of a rectangular frame 300 mounted on the frame 117 and having an opening coinciding with the opening 298 in the frame 117. When the slips are to be placed in the box it is slid forwardly and then after the slips have been placed on the plate 295 the box is slid rearwardly to normal position and is properly alined in this position by the engagement of the forward lugs 299 in notches or recesses 303 formed in the frame 300.

When the supply box is in normal position the spring 297 yieldingly retains the uppermost slip of the pile in engagement with a retaining bail 304 (Figs. 23, 24 and 25). The bail 304 is bent as shown in Fig. 25 and is slidably mounted in lugs 305 (Figs. 23 and 24) on the frame 117. A cross bar 306 (Fig. 24) fast on the bail 304 carries a pin 307 projecting into a recess formed in the outer end of an arm 308 rigidly mounted on a shaft 309. The shaft 309 near its upper end is journaled in the frame 117 and at its lower end (Figs. 30 and 35) is journaled in a horizontal frame 310 which is integral with a vertical frame 313 rigidly fastened at its upper end to the frame 117. This frame 310 is also supported by two vertical rods 314 projecting downwardly from the frame 117 as shown in Fig. 33. The shaft 309 (Fig. 35) carries an arm 316 which is connected by a link 317 to one arm of a bell crank lever 318 pivotally mounted on a stud 321 projecting from the frame 117. The other arm of the bell crank lever 318 carries a roller projecting into a cam groove 319 formed in the upper face of a disk 320 rigidly mounted on the shaft 113. This cam groove is so constructed that the bail 304 (Figs. 23, 24 and 25) is drawn rearwardly through the above described connections, and then moved forwardly to normal position. When the bail 304 is drawn rearwardly the top sales slip on the pile is raised from the pile as will be described later and then upon forward movement of the bail to normal position it passes between this slip and the next slip which is to be withdrawn from the pile during the next cycle of operation.

*Sorting mechanism: Slip carrier A.*

Slip carrier A which picks up a slip from the pile in the supply box 296 during each operation of the machine and delivers the slips to a second slip carrier, called slip carrier B herein, will now be described.

Slip carrier A (Figs. 23, 24 and 25) comprises a hollow cylindrical member 323 (Figs. 24 and 25) and three radially extending arms or frames 324 rigidly mounted on the member 323 by screws 329. The member or cylinder 323 at its lower end is fast on the upper end of a shaft 325 (Fig. 25) which near its upper end is slidably mounted in a boss on the frame 117, (Fig. 33) and near its lower end (Figs. 35 and 47ᴮ) in a horizontal plate or frame 326 which is integral with the vertical frame 313 and a vertical frame 327 fastened on the frame 117.

The arms 324 are identical and therefore it will be sufficient to describe but one. A plate 330 (Figs. 25, 26, and 27) is rigidly mounted to the lower face of the flat rectangular portion of the arm 324. The plate 330 as shown in Figs. 24 and 27 is provided with slots 333 forming two connected H's.

These slots 333 coincide with grooves 334 (Fig. 27) formed in the lower face of the rectangular portion of the arm 324. An air chamber is formed in the left hand end (as viewed in Figs. 25, 26 and 27) of the rectangular portion of the arm 324. A frame 336 is mounted on a shaft 337 carried by the sides of the air chamber 335 and this frame serves to close the air chamber. As shown in Fig. 24 the grooves 334 are connected by a short channel or groove 338 to the air chamber 335. The bottom or horizontal portion of the frame 336 is provided with a row of holes 339. The grooves 334 and air chamber 335 communicate with the vacuum tank 245 (Figs. 1 and 7) through a duct 340 (Figs. 24, 25 and 26) a valve chamber 345 and a duct 346 formed in the arm 324 thence through a hole 347 (Fig. 25) in the cylinder 323, through a slot 348 (Fig. 29) formed in a cylinder 350 (Figs. 25 and 29) through an angular groove and a duct 354 formed in a cylinder 355 (Figs. 24 and 25) through a duct 351 formed in a member 352 and finally through suitable flexible tubes to the vacuum tank. These pneumatic connections will be described more fully later. When slip carrier A is lowered as will be described later, the bail 304 (Figs. 24 and 25) is withdrawn from over the pile of slips in the supply box 296 and the spring 297 yieldingly holds the top slip in engagement with the plate 330 on the arm 324 which is over the supply box at the time the carrier is lowered. Then the air in the slots 333 grooves 334 and the air chamber 335 is partially exhausted by the vacuum tank 245 through the above described connections and such partial exhaustion of the air causes the slip to be held firmly by suction against the plate 330 thereby closing the slots 333 and the holes 339. When the air is partially exhausted in this manner from the chamber 335 the pressure of the air on the outside of the frame 336 causes the latter to rock counter clockwise (Figs. 25, 26 and 27) up into the air chamber 335, thereby bending the rear end of the top slip held on the arm 324 by suction upwardly. When the rear end of the slip has been raised in this manner and as the slip carrier A begins its upward movement the bail 304 is moved forwardly to normal position between the slip picked up by the arm 324 and the next slip on the pile, thereby retaining the latter slip in the supply box until it is picked up during the next cycle of operation of the machine.

At the same time that the bail 304 is moved forwardly to normal position, air at greater than atmospheric pressure is forced downwardly through holes 358 (Fig. 24) formed in the plate 330, and through the perforations 105 (Fig. 43) in the sales slip picked up by the arm 324. This current of the air through the holes 358 is supplied by the pressure tank through the tube 266 (Figs. 1 and 7), a duct 361 formed in the member 352, (Figs. 24 and 25) a duct 360, formed in the cylinder 355, a hole 362 (Figs. 25 and 29) formed in the cylinder 350, a hole 363 (Fig. 25) formed in the cylinder 323, duct 364 (Figs. 24, 25, 26 and 27) formed in the arm 324 and thence through grooves 365 (Figs. 24 and 26) formed in the lower face of the flat rectangular portion of the arm 324. This passage for the air from the pressure tank to the grooves 365 will be described later in detail. These grooves 365 except for the holes 358 are covered and closed by the plate 330. The current of air when forced through these holes 358 in the plate 330 and through the perforations 105 in the sales slips performs the function of insuring separation of the uppermost slip from the next slip on the pile when the uppermost slip is raised from the pile by the arm 324 for the following reason. The perforations 105 in the various sales slips are made in practically the same locations on each sales slip but when the slips are placed in the supply box 396 they are not necessarily in exact alinement. Therefore the perforations 105 in one slip would in all probability be slightly overlapped by the next lower slip of the pile, so that when air is forced through the perforations 105 in the uppermost slip it would strike the overlapping portions of the next slip thereby forcing the two slips apart. This is the only function performed by the pressure tank 244. The current of air through these holes 358 is cut off after the slip carrier A has been raised slightly in a manner to be described later.

After slip carrier A has been raised to its normal position it is given one-third of a rotation to bring the next arm 324 above the sales slips in the supply box 296 so that when the slip carrier is lowered during the next cycle of operation of the machine the next sales slip will be picked up from the pile in the manner above described. The means for lowering and raising slip carrier A is shown in Figs. 32, 25 and 47<sup>B</sup> and will now be described.

The lower end of the shaft 325 carrying slip carried A is provided with a collar 367 (Figs. 25 and 47<sup>B</sup>) and a ring 368 is loosely mounted in an angular groove formed in the collar 367. The ring 368 carries pins 369 projecting into recesses formed in forks 371 on one end of a lever 370, which is pivotally mounted on a bracket 373 projecting downwardly from the frame 326. The opposite end of the lever 370 carries a roller (Fig. 32) projecting into a groove formed in the face of a disk 374 rigidly mounted on a shaft 375. This shaft 375 (Fig. 35) is journaled in the frames 313 and 327 and near its forward end carries a bevel gear 376 (Figs. 6<sup>B</sup> and 35) meshing with a bevel gear 377 fast on the shaft 113. These bevel gears 376 and 377 are of the same size so that the shaft 375 is given one complete rotation upon each rotation of the shaft 113. The cam groove formed in the disk 374 (Fig. 32), is so constructed that near the beginning of each cycle of operation of the machine the lever 370 is rocked clockwise, as viewed in Fig. 47<sup>B</sup> to lower the shaft 325 and the slip carrier A. Then after the top slip on the pile has been attached to one of the arms 324 by suction as above described the cam groove rocks the lever 370 to normal position to raise the shaft 325 and the slip carrier.

After the slip carrier has been raised to normal position as above described, it is given a one-third rotation in a clockwise direction as viewed in Figs. 23 and 24. The means for rotating this slip carrier is shown in Figs. 30, 33 and 34, and will now be described.

A sleeve 379 is loosely mounted on the shaft 325 and is prevented from moving in a vertical plane by the engagement of the forked end of an arm 380 in an angular groove 383 in the sleeve, the arm 380 being fastened to the under side of the frame 117 (Fig. 33). An arm 384 (Fig. 30) is fast on the lower end of the sleeve 379 (Fig. 34) and is rigidly connected by a pin to a disk 385. The arm 384 at its outer end (Figs. 30 and 33) carries a downwardly extending rod 386 which projects through a hole formed in the outer end of an arm 387 fast on the shaft 325. Through this rod 386 the arm 387 and shaft 325 are caused to rotate with the arm 384 and at the same time are permitted to be raised and lowered independently of the arm 384.

Fast on a sleeve 388 (Figs. 33 and 34) which rotates in a restricted portion of the sleeve 379 is a segment gear 389 (Fig. 30). The teeth of the segment gear 389 mesh with the teeth on the segmental portion of a lever 390 pivotally mounted on a stud 391 on the frame 310. The lever 390 carries a roller 393 projecting into a cam groove 394 formed in the upper face of a disk 395 rigidly mounted on the shaft 113. This cam groove is so constructed that the segment gear 389 is rocked counter clockwise (Fig. 30) one-third of a rotation and then moved clockwise to normal position after the slip carrier A has been elevated to normal position.

Loosely mounted on a pin 396 (Fig. 30) on the segment gear 389 is a pawl 397 having a nose 398 normally engaging in one of the three equi-distant notches 399 formed in the periphery of the disk 385. A spring 400 coiled about the pin 396 tends to retain the nose 398 of the pawl 397 in engagement with the notches 399. Rigidly mounted on a stub shaft 403 (Fig. 30) mounted in the frame 310 is an arm 404 and a lever 405.

One end of the lever 405 normally projects under a nose 406 on the pawl 397. The outer end of the arm 404 is pivotally connected to one end of a link 407 which at its opposite end is pivotally connected to one of the arms of a bell crank lever 408, loosely mounted on the stud 391. The other arm of the bell crank lever 408 carries a roller 409 projecting into a cam groove 410 formed in the lower face of the disk 395. The cam groove 410 is so constructed that the lever 405 is rocked clockwise (Fig. 30) near the beginning of each cycle of operation of the machine. This movement of the lever 405 rocks the pawl 397 to carry its nose 398 out of engagement with one of the notches 399 in the disk 385. Then the lever 390 is rocked clockwise by the cam groove 394 to give the segment gear 389 one-third of a rotation in the counter clockwise direction. During this movement of the segment gear 389 a nose 413 on the lever 405 engages in one of the notches 399 in the disk 385 thereby locking the disk 385 and hence slip carrier A against rotation. The nose 406 on the pawl 397 slides out of engagement with the lever 405 so that at the end of the counter clockwise movement of the segment gear 389 the spring 400 rocks the pawl 397 to move the nose 398 into the notch 399 opposite the nose at such time. Then the lever 405 is rocked counter clockwise to normal position to release the disk 385 and finally the lever 390 is restored to normal position whereupon the disk 385 is given one-third of a rotation through the engagement of the nose 398 of the pawl 397 in one of the notches 399. As the disk 385 is fast to the arm 384 carrying the rod 386 projecting through the arm 387 fast on the shaft 325 the shaft 325 is rotated with the disk 385.

From the above description of the means for raising and lowering slip carrier A and for rotating this slip carrier it can be seen that upon each cycle of operation of the machine the carrier is first lowered so that one of its arms 324 picks up the top sales slip on the pile in the supply box 296 after which the slip carrier is raised to normal position and finally given one-third of a rotation.

*Assorting mechanism: Valve of slip carrier A.*

The valve of slip carrier A for controlling the current of air forced by the pressure tank through the holes 358 (Fig. 24) in the arms 324 of the slip carrier and the creation of a partial vacuum in the grooves 334 (Figs. 24 and 27) and chambers 335 in these arms by the vacuum tank may be said to comprise the cylinder 323, the cylinder 350 and the cylinder 355 (Fig. 25) and this valve will now be described. This valve is marked "valve No. 1" in Fig. 1.

The cylinder 355 is solid, except for the ducts 354 and 360 and is positioned within the hollow cylinder 350. The cylinders 350 and 355 are loosely mounted in the cylinder 323. The cylinder 355 carries the head or member 352 (Figs. 24 and 25) having two vertical projecting ears 416. A pin 417 mounted in the ears 416 projects through a recess formed in one end (Fig. 25) of a lever 418 (Figs. 3$^c$, 23, 24 and 47$^B$) pivotally mounted on a frame 419 fast on the frame 117. The opposite end of the lever 418 is pivotally connected to the upper end of a link 420 (Fig. 47$^B$) which at its lower end is pivotally connected to one end of the lever 423 pivotally mounted on a bracket 424 projecting downwardly from the frame 326. The opposite end of the lever 423 is forked and each fork has a recess through which projects a pin 425 on a ring 426 loosely mounted in an angular groove formed in the aforesaid collar 367 fast on the lower end of the shaft 325. The levers 418 and 423 are so proportioned that when the shaft 325 is lowered, as above described, the cylinder 355 is lowered but not to the same extent as the shaft 325.

Fast on the lower end of the cylinder 355 (Fig. 25) is a disk 429 which projects beyond the cylindrical surface of the cylinder 355 so that the cylinder 350 may rest on the disk 429 whereby the cylinder 350 is raised and lowered with the cylinder 355. Fast on the upper end of the cylinder 350 (Figs. 24 and 25) is a collar 430 having a projection 433 which is pivotally connected to one end of a link 434 (Figs. 23 and 24) which at its opposite end is pivotally connected at 435 (Figs. 23 and 92) to an arm 436 pivoted at 437 to the frame 117. The arm 436 carries a roller (Fig. 92) projecting into a cam groove formed in the upper face of a disk 438 fast on the shaft 113. This cam groove in the disk 438 is so constructed that it rocks the collar 430 and the cylinder 350 counter clockwise (Figs. 24 and 28) after slip carrier A has been lowered and then the cam groove restores the collar and cylinder to normal position after the slip carrier has been raised. The cylinder 323, of course, has three holes 347 (Figs. 25 and 28) each hole being in alinement with the end of the duct 346 formed in the corresponding arm 324 of the slip carrier.

The operation of this valve will now be described more particularly in reference to Figs. 15, 28 and 29. The views in Figs. 28 and 29 show the different relative positions between the cylinder 323 and the cylinder 350 during one cycle of operation of the machine. It is to be remembered that slip carrier A picks up a sales slip from the supply box 296 and is then given one-third of a rotation during each cycle of operation of the machine. Fig. 15 is a diagrammatic view showing the relative movement between one of the holes 347 in the cylinder 323 and the cylinder 350 during three cycles of operation of the machine. In Fig. 15 the vertical dotted lines 443 also lettered A, C, E, G, I and K represent the relative vertical motion between the cylinder 323 and the cylinder 350 and the horizontal dash lines 444 also lettered B, D, F, H and L represent the relative angular motion between these two members. For the sake of convenience the holes 347 in the cylinder 323 will be numbered $347^A$, $347^B$ and $347^C$ in Figs. 28 and 29 and the hole $347^A$ will be considered as being appropriate to the arm 324 which is in position to pick up the top slip in the pile during the first cycle of operation of the machine, that is during the first rotation of the main drive shaft 113.

Near the beginning of the cycle of operation slip carrier A is lowered, as above described, whereupon the cylinder 323 and the cylinder 350 move from their normal positions shown in the left hand view in Fig. 29 to the position shown in the second view from the left in this figure. At the end of this movement the hole $347^A$ in the cylinder 323 is at the point of intersection of the lines A and B in Fig. 15. While the slip carrier is in lowered position the cam 438 (Fig. 92) through the above described connections rocks the cylinder 350 from the position indicated in the second view from the left in Figs. 28 and 29 to the position indicated in the third views from the left in these figures. At such time the hole $347^A$ (Fig. 15) is at the point of intersection of the lines B and C, the hole $347^A$ being moved into registry with the slot 348 in the cylinder. The lower ends of the vertical portions of the slot 348 are always in registry with the angular grooves 353 (Fig. 25) in the cylinder 355. While the cylinder 350 is in this rocked position the slip carrier and the cylinder are elevated to normal position. The relative positions of the hole $347^A$ and slot 348 at such time is shown in the fourth views of Figs. 28 and 29 counting from the left. The hole $347^A$ would be at the point of intersection of the lines C and D in Fig. 15. Then during the one-third rotation of the slip carrier the cylinder 350 is rocked back to normal position. During the elevation of the slip carrier to normal position and its one-third rotation the hole $347^A$ remains in registry with the slot 348, the hole at the end of the one-third rotation of the carrier being at the point of intersection of the lines D and E in Fig. 15. The position of this hole $347^A$ and the slot 348 is also shown in the fifth view from the left in Fig. 28. At this time the hole $347^B$ as shown in the fifth views from the left in Figs. 28 and 29 is in the same position as the hole $347^A$ is in in the left hand views in these figures.

From the above description it can be seen that the hole $347^A$ in the cylinder 323 is not brought into registry with the slot 348 in cylinder 350 until the arm 324 of the slip carrier has been moved into engagement with the top sales slip on the pile in the supply box 296. The movement of the slot 348 into registry with the hole $347^A$ permits the vacuum tank to withdraw the air from the grooves 334 and the chamber 335 in the arm 324 (Figs. 24, 25, 26 and 27) through the duct 340 (Figs. 24, 25 and 26) valve chamber 345, duct 346, hole $347^A$, slot 348, angular groove 353 and duct 354 in the cylinder 355, duct 351 in the head 352, thence through a tube 428 (Fig. 1) and finally through the tube 268 connected directly to the vacuum tank 245. As the hole $347^A$ remains in registry with the slot 348 during the remainder of the cycle of operation of the machine it can be seen that a partial vacuum is maintained in the grooves 334 and the chamber 335 in the arm 324 so that the uppermost slip is retained on the arm 324 and carried with it.

The further operation of this valve so far as it controls the partial vacuum in the grooves 334 and chamber 335 in the arm 324 during the next two cycles of operation of the machine will be described later.

The hole 363 (Figs. 15, 25 and 29) formed in the cylinder 323 follows a path (Fig. 15) corresponding to that of the hole $347^A$. It is understood, of course, that there are three of these holes 363, one for each arm 324 but it will be only necessary to describe the relative movement between one of these holes 362 and the hole 363 formed in the tube 350. The relative movement between the hole 362 in the cylinder 323 and the hole 363 during three complete cycles of operation of the machine is indicated by the dotted lines 450 in Fig. 15. From this figure it can be seen that the hole 363 passes over the hole 362 when the corresponding arm 324 is lowered into engagement with the uppermost slip in the supply box 296 and the cylinder 350 is rocked and that the hole 363 passes out of engagement with this hole 362 near the beginning of the vertical movement of the slip carrier to normal position. This relative movement between the holes 362 and 363 is also clearly illustrated in Fig. 29. When slip carrier A is lowered (second view from the left in Fig. 29) the holes 362 and 363 are in the same horizontal plane. Then when the cylinder 350 is rocked the holes 362 and 363 are brought into registry as shown in the third view from the left in Fig. 29 and at the same time the hole 362 is brought into registry with the end of the duct 360 in the cylinder 355. When slip carrier A is raised the holes 362 and 363 move out of register as shown in the fourth view from the left in Fig. 29. During the passage of the hole 363 over this hole 362 air is forced by the pressure tank through the tube 266 (Figs. 1, 19 and 24) the duct 361 (Figs. 24 and 25) in the member 352 duct 360 in the cylinder, hole 363, hole 362, duct 364, grooves 365 (Figs. 1 and 24) and holes 358 and then through the perforations 105 (Fig. 43) in the sales slips to separate the uppermost slip picked up by the arm 324 from the next slip in the pile.

*Assorting mechanism: Slip aliner.*

At the end of the one-third rotation of slip carrier A after a sales slip has been picked up from the pile of slips the slip and the arm 324, carrying it, project over an alining table 455 (Figs. 23, 47$^B$ and 73) mounted on the frame 117. The table 455 comprises a flat top plate 456 supported by sides 457. When slip carrier A is lowered the slip above the alining table is lowered and deposited on the table. It is understood of course that during each cycle of operation one of the arms 324 picks up a sales slip from the pile and that at the next succeeding operation the next succeeding arm picks up the next sales slip, a sales slip in this manner being picked up during each cycle of operation of the machine and then moved over the alining table 455. When the slip carrier is lowered the hole 347$^A$ (Fig. 15) in the cylinder 323 is at the point of intersection of the lines E and F and therefore passes out of registry with the slot 348 in the cylinder 350 so that the suction retaining the sales slip on the arm 324 is interrupted whereby the slip is permitted to be supported on the alining table. While the slip rests on the alining table it is properly alined relative to the arm 324 by the following described means.

Each side 457 (Figs. 47$^B$ and 73) of the alining table 455 carries projecting lugs 459 in which is journaled a shaft 460 carrying an alining plate 461. Each alining plate has vertically extending fingers 462 normally projecting into slots or recesses 464 formed in the corresponding edge of the top plate 456 of the alining table. Each shaft 460 rigidly carries a downwardly extending arm 465 connected by a link 466 (Figs. 35 and 73) to the corresponding arm of a four armed lever 467. The lever 467 is fast on a stub shaft 468 journaled in bosses (Fig. 73) on the top plate 456 and the frame 117. Fast on the shaft 468 is an arm 469 which is connected by a link 470 to one arm of a bell crank 473 (Fig. 35) loosely mounted on a stud 472 projecting downwardly from the frame 117. The other arm of the bell crank lever 473 carries a roller 474 (Figs. 35 and 94) projecting into a cam groove 475 formed in the upper face of a disk 477 fast on the shaft 113. The cam groove 475 is so constructed that before the sales slip is lowered onto the top plate 456 (Fig. 73) of the alining table the plates 461 are rocked to move the fingers 462 of the plates out of engagement with the recesses in the top plate 456. Then after the sales slip has been lowered onto the table the plates 461 are rocked back to normal position whereupon the fingers 462 engage the sides of the slip to aline it properly relative to the arm 324.

Before slip carrier A is raised to normal position the cylinder 350 (Figs. 28 and 29) is rocked counter clockwise (Fig. 28) as above described. This movement of the tube brings its slot 478 (Figs. 15 and 28) into registry with the hole 347$^A$ the latter at such time being at the point of intersection of the lines F and G in Fig. 15. Then during elevation of the slip carrier A to normal position and during its one-third rotation the hole 347$^A$ remains in registry with the slot 478, the hole at the end of the cycle being at the point of intersection of the lines H and I (Fig. 15). From this it can be seen that the vacuum tank is permitted to create and maintain a partial vacuum in the grooves 334 (Figs. 24 and 27) and chamber 335 (Figs. 24, 25, 26 and 27) after the slip has been properly alined relative to the arm 324 and before slip carrier A is raised so that during the elevation of the slip carrier and its one-third rotation the slip is carried with the arm 324.

At the end of the cycle of operation in which the sales slip is alined as above described the sales slip and the arm 324 carrying it are above one of the three arms 479 (Figs. 23, 36 and 37) of slip carrier B which will be described presently in detail. During the third cycle of operation when slip carrier A is lowered the slip is moved into engagement with the arm 479 under the slip at such time. During such movement of slip carrier A the hole 347$^A$ (Fig. 15) remains in registry with the vertical portion 480 of the slot 478 the hole at the end of the movement being at the point of intersection of the lines I and J. Then when the cylinder 350 (Figs. 28 and 29) is rocked counter clockwise as viewed in Fig. 28 the slot 478 is moved out of registry with the hole 347$^A$, thereby stopping the action of the vacuum tank on the sales slip, so that the sales slip may rest on the arm 479 of slip carrier B. During the remainder of the cycle of operation the arm 324 moved from over the arm 479 does not carry a sales slip and the hole 347$^A$ is not in registry with either of the slots 348 or 478. At the end of this cycle of operation this arm 324 which does not carry a slip is above the supply box 296 and therefore in position to pick up another slip at the next cycle of operation of the machine.

From the above description it can be seen that upon each cycle of operation of the machine one of the arms 324 of slip carrier A picks up a sales slip from the pile in the supply box 296. During the first cycle in which an arm 324 picks up a slip it carries the slip into position over the alining table 455. During the second cycle the arm deposits the slip on the alining table and then after the slip is alined the arm 324 picks up the slip and carries it into position over one of the arms 479 of slip carrier B. Then during the third cycle the arm 324 deposits the slip on the arm 479 and completes its rotation so that it is again above the pile of slips in the supply box 296.

*Assorting mechanism: Slip carrier B.*

Slip carrier B (Figs. 23, 36 and 37) has three arms 479 and upon each cycle of operation of the machine slip carrier A deposits a slip upon one of the arms of slip carrier B and then the latter is given one-third of a rotation during the cycle of operation. Slip carrier B is not raised and lowered. During the first movement of a slip with the slip carrier B the slip is moved into position to control the hereinafter described differential mechanisms for the printing, totalizing and distributing mechanisms. During the next cycle of operation of the machine the sales slip is carried into position to be delivered to the distributing mechanism. Then during the next cycle of operation the arm 479 which carried the slip is moved into position to receive another slip from slip carrier A.

Slip carrier B comprises a frame 483 (Figs. 36 and 37) having the three radially extending arms 479 (Figs. 23, 36 and 37). The frame 483 is rigidly mounted on the upper end of a shaft 484 by a pin 485 (Fig. 36). The shaft 484 is journaled in a boss on the frame 117 (Fig. 32) and in the frame 326 (Fig. 35). Each arm 479 on the upper face of its flat rectangular portion carries a plate 486 provided with four parallel slots 487 (Figs. 36 and 37). These slots 487 coincide with grooves 488 formed in the upper face of the arm 479 and connected by grooves 489. When a sales slip is deposited by slip carrier A upon an arm 479 of slip carrier B the air in the slots 487 and grooves 488 is partially exhausted to retain the slip on the arm 479 by suction. The air is withdrawn from these slots and grooves at the proper time by the vacuum tank through a duct 490 (Figs. 36, 37 and 40) formed in the arm 479, a valve cylinder 495 (Figs. 17 and 36) loosely mounted in the frame 483 of slip carrier B and thence through a tube 496 (Fig. 1) and the tube 268.

On the head 498 of the valve cylinder 495 (Figs. 17, 36 and 37) are two vertically projecting lugs 499 in which is supported a pin 500 projecting through a recess formed in one end of a lever 503. The opposite end of the lever 503 (Fig. 47ᴮ) is pivotally connected to the upper end of a link 505. As shown in Figs. 3ᶜ, 23 and 47ᴮ the lever 503 is pivoted intermediate its ends on a frame 504 fast on the frame 117. At its lower end the link 505 (Fig. 47ᴮ) is pivotally connected to one end of a lever 506 loosely mounted on a stud 507 (Figs. 35 and 47ᴮ) on the frame 327. The opposite end of the lever 506 (Fig. 79) carries a roller 509 projecting into a cam groove 510 formed in the front face of a disk 513 rigidly mounted on the shaft 375. This cam groove 510 is so constructed that near the beginning of each cycle of operation of the machine and at the same time that a sales slip is deposited on one of the arms 479 of the slip carrier B the valve cylinder 495 is raised slightly. Then the cam groove raises the valve cylinder another step and finally lowers it to normal position during the one-third rotation of the slip carrier, the cylinder being gradually lowered during the entire rotating movement of the slip carrier.

The valve cylinder 495 (Fig. 17) is provided with a slot 514. At the beginning of a cycle of operation of the machine the end of the duct 490 (Fig. 36) in the arm 479, which is in position to receive the slip from the slip carrier A, is in the position represented by the dotted circle 515 in Fig. 17. When the cylinder 495 is given its first step of vertical movement as above described the end 516 of the slot 514 is brought into registry with the end of the duct 490 thereby permitting the vacuum tank to create a partial vacuum in the grooves 488 (Figs. 36 and 37) for the purpose of holding the slip on the arm 479 by suction. Then when the cylinder 495 is given its second step of vertical movement and finally lowered during rotation of the slip carrier the slot 514 remains in registry with the end of the duct 490 so that the above described partial vacuum in the grooves 488 is maintained. At the end of the cycle of operation the end of the duct 491 is in the position indicated by the dotted circle 517. During the next cycle of operation of the machine the end of the duct 490 is in registry with the vertical portion 518 and the inclined portion 519 of the slot 514 and at the end of the cycle is in registry with the end 523 of the slot 514. Near the beginning of the following cycle of operation the slip is delivered to the distributing mechanism, to be described later, and at such time the slot 514 is moved out of registry with the duct 490 so that the suction on the slip is cut off. During the remainder of this last cycle the slot 514 is not in registry with the duct 490 and the position of the end of the duct relative to the slot 514 at the end of such cycle is indicated by the dotted circle 515, slip carrier B having been given one complete rotation during the three cycles of operation.

The means for rotating slip carrier B is very similar to that employed to rotate slip carrier A and this means will now be described. Fast on the shaft 484 carrying slip carrier B is a disk 524 (Figs. 30 and 33). Loosely mounted on the shaft 484 is a segment gear 525 carrying a pawl 526 whose nose 527 is normally retained by a spring 521 in engagement with one of the three notches 531 formed in the periphery of the disk 524. The segment gear 525 meshes with the teeth on an operating lever 528 loosely mounted on a stud 529 projecting from the frame 310. The lever 528 carries a roller 530 (Fig. 31) projecting into a cam groove 533 formed in the upper face of a disk 534 which is rigidly mounted on the shaft 113. A three-armed lever 535 (Fig. 30) is loosely mounted on a stud 536 projecting from the frame 310. One of the arms of the lever 535 is connected by a link 537 to one arm of a bell crank lever 538 loosely mounted on the stud 529. The other arm of the bell crank lever 538 carries a roller 539 (Fig. 31) projecting into a cam groove 540 formed in the lower face of a disk 534. The arm 543 of the lever 535 projects under the free end of the pawl 526. The cam grooves 533 and 540 are so constructed that the lever 535 is first rocked to disengage the nose 527 of the pawl 526 from one of the notches 531 after which the segment gear 525 is rocked first counter clockwise (Fig. 30) one-third of a rotation and then clockwise to normal position. At the end of the counter clockwise movement of the segment gear 525 the nose 527 of the pawl 526 engages in the next notch 531 in the disk 524 thereby rotating the disk 524, the shaft 484 and slip carrier B one-third of a rotation in a clockwise direction (Figs. 23, 30, and 37) when the segment gear is moved clockwise to normal position. During counter clockwise movement (Fig. 30) of the segment gear 525 a nose 544 on the lever 535 engages in notch 531 opposite the nose to lock the disk 524 against movement until the nose 527 of the pawl 526 engages in one of the notches 531 at the end of its clockwise movement, after which the lever 535 is moved to normal position to permit rotation of the disk.

*Assorting mechanism: Translating device.*

At the end of the cycle of operation of the machine at which a slip is deposited on one of the arms 479 of slip carrier B and the slip carrier given one-third rotation, the slip is in coöperative relation with the translating device. As hereinbefore stated, the sales slips when in coöperative relation with the translating device controls the various differential mechanisms which will be described later. The translating device is shown in Figs. 23, 39, 42, 44 and 47$^A$—47$^B$, and will now be described.

A frame 545 (Figs. 23, 39 and 42) carrying the translating device is rigidly mounted on the frame 117. This frame as viewed from the top is U-shaped having two forwardly extending arms 546 in each of which is journaled a corresponding shaft 547 (Figs. 39 and 42). Each shaft 547 carries two arms 548 which at their free ends are forked over pins 549 projecting from a frame 550. This frame 550 is flat and rectangular except for the rear end which has a downwardly and rearwardly curved portion 553. Rigidly mounted on one of the shafts 547 (Figs. 42 and 47$^B$) is an arm 554 which at its free end is pivotally connected to the upper end of a link 555 (Fig. 48$^B$). At its lower end the link 555 is pivotally connected to an arm 556 loosely mounted on the stud 507. The arm 556 carries a roller 557 projecting into a cam groove 558 formed in the rear face of the disk 513 rigidly mounted on the shaft 375. The shafts 547 (Figs. 39 and 42) at the forward ends carry oppositely extending arms 560 which are connected at their free ends by a slot and pin connection 563 (Fig. 42). The cam groove 558 (Fig. 47$^B$) is so constructed that during each cycle of operation of the machine and before slip carrier B is given its one-third rotation the shafts 547 and arms 548 are rocked through the above described connections to lower the frame 550 (Figs. 39 and 42) into engagement with the sales slip on the arm 479 under the frame 550. The frame 550 is retained in this lowered position for a short time and then raised before slip carrier B begins its one-third rotation. An arm 564 is loosely mounted at one end on one of the shafts 547 and at its opposite end is loosely mounted on one of the pins 549, this arm 564 being provided to insure exact alinement of the frame 550 with the sales slip.

The frame 550 (Figs. 36 and 44) is provided with five rows of holes 566 called "amount" holes herein and with four rows of holes 567 called "clerks'" holes herein. The amount perforations in the sales slips are in registry with the corresponding holes 566 and the clerks' perforations are in registry with the corresponding holes 567 when the frame 550 is lowered into engagement with the sales slips. Each plate 486 and arm 479 (Figs. 36 and 37) on slip carrier B are provided with five rows of amount holes 568 and four rows of clerks' holes 569 the amount holes 566 and the clerks' holes 567 being in registry with the amount holes 568 and clerks' holes 569 when the frame 550 is lowered into engagement with the sales slip as above described. When the frame 550 is lowered onto the sales slip the latter closes all the holes 567, 569, 566 and 568 except those holes which are in registry with the perforations in the slip. Formed in each arm 479 of slip carrier B and below the holes 568 and 569 is an air chamber 570. This air chamber 570 is connected to the vacuum tank by an air passage to be described later.

A plate 573 (Figs. 36, 39, 42 and 44) is slidably mounted on the upper face of the frame 550 the latter being provided with guide pieces 574 projecting over the plate 573 to guide the latter in its movements. Mounted in the plate 573 are five rows of nipples 575 there being one row of nipples 575 for each row of amount holes 566 in the frame 550. Each row of nipples 575 is connected by means of flexible tubes 576 (Figs. 1, 3ᴬ—3ᶜ, 42, 61ᴬ and 63ᴬ—63ᴮ) to corresponding nipples 577 (Figs. 61ᴬ, 63ᴬ and 63ᴮ) mounted in the appropriate one of five cylinders 578. These cylinders 578 (Fig. 61ᴬ) are provided with piston heads 579 (Fig. 61ᴬ) which are differentially positioned to control the differential mechanism for the totalizers and type carriers and will be described later. The plate 573 (Figs. 36, 39 and 44) is also provided with a row of nipples 580 which are connected by tubes 583 (Figs. 1, 3ᶜ, 48 and 50ᴮ) to corresponding nipples 584 (Fig. 48) mounted in a cylinder 585. The cylinder 585 is supported by rods 586 (Fig. 50ᴮ) projecting from the frame 117. A piston head 587 (Figs. 48 and 50ᴮ) is mounted in the cylinder 585 and is normally above the uppermost nipple 584. The piston head 587 is adapted to move differentially and controls the differential movement of the distributing mechanism, to be described later.

When the sales slips are to be assorted in accordance with the first, second, third and fourth digits counting from the left of the clerks' numbers the plate 573 (Figs. 36, 39 and 44) is moved preliminarily to the operation of the machine, as will be described later, so that the row of nipples 580 is in registry with the fourth, third, second and first rows of holes 567 (counting from the front) respectively. When the nipples 580 are in registry with one of these rows of holes 567 the plate 573 closes the other rows of holes 567, except during the first sorting operation when the row of nipples 580 is in registry with the rearmost row of holes 567 at which time the rearmost row of nipples 575 is over foremost row of holes 567, but this foremost row of holes at such time is closed as will be described now. Therefore, when the frame 550 is lowered into engagement with the sales slip only one nipple 580, one hole 567, one clerks' perforations in the sales slip and one hole 569 in the plate 486 and arm 479 are in registry.

During the first, second and third sorting operations the totalizing and printing mechanisms are not in operative condition and therefore it is necessary to close all of the amount holes 566 when the frame 550 is in engagement with a sales slip. It is also necessary to close the foremost row of holes 567 during the first sorting operation. To these ends a plate 588 (Figs. 36, 39 and 44) is mounted to slide in a groove 589 formed in the upper face of the frame 550. The top face of the plate 588 is flush with the top face of the plate 550. The plate 588 is provided with five rows of amount holes 590 (Figs. 36, and 44) and with one row of clerks' holes 593. The plate 588 carries two vertically extending pins 594 between which slides an arm 595 of a member 596 fastened on the plate 573. During the fourth sorting operation the plate 573 is in the position shown in Fig. 39 so that the amount holes 590 (Fig. 44) are in registry with the amount holes 566 in the frame 550 and the clerks' holes 593 are in registry with the foremost row of clerks' holes 567 also formed in the frame 550. When the plate 573 is moved from the position shown in Fig. 39 to any other position the inclined edge 597 of the member 596 engages the corresponding pin 594 and moves the plate 588 to the position shown in Fig. 44 so that the amount holes 590 are not in registry with the amount holes 566 and the clerks' holes 593 are not in registry with the clerks' holes 567. Therefore it can be seen that during the first, second and third sorting operations the air cannot be drawn through the amount perforations in the sales slip or through the perforations representing the first digits in the clerks' numbers.

After the frame 550 has been lowered into engagement with a sales slip as above described, the air in the cylinder 585 (Figs. 48 and 50ᴮ) is withdrawn by the vacuum tank through one of the nine tubes 583, one of the nipples 580 (Figs. 36 and 39) the hole 567 in registry with this nipple and the clerks' perforation in the sales slip, thence through the corresponding hole 569, chamber 570 and finally through suitable connections to be described later. When the air in the cylinder 585 is partially exhausted in this manner the cylinder head 587 is drawn downwardly due to the withdrawal of the air and its weight until it is over the end of the nipple 584 through which the air is withdrawn. As further withdrawal of the air from the cylinder is then prevented by the cylinder head the latter will remain in its differentially moved position until near the end of the cycle of operation when it will be moved back to normal position as described later. An opening 599 in the top of the cylinder 585 permits air to enter the cylinder above the piston head 587 when the latter is lowered. As above stated the sales slips are not perforated to represent "0's." It is obvious that if no clerks' perforations in a sales slip is in registry with one of the nipples 580 (Figs. 36 and 39) the piston head 587 (Figs. 48 and 50ᴮ) will remain in normal "0" position as no air is withdrawn from the cylinder 585.

From the above description it can be seen that during the first sorting operation of the machine the nipples 580 are in registry with the rearmost row of clerks' holes 567. During such operation the portion of the plate 573 between the nipples 580 and the rearmost row of nipples 575 closes the two middle rows of holes 567 and the plate 588 closes the front row of holes 567. Therefore a partial vacuum can only be created in the cylinder 585 (Fig. 48) through the clerks' perforations representing the first digits of the clerks' numbers. When the machine is prepared for a second sorting operation the plate 573 is moved so that the row of nipples 580 is in registry with the second row of holes 567 from the rear and the plate 573 closes the first and third rows of holes 567 (counting from the rear) while the plate 588 closes the foremost row of these holes. Therefore the air in the cylinder 585 during the second sorting operation is exhausted only through the clerks' perforations representing the second digits of the clerks' numbers. In like manner during the third sorting operation of the machine the air in the cylinder 585 is partially exhausted through the clerks' perforations representing the third digits of the clerks' numbers. During these first three sorting operations of the machine the plate 588 is in the position shown in Fig. 44 so that the amount holes 566 are closed and therefore the air in the cylinders 578 (Figs. 61ᴬ, 63ᴬ and 63ᴮ) is not withdrawn during these operations. When the machine is prepared for the fourth sorting operation the plate 573 is moved to the position shown in Fig. 39, so that the nipples 580, the holes 593 in the plate 588 and the foremost row of holes 567 are in registry. At the same time the five rows of nipples 575 on the plate 573 and the five rows of holes 590 and 566 in plate 588 and frame 550 respectively are in registry. Therefore, during this fourth sorting operation the air is withdrawn from the cylinder 585 through the clerks' perforations representing the fourth digits in the clerks' numbers and the air in the cylinders 578 (Figs. 61ᴬ, 63ᴬ and 63ᴮ) is withdrawn through the perforations representing the amount of the transaction. When the air in the cylinders 578 is partially exhausted the cylinder heads 579 move downwardly until they close the nipples 577 through which the air is withdrawn. Then these piston heads remain in these positions until after they have controlled the amount of differential mechanism when they are restored to normal position.

The pneumatic connections forming a passage between the vacuum tank and the chamber 570 (Figs. 36 and 35) of the arm 479 carrying the slip in coöperative relation with the translating device will now be described. A duct 600 formed in the arm 479 opens into the chamber 570. A disk 603 (Figs. 36 and 38) is loosely mounted on the shaft 484, and a spacing collar 604 (Fig. 36) retains the disk 603 from vertical movement on the shaft. The disk 603 on its lower face carries a nipple 605 and a duct 606 extends through the disk and the nipple. The nipple 605 is connected by a tube 607 to a nipple on a valve 608 (Figs. 1, 41 and 47ᴬ) mounted on a bracket 609 fast on the frame 117. A second nipple on the valve 608 is connected by a tube 611 to the tube 268. The duct 606 in the disk 603 (Figs. 36 and 38) is normally out of registry with the lower end of the duct 600 in the arm 479 which is in coöperative relation with the translating device. After the frame 550 of the translating device has been lowered onto the sales slip on the arm 479 the disk 603 is rocked counter clockwise (Fig. 38) to bring the two ducts 600 and 606 into registry whereupon the vacuum tank through the above described pneumatic connections withdraws a part of the air from the cylinder 585 (Fig. 48) during the first, second and third sorting operations and from the cylinder 585 and the cylinders 578 (Figs. 61, 63ᴬ and 63ᴮ) during the fourth sorting operation as above described. A projection 610 (Fig. 38) on the disk 603 is connected by links 613 and 611 (Fig. 47ᴬ) to the upper end of the upwardly extending arm of a lever 612 (Figs. 47ᴬ and 50) loosely mounted on a stud 740 projecting from the frame 327. The lever 612 is connected by a link 621 to an arm 614 (Fig. 78) which carries a roller 615 projecting into a cam groove formed in the face of a disk 616 fast on the shaft 375. This cam groove is so constructed that the disk 603 is rocked to bring the ducts 600 and 606 into coincidence after which the disk is restored to normal position.

The plate 573 (Figs. 39 and 44) is shifted to the desired position preliminarily to the operation of the machine by the following described means. A pin 617 mounted on the plate 573 projects into a recess formed in the outer end of an arm 618 which is mounted at its opposite end on a shaft 619, (Fig. 35) which is journaled in the frame 117. An arm 620 fast on the shaft 619 is provided with a slot 623 through which a pin on the rear end of a link 624 projects. The forward end of the link 624 is pivotally connected to the upper end of an arm 625 (Figs. 6A—6B, 35 and 70) which at its lower end is pivotally mounted on a stud 626 (Figs. 6B and 70) projecting from a curved frame 627 mounted on the frame 135. The rear end of the link 624 (Fig. 35) is provided with a slot 628 through which a pin on one arm of a bell crank lever 629 projects. The bell crank lever 629 is loosely mounted on a stud 630 projecting downwardly from the frame 117. The other arm of the bell crank lever 629 is connected to rear end of a link 633 which at its forward end is pivotally mounted on the downwardly extending arm 634 (Figs. 6A and 22) of a sorting lever 635. The sorting lever 635 is loosely mounted on the shaft 120 (Figs. 5 and 6A) and is adapted to be adjusted manually to one of its four sorting positions, these positions being indicated on the hood 126 as shown in Fig. 23. When the sorting lever is moved from its first sorting position to any other of its positions the link 633 is drawn forwardly (Fig. 35) a corresponding extent. Such movement of the link 633 rocks the lever 629 and the link 624 clockwise (Fig. 35) about their pivots thereby moving the pin on the link 624 in the slot 623 of the arm 620. The slot 623 is so constructed that movement of the pin on the link 624 rocks the arm 620, the shaft 619, and the arm 618 (Figs. 39 and 44) to move the plate 573 to the desired position.

*Assorting mechanism: Distributing device.*

After the arm 479 of slip carrier B is given one-third of a rotation from coöperative relation with the translating device the sales slip on the arm 479 is under the outer end of an arm 637 (Figs. 23, 47A and 52) which is called the "distributing" arm herein. This distributing arm 637 is constructed to pick up the slips from slip carrier B and then deposit the slips in their proper boxes 638 to be described later.

Figure 50B:
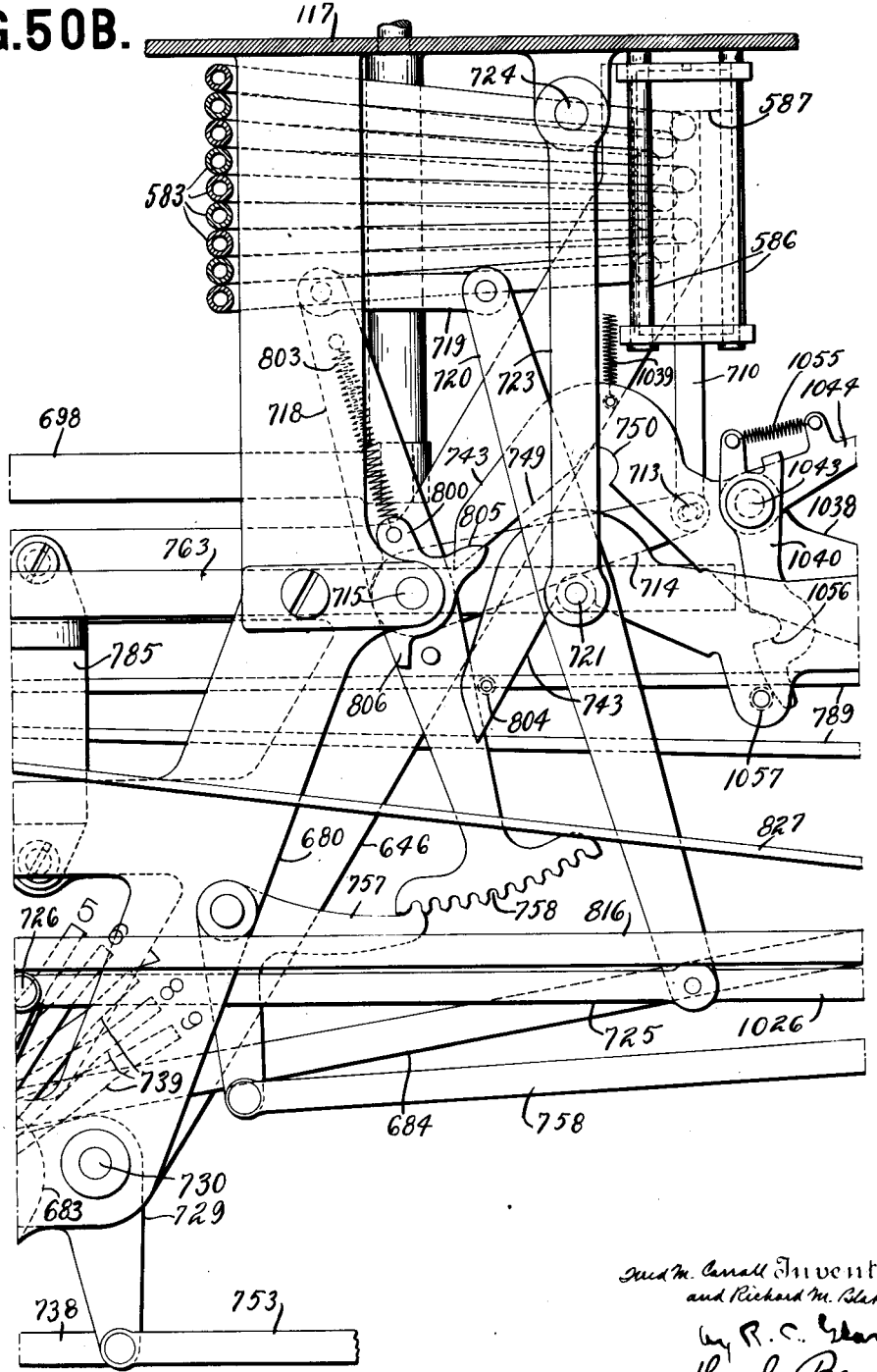

The distributing arm 637 comprises an arm 639 carrying a plate 640 at its outer end and rigidly mounted on a sleeve 643 (Figs. 52 and 54) at its opposite end. The sleeve 643 is fast on a shaft 644 which is slidably mounted near its upper end in a frame 642 on the frame 117 and near its lower end in a bracket 645 (Figs. 50A and 56). The bracket 645 is rigidly mounted on a vertical frame 646 (Figs. 3B—3D, 50A—50B, 55 and 56) fast on the under side of the frame 117.

The shaft 644 with the distributing arm 637 (Fig. 52) is raised and lowered during each cycle of operation of the machine by means to be described later. The plate 640 rigidly carries on its lower face a plate 647 provided with holes 648 (Fig. 51) above which is formed a groove 649 in the lower face of the plate 640. After a sales slip is moved by slip carrier B into position under the distributing arm 637 the shaft 644 and distributing arm 637 are lowered during the next cycle of operation so that the plate 647 engages the slip. Then as the slot 514 (Fig. 17) in the cylinder 495 moves out of registry with the duct 494 (Fig. 36) in the arm 479 carrying the slip the air in the groove 649 (Fig. 51) is partially exhausted so that the slip is transferred from slip carrier B to the distributing arm, the slip being held on the distributing arm by suction. The air in the groove 649 at such time is exhausted by the vacuum tank through a nipple 650 (Figs. 51 and 52) on the plate 640, a flexible tube 653 (Fig. 52) carried by the distributing arm, a duct 654, (Figs. 52 and 54) formed in the sleeve 643 and shaft 644, an angular groove 655 formed in the sleeve 643, a duct formed in a nipple 656, mounted on a sleeve 657, a tube 658 (Figs. 3B—3D, 52 and 54) a valve 659, (Figs. 1 and 3D) a tube 660 (Fig. 1) and the tube 268. The sleeve 657 (Figs. 52 and 54) is loosely mounted in a restricted portion of the sleeve 643 and is raised and lowered with the sleeve 643 and shaft 644. In order to prevent the sleeve from rotating with the shaft 644, and permit it to be lowered and raised with the shaft a pin 663 mounted in the frame 642 projects through a hole in a projection 664 formed on the sleeve 657.

The valve 659 (Fig. 3D) is mounted on the frame 646. This valve is shown in cross section in Fig. 71 and comprises a disk 665 mounted in the valve casing 666 and provided with a hole 667. The disk 665 carries an arm 668 which is connected by a link 669 to one arm of a bell crank lever 670 (Fig. 97) pivotally mounted on the frame 646. The other arm of bell crank lever 670 carries a roller projecting into a cam groove 673 formed in the lower face of a disk 674 fast on the shaft 113. This cam groove is so constructed that when the distributing arm is lowered into position to pick up a slip from slip carrier B the disk 665 (Fig. 71) is rotated to open the above described passage between the vacuum tank and the groove 649 (Fig. 51) in the plate 640 of the distributing arm. This disk 665 is then maintained in this position until the distributing arm has been moved differentially and lowered the slip into the proper box 638 (Figs. 23 and 52), when the disk 665 is moved back to normal position to close this passage. It can therefore be seen that when the slip is lowered into the proper box 638 by the distributing arm the slip is no longer held on the arm by suction and therefore it is permitted to remain in the box when the distributing arm is raised.

The shaft 644 is lowered and raised at the proper times to pick the sales slips and deposit them in their proper boxes 638 by the following described means. The shaft 644 at its lower end carries a collar 675 (Fig. 50ᴬ) provided with an angular groove in which is loosely mounted a ring 676. The ring 676 carries two oppositely extending pins 677 projecting into the recesses formed in corresponding arms 681 (Figs. 50ᴬ and 55) of a frame 678 which is rigidly mounted on a shaft 679 supported at one end in the frame 646 and at the opposite end in a frame 680 (Figs. 47ᴬ, 50ᴬ—50ᴮ, 55 and 56) mounted on the frame 117 and parallel with the frame 646. An arm 683 (Figs. 50ᴬ, 55 and 56) is fast on the shaft 679 which is connected by a link 684 (Figs. 50ᴬ, 50ᴮ and 50ᶜ) to the vertically extending arm of a lever 685 (Figs. 50ᶜ and 53) which is loosely mounted on a cross rod 686 supported by the parallel frames 313 and 327. The other arm of the bell crank lever 685 (Fig. 53) carries a roller projecting into a cam groove formed in the face of a disk 687 fast on the shaft 375. The cam groove in the disk 687 is so constructed that the shaft 679 and frame 678 (Fig. 50ᴬ) are rocked counter clockwise near the beginning of each cycle of operation of the machine, and then rocked clockwise to normal position. This movement of the frame 678 raises and lowers the shaft 644 and distributing arm 637 so that the distributing arm may pick up a slip from slip carrier B. Then the shaft 644 and distributing arm are rotated differentially as will be described later into position over the desired box 638. Then while the shaft and distributing arm are in their differentially moved position the groove in the disk 687 (Fig. 53) again rocks the lever 678 counter clockwise and then clockwise (Fig. 50ᴬ) such movement of the lever 678 lowering the shaft and distributing arm so that the distributing arm may deposit the slip in the proper box 638. Then after the shaft for the distributing arm is raised in normal position they are rotated to normal position.

The boxes 638 (Figs. 3ᴮ—3ᶜ, 23 and 52) are mounted on the frame 117 and are arranged in a circle with the shaft 644 as a center. The sales slips are deposited by the distributing arm on horizontal plates 690 (Fig. 52) supported by compressed spiral springs 689 which are fastened at their lower ends by pins to the bottoms of the boxes 638.

*Assorting mechanism: Retaining bails for sales slips.*

When the distributing arm 637 is lowered to deposit a slip in one of the boxes 638 a bail 693 (Figs. 23 and 52) against which the uppermost slip in the box is pressed by the spring 689 is withdrawn from over the slips and then moved back to normal position over the slip deposited by the distributing arm. There is one of these bails for each box 638. Each side of the bail 693 is supported by a pair of arms 694 and 695. These arms are loosely mounted on cross rods 696 supported at their ends in the vertical sides of a corresponding frame 697. The frames 697 are rigidly mounted on the circular frame 698 which is supported by vertical rods 699 (Figs. 3ᴮ, 3ᶜ and 23) projecting downwardly from the frame 117. The arms 694 (Fig. 52) are connected by a cross rod 700 and a cross bar 703. The arms 695 are connected by a cross piece 704 and a spring 705 connected at one end to the cross piece 704 and at its opposite end to the cross rod 700 normally retains the bail 693 over the uppermost slip on the plate 690 as shown in Fig. 52. Rigidly mounted on the shaft 644 is an arm 706 which when the distributing arm is positioned over one of the boxes 638 projects over a pawl 707 pivotally mounted in the corresponding cross bar 703.

When the shaft 644 and the distributing arm 637 are lowered the arm 706 engages the pawl 707 thereby rocking the arms 694 and 695 clockwise (Fig. 52) to move the bail 693 from over the slips in the selected box. Near the end of the downward movement of the shaft 644 the arm 706 slides out of engagement with the pawl 707 whereupon the spring 705 rocks the arms 694 and 695 to normal position to move the bail 693 to normal position over the slips. When the bail 693 moves to normal position it projects over the slip to be deposited by the distributing arm and into a recess 708 (Fig. 51) formed in the plates 640 and 647 so that when the distributing arm is raised the slip will be retained in the box 638. When the shaft 644 is raised the arm 706 engages the pawl 707 and idly rocks it counter clockwise (Fig. 52) against the action of its spring 709 until the arm 706 moves out of engagement with the pawl when the latter is moved to normal position by its spring.

After a pile of slips has been sorted the bails 693 are moved manually from over the slips in the boxes 638 whereupon the spring 689 raises the plates 690 and the slips so that the latter may be removed readily from the boxes.

*Assorting mechanism: Differential mechanism for distributing arm.*

The differential mechanism for rotating the shaft 644 and the distributing arm 637 is controlled by the differential movement of the piston head 587 (Figs. 48, and 50ᴮ) and is constructed to move the distributing arm in either direction from the normal position shown in Fig. 23. When the clerk's perforation, controlling the differential movement of the piston head 587 represents one of the digits 1, 2, 3, or 4, the distributing arm is moved clockwise (Fig. 23), two, three, four or five steps respectively and when the perforation represents one of the other digits, that is, 5, 6, 7, 8 or 9, the distributing arm is moved one, two, three, four or five steps respectively in a counter clockwise direction. If the piston head 587 is not moved out of normal position, as is the case when a "0" occurs in the clerks' number the distributing arm is moved one step in a clockwise direction. The boxes 638 appropriate to the various digits are indicated by the digits in Fig. 23.

A rod 710 (Figs. 50$^B$, 55 and 56) which at its upper end is mounted in the piston head 587, is provided at its lower end with a pin 713 (Fig. 50$^B$) projecting into a slot formed in an arm 714. This arm 714 is rigidly mounted on a shaft 715 which is mounted in the frame 680 and a projection 716 (Fig. 55) on a cross rod 717 supported at its ends in the frames 646 and 680. Rigidly mounted on the shaft 715 (Figs. 50$^B$, 55 and 56) is a lever 718 which at its upper end is connected by a link 719 to the upper end of a lever 720. The lever 720 intermediate its ends is pivotally mounted by a pin 721 to the lower end of an arm 723 which at its upper end is pivoted at 724 (Fig. 50$^B$) to a downwardly extending lug on the frame 117. The lower end of the lever 720 is connected to one end of a link 725 which at its opposite end is connected by pin 726 (Figs. 50$^A$—50$^B$) to the upper end of an arm 727. The arm 727 is rigidly mounted on a shaft 728 (Figs. 50$^A$ and 55) which at its ends is journaled in the outer ends of the nearly horizontal arms 729 (Figs. 50$^A$—50$^B$ and 55) rigidly mounted on a shaft 730 journaled at its ends in the frames 646 and 680. The arm 727 is connected by a link 733 to an arm 734 fast on a shaft 735 (Figs. 50$^A$, 55 and 56). The shaft 735 is journaled at its ends in arms 736 rigidly mounted on a shaft 737 journaled at its ends in the frames 646 and 680. The rear arms 729 (Fig. 50$^B$) and 736 (Fig. 50$^A$) have downwardly extending arms which are connected by a link 738 (Figs. 50$^A$—50$^B$). Rigidly mounted on each shaft 730 and 735 (Figs. 50$^A$, 50$^B$, 55 and 56) are five fingers 739. The fingers 739 on each shaft are spirally arranged the angular distance between the adjacent fingers being equal.

Loosely mounted on the stud 740 (Fig. 50$^C$) projecting from the frame 327 is an operating lever 743 (Figs. 50$^B$—50$^C$). The downwardly extending arm 744 (Fig. 50$^C$) of the lever 743 is connected by a link 745 (Fig. 76) to one arm of a lever 746 pivotally mounted on the cross rod 686. The other arm of the lever 746 carries a roller projecting into a cam groove 747 formed in the rear face of a disk 748 rigidly mounted on the shaft 375. The cam groove 747 is so constructed that the lever 743 is rocked clockwise (Figs. 50$^B$—50$^C$) an invariable distance before the piston head 587 is differentially positioned and then lowered to normal position after the piston head is positioned.

From the above construction it can be seen that when the piston head 587 is differentially positioned the lever 720 is rocked counter clockwise (Fig. 50$^B$) about its pivotal connection with the link 725 through the rod 710, arm 714, shaft 715, lever 718 and link 719. Then the lever 718 is locked in moved position as will be described later, and the lever 743 is rocked clockwise to normal position by the cam groove 747. During this clockwise movement of the lever 743 one of its inclined edges 749 engages the pin 721 and rocks the link 720, the pin 721 at the end of such movement being in engagement with the circular recess 750 in the lever 743. As the lever 718 is locked in moved position the link 723 is rocked about its pivot 724 and the link 720 is rocked in the same direction about its pivotal connection with the link 719 thereby differentially positioning the lower end of a lever 720 in accordance to the position of the piston head 587. This movement of the lever 720 through the link 725, arm 727 (Figs. 50$^A$ and 50$^B$) link 733 and arm 734 differentially positions the shafts 728 and 735 and the fingers 739 mounted on the shaft.

After the shafts 728 and 735 have been positioned differentially and while they remain in such position the shafts 730 and 737 (Figs. 50$^A$ and 50$^B$) are rocked clockwise to raise the shafts 728 and 735 and their fingers 739. To this end the downwardly extending arm integral with the rear arm 729 (Fig. 50$^B$) is connected to one end of a link 753 which at its opposite end (Figs. 50$^C$ and 80) is connected to the downwardly extending arm of a lever 754 loosely mounted on the cross rod 686. The other arm of the lever 754 carries a roller projecting into a cam groove 755 formed in one face of a disk 756 rigidly mounted on the shaft 375. This cam groove 755 is so constructed that the shafts 728 and 735 (Fig. 50$^A$) are raised and then immediately lowered near the beginning of each cycle of operation of the machine.

In order to lock the lever 718, (Fig. 50$^B$) in differentially moved position during the counter clockwise movement of the operating lever 743 the nose on the horizontal arm of a bell crank lever 757 engages in one of the notches 758 formed in the lower segmental end of the lever 718. The lever 757 is pivotally mounted on the frame 680 and its downwardly extending arm is connected by a link 758 to a lever 759 (Fig. 76) loosely mounted on the cross rod 686. The lever 759 carries a roller projecting into a cam groove 760 formed in the front face of the disk 748. This cam groove 760 is so constructed that the lever 757 (Fig. 50ᴮ) is rocked to disengage its nose from one of the recesses 758 in the lever 718 to permit differential movement of the lever 718 after which the lever 757 is rocked to normal position to engage its nose in one of the other recesses 758 and thereby lock the lever 718 in moved position during counter clockwise movement of the operating lever 743. When the shafts 728 and 735 and the fingers 739 are elevated as above described the lever 718 is locked in moved position by the lever 757 and the lever 743 so that these shafts and fingers are locked in their differentially moved positions.

After the fingers 739 have been lowered to normal position the nose of the alining lever 757 (Fig. 50ᴮ) is rocked out of engagement with the lever 718 and then during clockwise movement of the lever 743 the piston head 587 is raised to normal position. To this end a pawl 800 is loosely mounted on the shaft 715 and a spring 803 is connected at its lower end to the pawl 800 and at its upper end to the lever 718. During the clockwise movement of the lever 743 from normal position a roller 804 on the lever engages the lower edge of a projection 805 on the pawl 800 thereby rocking the latter counter clockwise slightly past normal position. The pawl 800 is provided with a downwardly extended projection 806 which when the pawl is rocked counter clockwise engages a pin 807 on the lever 718 thereby moving the lever 718, shaft 715, arm 714 and hence the piston head 587 to normal position. During counter clockwise movement of the lever 718 the link 720 rocks idly about its pivotal connection with the link 725 thereby permitting the fingers 739 (Figs. 50ᴬ and 50ᴮ) to remain in their differentially moved position. When the operating lever 743 is rocked counter clockwise to normal position the roller 804 engages the projection 805 on the pawl 800 thereby rocking the latter clockwise until the roller 804 passes out of engagement with the projection 805 whereupon the spring 803 rocks the pawl back to normal position relative to the lever 718.

Two horizontal and parallel rods 763 (Figs. 50ᴬ–50ᴮ, 55, 56 and 58) are slidably mounted in the cross bar 717 (Fig. 55) and in a cross bar 764 also supported by the frames 646 and 680. Rigidly mounted on a frame 765 (best shown in Fig. 58) fast on the rods 763 are two parallel bars 766 each of which is provided with five holes 767. Rigidly mounted on the forward end of the frame 765 is a rack 768 meshing with a pinion 769 loosely mounted on the shaft 644 and rigidly connected to a sleeve 770 (Fig. 56) also loosely mounted on the shaft 644. The sleeve 770 is prevented from moving vertically by the engagement of the end of a bracket 773 in an angular groove 774 in the sleeve 770 the bracket being fast on the frame 646. Rigidly mounted on the sleeve 770 is an arm 775 (Figs. 55 and 56) carrying an upwardly projecting rod or pin 776 which projects through an opening in an arm 778 (Figs. 52 and 56) fast on the shaft 644. The pin 776 causes the shaft 644 to be rotated with the arm 775 and permits vertical movement of the shaft 644 independently of the arm 775.

Bars 779 (best shown in Fig. 58) are normally under the corresponding cross bars 766 so that pivot pins 780 (Figs. 50ᴬ, 56 and 59) in the bars 779 are in registry with the holes 767 in the bars 766. Each bar 779 at its rear end is provided with a recess 783 (Figs. 55 and 58) through which a vertical rod 784 supported in a corresponding bracket 785 (Figs 55, 56 and 58) projects. The brackets 785 are rigidly mounted on the frame 646. Also loosely mounted on each rod 784 is a lever 786. The forward ends of the levers 786 are provided with pins 787 which project through slots 788 formed in the forward ends of the corresponding bars 779. The rear ends of the levers 786 are connected by corresponding links 789 to corresponding levers 790 (Figs. 50ᶜ and 96) loosely mounted on a stud 793 projecting from the frame 326. The levers 790 carry rollers projecting into corresponding grooves 794 formed in the opposite faces of a disk 795 fast on the shaft 113. These cam grooves are so constructed that the left hand lever 786 as viewed in Figs. 55 and 58 is rocked counter clockwise and the right hand lever 786 is rocked clockwise and to the same extent to the positions shown in Fig. 58. Then after the slip has been deposited by the distributing arm 637 in the selected box 638 the levers 786 are moved by the cam grooves to normal position.

The digits represented by the fingers 739 (Figs. 50ᴬ and 50ᴮ) and the corresponding digits represented by the pivot pins 780 (Fig. 58) are properly designated in these figures. It can be seen from these figures that when the piston head 587 is not moved from normal position the "0" finger 739 remains in normal vertical position so that the "0" pin 780 is directly above the upper end of this finger. When, however, the piston head 587 is moved differentially the fingers 739 are moved to a like extent, as above described, to bring the proper finger under the corresponding pivot pin 780. For example if the piston head 587 is moved four steps the "4" finger is moved into vertical position under the "4" pin 780. If the piston head is moved nine steps fingers 739 are rotated nine steps to bring the "9" finger under the "9" pivot pin 780. Then when the fingers 739 are elevated as above described the selected finger in coöperative relation with its pivot pin 780 engages the latter and elevates it to move its upper end through the corresponding hole 767 (Fig. 58) in the appropriate bar 766.

As shown in Fig. 59 these plunger pins 780 are slidably mounted in hubs 796 carried by the bars 779. The lower bent end of a spring 797 fast on the corresponding hub 796 engages in the upper one of a pair of notches 798 formed in the lower enlarged portion of the corresponding pin 780. When a pin 780 is raised the lower bent portion of the corresponding spring 797 engages in the lower notch 798 thereby retaining the pin in elevated position.

After the selected pin 780 is raised so that it engages in the corresponding hole 767 (Fig. 58) the levers 786 are rocked in opposite directions as above described to the positions shown in Fig. 58. As the pins 787 on the forward ends of the levers 786 engage in the slots 788 in the bars 779, the latter are rocked with the levers 786. It can be seen that as the selected pivot pin 780 connects one of the bars 779 and the corresponding bar 766 together the frame 765 and supporting rods 763 are shifted differentially dependent upon the pivot pin 780 connecting the two bars. The frame 765 is moved in either direction dependent upon to which bar 779 it is connected. For example if the "0," "1," "2," "3" or "4" pin 780 is elevated the frame 765 is moved one, two, three, four or five steps respectively from normal position toward the right as viewed in Fig. 58. If the "5," "6," "7," "8" or "9" pin is elevated the frame 765 is moved one, two, three, four or five steps respectively toward the left as viewed in Fig. 58. The frame 765 is shown in its "3" position in Fig. 58. As the rack bar 768 (Figs. 55, 56 and 58) meshes with the pinion 769 it can be seen that this pinion and therefore the shaft 644 and distributing arm 637 (Figs. 23 and 52) are rocked differentially from 1 to 5 steps in either direction from normal position so that the distributing arm is positioned over the desired box 638 under the control of the clerk's perforation controlling the assortment of the slip.

After the levers 786 and bars 779 (Figs. 50^A, 55 and 58) and therefore the distributing arm 637 have been restored to normal position the elevated pivot pin 780 is lowered to normal position. Plates 808 (Figs. 50^A and 56) one for each row of pivot pins 780, at their outer ends engage the lower sides of notches 809 (Figs. 50^A and 59) formed in the enlarged portions of the pivot pins 780. Each plate 808 is rigidly mounted on a corresponding shaft 810 (Fig. 50^A) journaled in the frames 646 and 680. One of the shafts 810 rigidly carries an arm 813 which is connected by a link 814 to a downwardly extending arm 815 on the other shaft 810. The arm 815 is connected to one end of a link 816 which at its opposite end (Fig. 80) is connected to a lever 817 loosely mounted on the cross rods 686. The lever 817 carries a roller projecting into a cam groove 818 formed in the rear face of the disk 756. The configuration of this cam groove is such that the plates 808 (Fig. 50^A) are rocked to raise their outer edges out of engagement with the lower sides of the notches 809 in the pivot pins 780 to permit elevation of the selected pin 780. Then after the bars 779 carrying the pins 780 are restored to normal position the plates 808 are rocked to normal position whereupon one of the plates engages the lower side of the notch 809 in the elevated pin 780 to lower the latter to normal position.

The above described mechanism for moving the distributing arm 637 differentially under the control of the sales slips is constructed so that the fingers 739 are differentially positioned under the control of a sales slip during one cycle of operation and elevated during the next cycle of operation to control the movement of the differential mechanism for differentially positioning the distributing arm. Near the beginning of a cycle of operation the sales slip in coöperative relation with the translating device controls the differential movement of the piston head 587 (Fig. 50^B) and then during the same cycle of operation the lever 743 is rocked counter clockwise to position the fingers 739 (Figs. 50^A and 50^B) in accordance to the position of the piston head 587. During the same cycle of operation in which the sales slip controls the movement of the piston head 587 the sales slip is moved into position under the distributing arm. At the beginning of the next cycle of operation in which the fingers are differentially positioned the fingers 739 are elevated to raise the selected pivot pin 780 and then the fingers are immediately lowered to normal position. During the same cycle of operation of the machine the distributing arm is lowered to pick up the sales slip and is then differentially positioned to deposit the sales slip into the proper box 638.

The bars 779 (Figs. 55 and 58) and therefore the distributing arm 637 are alined in normal position by the following described device to insure coincidence of the pivot pins 780 with the holes 767 in the bars 766 which are mounted on the frame 765. A three armed lever 819 is pivotally mounted on a bracket 820 (Fig. 55) fast on the frame 680. The oppositely extending arms 823 of the lever 819 are provided on opposite sides with recesses 824 (Fig. 58) which engage over the pins 787 while the selected pivot pin 780 is being elevated, the bars 779 in this manner being alined in normal position. The rearwardly extending arm of the lever 819 is connected by a link 825 to a lever 826 (Fig. 77) loosely mounted on the cross rod 686. The lever 826 carries a roller projecting into a cam groove formed into the face of a disk 827 fast on a shaft 375. This cam groove is so constructed that the lever 819 (Figs. 55 and 58) is rocked counter clockwise after the selected pivot pin 780 has been raised thereby disengaging the recesses 824 in the lever from the pins 787 to permit movement of the bars 779. Then after the bars 779 have been restored to normal position, the lever 819 is rocked to normal position.

*Assorting mechanisms: Stopping machine.*

During the cycle of operation in which the last sales slip to be sorted is moved by slip carrier B (Figs. 23, 36 and 37) from its position under the frame 550 of the translating device (Figs. 23, 36 and 39) to its position under the distributing arm 637 (Figs. 23 and 52) the arm 159 (Fig. 6ᶜ) is rocked counter clockwise. Then the pawl 151 during this cycle and the next two cycles rotates the ratchet 148 three more steps, the motor circuit being broken and the shafts 110 and 113 being disconnected when the ratchet 148 is moved to normal position as above described.

The arm 159 is connected to the forward end of a link 829 which at its rear end is fast to a plate 830, (Figs. 6ᶜ and 46). The plate 830 is square and is movable in an air chamber 833 formed in a frame 834 fast on the frame 135. A spiral spring 835 is compressed between the rear side of the plate 830 and the rear wall of the chamber 833 whereby the arm 159 is retained in the normal position shown in Fig. 6ᶜ. A nipple 836, mounted in the rear wall of the frame 834 is connected by a tube 837 (Figs. 1, 47ᴮ) to the tube 268. A plate 838 (Figs. 6ᶜ and 46) mounted on the frame 834 and closing the chamber 833 is provided with a nipple 839 which is connected by a tube 840 to a nipple 843 (Fig. 36) on the disk 603. A duct 844 (Figs. 36 and 38) is formed in the nipple 843 and the disk 603 and at its upper end terminates in a groove 845 formed in the upper face of the disk 603. A duct 846 (Figs. 36 and 37) is formed in each of the arms 479 of slip carrier B and when slips are on the arms they close the upper ends of the ducts 846.

As the arms 479 of slip carrier B move from their position under the arms of slip carrier A into position under the frame 550 of the translating device the lower ends of the ducts 846 pass over the groove 845. As the tubes 268 and 837 connect the nipple 839 with the vacuum tank the latter creates and maintains a partial vacuum between the plate 830 and the rear wall of the chamber 833. Normally the spring 835 is sufficient to prevent this vacuum from causing the plate 830 to be drawn rearwardly. When, however, no slip is on one of the arms 479 and the lower end of the duct 846 in the arm passes over the groove 845 the upper end of the duct 846 is open and therefore the atmospheric pressure of the air on the front side of the plate 830 causes the plate to move rearwardly against the action of the spring 835, the air pressure on the front side of the plate being greater than that on the rear side of the plate due to the partial vacuum created by the vacuum tank. The plate 830 is operated in this manner while the last slip is being moved into position under the frame 550 of the translating device. As the plate 830 is connected to the arm 159 by the link 829 the arm 159 is rocked clockwise (Fig. 6ᶜ) so that the pawl 151 engages the tooth 158 of the ratchet 148 and rotates the latter one step during the same cycle of operation in which the plate 830 is operated. Then during the next two cycles of operation the pawl 151 engages the teeth between the tooth 158 and the tooth 157 thereby restoring the ratchet 148 to normal position.

*Assorting mechanism: Valves.*

During the last cycle of each sorting operation of the machine no slip is in coöperative relation with the translating device and it is therefore desirable to prevent the partial exhaustion of the air in the cylinder 585 (Figs. 48 and 50ᴮ) when the disk 603 is operated. The following described device is employed for this purpose. Mounted on the frame 550 (Figs. 39 and 42) is a frame 850 in which is mounted a cross rod 853. A yoke shaped frame 854 is loosely mounted on the cross rod 853 and is fast to a lever 855. The cross bar connecting the two sides of the frame 854 rests on pins 856 mounted in the frame 550. The downwardly extending arm of the lever 855 (Figs. 42 and 47ᴬ) carries a pin projecting into a slot 857 formed in the vertical arm of a bell crank lever 858 pivotally mounted on a bracket 859 fast on the frame 117. The horizontal arm of the bell crank lever 858 is connected to the upper end of a link 860 (Figs. 39, 41 and 47ᴬ). The lower end of the link 860 projects into the chamber in the valve 608 and is connected to a disk-like member 610 (Fig. 41) preferably formed of flexible material so that the member 610 may close the duct through the nipple to which one end of the tube 497 is connected.

When the frame 550 (Figs. 36 and 39) is lowered the lower ends of the pins 856 which normally project below the frame 550 engage the sales slip in coöperative relation with the translating device thereby rocking the frame 854 and lever 855 counter clockwise (Fig. 42) and the lever 858 clockwise to raise the member 610 (Fig. 41). When the member 610 is raised the air from the cylinders 585 (Figs. 48 and 50ᴮ) and cylinders 578 (Fig. 61ᴬ) can be withdrawn by the vacuum tank through the above described passages which include the translating device, the perforations in the sales slip and the arm 479. During the last cycles of operation in which no sales slip is in coöperation with the translating device the member 610 (Fig. 41) is not raised as the lower ends of the pins 856 enter holes 864 (Fig. 37) formed in the plate 486 and the arm 479 under the frame 550 when the latter is lowered. Therefore during this cycle of operation the air in the cylinders 585 and 578 cannot be withdrawn as the member 610 closes the passages between the cylinders and the vacuum tank.

During the last four cycles of operation of the machine in which the last sales slip to be sorted is moved by slip carrier A (Figs. 23, 24 and 25) from its position on the alining table 455 (Figs. 23 and 73) and deposited in its proper box 638 no slip is picked up by the arms 324 when they are lowered into the supply box 296.

It is, therefore, necessary for the purpose of maintaining the proper pressure in the vacuum tank to stop the passages from vacuum tank to the grooves 365 (Fig. 24) in the arms 324, which do not carry slips, when the passages are opened through the valve comprising the cylinder 323, tube 350 and cylinder 355 (Fig. 25). To this end a valve plunger 865 (Fig. 26) is mounted to slide in the valve chamber 345 in each arm 324. When a sales slip is not on one of the arms 324 and the vacuum tank begins to withdraw air from the chamber 335 through the valve chamber 345 a partial vacuum is created in the valve chamber 345 above the plunger 865 whereupon the air at atmospheric pressure on the lower side of the plunger raises the latter to close the ducts 340 and 346 and thereby close the passage from the chamber 335 and grooves 334 to the vacuum tank. This partial vacuum is created in the air chamber 345 as the duct 340 has a restricted portion which has a smaller diameter than the duct 346 and therefore the air cannot be drawn into the chamber 345 as rapidly as it is withdrawn from this chamber. When a sales slip is on one of the arms 324 and the air in the grooves 334 and chamber 335 is partially exhausted a partial vacuum is created in the chamber 345 but as the slip is over the opening 866 under the plunger 865 and formed in the plate 330 the plunger 865 cannot be raised sufficiently to close the passage as a slight elevation of the plunger creates a vacuum between the slip and the under side of the plunger which prevents the plunger from being elevated further.

It is obvious that during the first four and the last three cycles of operation of the machine sales slips are not on all of the arms of slip carrier B when the passages between the vacuum tank and the grooves 488 (Figs. 36 and 37) in the arms are opened by the valve cylinder 495 (Fig. 17). Therefore, a valve plunger 867 (Figs. 36, 37 and 40) is slidably mounted in a valve chamber 871 in the duct 490 in each of the arms to close the passages so that the proper pressure is maintained in the vacuum tank 479. A spring 868 normally retains each plunger in the position shown in Fig. 40. When no slip is on one of the arms 479 and the passage from the vacuum tank to grooves 488 in the arm is opened a partial vacuum is created in the duct 490 whereupon the atmospheric pressure on the upper end of the valve plunger 867 forces the latter downwardly against the action of its spring 868 to close the duct 490 and thereby prevent further suction by the vacuum tank of the air from the grooves 488 in the arm. When a slip is on one of the arms 479 and the air in the duct 490 is partially withdrawn by the vacuum tank the valve plunger 867 cannot be operated as the slip closes the hole 869 formed above the plunger valve 867 and in the plate 486.

A valve plunger 870 (Fig. 52) which is constructed similarly to the valve plunger 865 (Fig. 26) in each arm of slip carrier A, is mounted in the nipple 650 on the plate 640 and is automatically raised in the same manner as the plunger valve 865 when no slip is on the distributing arm and the passage between the groove 649 (Fig. 51) in the distributing arm and the vacuum tank is opened.

During total printing operations, to be described later, no slips are sorted and therefore the valve plungers 865 (Fig. 26), 867 (Fig. 40), and 870 (Fig. 52) are operated to close their various passages.

*Totalizing mechanism: General.*

The machine is provided with ten totalizers and common actuating means therefor. During the first, second and third sorting operations of the machine the totalizing mechanism is disabled as is also the printing mechanism. During the fourth sorting operation the totalizing and printing mechanisms are enabled so that the amounts on the sales slips are added on the appropriate totalizers and printed on the corresponding detail strips. The totalizers to be added on and the strips to be printed upon are selected under the control of the perforations representing the fourth digits of the clerks' numbers. During the first three cycles of the fourth sorting operation the totalizing and printing mechanisms are not operated. During the next ten cycles of operation the totalizer engaging mechanism is disabled but the printing mechanism is operated to head the various detail strips with the appropriate clerks' numbers. The operation of the totalizers and printing mechanism during the adding cycles of fourth sorting operation will first be described and the operation of the machine during heading cycles of operation will be described later.

*Totalizing mechanism: Actuating means.*

The actuating means for the totalizers comprises a common set of racks 875 (Figs. 61$^A$—61$^B$ and 63$^A$—63$^B$). The five actuating racks 875 of lowest denominations are controlled by the piston heads 579 (Fig. 61$^A$) of their appropriate cylinders 578, while the two racks of highest order (Fig. 63$^A$) are used merely for transfer purposes and in total printing operations and consequently do not need to be controlled by piston heads. The racks 875 are slidably mounted on a plate or frame 876 (Fig. 61$^B$) and a frame 877, the racks being slidable in slots (not shown) in the frame 876 and being provided with slots 878 through which a cross rod 879 supported in ears 881 on the frame 877 projects. The frames 876 and 877 are rigidly mounted at their right hand ends on the frame 115 (Figs. 3$^A$ and 63$^B$) and at their left hand ends on a frame 880 (Figs. 61$^A$—61$^B$ and 63$^A$) which is rigidly mounted on the frame 117.

The forward ends of the racks 875 are provided with slots 883 (Figs. 61$^A$—61$^B$) which near their forward ends, (Fig. 61$^A$) have shoulders 884. The shoulders 884 are engaged by lugs 888 projecting from corresponding pawls 889 pivotally mounted at 890 on the upper ends of corresponding levers 893. Springs 894 connected at one end to the levers 893 and at their opposite ends to the downwardly extending arms of the pawls 889 serve to retain the pawls 889 in normal position. The lower ends of the levers 893 are provided with slots 895 through which projects a cross rod 896 supported at its ends in arms 897 (Figs. 61$^A$—61$^B$ and 67) fast on a shaft 898 journaled at its ends in the frames 115 and 880. The right hand arm 897 has a rearwardly extending arm 901 (Fig. 91) which carries a roller projecting into a cam groove formed in the face of a disk 899 fast on a shaft 900 journaled in the frames 115 and 880. During the first, second and third sorting operations the shaft 900 is not rotated but during fourth sorting operations the shaft 900 is given one complete rotation in the direction of the arrow upon each cycle of operation of the machine through means to be described later. The cam groove in the disk 899 is so constructed that the cross rod 896 (Fig. 61$^A$) is lowered to lower the levers 893 after which the rod and levers are retained in lowered position and finally elevated to normal position. The lower ends of the levers 893 are connected by links 891 to the upwardly extending arms of corresponding levers 892 (Figs. 61$^A$—61$^B$ and 83) loosely mounted on a cross rod 902. When the levers 893 are raised and lowered the links 891 rock about their pivotal connections with the levers 892 which at such times are retained in normal position as will be described later.

Levers 903 (Figs. 61$^A$, 63$^A$ and 63$^B$) are loosely mounted on a shaft 904 journaled at its ends in the frames 115 and 880. The upwardly extending arms of the levers 903 are segmental in shape and are provided with series of notches 905. The forwardly extending arms of the levers 903 have slot and pin connections with the lower ends of corresponding rods 906 mounted at their upper ends in the piston heads 579. Tensioned springs 911 (Figs. 61$^A$—61$^B$) connected to the levers 903 and arms 920 on a cross rod 921 retain the levers in normal position.

From the above description it can be seen that when the air in the cylinders 578 and under the piston head 579 is partially exhausted under the control of the amount perforations in the sales slips, as above described, the piston heads 579 are lowered differentially thereby rocking the levers 903 to the same extent in the counter clockwise direction (Fig. 61$^A$). While the levers 903 are in their differentially moved positions the levers 893 are lowered, as above described, whereupon pins 907 on the levers 893 engage in the notches 905 which are under the pins when the levers 893 are lowered. While the pins 907 are in engagement with the notches 905 the levers 903 are rocked clockwise to normal position by means to be described later. As the lugs 888 carried by the pawls 889 engage the shoulders 884 the racks 875 are moved rearwardly to differential extents by the counter clockwise movement of the levers 893. While the racks are in moved positions the pinions 874 (Fig. 61$^B$) of the selected totalizer are rocked into engagement therewith and then the racks and levers 893 are moved to normal position and during this movement the amount represented by the amount perforations on the sales slip is added on the selected totalizer.

A cross rod 908 (Figs. 61$^A$ and 63$^A$—63$^B$) is supported at its ends in the forwardly extending arms 909 of levers 910 rigidly mounted on the shaft 904. The rearwardly extending arm of the right hand lever is connected by a short link 913 to the forwardly extending arm of a lever 914 (Figs. 61^A—61^B and 89) loosely mounted on the shaft 898. The rearwardly extending arm of the lever 914 carries a roller (Fig. 89) projecting into a cam groove formed in the face of a disk 915 rigidly mounted on the shaft 900. The cam groove in the disk 915 is so constructed that after the levers 893 (Fig. 61^A) have been lowered the levers 910 are rocked clockwise. During this movement of the levers 910 the cross rod 908 engages the forwardly extending arms of the levers 903 thereby moving the latter to normal position for the purpose of differentially positioning the levers 893 and the actuating racks 875. Movement of the levers 903 to normal position is positively arrested by engagement of the forwardly extending arms of the levers with a cross bar 901 supported by the frames 115 and 880. After the levers 903 have been restored to normal position the levers 893 are raised to normal position and then rocked counter clockwise about their pivotal connections with the links 891 to normal position. During this return movement of the levers 893 the lugs 888 on the pawls 889 engage the forward ends of the slots 883 in the actuating racks thereby restoring the latter to normal position. The vertical arms 916 of the levers 910 carry a cross rod 917 which during counter clockwise movement of the levers 910 to normal position engages the levers 893 and rocks them to normal position. The counter clockwise movement of the levers 893 to normal position is positively arrested by the engagement of the forward edges of these levers with a cross rod 918. The levers 893 are guided in their movements by the engagement of their upper ends in slots (not shown) formed in a forwardly projecting plate 919 (Figs. 61^A—61^B) fast at its rear end on the frame 876.

The above described totalizer actuating means is so constructed that during one cycle of operation of the machine the slip in coöperative relation with the translating device controls the extent of movement of piston heads 579 and during the next succeeding cycle the actuating racks are moved differentially in accordance to the positions of the piston heads and then returned to normal position. It is understood of course, that the plate 573 (Fig. 39) is in the position shown in this figure so that part of the air under the piston heads 579 in the cylinders 578 may be withdrawn through the amount of perforations in the sales slips.

*Totalizing mechanism: Enabling means.*

During the first, second and third sorting operations of the machine the totalizing mechanism is not actuated as above stated. During the fourth sorting operation of the machine, however, the plate 573 (Fig. 39) is in position to permit the amount perforations in the sales slips to control the extents of movement of the totalizer actuating racks and the operating shaft 900 (Figs. 61^B and 67) is rotated. In order to rotate the shaft 900 during the fourth sorting operation the following means is employed.

The shaft 900 on its right hand end carries a bevel gear 923 (Figs. 3^A and 63^B) meshing with a bevel gear 924 fast on a shaft 925. The shaft 925 at its rear end is journaled in a bracket 926 and at its forward end in the frame 114 (Figs. 2 and 3^A). Near its forward end the shaft 925 carries a bevel gear 927 which meshes with a bevel gear 928 loosely mounted on the main drive shaft 113. The hub of the bevel gear 928 rests upon a collar 929 fast on the shaft 113. A pin 930 (Fig. 2) is slidably mounted in a vertical tubular hole in the bevel gear 928 and its hub. The pin 930 carries a laterally projecting pin 934 which extends into a slot 935 which is formed in the upper rounded end 936 of a link 937. The link 937 near its upper end is provided with a slot 938 through which a pin on the frame 115 projects. The lower end of a link 937 is pivotally connected to the rear end of a lever 938 (Fig. 6^A) which is pivotally mounted intermediate its ends on a bracket 939 fast on the frame 117. The forward end of the lever 938 is connected by a vertical link 940 to a rearwardly extending arm 943 (Figs. 6^A and 20) splined on the shaft 120. Fast on the shaft 120 is a hand lever 945 (Figs. 5 and 20) which is called the "control" lever herein. The control lever 945 projects through an inverted U-shaped slot 946 (Fig. 23) formed in the hood 126. During the first, second and third sorting operations of the machine the lever is in "neutral" position, that is, in the upper portion of the slot 946. When the machine is to be prepared for the fourth sorting operation the lever 945 is rocked counter clockwise (Fig. 20) to "add" position (Fig. 23).

When the lever 945 is moved from its "neutral" to its "add" position it can be seen that through shaft 120, arm 943, link 940 and lever 938 (Fig. 6^A) the link 937 (Figs. 2 and 3^A) is lowered. As the pin 934 engages in the slot 935 in the link the pin 930 is lowered to move its lower end into a groove 947 formed in the collar 929 to rigidly connect the bevel gear 928 and collar 929 together. Therefore during operation of the machine the shaft 113 is connected to the bevel gear 928 whereby the shafts 925 and 900 are given one complete rotation upon each cycle of operation of the machine. During the first, second, and third sorting operations of the machine the pin 930 (Fig. 2) does not project into the groove 947 in the collar 929 and therefore the shafts 900 and 925 are not rotated during these operations. During rotation of the bevel gear 998 the pin 934 passes through the slot 935 in the link 934 and comes to rest in the slot at the end of the operation.

*Totalizing mechanism: Transfer devices.*

When a totalizer pinion moves from its "9" to its "0" position or beyond the rack 875 (Fig. 61B) engaging with the totalizer pinion of next higher denomination is moved forwardly an extra step past normal position to carry "1" to this pinion of next higher order. The transfer mechanism for accomplishing these carrying operations will now be described.

Figure 61B:
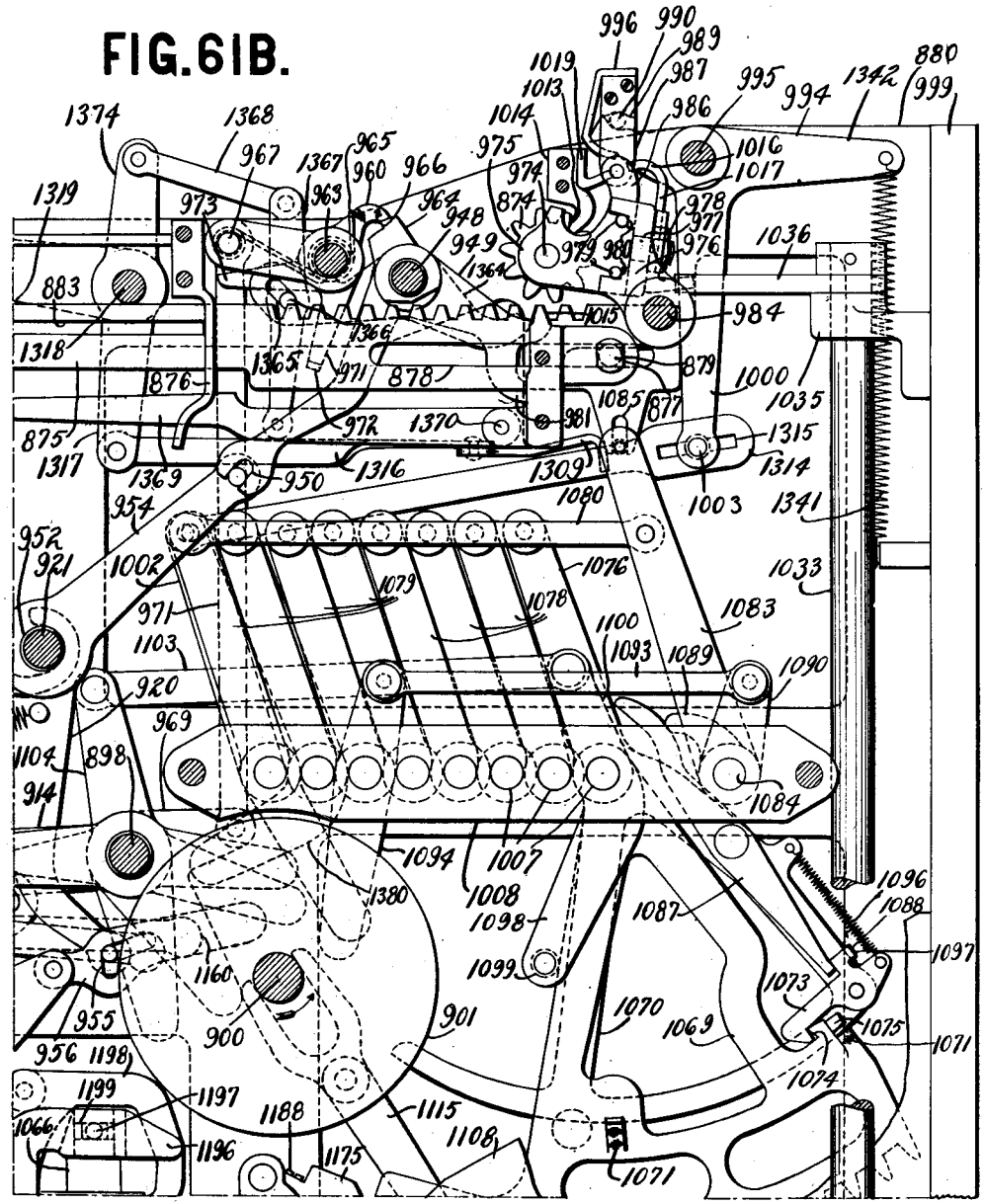

Transfer levers 949 one for each denomination represented in the totalizers are loosely mounted on a cross rod 948 (Figs. 61B, 63A—63B, and 68) which is mounted at its ends in the frames 115 and 880. The downwardly and forwardly extending arm of each lever is provided with a recess 950 through which a pin on a corresponding arm 954 (Fig. 61B) projects. The arms 954 are fast on the right hand ends of corresponding sleeves 952 (Figs. 61B and 63A—63B) which are loosely mounted on the cross rod 921 and carry at their left hand ends the corresponding arms 920. Each arm 920 at its lower end carries a pin which projects into a slot 955 (Figs. 61B and 83) formed in a corresponding lever 956. Each lever 956 at its forward end is pivotally connected to the corresponding lever 892. The rear end of each lever 956 carries a roller projecting into a groove formed in a corresponding disk 957 fast on the shaft 900. The springs 911 normally retain the arms 920 and 954 and transfer levers 949 in the positions shown in Fig. 61A. The pins on the lower ends of the levers 920 are normally in the positions shown in Figs. 61B and 83 so that when the levers 956 are rocked counter clockwise about their pivotal connections with the levers 892 by the cam grooves in the disks 957 the vertical portions of the slots 955 move over the pins. When a totalizer pinion 874 passes from its "9" to its "0" position its wide tooth 958 (Fig. 69) engages the nose 959 (Fig. 68) of the corresponding transfer lever 949 thereby rocking the latter clockwise (Figs. 61B and 68). This movement of the lever 949 rocks the corresponding arms 920 and 954 counter clockwise thereby moving the pin, carried by the arm 920 rearwardly in the rearwardly extending portion of the slot 955 in the lever 956 appropriate to the actuating rack of next higher order than that meshing with the totalizer pinion passing to its "0" position. With the arm 920 in this position it can be seen that the lever 956 is rocked counter clockwise by the groove in its cam 957 about the pin on the arm 920 as a fulcrum. This movement of the lever 956 rocks the lever 892 clockwise (Figs. 61A—61B and 83) about the cross rod 902. As the lever 892 is connected by the link 891 to the lever 893 (Fig. 61A) the lever 893 is rocked counter clockwise about the cross rod 918 as a fulcrum. This rocking movement of the lever 893 is sufficient to move the corresponding pawl 889 and actuating rack 875 one step forwardly past "0" position whereby the totalizer pinion engaging the rack and of next higher order than the pinion operating the transfer lever 949 is moved an extra step. The cam grooves in the disk 957 are so constructed that the levers 956 are successively rocked counter clockwise from lower to higher orders, each lever being rocked a few degrees before the lever of next higher order for the purpose of effecting successive transfers as is well understood in the art.

When a transfer lever 949 is moved from its normal position by a totalizer pinion it is latched in moved position by a corresponding pawl 960 (Figs. 61B, 63A and 63B) loosely mounted on a cross rod 963 supported at its ends in the frames 115 and 880. The rear ends of the pawls 960 engage the ends of arms 964 on the transfer levers 949. When a transfer lever 949 is moved by a totalizer pinion the corresponding pawl 960 is rocked by a corresponding spring 965 so that its outer end engages a shoulder 966 on the arm 964 thereby locking the lever 949 in moved position.

After the required transfers have been accomplished the operated pawls 960 are rocked out of engagement with the shoulders 966 on the transfer levers 949 whereupon the springs 911 (Figs. 61A—61B) rock the transfer levers 949 and arms 920 and 954 to normal position. To rock the pawls 960 to normal position the following described device is employed. A cross rod 967 (Figs. 61B and 63A—63B) is supported at its ends in arms 968 loosely mounted on the cross rod 963. A link 971 (Fig. 61B) is mounted at its upper end on the cross rod 967 and its lower end is pivotally connected to the rearwardly and nearly horizontal arm of a lever 969 (Fig. 82) loosely mounted on the shaft 898. The downwardly and rearwardly extending arm of the lever 969 carries a roller projecting into a cam groove formed in the face of a disk 970 fast on the shaft 900. This cam groove is so constructed that near the beginning of each cycle of operation of the machine the cross rod 967 (Fig. 61B) is lowered and then raised to normal position. When the cross rod 967 is lowered it engages forwardly extending arms 973 of the pawls 960 thereby rocking the pawls which have been operated to normal position. In order to insure movement of the levers 949 to normal position downwardly extending arms 971 of the pawls 960 are provided with projections 972 which engage the levers 949 positively to return them to normal position when the pawls 960 are rocked to normal position. Projections 981 on the levers 949 engage the frame 877 when the levers are restored to normal position thereby preventing the levers from being rocked past normal position.

*Totalizing mechanism: Totalizers.*

The totalizer pinions 874 (Figs. 61$^B$ and 63$^A$—63$^B$) of the ten totalizers are loosely mounted on a cross rod 974 and are arranged in denominational groups each totalizer consisting of one pinion in each group as is well known in the art. The cross rod 974 is mounted in plates 975 which, as best shown in Fig. 65, are fast on a rock frame 976 the plates being provided with rearwardly extending threaded studs 977 on which are screwed the nuts 978. Pins 979 on the plates 975 engage shoulders 980 (Fig. 61$^B$) on the frame 976 these pins and shoulders serving properly to aline the plates 975 on the frame 976. The frame 976 is slidably mounted at its left hand end (Fig. 63$^A$) on a rod 983 projecting from the frame 880 and the frame 976 at its right hand end (Fig. 63$^B$) is slidably mounted on a rod 984 projecting from a bracket 985 fast on the frame 115. Two of the plates 975 have upwardly extending projections 986 (Figs. 61$^B$ and 65) to which are pivotally connected the lower ends of arms 987 fast on the ends of a cross rod 989 (Figs. 61$^B$, 63$^A$—63$^B$ and 65). Bearings 990 are mounted between the groove on the lower face of the cross rod 989 and the groove on the upper face of a cross rod 993 (Fig. 65) forming part of a yoke frame 994 (Figs. 61$^B$, 63$^A$—63$^B$ and 65) loosely mounted on a cross rod 995 supported at its ends in the frames 115 and 880. A plate 996, fast on the cross rod 989, is bent to engage the lower curved face of the cross bar 993. The cross bar 993 is shorter than the cross bar 989 so that the frame 976 with the frame comprising the cross rod 989 and arms 987 may be shifted on the rods 983 and 984 to move the pinions of the selected totalizer into coöperative relation with the actuating racks 875.

*Totalizer mechanism: Engaging means.*

After the totalizers have been shifted to bring the selected totalizer into coöperative relation with the actuating mechanism the frames 976 and 994 (Figs. 61$^B$ and 63$^A$—63$^B$) are rocked to move the selected totalizer into engagement with the racks and the means for accomplishing this result will now be described.

A downwardly extending arm 1000 (Figs. 61$^B$ and 64) on the frame 994 carries a laterally projecting pin 1003, which projects into a slot 1004, (Fig. 64) formed in the rear end of a link 1005. The pin 1003 has a centrally rounded portion 1006 which engages in a corresponding rounded portion 1001 of the slot 1004 during adding cycles of operations. The forward end of the link 1005 is pivotally connected to the upper end of a lever 1002 (Figs. 61$^B$ and 87) which is loosely mounted on the foremost of a series of shafts 1007 which are journaled at their ends in plates 1008 (Fig. 61$^B$) fast on the side frames 115 and 880. The lower end of the lever 1002 (Fig. 87) carries a roller projecting into a cam groove 1009 formed in the face of a disk 1010 fast on the shaft 900. The cam groove 1009 is so constructed that after the actuating racks 875 (Fig. 61$^B$) have been moved differentially the totalizer frame is rocked to engage the pinions of the selected totalizer with the actuating racks so that upon return movement of the latter to normal position, the amount, represented by the amount perforations in the sales slip controlling the racks, is added on the selected totalizer. After the actuating racks have been returned to normal position and the required transfers effected the totalizers are raised to normal position to move the selected totalizer out of engagement with the actuating racks. When the frame 994 is rocked out of normal position by the cam groove 1009 the lower side of the cross bar 993 (Fig. 65) of the frame 994 through its engagement with the plate 996 positively rocks the totalizer frame to engage the selected totalizer pinions with the actuating racks. The bearings 990 (Fig. 65) serve to reduce the friction between the cross bars 989 and 993 when the totalizers are shifted and the frame 994 is rocked.

*Totalizer mechanism: Alining means.*

In order to aline the totalizer pinions when they are out of engagement with the actuating racks an alining ridge 1013 (Fig. 61$^B$) formed on a cross bar 1014 engages the totalizer pinions. When the totalizer pinions are lowered to move the pinions of the selected totalizer into engagement with the actuating racks 875 the pinions pass out of engagement with the alining ridge 1013 and the pinions of the unselected totalizers engage alining ridges 1015 on the frame 877 to lock these pinions against movement when they are out of engagement with the alining ridge 1013.

In order to aline the totalizers in shifted position when the totalizers are lowered to engage the selected totalizer with the actuating racks a nose 1016 (Figs. 61$^B$ and 63$^A$) formed on the upper end of an arm 1017 fast on the frame 976 engages in one of the notches 1018 (Fig. 63^A) formed in a plate 1019 fast on the frame 1014.

*Totalizing mechanism: Totalizer shifting means.*

The totalizer frame is shifted to move the desired totalizer into coöperative relation with the actuating racks 875 under the control of the piston head 587 (Figs. 48 and 50^B) which it will be remembered is controlled by perforations in the sales slips representing the fourth digits of the clerks' numbers during the fourth sorting operation in which the amounts are added on the various totalizers. The mechanism for shifting the totalizers under the control of this piston head 587 will now be described.

The upper end of the lever 718 (Figs. 50^B, 55 and 56) is connected by a link 1020 (Figs. 55 and 56) to the upper end of a link 1023 which is loosely mounted intermediate its ends on a pin 1024 (Fig. 56) projecting from the lower end of a link 1025. The link 1023 and link 1025 are constructed like the links 720 and 723 respectively (Fig. 50^B). The lower end of the link 1023 is pivotally connected to one end of a link 1026 which at its opposite end (Fig. 35) is pivotally connected to one arm of a lever 1027 (Figs. 3^C and 35) loosely mounted on a stud 1028 projecting from the frame 326. The other arm of the lever 1027 is connected by a link 1029 to an arm 1030 fast on a shaft 1033. The lower end of the shaft 1033 (Figs. 3^C and 47^B) is journaled in a bracket 1034 projecting from the frame 327 and the upper end of the shaft 1033 is journaled in a bracket 1035 (Figs. 61^B and 63^B) fast on the frame 999. The shaft 1033 carries a segment gear 1036 which meshes with a rack 1037 fast on the frame 976.

Loosely mounted on the stud 740 (Figs. 49 and 50^C) is an operating arm 1038 (Figs. 49 and 50^B—50^C). A spring 1039 (Fig. 50^B), connected at its lower end to the arm 1038 and at its upper end to the frame 117 normally retains the arm 1038 in the position shown in Fig. 50^B. During the first, second and third sorting operations of the machine the arm 1038 is not connected to the operating lever 743 and therefore the arm 1038 remains in normal elevated position during these operations. During the fourth sorting operation however, when amounts are added on the totalizers, the arm 1038 is connected to the operating lever 743 so that the arm is rocked with the lever. The means for connecting the arm 1038 and the lever 743 will be described presently.

From the above description it can be seen that during the fourth sorting operation the arm 1038 is actuated to position differentially the lower end of the link 1023 (Fig. 56) in the same manner as the operating lever 743 positions the lower end of the link 720 (Fig. 50^B) the links 720 and 1023 being positioned to the same extents in accordance to the differential movement of the piston head 587. The differential adjustment of the lower end of the link 1023 through the link 1026 (Fig. 35) lever 1027, link 1029, arm 1030, shaft 1033, segment gear 1036 (Fig. 63^B) and rack 1037 differentially shifts the totalizers to bring the selected totalizer into coöperative relation with the set of actuating racks 875.

The means for connecting the operating arm 1038 (Fig. 50^B) to the operating lever 743 during the fourth sorting operation will now be described. A lever 1040 (Figs. 49 and 50^B) is pivotally mounted on a pin 1043 projecting from the arm 1038. The upper end of the lever 1040 is bent to engage the upper edge of an arm 1044 also loosely mounted on the pin 1043. The arm 1044 is provided with a projection 1041 (Fig. 50^C) which normally engages a pin 1042 on the frame 327 thereby normally preventing operation of the arm 1038. The free end of the arm 1044 projects into a recess 1045 (Figs. 3^C and 50^C) formed in the nearly horizontal arm of a bell-crank lever 1046 pivotally mounted on a bracket projecting downwardly from the frame 310. The vertical arm of the bell crank lever 1046 (Fig. 3^C) is connected by a link 1047 to the upwardly extending arm of a bell crank lever 1048 (Figs. 3^B and 6^A—6^B) pivotally mounted on the frame 135. The forwardly extending arm of the bell crank lever 1048 (Fig. 6^B) has a recess through which a pin on a link 1049 projects. The link 1049 at its upper end (Figs. 6^A and 20) is pivotally mounted on a forwardly extending arm 1050 fast on the shaft 120. The lower end of the link 1049 is provided with a slot 1053 (Figs. 6^B and 18) through which projects a shaft 1054, mounted to rotate in the frame 627, (Figs. 6^B and 70) as will be described later.

When the control lever 945 (Figs. 5, 20, and 23) is moved from its "neutral" to its "add" position the shaft 120 is rocked whereupon the link 1049 is lowered to rock the lever 1046 counter clockwise (Fig. 3^C) through the lever 1048 and link 1047. This movement of the lever 1046 rocks the arm 1044 clockwise (Figs. 49 and 50^B) thereby moving the projection 1041 on the arm 1044 away from the pins 1042. When the lever 743 (Fig. 50^B) is raised to its uppermost position during the first cycle of operation a spring 1055 rocks the lever 1040 clockwise so that its recess 1056 engages over a pin 1057 projecting from the lever 743 to couple the arm 1038 and lever 743 together. During the first, second, and third sorting operations the engagement of the upper edge of the lever 1040 with the arm 1044 prevents the spring 1055 from rocking the lever 1040 and therefore as the arm 1038 and lever 743 are not connected together, the arm 1038 is not operated to shift the totalizers during these sorting operations. During the fourth sorting operation however the lever 1040 connects the arm 1038 and lever 1043 so that the totalizers are shifted in accordance with the clerks' perforations controlling the piston head 587. The outer end of the arm 1044 is so constructed that it is not rocked about the pin 1043 nor disengaged from the recess 1045 (Fig. 3$^c$) in the lever 1046 when the arm 1038 is operated. After the machine stops the control lever 945 (Figs. 5 and 20) is moved to "neutral" position which rocks the lever 1040 (Figs. 49 and 50$^B$) to disconnect the lever 743 and arm 1038, whereupon the spring 1039 rocks the arm 1038 to normal position.

The above described totalizer selecting, actuating and engaging mechanisms are so constructed that the totalizer is selected for operation during one cycle of operation and actuated during the next cycle. The totalizers are shifted near the end of a cycle of operation and the racks near the beginning of the next cycle of operation are moved rearwardly to their differential positions. While the racks are in such position the selected totalizer is moved into engagement with the actuating racks, so that when the latter are moved forwardly during the same cycle they actuate the engaged totalizer. Finally during the same cycle and before the totalizers are again shifted the selected totalizer is rocked out of engagement with the actuating racks.

*Printing mechanism: Type carriers and actuating means.*

The type carriers 1060 (Figs. 57, 61$^c$ and 66) are mounted on corresponding arms 1063 which are loosely mounted on a cross rod 1064 mounted at its ends in the sides of a frame 1065 fast on a shaft 1066. The lower edges of the arms 1063 normally rest on corresponding spring plungers 1067 (Figs. 57 and 61$^c$) mounted in a cross bar 1068 of the frame 1065. The type carriers 1060 are in the form of pinions and have type on the outer ends of the teeth.

The type carriers 1060 mesh with corresponding actuating segment gears 1069 (Figs. 61$^B$—61$^c$ and 67) loosely mounted on the rearmost shaft 1007 (Fig. 61$^B$). The segment gears 1069 are connected to corresponding levers 1070 by pawls 1073 and pins 1075. The pawls 1073 are pivotally mounted on the levers 1070 and their noses engage projections 1074 on the segment gears 1069. The pins 1075 on the levers 1070 engage the rear edges of the projections 1074. Lugs or bent portions 1071 (Figs. 61$^B$ and 67) on the segment gears 1069 project under and engage the left hand sides of the lower curved ends of the corresponding levers 1070 the lugs being provided to prevent lateral movement of the levers 1070 relative to the segment gears 1069. The segment gears 1069 are prevented from moving laterally by rods 1072 (Figs. 61$^c$ and 67) projecting forwardly from the frame 999. The upwardly extending arms 1076 of the levers 1070 are connected by links 1077 (Fig. 67) to corresponding arms 1078 (Figs. 61$^B$ and 67) fast on their appropriate shafts 1007 there being one arm 1078 fast on each shaft 1007. Also rigidly mounted on the shafts 1007 are the arms 1079 which are like the arms 1078 and are connected by links 1080 to corresponding arms 1083 loosely mounted on a shaft 1084 supported by the plates 1008. The upper ends of the arms 1083 carry pins projecting into vertical slots or recesses 1085 (Fig. 61$^B$) formed in the projections on the rack bars 875 so that when the rack bars 875 are differentially positioned the corresponding gear segments 1069 are moved to like extents through the appropriate arms 1083, links 1080, arms 1079, shafts 1007, arms 1078, links 1077 and levers 1070. As the type carriers 1060 (Fig. 61$^c$) mesh with the gear segments 1069 during differential movement of the latter from normal position the type carriers are rotated accordingly so that they print the amounts represented by the amount perforations in the sales slips.

After the type carriers 1060 (Fig. 61$^c$) have been differentially positioned the frame 1065 and shaft 1066 are differently rotated and then lowered to print on the selected one of ten detail strips 1086 (Fig. 61$^c$) mounted in boxes 1117 (Fig. 66) which will be described later. While the type carriers 1060 are out of engagement with the actuating segments 1069 the actuating racks 875 for the totalizers are restored to normal position, and the actuating segments 1069 are retained in moved positions so that when the type carriers are again moved into engagement with the segments 1069 and the segments moved to "0" position the type carriers will be rotated to "0" position. It is therefore necessary to disconnect the actuating segments 1069 from the levers 1070 to permit movement of the actuating racks 875 to normal position before the segments 1069 are restored to normal position. To this end a lever 1087 (Fig. 61$^B$), is pivotally mounted on each lever 1070. The lower end of each lever 1087 engages a projection 1088 on the corresponding pawl 1073 and the upper portion of the rear edge of the lever 1087 engages a corresponding arm 1089 fast on the shaft 1084. The upper portion of the rear edge of the lever 1087 is normally concentric with the shaft 1007, carrying the lever 1070, so that the lever 1087 remains in engagement with the corresponding arm 1089 during movement of the lever 1070. An arm 1090 fast on the shaft 1084 is connected by link 1093 to the upper end of a lever 1094, loosely mounted on one of the shafts 1007. The lower end of the lever 1094 carries a roller (Fig. 90) projecting into a cam groove formed in the face of a disk 1095 fast on the shaft 900. This cam groove is so constructed that after the actuating segments 1069 (Fig. 61ᴮ) have been differentially positioned and before return movement of the levers 1070 to normal position is begun, the pawls 1073 are rocked clockwise against the action of their springs 1096 through the levers 1087, arms 1089, shaft 1084, arm 1090, link 1093 and lever 1094. Then after the segments 1070 are restored to normal position the springs 1096 rock the pawls 1073 to normal position such return movement of the pawls being limited by engagement of lugs 1097 on the pawls with the rear edges of the levers 1070. It can be seen that when the pawls 1073 are rocked clockwise their noses are moved out of engagement with the projections 1074 on the actuating segments 1069 thereby permitting the levers 1070 to be restored to normal position with the totalizer actuating racks 875 independently of the actuating segments 1069.

After the type carriers have been moved to print on the selected detail strip and then moved back into engagement with the differentially positioned actuating segments 1069 the latter are returned to normal position by the following described device. Loosely mounted on the rearmost shaft 1007 (Fig. 61ᴮ) are two arms 1098 which at their lower ends support a cross bar 1099 normally in engagement with the forward edges of the actuating segments 1069. One of the arms 1098 is provided with an upwardly extending arm 1100 which is connected by a link 1103 to the upper end of a lever 1104 loosely mounted on the shaft 898. The lever 1104 at its lower end (Fig. 88) carries a roller projecting into a cam groove formed in the face of a disk 1105 fast on the shaft 900. This cam groove is so constructed that the arms 1098 are rocked clockwise (Fig. 61ᴮ) near the beginning of each cycle of operation of the machine to permit differential movement of the actuating segments 1069. Then near the end of each cycle of operation of the machine and after the type carriers have printed on a detail strip and been moved into engagement with the actuating segments 1069 the cam groove in the disk 1105 rocks the arms 1098 counter clockwise to normal position whereupon the cross bar 1099 engages the actuating segments 1069 and rotates them to normal position. As the actuating segments 1069 approach normal position the forward inclined edges of the noses on the pawls 1073 are engaged by the projections 1074 on the actuating segments to raise the forward ends of the pawls until the segments 1069 reach normal position when the springs 1096 rock the pawls back to normal position to connect together the levers 1070 and the actuating segments 1069.

The actuating segments 1069 are alined in their differentially moved positions while the type carriers 1060 are out of engagement therewith by the following described device. Levers 1106, one for each actuating segment 1069, are loosely mounted on a cross rod 1107 mounted at its ends in frames 1108 (Figs. 61ᴮ—61ᶜ) projecting forwardly from the frame 999. The upper ends of the levers 1106 engage the teeth of the actuating segments 1069 and the lower ends of the levers are connected by springs 1109 to a plate or frame 1110, which is fast on a shaft 1113 mounted in the frames 1108. An arm 1114 fast on the shaft 1113 is pivotally connected to the lower end of a pitman 1115 (Fig. 86) which at its upper end is forked to straddle the shaft 900. The pitman 1115 carries a roller projecting into a cam groove formed in the face of a disk 1116 fast on the shaft 900. This cam groove is so constructed that the levers 1106 are positively rocked out of engagement with the actuating segments 1069 through the above described connections before the actuating segments are differentially positioned and then rocked into engagement with the differentially positioned actuating segments by the springs 1109 after the actuating segments have been differentially positioned to aline the latter in such positions while the type carriers are out of engagement therewith. Then after the type carriers have been moved back into engagement with the actuating segments and before the latter begin their return movement to nornal position the levers 1106 are again positively rocked by the cam groove in the disk 1116 through the pitman 1115 and frame 1110 to permit return movement of the segments to normal position, the levers 1106 finally being rocked back into engagement with the actuating segments after the latter have been moved to normal position.

*Printing mechanism: Means for moving type carriers over detail strips.*

The detail strips 1086 (Fig. 61ᶜ) are carried in corresponding frames or boxes 1117 (Fig. 66) which are arranged in a circle on a large circular disk 1118, (Figs. 61ᶜ and 66). The detail strips are omitted in Fig. 66. Each detail strip is fed from its supply roll over a platen 1119 mounted in its corresponding frame 1117, thence between two corresponding feed rollers 1120 and 1123 and finally through a chute 1124. After the type carriers have been positioned differentially the frame 1065 and shaft 1066 are rotated differentially to carry the type wheels above the platen 1119 of the selected detail strip which is appropriate to the selected totalizer. Then the frame 1065 and shaft 1066 are lowered to carry the type carriers into engagement with the platen 1119 whereupon the amount is printed upon the selected detail strip.

For the purpose of differentially rotating the frame 1065 and the shaft 1066 the following described connections between the shaft 1066 and the shaft 644 (Figs. 23 and 52), carrying the distributing arm 637 are employed. The shaft 1066 (Figs. 57 and 61ᶜ) is mounted to slide vertically in a hub 1125 on the disk 1118. Near the lower end of the shaft 1066 is rigidly mounted a gear 1126 (Figs. 61ᶜ, 62 and 66) which meshes with vertical teeth 1127 formed on a gear 1128. The teeth 1127 are sufficiently long to permit the gear 1126 and the teeth to remain in mesh when the shaft 1066 with the gear 1126 is raised and lowered. The gear 1128 is mounted on a pin 1131 (Fig. 62) fast in a bearing 1129 formed on a circular pan shaped frame 1130 (Figs. 61ᶜ, 62 and 66) supported by the side frames 115 and 880. A shaft 1133 projects through the frame 1130 and is journaled at one end in the bearing 1129. At its opposite end the shaft 1133 is journaled in a frame or bracket 1134 (Figs. 23 and 52) which is fast on the frame 642. A bevel gear 1135 (Fig. 62) loose on the shaft 1133 meshes with the bevel teeth 1136 on the gear 1128. A clutch disk 1137 is splined on the shaft 1133 and is suitably constructed to connect and disconnect the bevel gear 1135 and shaft 1133. Near the end of the shaft journaled in the frame 1134 (Fig. 52) is rigidly mounted bevel gear 1138 meshing with a bevel gear 1139 fast on a sleeve 1140. The sleeve 1140 is loosely mounted on the shaft 644 and is so mounted in the frame 1134 that the shaft 644 may be raised and lowered independently of the sleeve and bevel gear 1139. An arm 1143 fast on the lower end of the sleeve 1140 carries a downwardly extending pin 1144 which projects through an opening formed in an arm 1145 fast on the shaft 644. Through this connection between the shaft 1133 and shaft 644 it can be seen that the shaft 1133 is rotated differentially with the shaft 644.

During the first, second and third sorting operations the clutch disk 1137 (Fig. 62) is out of engagement with the bevel gear 1135 so that the shaft 1133 rotates independently of the bevel gear 1135 and hence the shaft 1066 and frame 1065 (Figs. 57 and 61ᶜ) are not moved out of normal position. When, however, the machine is prepared for the fourth sorting operation the clutch disk 1137 is slid on the shaft 1133 to connect the shaft 1133 and the bevel gear 1135. Therefore during the fourth sorting operation of the machine the shaft 1066 and frame 1065 are rotated differentially and to the same extents as the distributing arm 637 (Fig. 52) so that the detail strip 1086 (Figs. 61ᶜ and 66) appropriate to the box 638 (Fig. 23) in which the sales slip is deposited and appropriate to the totalizer actuated is printed upon by the type carriers. The disk 1137 is provided with an angular groove 1146 (Figs. 62 and 66) into which project pins 1147 mounted on the forks on the upper end of a lever 1148 pivotally mounted on a downwardly extending projection of the frame 1130. The lower end of the lever 1148 is pivotally connected by a link 1149 (Figs. 3ᶜ and 66) to one arm of a bell crank lever 1150 pivotally mounted on a bracket on the frame 115. The other arm of the bell crank lever 1150 is connected by a link 1153 to the vertical arm of a bell crank lever 1154 (Fig. 3ᴮ) pivotally mounted at 1151 on the frame 115. The forwardly extending arm of the bell crank lever 1154 is pivotally connected at 1155 to the link 937 which, it will be remembered, is operated by the control lever 945 (Figs. 5 and 20) through the lever 938 (Fig. 6ᴬ), link 940, arm 943, and shaft 120. From the above described construction it can be seen that when the control lever 945 is moved from its "neutral" to its "add" position the clutch disk 1137 (Figs. 52 and 66) is shifted to connect the shaft 1133 and bevel gear 1135 together so that the type carriers are differentially positioned above the selected detail strip as above stated.

After the shaft 1066 and frame 1065 have been positioned differentially they are lowered and then raised and rotated to normal position. The means for lowering and raising the shaft 1066 and frame 1065 will be described presently. For the purpose of alining this shaft and frame in their differentially moved position when they are lowered and raised, an alining lever 1156 (Fig. 66) is employed. At one end the lever is provided with a nose 1157 adapted to engage the vertical teeth 1127 of the gear 1128. At its opposite end the lever 1156 is connected by a link 1158 to the lower end (not shown) of a lever 1159 (Fig. 61ᴬ) pivotally mounted intermediate its ends on the frame 880. The upper end of the lever 1159 is connected by a link 1160 to a downwardly extending arm 1163 (Fig. 84) loosely mounted on the shaft 898. The arm 1163 carries a roller projecting into a cam groove formed in the face of a disk 1164 fast on the shaft 900. This cam groove is so constructed that the lever 1156 (Fig. 66) is operated to aline the shaft 1066 and frame 1065 in normal position during the adjustment of the type carriers by their actuating segments 1069 and during the raising and lowering of the shaft and frame, the lever 456 being rocked at the proper times to permit differential rotation of the shaft 1066 and frame 1065 away from and back to normal position.

*Printing mechanism: Taking printing impressions.*

As above stated after the type carriers 1060 (Figs. 61ᶜ and 66) have been positioned differentially over the desired detail strip 1086 the type carriers are lowered to take a printing impression. The means for lowering the type carriers at such time will now be described.

The hub 1165 (Figs. 14 and 61ᶜ) of the gear 1126 is provided with an angular groove 1162 into which project rollers 1166 mounted on the forks 1167 (Figs. 14 and 66) formed on the left hand end of a lever 1168, which is centrally pivoted on an upright 1169 mounted on the frame 1130. The opposite end of the lever 1168 is connected by a link 1170 (Figs. 66 and 67) to a lever 1173 (Fig. 67) pivotally mounted on a bracket fast on the frame 115. The lever 1173 carries a roller projecting into a cam groove formed in the face of a disk 1174 fast on the shaft 925. This cam groove is so constructed that the shaft 1066 and frame 1065 are slightly lowered to disengage the type carriers from their actuating segments 1069 and then after the type carriers have been positioned differentially over the selected detail strip the shaft and frame are further lowered to permit contact of the type carriers with the selected detail strip to take an impression. Finally the shaft 1066 and frame 1065 are raised and then rotated to normal position after which they are raised slightly further to move the type carriers into normal engagement with their actuating segments.

Zero eliminating mechanism having the well known function of preventing the printing of "0's" by the type carriers of orders higher than that adjusted to print another amount character and permitting the printing of "0" by the type carriers of lower order and in "0" position when one of the higher order is adjusted to print an amount character other than "0" will now be described.

Loosely mounted on each arm 1063 (Figs. 57 and 61ᴮ—61ᶜ) is an arm 1175 which at its lower end projects into a recess 1176 formed in a corresponding lever 1177 pivotally mounted on the arm 1063. The downwardly extending projection 1178 of the lever 1177 engages into a recess formed in the upper end of a corresponding lever 1179 also pivotally mounted on the arm 1063. A spring 1180 connected at one end to the lever 1179 and at its opposite end to the downwardly extending arm of a lever 1183 pivotally mounted on the arm 1063, normally retains the arm 1175 and levers 1177 and 1179 in the position shown in Figs. 61ᴮ—61ᶜ so that the forward tooth of the corresponding actuating segment 1069 engages an inclined edge 1184 of the lever 1175. A nose 1185 of a pawl 1186 pivoted on the arm 1063 normally engages the lower face of a projection 1187 on the corresponding arm 1175. When an actuating segment 1069 is moved from zero position it rocks the arm 1175 and levers 1177 and 1179 against the action of the spring 1180 whereupon the pawl 1186 rocks counterclockwise (Fig. 57) by gravity to engage its nose 1185 with the rear edge of the projection 1187, the pawl 1186 in this manner serving to retain the arm 1175 and levers 1179 in moved position. Each arm 1175 except that of higher order carries a finger 1188 (Figs. 57, 61ᴮ and 66) projecting over the arm 1175 of next lower denomination so that when an actuating segment 1069 is not moved out of "0" position and an actuating segment of higher order is differentially positioned out of "0" position the arm 1175 and levers 1177 and 1179 for the actuating segment of lower order will be moved with the arm and levers for the actuating segment of higher order as is well understood in the art.

When the shaft 1066 and frame 1065 are lowered to take a printing impression the lower ends of the levers 1179 which have been rocked out of normal position engage a flange 1189 (Figs. 61ᶜ and 66) formed on the upper end of a circular plate or drum 1190 fast on the disk 1118. Engagement of these levers 1179 with the flange 1189 rocks the arms 1063 counterclockwise (Figs. 57 and 61ᶜ) about the cross rod 1064. The levers 1179 which have not been moved out of normal position do not engage the flange 1189 and therefore the corresponding arms 1063 are not moved relative to the frame 1065.

An arm 1193 (Figs. 57 and 61ᶜ) on a sleeve 1194 splined on the shaft 1066 projects under projections 1195 of the pawls 1186. A member 1196 (Figs. 57 and 61ᴮ) carries pins 1197 projecting into an annular groove 1199 formed in the upper end of the shaft 1066 so that the member 1196 is lowered with the shaft but not rotated with it. Pivotally mounted at 1201 (Fig. 57) on the member 1196 is a lever 1198 the free end 1202 of which projects into an annular groove 1200 formed in the sleeve 1194. The lever 1198 is connected by a link 1203 (Fig. 61ᴬ) to the lower end of an arm 1204 fast on a shaft 1205 journaled in the frames 115 and 880. The upper end of an arm 1211 fast on the shaft 1205 is connected by a link 1206 to an arm 1207 (Fig. 85) loosely mounted on the shaft 898. The arm 1207 carries a roller projecting into a cam groove formed in the face of a disk 1208 fast on the shaft 900. This cam groove is so constructed that after the type carriers have been lowered the lever 1198 (Fig. 57) is rocked counter clockwise to raise the sleeve 1194. Upon elevation of the sleeve 1194 its arm 1193 engages the projections 1195 on the operated pawls 1186 thereby rocking the latter to normal position to permit the corresponding springs 1180 to rock the levers 1179 out of engagement with the flange 1189 (Fig. 61$^c$) on the plate or drum 1190. As the levers 1179 are rocked out of engagement with the flange 1189 springs 1192 connected to pins on the arms 1063 and to a cross rod 1191 rock the arms 1063 clockwise. The springs 1192 are sufficiently tensioned to cause the arms 1063 when rocked clockwise to depress the corresponding spring plungers 1067 by their impact and thereby force the type carriers into printing engagement with the detail strip. The type carriers of higher orders than that type carrier of highest order adjusted out of "0" position do not print upon the detail strip as the springs of the plungers 1067 are sufficiently strong to prevent the springs 1192 from depressing the plungers 1067 except when the arms 1063 are rocked relative to the frame 1065 by the springs 1192.

*Printing mechanism: Type carrier aliner.*

The vertical arms of the levers 1183 (Figs. 57 and 61$^c$) have noses 1209 which are normally retained in engagement with the type carriers by the springs 1180. When the plate 1110 is rocked counter clockwise, as above described, it engages the nearly horizontal arms of the levers 1183 and rocks the levers to move the noses 1209 out of engagement with the type carriers during their differential rotation by the actuating segments 1069 and then as the type carriers are moved out of engagement with their actuating segments the plate 1110 is moved to normal position to permit the springs 1180 to move the alining noses 1209 into engagement with the type carrier the latter in this manner being alined in adjusted positions while out of engagement with their actuating segments. Then when the plate 1110 is rocked counter clockwise the second time the noses 1209 are again moved out of engagement with the type carriers to permit rotation of the type carriers to "0" position.

*Printing mechanism: Reversible ink ribbon feeding device.*

The ink ribbon 1210 (Figs. 61$^c$ and 66) through which the type carriers print on the detail strips passes from one roll 1213 under a guide roller 1214, over a guide roller 1215, about an angular guide frame 1216, (Fig. 66) under the type carriers, around an angular guide frame 1217, over a roller 1218, under a roller 1219 onto roll 1220. The roll 1213, rollers 1214 and 1215 and guide frame 1216 are mounted on the right hand side of the frame 1065 and the frame 1217, rollers 1218 and 1219 and roll 1220 are mounted on the left hand side of the frame 1065.

Loosely mounted on the shaft 1066 (Figs. 57 and 61$^c$) and supported by the hub 1125 is a member 1223. A rod 1222 projecting downwardly from the frame 1065 projects through a hole in the member 1223 so that the latter is rotated with the frame 1065. Journaled in the lower end of an arm 1224 of the member 1223 is a stub shaft 1226 rigidly carrying oppositely extending arms 1227 (Fig. 61$^c$) which are connected by links 1228 to corresponding levers 1229 pivoted on opposite sides of the arm 1224. Levers 1230 one for each roll 1213 and 1220 are pivotally mounted on the frame 1065 and their upper ends are retained in engagement with the ribbon by springs (not shown). When the ribbon on the roll 1213 or 1220 serving as the supply roll is exhausted the upper end of the corresponding lever 1230 engages into a recess 1233 formed in the hub 1234 of the roll. Then when the shaft 1066 and frame 1065 are lowered the lower end of this lever 1230 engages the vertical projection 1232 of the horizontal arm of the corresponding lever 1229 thereby rocking the latter counter clockwise and the other lever 1229 clockwise through the links 1228, arms 1227 and shaft 1226. A spring 1235 serves to retain the levers 1229 in either one of their two positions. When the levers 1229 are rocked in this manner the lever 1229 appropriate to the roll 1213 or 1220 which has been serving as the supply roll is in position to coöperate with a ratchet 1236 fast on the roll and the other lever 1229 is out of coöperative relation with the ratchet 1236 on the roll which has been serving as the storage roll. When the frame 1065 is lowered the arm 1229 in coöperative position with its ratchet 1236 engages its ratchet thereby causing the ribbon to be fed one step onto the corresponding roll.

From the above described construction it can be seen that the inking ribbon is fed from one roll onto the other until the ribbon on the roll serving as the supply roll is exhausted when the direction of feed of ribbon is reversed so that the roll from which the ribbon is exhausted serves as the storage roll while the other serves as the supply roll.

*Printing mechanism: Detail strip feeding devices.*

As above stated each detail strip 1086 (Fig. 61$^c$) is fed from its supply roll over its platen 1119 and thence between the corresponding pair of feed rollers 1120 and 1123. The feed roller 1123 is mounted on a lever 1237 and a spring 1238 yieldingly retains the roll 1123 in engagement with the roll 1120. A lever 1239 is loosely mounted on the box 1117 and carries a pawl 1240 engaging a ratchet 1241 rigidly mounted on the feed roll 1120. A spring 1243 is connected at one end to a pin on the lever 1239 and at its opposite end to a pin on the pawl 1240. A spring 1244 retains the arm 1239 in the normal position shown in Fig. 61$^C$. When the frame 1065 carrying the type carriers is lowered as above described, a projection 1245 on the cross bar 1068 of the frame engages an upwardly extending projection 1246 on the lever 1239 appropriate to the detail strip to be printed upon, whereby the lever 1239 is rocked to rotate the feeding rolls 1120 and 1223 through the pawl 1240 and ratchet 1241.

Bearings 1247 (Figs. 61$^C$ and 66) are mounted in a race 1248 formed by the disk 1118 and the upper edge of the pan shaped frame 1130. After the machine has been operated to print the totals on the totalizers on the corresponding detail strips, as will be described later, the disk 1118 carrying the detail strips may be rotated manually so that the printed lists on the strips may be torn off when the strips are opposite an opening 1249 (Fig. 66) formed in a circular plate 1250 (Figs. 61$^C$ and 66) fast on the frame 1130. After the printed lists have been torn off of the detail strips the disk 1118 is rotated to normal position shown in Fig. 66 so that the type carriers print on the appropriate strips during fourth sorting and total printing operations. The printed portions of the detail strips are fed between the frames 1117 and the plate 1250.

Heading mechanism: General.

During fourth sorting operations the first sales slip to be sorted is moved from the supply box to its position under the frame 550 (Figs. 23, 36, 39 and 42) of the translating device during the first three cycles of operation and then during the next ten cycles of operation slip carriers A and B (Figs. 23, 24, 25, 36 and 37) are locked against rotation so that the first sales slip remains in coöperative relation with the translating device. During each of these ten cycles of operation called the "heading" cycles the perforations representing the first, second and third digits of the clerks' numbers control the thousands, hundreds and tens type carriers respectively and a units automatic device controls the units type carrier and the above described mechanism for differentially positioning the type carriers over the appropriate detail strips, so that the clerks' numbers are printed on the appropriate detail strips and head the lists of printed amounts which are printed after the lists have been headed properly. During the fourteenth cycle of operation the slip carriers A and B are unlocked, and then during this fourteenth cycle and the following cycles of operation the assortment of the slips is continued as in the first, second, and third sorting operations, and the amounts on the sales slips are added on the totalizers and printed on the detail strips.

Heading mechanism: Controlling means.

As above stated, when the machine is prepared for fourth sorting operations the plate 573 (Fig. 39) is adjusted to the position shown in this figure by movement of the sorting lever 119 (Fig. 6$^A$) to its "fourth sorting" position. During the third cycle of operation when the first sales slip is moved to its position under the translating device the plate 573 is moved to the position shown in Fig. 44 so that the thousands, hundreds and tens rows of amount nipples 575 are in registry with the thousands, hundreds and tens rows of clerks' holes 567, respectively, formed in the frame 550. The plate 573 is retained in this position until near the beginning of the fourteenth cycle of operation of the machine in which cycle the last detail strip is headed with the clerk's number when the plate 573 is automatically moved back to its position shown in Fig. 39. While the plate 573 is in the position shown in Fig. 44 the plate 588 closes all of the amount holes 566 and the units row of clerks' holes 567. The means for automatically moving the plate 573 during fourth sorting operations will now be described.

It will be recalled that the forward end of the link 624 (Figs. 6$^A$ and 35) is pivotally connected to the upper end of an arm 625 (Figs. 6$^A$—6$^B$, 35, 71 and 75). The arm 625 carries a roller 1250 (Fig. 75) projecting into a cam groove 1253 shown in dotted lines and formed in a disk 1254 fast on the shaft 1054. The shaft 1054 is not operated during the first, second and third sorting operations. During the fourth sorting operation, however, the shaft is given one complete rotation during the first fourteen cycles of operation the shaft being given one step of movement upon each cycle of operation, as will be described later. The cam groove 1253 is so constructed that near the beginning of the fourth cycle of operation of the machine the link 624 (Fig. 35) is drawn forwardly thereby rocking the arm 620, shaft 619 and arm 618 (Figs. 39 and 44) to move the plate 573 to the position shown in Fig. 44. Then near the beginning of the fourteenth cycle of operation the cam groove through the above described connections moves the plate 573 to the position shown in Fig. 39 in which position it remains during the remainder of the operation of the machine. The mechanism for rotating the shaft 1054 will now be described.

The lower end of the link 1049 (Figs. 6ᴬ—6ᴮ, 18 and 70) carries a housing 1252 (Fig. 70) in which is mounted a plunger pin 1255. A spring 1251 (Fig. 70) in the housing 1252 normally retains the pin 1255 in a groove 1256 (Figs. 6ᴮ and 18) formed in the face of a ratchet 1257 fast on the shaft 1054. The portion 1258 of the groove 1256 extends at an angle to the radius of the ratchet normally passing through the plunger pin 1255 so that when the link 1049 is lowered by movement of the control lever 945 to "add" position the plunger pin 1255 engages a rear edge of the portion 1258 of the groove 1256 thereby rotating the ratchet 1257 and shaft 1054 counter clockwise (Figs. 6ᴮ and 18) part of one step. A pawl 1259 (Fig. 6ᴮ) is pivotally mounted on the forward end of a pitman 1260 which near its forward end is guided in a guide piece 1263 and at its rear end has a slot 1264 (Fig. 95) through which the main drive shaft 113 projects. The pitman 1260 carries a roller projecting into a cam groove formed in the face of a disk 1265 fast on the shaft 113. This cam groove is so constructed that the pitman 1260 and pawl 1259 (Fig. 6ᴮ) are moved forwardly and then rearwardly during each cycle of operation of the machine. The forward end of the pawl normally rests on a tooth 1266 which is slightly longer than the other teeth of the ratchet 1257. The ratchet 1257 during first, second and third sorting operations is normally in such position that the pawl 1259 rides idly on the long tooth 1266 of the ratchet 1257 wherefore the ratchet and shaft 1054 are not rotated. When the control lever 945, however, is moved to its "add" position the shaft 1054 and ratchet 1257 are rotated counter clockwise part of one step, as above described, so that during the first cycle of operation of the machine the pawl 1259 engages the radial face of the long tooth 1266 thereby rotating the ratchet and shaft one step. Then upon each of the thirteen succeeding cycles of operation of the machine the pawl 1259 engages the radial face of the next succeeding tooth whereby the ratchet and shaft are given one step of movement upon each cycle of operation of the machine. Finally during the fourteenth cycle of operation of the machine the ratchet 1257 and shaft 1054 reach normal position so that during the adding cycles of operation the pawl 1259 rides idly on the long tooth 1266 and the shaft 1054 remains in normal position.

During the first cycle of operation of the machine the plunger pin 1255 (Fig. 18) moves out of the groove against the action of its spring 1251 (Fig. 70) as the base of the portion 1267 (Fig. 18) of the groove 1256 is gradually inclined from the base of the portion 1258 to the side of the ratchet 1257. After the fourth sorting operation when the control lever 945 and therefore the link 1049 are restored to normal position the plunger pin 1255 is again moved by its spring into normal engagement with the upper end of the portion 1258 of the groove 1256.

It can be seen from the above that during the heading cycles of operation of the machine the first sales slip is retained in cooperative relation with the translating device and the clerks' perforations representing the first, second, and third digits of the clerks' numbers are in registry with nipples 575 (Fig. 44) in the thousands, hundreds and tens rows of nipples respectively so that during each heading cycle of operation these perforations control the extent of movement of the tens, hundreds and thousands piston heads 579 (Fig. 61ᴬ) and therefore the adjustment of the tens, hundreds and thousands type carriers 1060 (Fig. 61ᶜ). These three type carriers in heading cycles are actuated under the control of the piston heads 579 by the differential mechanism shown in Figs. 61ᴬ—61ᴮ—61ᶜ in the same manner as in adding cycles of operations.

In order to aline the shaft 1054 (Fig. 6ᴮ) in normal position and in moved position at the end of each step of movement the nose of a pawl 1271 pivoted on the frame 135 engages in the recesses 1272 formed in the periphery of a disk 1281 fast on the shaft 1054. The pawl 1271 is operated by a spring 1282.

*Heading mechanism: Units automatic device.*

During each heading cycle of operation of the machine the units type carrier 1060 instead of being controlled by a clerk's perforation is controlled by an automatic device which also controls the positioning of the type carriers over the proper detail strip. This automatic device will now be described.

When the plate 573 is moved, as above described, to the position shown in Fig. 44 the row of clerks' nipples 580 is in registry with the upper ends of ducts 1270 (Figs. 39, 42 and 44) formed in the frame 550. The ducts 1270 are connected by corresponding tubes 1273 (Figs. 1, 3ᶜ—3ᴱ—3ᴰ—3ᴮ—6ᴮ, 41, 47ᴬ—47ᴮ, 70 and 72) to nipples 1274 Figs. 6ᴮ, 70 and 72) mounted in a frame 1275 fast on the frame 627. The nipples 1274 register with a row of holes 1276 (Fig. 72) formed in a cylinder 1277 fast on the frames 627 and 1275. Loosely mounted within the cylinder 1277 is a cylinder 1278 having a head 1279 mounted within its left hand end and fast on the shaft 1054. Therefore the tube 1278 rotates with the shaft 1054 and within the tube 1277. A head 1280 mounted within the right hand end of the cylinder 1277 has a duct 1283 and is connected by a tube 1284 to a valve 1285 (Figs. 1 and 6ᴮ). The valve 1285 is connected by a tube 1286 (Fig. 1) to the tube 268. The cylinder 1278 (Fig. 72) is provided with nine holes 1287 which are spirally arranged about the tube. During the fourth cycle of operation, that is the first heading cycle, none of the holes 1287 are in registry with the holes 1276. During the fifth cycle of operation (second heading cycle) the right hand hole 1287 registers with the right hand hole 1276. During a sixth cycle of operation (third heading cycle) the second hole 1287 from the right registers with the second hole 1276 from the right and so on, a hole 1287 being moved into registry with a hole 1276 upon each heading cycle of operation. When a hole 1287 is in registry with a hole 1276 the valve 1285 (Figs. 1 and 6ᴮ) is operated whereupon part of the air in the cylinder 585 (Figs. 48 and 50ᴮ) and under the piston head 587 is withdrawn through one of the tubes 583 (Figs. 1, 48 and 50ᴮ) corresponding duct 1270 (Fig. 42) corresponding tube 1273 (Figs. 1, 6ᴮ and 42) corresponding holes 1276 and 1287 (Fig. 72) which are in registry, cylinder 1278, tube 1284 (Figs. 1, 6ᴮ and 72) valve 1285, tube 1286, (Fig. 1) tube 268 into the vacuum tank. In this manner upon each heading cycle of operation of the machine the piston head 587 is moved differentially the piston head being moved one step farther at each cycle than during the preceding cycle. From this construction, it can be seen that during each heading cycle of operation the piston head 587 controls the above described differential mechanism for moving the type carriers 1060 over the detail strips so that upon each cycle of operation the type carriers are moved over one of the detail strips to print the appropriate clerk's number. The clerks' numbers are printed upon the detail strips in successive order, the "0" strip being the first printed upon and the "9" strip the last.

The tubes 1273 have branch tubes 1290 (Figs. 1 and 3ᴬ—3ᶜ) which connect the tubes 1273 with the tubes 576 connecting the units cylinder 578 (Figs. 1, 61ᴬ and 63ᴮ) to the units amount nipples 575 (Figs. 39 and 44). Therefore, during each heading operation of the machine the air in the units cylinder 578 is partially withdrawn through part of one of the tubes 576, corresponding tubes 1290 and 1273, cylinder 1277, (Fig. 72) and thence through the above described passage (Fig. 1) from the cylinder 1278 to the vacuum tank. In heading cycles the units piston head 579 (Fig. 61ᴬ) controls the actuation of the units differential mechanism in the same way as during adding cycles. Therefore during each heading cycle of operation of the machine the units type carrier is differentially positioned under the control of the units automatic device shown in Fig. 72. During the first heading cycle of operation no hole 1287 is in registry with a hole 1276 so that a "0" is printed by the units type carrier on the "0" detail strip. Then upon each succeeding heading cycle of operation the units type carrier is moved one step farther than at the preceding cycle so that each of the units "0" to "9" inclusive is printed during the heading cycles of operation.

As the first sales slip remains in coöperative relation with the translating device during heading cycles and the perforations representing the third, second and first digits of the clerk's number control the tens, hundreds and thousands type carriers during each heading cycle, it can be seen that the first three digits of the clerks' numbers printed on all of the detail strips are alike. The fourth digits of the clerks' numbers are printed under the control of the units automatic device (Fig. 72) and therefore are different. Therefore the ten clerks' numbers represented in a pile of slips to be sorted during the fourth sorting operation are successively printed and printed on the appropriate detail strips. For example, if the perforations on the first slip represent clerk No. 4631 the perforations representing the 3, 6 and 4 respectively control the tens, hundreds and thousands type carriers upon each cycle so that these three digits would be printed upon each detail strip. During the first heading cycle the piston head in the units cylinder 578 (Fig. 61ᵃ) is not moved from normal position and therefore the units type carrier will print a "0" and the set of type carriers will print "3630" on the zero detail strip. During the second heading cycle of operation the units type carrier is moved one step under the control of the device shown in Fig. 72, and the set of type carriers under the control of this device is moved into position over the "1" detail strip so that the clerk's number "3631" is printed upon this detail strip. During the third heading cycle the number 3632 is printed on the "2" detail strip and so on, each detail strip being headed with the appropriate clerk's number.

After the thirteenth cycle of operation, that is after the detail strips have been properly headed the assorting of the slips is continued and the amounts on the slips are added on the totalizers and printed on the proper detail slips under the clerks' numbers.

The valve 1285 (Figs. 3ᴮ, 6ᴮ and 35) is mounted on the frame 135 and is constructed similar to the valve shown in Fig. 71.

The inner member (not shown) of the valve 1285 carries an arm 1294 to which is pivotally connected the forward end of a pitman 1295. The rear end of the pitman 1295 (Fig. 97) is forked to straddle the shaft 113 and carries a roller projecting into a cam groove 1296 formed in the upper face of the disk 674. This cam groove 1296 is so constructed that the valve 1285 is operated at the proper time to open the air passage from the device shown in Fig. 72 to the vacuum tank, as above described.

*Heading mechanism: Disabling means for slip carriers.*

During the fourth cycle of operation (first heading cycle) the slip carriers A and B are locked against rotation until near the beginning of the fourteenth cycle of operation when their normal operation is continued. During the fourteenth cycle of operation the amount perforations in the first sales slip control the movement of the piston heads 579 (Fig. 61^A) for the amount differential mechanism and the perforation representing the fourth digit in the clerk's number controls movement of the piston head 587 (Figs. 48 and 50^B). The means for locking these slip carriers against rotation during heading cycles of operation will now be described.

Levers 1297 (Fig. 30) one for each slip carrier A and B are connected by a link 1293. The lever 1297 for slip carrier A is pivoted at 1301 on the frame 310 and the lever 1297 for slip carrier B is pivoted on a bracket 1302 fast on the frame 310. The lever 1297 for slip carrier A is connected to one end of a link 1298 which at its opposite end (Figs. 6^A—6^B and 70) is pivotally connected to the upwardly extending arm of a bell crank lever 1299 loosely mounted on a rod 1300 projecting from the frame 135. The forwardly extending arm of the lever 1299 carries a roller projecting into a cam groove 1303 shown in dash lines in Fig. 75 and formed in the face of a disk 1304 (Fig. 70) fast on the shaft 1054. This cam groove is so constructed that near the beginning of the fourth cycle and after the first slip has been moved into coöperative relation with the translating device which occurs during the third cycle of operation, the levers 1297 (Fig. 30) are rocked clockwise to move their noses 1305 into the notches 399 and 528 in the corresponding disks 385 and 524 thereby locking slip carriers A and B against rotation.

During each heading cycle of operation of the machine pins 1306 (Fig. 30) on the pawls 397 and 526 engage inclined edges 1307 of the corresponding levers 1297 near the end of the counter clockwise movements of the segment gears 389 and 585 thereby preventing the noses 398 and 577 of the pawls 397 and 526 respectively from engaging in the notches into which the noses 1305 project, the rotating means for the slip carriers being disabled in this manner. Near the beginning of the fourteenth cycle of operation of the machine, that is the cycle following the last heading cycle the levers 1297 are rocked back to normal position by the cam groove in the disk 1304 (Figs. 70 and 75) to permit the rotating means for the slip carriers to rotate the latter during the fourteenth cycle and each succeeding cycle of operation. Therefore after the last heading cycle of operation the sorting of the sales slips is continued.

*Heading mechanism: Disabling of totalizer engaging means.*

As the actuating racks 875 (Figs. 61^A—61^B) are controlled by the clerks' perforations and the units automatic device shown in Fig. 72 during heading cycles of operation it is obviously necessary to prevent the totalizers from being rocked into engagement with the actuating racks during these cycles of operation. It might be well to state here that during the first three cycles of a fourth sorting operation a totalizer is rocked into mesh with the actuating racks 875, but as the valve 608 (Fig. 41) is closed, as hereinbefore described the actuating racks are not moved out of "0" positions because the piston heads 587 (Fig. 61^A) remain in normal position.

A lever 1309 (Figs. 61^B, 63^B and 64) is pivotally mounted on the frame 877 (Fig. 61^B). The lever 1309 (Fig. 64) has a downwardly extending flange 1310 provided with two vertical notches 1313 through which project the link 1005 and a link 1314. The link 1314 has a slot 1315 which is like the slot 1004 in the link 1005. During total printing operations the central rounded portion of the slot 1315 engages over the rounded portion 1006 on the pin 1003 and the link 1314 is operated as will be described later to rock the selected totalizer into engagement with the actuating racks before they begin their movement from normal position. The lever 1309 is connected by a link 1316 (Fig. 61^B) to the lower end of an arm 1317 fast on a shaft 1318 journaled at its ends in the side frames 115 and 880. Fast on the shaft 1318 is a forwardly extending arm 1319 (Figs. 61^A—61^B) which is connected by a vertical link 1320 (Fig. 61^A) to the rear end of a lever 1323 pivotally mounted on the frame 880. The forward end of the lever 1323 is connected by a link 1324 to the forward end of a lever 1325 (Fig. 3^C) also pivotally mounted on the frame 880. The rear end of the lever 1325 is connected by a link 1326 to one arm of a bell crank lever 1327 pivotally mounted on a bracket 1328 fast on the frame 117. The upwardly extending arm of the lever 1327 is connected by a link 1329 (Figs. 6A and 35) to a lever 1330 loosely mounted on a stud 1333 projecting downwardly from the frame 117. A link 1334 is pivotally connected at its rear end to the lever 1330 and at its forward end is pivotally connected to a link 1335 (Fig. 6A). The upper end of the link 1335 is pivotally connected to a downwardly extending arm 1336 (Figs. 5, 6A and 21) of a lever 1337 loosely mounted on the shaft 120. The lower end of the link 1335 (Fig. 6B) is forked over a pin projecting from the upper end of an arm 1338 (Fig. 4 on sheet 3, and Figs. 6B and 70) pivotally mounted at its lower end on a stud 1339 projecting from the frame 135. The arm 1338 (Fig. 4) carries a roller projecting into a cam groove formed in the face of a disk 1340 fast on the shaft 1054. This cam groove is so constructed that during the fourth cycle of a fourth sorting operation the arm 1338 is rocked clockwise and is then retained in this position until near the end of the fourteenth cycle of operation when the arm is restored to normal position. The clockwise movement of the arm 1338 through the above described connections between this arm and the lever 1309 (Figs. 63 and 64) rocks the lever 1309 counter clockwise as viewed in these figures. In this manner the rear ends of the links 1005 and 1314 are swung laterally so that the rounded portion 1006 of the pin 1003 is intermediate the links. With the links 1005 and 1314 in this position it can be seen that when the links are operated the rectangular portions of their slots 1004 and 1315 move idly over the flattened portions of the pin 1003 so that the totalizers are not rocked into engagement with the actuating racks during the heading cycles of the machine. A spring 1341 (Fig. 61B) connected at its upper end to a rearwardly extending arm 1342 of the frame 994 and at its lower end to a pin on the frame 999, retains the totalizers out of engagement with the actuating racks during heading cycles. Near the end of the fourteenth cycle of operation the lever 1309 is moved to normal position by the return movement of the lever 1338 (Fig. 4) so that the rounded portion 1001 (Fig. 64) of the slot 1004 in the link 1005 again engages over the rounded portion 1006 of the pin 1003. Therefore during each cycle after the fourteenth cycle of a fourth sorting operation the selected totalizer is moved into engagement with the actuating racks so that the totalizers accumulate the amounts represented by the perforations on the sales slips. It is understood, of course, that during the fourteenth cycle of operation the amount perforations in the first sales slip controls the movement of the piston heads 579 and that during the fifteenth cycle the amount differential is actuated under the control of the piston heads 579 and while the latter are in their moved positions, as the piston heads are differentially positioned during one cycle and the actuating mechanism operated accordingly during the next cycle, as hereinbefore described.

Total printing: General.

Figure 61C:
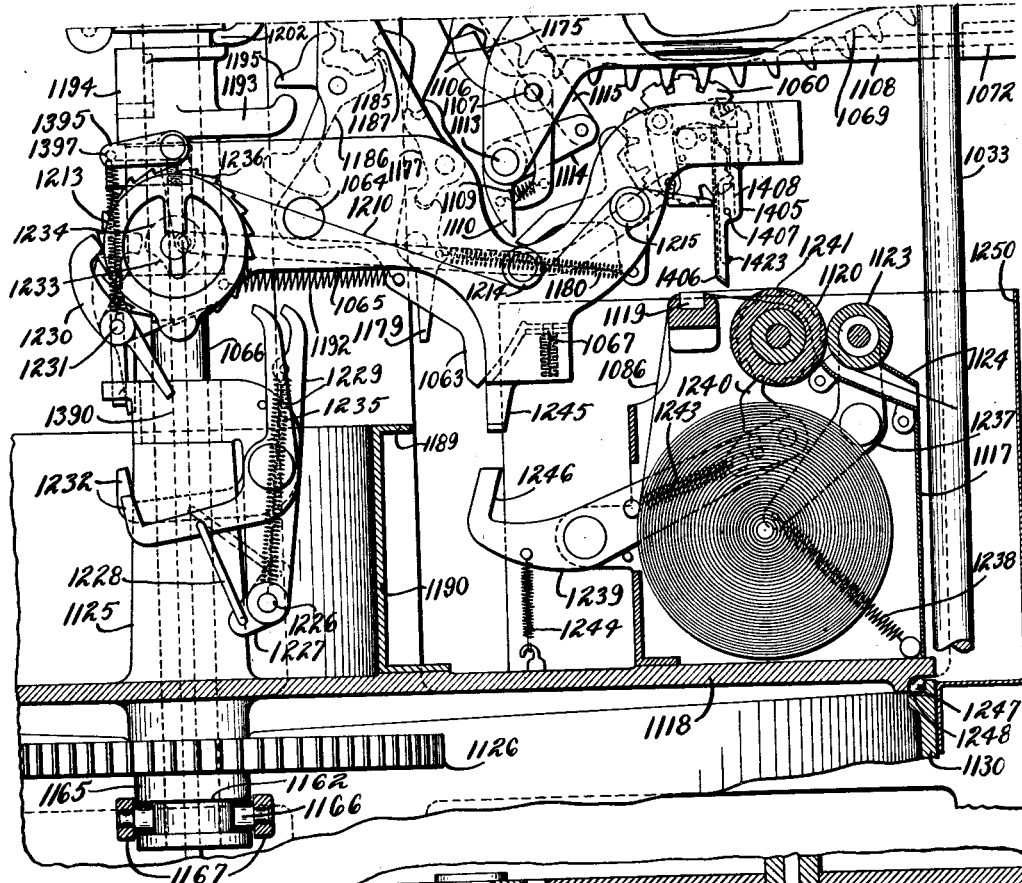

After each fourth sorting operation the machine is operated to print the totals of the items accumulated on the totalizers on the corresponding detail strips, the totalizers being cleared during the operation. The totalizers are cleared automatically and in automatic succession, that is, the totalizers are cleared in invariable order and during the continuous operation of the machine, one totalizer being cleared upon each of ten of the cycles of operation. During a total printing operation no sales slips are in the machine, as the only functions performed by the machine during such operations, are those of printing the totals and clearing the totalizers. During total printing operations the machine is given sixteen cycles of operation and during the eleven cycles including the fourth and the fourteenth cycles the totalizers are cleared and the totals printed. During each cycle in which a totalizer is to be cleared the actuating racks 875 (Fig. 61B) are moved to their "9" positions and then the totalizer to be cleared is rocked into engagement with the actuating racks so that upon movement of the latter the engaged totalizer controls the extents of movement of the actuating racks whereby the amount on the totalizer is set up on the type carriers 1060 (Fig. 61C). The totalizer to be reset and the detail strip to be printed upon are selected under the control of the units automatic device described above and shown in Figs. 6B, 70 and 72.

Total printing: Operation of actuating racks.

When the machine is prepared for total printing operation the control lever 945 (Figs. 5 and 21) is shifted toward the left and then moved to its "total" position (Fig. 23). The sorting lever 119 (Figs. 5, 6A and 23) is left in its fourth sorting position and the starting lever 119 is operated to start the machine in the usual manner. As the control lever 945 is fast on the shaft 120 and the arm 1050 (Figs. 6A and 20) is splined on the shaft it can be seen that the link 1049 (Figs. 6A—6B) is lowered and the shaft 1054 is given one complete rotation in the same manner as during the first fourteen cycles of fourth sorting operations. When the control lever 945 is shifted toward the left the left hand end of a pin 1343 (Figs. 5 and 21) on the lever 945 projects through a hole formed in the lever 1337 so that when the lever 945 is rocked to its "total" position the lever 1337 is rocked with it. The lever 1337 is prevented from shifting laterally with the shaft 120 by lugs 1344 on the frame 124. This movement of the lever 1337 rocks the link 1335 (Figs. 6A—6B) clockwise about the pin on the upper end of the arm 1338, and through the above described connections between the link 1335 and the link 1320 (Fig. 61A) lowers the link 1320 to the position to which it is lowered during the fourth cycle of a fourth sorting operation. Then during the fourth cycle of operation, when the arm 1338 is rocked clockwise (Figs. 4 and 6B) the link 1320 is lowered still farther. A lever 1347 (Figs. 60 and 61A—61B) intermediate its ends is pivoted to the lower end of an arm 1348 (Figs. 60 and 61A) loosely mounted on the shaft 904. The link 1320 also carries a rearwardly extending projection 1349 which when the link is lowered during the fourth cycle of a total printing operation engages a roller 1350 on the lever 1347 thereby rocking the latter counter clockwise about its pivotal center against the action of a spring 1353. This movement of the lever 1347 causes a recess 1354 in its rear end to engage over a pin 1355 on the forwardly extending arm of a lever 1356 (Fig. 81) loosely mounted on the shaft 898. The downwardly and rearwardly extending arm of the lever 1356 carries a roller projecting into a cam groove formed in the face of a disk 1357.

Loosely mounted on the shaft 904 are two arms 1358 (Figs. 61A and 63A—63B) which on their outer ends carry a cross rod 1359. The left hand arm 1358 is rigidly connected to the arm 1348 (Figs. 60 and 61A). A spring 1360 (Fig. 61A) serves during first, second, third and fourth sorting operations to retain the arms 1358 and 1348 and cross bar 1359 in the normal positions shown in Figs. 60 and 61A. As the arm 1348 is connected by the lever 1347 to the lever 1356 (Figs. 60 and 81) during total printing operations as above described, operation of the lever 1356 by its cam groove rocks the arms 1358 and cross rod 1359 counter clockwise (Fig. 61A) and then clockwise to normal position, during each of the ten cycles following the third cycle. When the arms 1358 are rocked counter clockwise the cross rod 1359 engages the forwardly extending arms of the levers 903 and moves these levers to the "9" positions. When the lever 1348 (Fig. 60) is rocked the roller 1350 remains in engagement with the lower curved edge of the projection 1349 so that the recess 1354 in the lever 1347 remains in engagement with the pin 1355 on the lever 1356. When the link 1320 is raised after a total printing operation the spring 1353 restores the lever 1347 to normal position to disconnect the arm 1348 from the lever 1356. A projection 1363 on the arm 1348 prevents the spring 1353 from rocking the lever 1347 clockwise past normal position.

After the levers 903 (Fig. 61A) have been moved to their "9" positions the levers 893 are lowered as in heading and adding cycles of operation so that the pins 907 on the levers 893 engage in the rearmost notches 905 in the levers 903. The levers 910 are then rocked clockwise as in heading and adding cycles of operation whereupon the cross rod 908 carried by the levers 910 restores the levers 903 to normal position, the levers 893 and pawls 889 in this manner being moved to their "9" positions. During movement of the levers 893 and pawls 889 to their "9" positions the rear ends of the pawls 889 are lifted under the control of the totalizer pinions, as will be described presently to move the lugs or projections 888 on the pawls out of engagement with the shoulders 884 on the actuating racks 875. The projections 888 are disengaged from the shoulders 884 when the totalizer pinions arrive at "0" position the totalizer pinions being rotated reversely during the rearward movement of the actuating racks. When a projection 888 is disengaged from the shoulder 884 of the corresponding actuating rack the projection moves idly in the slot 883 in the actuating racks during the continued rearward movement of the pawl 889. After the pawls 889 and levers 883 have been moved to their "9" positions the engaged totalizer is rocked out of engagement and then the levers 893 are raised as in adding cycles of operations to disconnect the levers 893 from the levers 903. Finally the levers 910 are rocked counter clockwise (Fig. 61A) to normal position as in adding cycles of operation whereupon the cross rod 917 engages the levers 893 to restore the pawls 889 and the actuating racks 875 to "0" positions. During the first cycle of operation the "0" totalizer is shifted into operative relation with the actuating racks as the arm 1038 (Figs. 40 and 50B—50C) is operated and the piston head 587 (Fig. 50B) is in "0" position. This totalizer remains in this operative relation during the first four cycles. Near the beginning of the fourth cycle the "0" totalizer is rocked into engagement with the actuating racks, as will be described later. Then the actuating racks are moved rearwardly under the control of this totalizer and while the racks are in moved position the totalizer is rocked out of engagement. Finally during the same cycle the racks are moved forwardly to normal position and the totalizers shifted to bring the "1" totalizer into coöperative relation with the actuating racks. It can therefore be seen that during each cycle after the third cycle the totalizer shifted into coöperative relation with the actuating racks during the preceding operation is cleared and then the next totalizer to be cleared at the following cycle is shifted into coöperative relation with the actuating racks.

The means for rocking the pawls 889 when the totalizer pinions arrive at "0" position to permit continued movement of the pawls 889 independently of the actuating racks 875 will now be described. Loosely mounted on the cross rod 948 (Figs. 61$^B$, 63$^A$—63$^B$ and 68) are levers 1364, one for each actuating rack. The forward ends of the levers 1364 are provided with slots 1365 through which pins 1366 project. The pins 1366 project laterally from corresponding links 1367 which at their upper ends are pivotally connected to the rear ends of links 1368 and at their lower ends to forwardly extending arms 1369 which at their rear ends are pivotally mounted on a cross bar 1370 mounted in the frame 877. The forward ends of the arms 1369 engage pins 1373 (Fig. 61$^A$) on the corresponding pawls 889. The forward ends of the links 1368 (Figs. 61$^B$ and 63$^A$—63$^B$) are pivotally connected to the upper ends of arms 1374 fast on the shaft 1318. One of the arms 1374 is integral with the arm 1317 (Fig. 61$^A$) above described. It will be recalled that the arm 1319 (Figs. 61$^A$—61$^B$) is fast on the shaft 1318 and at its forward end is pivotally connected to the upper end of the link 1320. When the link 1320 is lowered to its lowermost position during the fourth cycle of a total printing operation, as above described, the arm 1319, the shaft 1318, and the arms 1374 are rocked counter clockwise (Figs. 61$^A$—61$^B$). During this movement of the arms 1374 the links 1367 are rocked counter clockwise about their pivotal connections with the arms 1369, thereby moving the pins 1366 into the forward upper ends of the slots 1365 (Figs. 61$^B$ and 68) in the levers 1364. This movement of the pins 1366 in the slots 1365 rocks the levers 1364 counter clockwise (Figs. 61$^B$ and 68) to move the noses 1375 of the levers 1364 into the path of movement of the wide teeth 958 (Fig. 69) on the totalizer wheels engaging the actuating racks. As the totalizer wheels pass from their "1" to their "0" positions the wide teeth 958 rock the levers 1364 clockwise, which movement is limited by the engagement of projections 1371 on the levers with the cross rod 963. As the pins 1366 (Fig. 61$^B$) are in the forward upper ends of the slots 1365 when the pawls 1364 are rocked clockwise the links 1367 are raised, the links 1368 being rocked about their pivotal connections with the arms 1374 and the arms 1369 rocked about the cross rod 1370. When the levers 1369 are rocked in this manner it can be seen that they rock the pawls 889 (Fig. 61$^A$) to move the projections 888 out of engagement with the shoulders 864 thereby permitting the actuating racks to be arrested while the pawls 889 continue their rearward movement to their "9" positions. When the totalizer pinions reach "0" position their wide teeth 958 (Fig. 69) engage the forward edges of the noses 959 (Fig. 68) of the corresponding transfer levers 949 thereby positively arresting the pinions in "0" positions and the actuating racks in moved positions.

During each total printing cycle of operation the type carriers are differentially rotated by the actuating segments 1069 (Figs. 61$^B$ and 61$^C$) in the same manner as in adding cycles of operation. Then after the type carriers have been rotated differentially by their actuating segments they are differentially positioned over the proper detail strip and lowered to print the total on the strip.

Total printing: Totalizer engaging mechanism.

During total printing operation the totalizers are shifted and the type carriers are moved into printing relation with the corresponding detail strips in the same manner as in heading cycles of operation, as above described, the automatic device shown in Figs. 70 and 72 being employed during both heading cycles of operation and total printing operations.

As above stated during total printing cycles of operation the selected totalizer is rocked into engagement with the actuating racks while the latter are in normal position and disengaged therefrom after the racks have been positioned differentially under the control of the selected totalizer. The mechanism for engaging the totalizers during total printing operations will now be described.

The forward end of the link 1314 (Figs. 61$^B$ and 64) is pivotally mounted on the upper end of a lever 1380 (Figs. 61$^B$ and 87) loosely mounted on one of the shafts 1007. The arm 1383 of the lever 1380 carries a roller projection into a cam groove 1384 formed in the face of the disk 1010 fast on the shaft 900. The cam groove 1384 is so constructed that near the beginning of each of the cycles in which a total is printed, and before the actuating racks are moved out of normal position the lever 1380 is rocked clockwise (Fig. 61$^B$) thereby moving the link 1314 rearwardly. When the shaft 1318 (Fig. 61$^B$) is rocked counter clockwise during the fourth cycle of operation, as above described, the lever 1309 (Fig. 64) is rocked counter clockwise thereby swinging the rear ends of the links 1005 and 1314 to move the rounded portion of the slot 1315 over the rounded portion 1006 of the pin 1003.

From the above construction it can be seen that during total printing operations the link 1005 is idly reciprocated as the rounded portion 1006 of the pin 1003 is not in the rounded portion 1001 of the slot 1004. As the rounded portion of the slot 1315 in the link 1314 is over the rounded portion 1006 of the pin 1003 the cam groove 1384 (Fig. 87) rocks the selected totalizer into mesh with the actuating racks 875 (Fig. 61$^B$) before the actuating racks begin their movement from normal position and rocks the totalizer out of engagement with the racks after the latter have been moved differentially under the control of the totalizer and while the racks are in moved positions.

It is understood, of course, that as the shaft 1054 (Figs. 6$^B$ and 70) is operated during total printing operations slip carriers A and B are locked against rotation during the ten cycles including the fourth and the thirteenth in the same manner as during heading cycles of operation. During the fourteenth cycle of a total printing operation the slip carriers A and B are unlocked and rotated one step. As no slip is on the arm 479 of slip B which moves from its position under an arm of slip carrier A the plate 830 (Fig. 6$^C$) and link 829 are drawn rearwardly to operate the arm 159. Then during the fourteenth cycle and the next two cycles of operation the pawl 151 moves the ratchet 148 three steps to normal position, the machine being stopped when the ratchet reaches normal position, as above described.

The distributing arm 637 (Fig. 52) is rotated in the same manner as in sorting operations but as it carries no slip the plunger valve 870 is operated to close the passage between the groove 649 (Fig. 51) in the arm and the vacuum tank.

*Total printing: Double space device for detail strips.*

The detail strips 1086 (Fig. 61$^C$) are fed two steps after the clerks' numbers are printed thereon and after the totals are printed thereon. The two steps between the headings and the first items on the detail strips make the clerks' numbers readily distinguishable from the items and the double space after the totals distinguishes the totals from the headings of the next lists, if two lists are printed on each detail strip before the lists are torn off. The means for feeding the detail strips an extra step during heading cycles of operation and total printing operations will now be described.

A vertical rod 1390 (Figs. 57 and 61$^C$) is slidably mounted in the shaft 1066 so that its lower end projects below the end of the shaft 1066. The upper end of the rod 1390 is fast in a block 1393 which is free to be raised and lowered in an opening 1394 in the shaft 1066. An arm 1395 (Figs. 61$^C$ and 66) and a lever 1396 (Figs. 57, 61$^C$ and 66) are pivotally mounted on pins projecting from opposite sides of the frame 1065. The arm 1395 and the forwardly extending arm of the lever 1396 support a cross rod 1397 which normally rests on the block 1393. The downwardly extending arm of the lever 1396 is connected by a link 1398 to the downwardly extending arm of a bell crank lever 1399 pivotally mounted at 1400 on the frame 1065. The outer end of the horizontal arm of the lever 1399 has a recess through which a pin 1404 on the upper end of a slide 1405 projects. The slide 1405 is slidably mounted in a groove formed in a frame 1406 fast on the frame 1065. A pin 1407 on the frame 1406 projects through a slot 1408 in the slide 1405.

A block 1409 (Fig. 14) is slidably mounted in the guides 1410 fast on the frame 1130. The block 1409 is connected by a link 1413 to one arm of a bell crank lever 1414 pivotally mounted on a downwardly extending projection of the frame 1130. The other arm of the lever 1414 has a recess 1415 at its outer end through which projects a projection 1416 formed on the lower end of the link 1324. During all cycles of operation except heading cycles and total printing cycles the shoulder 1417 of the block 1409 is not under the lower end of the rod 1390 so that when the shaft 1066 is lowered to make a printing impression from the type carriers on the detail strips the rod 1390 (Fig. 57) is not moved relatively to the frame 1065. The link 1324 as above described is in lowered position during heading cycles of operation and total printing operations and therefore the block 1409 (Fig. 14) is slid through the lever 1414 and link 1413 so that its shoulder 1417 is under the rod 1390. Therefore, during each heading cycle and total printing cycle of operation the lower end of the rod 1390 engages the shoulder 1417 while the shaft 1066 and frame 1065 are being lowered thereby lowering the slide 1405 (Figs. 57 and 61$^C$) through the lever 1399, link 1398, lever 1396, cross rod 1397 and block 1393. When the slide 1405 is lowered relative to the frame 1406 in this manner the lower curved end of the groove in the frame 1406 cams the lower end of the lever 1405 out of the groove, the lever 1405 being rocked about the point 1419 and against the tension of a leaf spring 1420 fast on the frame 1406. The slide 1405 is rocked in this manner near the end of the downward movement of the shaft 1066 and frame 1065 so that its nose 1423 engages under one of the teeth of the ratchet 1241 (Fig. 61$^C$) fast on the feeding roller 1120 for the detail strip to be printed upon. During the downward movement of the shaft 1066 and frame 1065 the lever 1239 is operated so that its pawl 1240 feeds the detail strip one step after which the clerk's number or the total is printed on the detail strip. Then when the shaft 1066 and frame 1065 are elevated the slide 1405 through its coöperation with the ratchet 1241 rotates the ratchet and feeding roller 1120 a second step to feed the detail strip one space. If the type carriers when lowered have printed the clerk's number it can be seen that when the first item is printed on the detail strip the latter is given another step of movement by the pawl 1240 so that two spaces occur between the clerk's number and the first item on the detail strip. If a total has been printed and the printed list has not been torn off of the detail strip it can be seen that during the next fourth sorting operation the detail strip is fed a second step by the pawl 1240 so that two spaces occur between the last total and the clerk's number for the next list.

Interlocks.

Mounted in brackets or frames 1425 (Figs. 5, 6A, 20, 21 and 22) fast on the frame 122 are three plates 1426, 1427 and 1428. The starting lever 119 (Figs. 5, 6A and 8) has a cam projection 1429 projecting through a notch 1430 (Fig. 8) formed on the rear edge of the plate 1426. The concentric edges 1431 of the sorting lever 635 (Fig. 22), lever 1337, (Fig. 21) and a lever 1433 (Fig. 20) when operated move through corresponding notches 1434 (Fig. 8) also formed in the rear edge of the plate 1426. The concentric edges 1431 of these levers are concentric with the shaft 120. The lever 1433 (Figs. 5 and 20) is loosely mounted on the shaft 120 and is connected to the control lever 945 by the pin 1343 when the control lever is slid toward the right before being moved to its "add" position. The concentric edges 1431 of sorting lever 635 (Fig. 22) the lever 1337 (Fig. 21) the lever 1433 (Fig. 20) and the starting lever 119 (Fig. 6A) are provided with four, two, two and one notches respectively. It can be seen from Fig. 8 that when the starting lever 119 is in its "stop" position any one of the levers 635, 1337 or 1433 may be adjusted as their concentric edges pass freely through the corresponding notches 1434. When however, the starting lever 119 is moved to its "start" position its cam projection 1429 moves the plate 1426 toward the right (Fig. 8) whereupon the rear edge of the bar 1426 engages in the slots in the levers 635, 1337 and 1433 to lock these levers against adjustment, after the starting lever has been moved to start the machine.

As the sorting lever 635 (Fig. 22) must be in its fourth sorting position before the machine can be operated for addition or for printing totals the plate 1427 is provided to compel movement of the sorting lever 119 to its fourth position before the lever 1337 or 1433 (Figs. 20 and 21) can be moved by the adjustment of the control lever 945 to its "total" or "add" position. Each of the levers 1337 and 1433 carries a cam strip 1438 (Figs. 5, 8, 20 and 21) adapted to coöperate with a corresponding edge 1439 (Fig. 9) formed on the plate 1427. When the control lever 945 is moved to its "add" position the strip 1438 on the lever 1433 engages the corresponding edge 1439 thereby moving the plate 1427 toward the left against the action of a spring 1440 which is connected at one end to the plate and at its opposite end to the right hand frame 1425. When the control lever 945 is moved to its "total" position the strip 1438 on the lever 1337 engages its corresponding edge 1439 thereby moving the plate 1427 toward the left against the action of the spring 1440. The concentric edge of the sorting lever 635 projects through a recess 1443 (Fig. 9) formed in the plate 1427 to permit adjustment of the sorting lever to its proper position. When the sorting lever is in its fourth sorting position a deep notch (not shown) in the sorting lever is in such position that the plate 1427 when moved toward the left as above described, engages in this deep notch. If the sorting lever 635 is not in its fourth sorting position the deep notch is not opposite the plate 1427 and as the latter cannot be moved the control lever 945 is locked in "neutral" position.

When the sorting lever 635 is in its fourth sorting position and the control lever 945 is in its "neutral" position the starting lever 119 is locked against operation, as it is necessary to have the sorting lever in its first, second, or third sorting position when the control lever 945 is in its "neutral" position or the control lever in its "total" or "add" position when the sorting lever 635 is in its fourth sorting position, before the machine can perform the proper operations. The plate 1428 is employed to compel adjustment of the sorting lever 635 to its first, second or third sorting positions or the adjustment of the sorting lever 635 to its fourth sorting position and the control lever 945 to its "total" or "add" position before the starting lever 119 can be operated to start the machine. When the sorting lever is in its fourth sorting position and the control lever 949 in its "neutral" position the plate 1428 projects under the cam projection 1429 on the starting lever 119 as shown in Fig. 10 thereby locking the starting lever in "stop" position. When the sorting lever 635 is moved out of its fourth sorting position to one of its other sorting positions a cam strip 1446 (Figs. 10 and 22) on this lever engages an edge 1447 (Fig. 10) on the plate 1428 thereby moving the plate toward the left against the action of its spring 1448.

In this way the plate is moved from under the projection 1429 to permit operation of the starting lever to start the machine. When the sorting lever 119 is in its fourth sorting position and the control lever 945 is moved to its "add" position the strip 1438 on the lever 1337 engages an edge 1449 on the plate 1428 thereby moving the plate to permit operation of the starting lever. When the sorting lever 119 is in its fourth sorting position and the control lever is moved from its "neutral" to its "add" position the strip 1438 on the lever 1433 engages an edge 1450 on the plate 1428 thereby moving the plate 1428 toward the left to permit operation of the starting lever.

From the above description it can be seen that the three plates 1426, 1427 and 1428 are employed to compel operation of the starting, sorting and control levers in the proper sequence and to predetermined positions so that the machine may be operated properly upon each operation.

The sorting lever 635 (Fig. 22), the lever 1337 (Fig. 21), the lever 1433 (Fig. 20) and the starting lever 119 (Fig. 6$^A$) are alined in their various positions by corresponding pawls 1451 (Fig. 6$^A$). The pawls 1451 are loosely mounted on a cross bar 1452 supported in the sides of the frame 123 and their noses engage in notches 1453 formed in their corresponding levers to aline the latter. Springs 1454 connected at their rear ends to the pawls 1451 and at their forward ends to a cross rod 1461 yieldingly retain the noses of the pawls 1451 in engagement with the notches 1453.

After the machine has been operated for a fourth sorting operation or for a total printing operation the control lever 945 (Figs. 5, 20 and 23) must be moved to its "neutral" position before the machine can be again set in operation by the starting lever 119. To this end a link 1455 (Figs. 3$^B$—3$^D$ and 6$^A$—6$^B$—6I$^C$) is pivotally mounted at its upper end on the arm 1050 (Figs. 6$^A$ and 20) and at its lower end to an arm 1456 (Figs. 3$^D$, 6$^C$ and 45) pivotally mounted on the frame 135. A lever 1457 is pivotally mounted on the arm 1456 and at its upper end is connected to the rear end of a spring 1458 which at its forward end is connected to a pin on the frame 135. The lower end of the lever 1457 is provided with a slot 1459 through which the pin 140 projects. When the control lever 945 is rocked to its "add" or its "total" position the arm 1456 is rocked clockwise through the link 1455. During this movement of the arm 1456 a pin 1460 on the arm engages the forward edge of the link 136 thereby rocking the link to move the horizontal portion of its slot 138 out of engagement with the pin 140. At the same time the lever 1457 is lowered so that the pin 140 is in the position relative to the slot 1459 indicated by the dotted circle 1463 in Fig. 45. After a fourth sorting or total printing operation movement of the starting lever to "stop" position raises the link 136 but as the pin 140 is not in the horizontal portion of its slot 138 the arm 143 is not rocked to normal position. Therefore if the starting lever is again operated while the control lever 945 is in its "add" or "total" position the pawl 145 carried by the arm 143 does not rotate the ratchet 148 one step and therefore the machine cannot be set in operation. When the control lever 945 is moved from its "add" or "total" position to its "neutral" position the edge 1464 (Fig. 45) of the slot 1459 engages the pin 140 thereby moving the arm 143 to normal position so that when the starting lever is moved to its starting position the machine may be set in operation.

*Operation.*

It is thought that the above detailed description is sufficient for a complete understanding of the present invention but to recapitulate, the various operations of the machine will be described briefly.

When the slips from a cashier's station are to be sorted the supply box 296 (Figs. 23 and 25) is drawn forwardly and the slips placed therein, after which the box is slid rearwardly to normal position. Then the sorting lever 635 (Figs. 5, 22 and 23) is moved to its first sorting position and finally the starting lever 119 is moved to its start position in order to set the machine in operation. During the first eight complete rotations of the shaft 110 (Figs. 3$^D$ and 7) the air pump 243 (Figs. 3$^E$ and 7) establishes the proper partial vacuum and pressure in the vacuum tank 245 and pressure tank 244 respectively. Near the end of the eighth cycle of operation the lever 200 (Figs. 3$^D$ and 6$^C$) is rocked counter clockwise to raise the sleeve 177 and thereby couple the shafts 113 and 110 together, as fully described above.

For the sake of convenience movement of the first slip on the pile in the supply box 296 will be described, it being understood that the movement of the other slips is the same, except that the slips are deposited in the various boxes 638 (Fig. 23). During the first rotation of the shaft 113, that is, during the first cycle of operation of the machine and the ninth rotation of the shaft 110 slip carrier A, (Figs. 23, 24 and 25) is lowered to move the arm 324 over the supply box into engagement with the uppermost slip. While slip carrier A is being lowered the retaining bail 304 for the sales slips is drawn rearwardly from over the pile of slips. Then the air passage from the grooves 334 and the air chamber 335 in the arm 324 to the vacuum tank is opened so that the slip is attached to the arm 324 by suction. At the same time air is forced through the perforations 105 (Fig. 43) in the sales slips to insure separation of the uppermost slip from the second slip. Then during the same cycle of operation slip carrier A is elevated and given one-third of a rotation in a clockwise direction (Fig. 23). During the elevation of slip carrier A the retaining bail 304 is restored to normal position. During the second cycle of operation the sales slip is lowered by slip carrier A onto the alining table 455 (Figs. 23, 47<sup>B</sup> and 73) where it is properly alined on the arm 324. Then during the same cycle of operation slip carrier A is raised to normal position and given a second one-third rotation in the clockwise direction to move the slip in position over one of the arms 479 of slip carrier B (Figs. 23, 36 and 37). When slip carrier A is lowered during the third cycle of operation the action of the vacuum tank on the sales slip is broken and the passage from the grooves 488 (Figs. 36 and 37) in the arm 479 of slip carrier B to the vacuum tank is opened so that the slip is transferred from slip carrier A to slip carrier B. Then during the same cycle of operation, that is, the third, slip carrier B is given one-third of a rotation in a clockwise direction (Fig. 23) to carry the slip into coöperative relation with the translating device (Figs. 23, 36, 39, 42 and 44).

When the frame 550 of the translating device is lowered during the fourth cycle of operation it engages the sales slip and then the disk 603 (Figs. 36 and 38) is operated to move the duct 606 into registry with the duct 600, whereupon air is drawn by the vacuum tank through the perforation representing the first digit of the clerk's number to effect differential movement of the piston head 587 (Figs. 48 and 50<sup>B</sup>). During this first sorting operation the plates 573 and 588 (Figs. 39 and 44) prevent air from being drawn through the other perforations on the sales slip. After the frame 550 has been raised to normal position during the fourth cycle of operation slip carrier B is rotated to carry the slip into coöperative relation with the distributing arm 637 (Figs. 23 and 52). During the fourth cycle of operation the fingers 739 (Figs. 50<sup>A</sup>, 50<sup>B</sup>, 55 and 56) are differentially positioned under the control of the piston head 587 and then elevated to raise the desired plunger pin 780.

Near the beginning of the fifth cycle of operation the distributing arm 637 (Figs. 23 and 52) is lowered and the air in the groove 649 (Fig. 51) in the distributing arm is partially withdrawn by the vacuum tank so that the sales slip is transferred from slip carrier B to the distributing arm, the passage between the grooves 488 (Figs. 36 and 37) on the arm 479 to the vacuum tank being broken at such time. During the same cycle of operation, that is, the fifth, the distributing arm 637 is rotated (Fig. 23) by the mechanism shown in Figs. 61<sup>A</sup>, 55, 56 and 58 to carry the slip over the box 638 corresponding to the digit represented by the clerk's perforation controlling this mechanism. Then during this same cycle the distributing arm 637 is lowered to deposit the slip in the selected box and is then raised and rotated to normal position. When the distributing arm is lowered to deposit the sales slip in the box 638 the corresponding bail 693 (Figs. 23 and 52) is withdrawn from over the plate 690 in the box and is then moved back to normal position over the slip so that when the distributing arm is raised the slip is retained under the bail 693.

The distribution of the other slips in the supply box 296 is the same as that of the first slip, there being one slip deposited in the proper box 638 during each cycle of operation of the machine after the fourth cycle. As the last sales slip to be sorted is moved from its coöperative relation with the translating device to its position under the distributing arm 637 the arm 159 (Fig. 6<sup>C</sup>) is rocked clockwise to permit the pawl 151 to rotate the ratchet 148 to normal position and thereby stop the machine. During the last cycle of operation the lever 200 is rocked back to normal position to effect the disconnection of the shafts 110 and 113 (Figs. 6<sup>B</sup>, 6<sup>C</sup> and 16).

After the machine has been stopped the starting lever 119 (Figs. 6<sup>A</sup> and 23) is moved back to its "stop" position and the sorting lever 635 (Figs. 22 and 23) is moved to its second sorting position. The sales slips in the boxes 638 are removed from the machine to the proper cabinet and one of the piles is placed in the supply box 296 to be sorted in accordance to the perforation representing the second digit of the clerk's number. Then the starting lever 119 is moved to its starting position to set the machine in operation. During this second sorting operation the slips are sorted in the same manner as during the first sorting operation, the slips of the clerks in the various departments being deposited in the appropriate boxes 638. After the second sorting operation the piles of slips sorted during the second sorting operation are removed from the boxes 638 and one of the piles is placed in the supply box 296. Then the sorting lever 635 is moved to its third sorting position and finally the starting lever is operated, as before, to set the machine in operation. During this third sorting operation the sales slips are sorted in accordance to the perforations representing the third digits of the clerks' numbers.

After the third sorting operation the sales slips in the boxes 638 are removed and one of the piles is placed in the supply box 296. The sorting lever 635 is adjusted to its fourth sorting position and the control lever 945 (Figs. 20 and 23) is adjusted to its "add" position. Finally the starting lever 119 is operated to set the machine in operation. During the first three cycles of operation the first sales slip is moved from the supply box 296 into coöperative relation with the translating device. Then near the beginning of the fourth cycle of operation the slip carriers A and B are locked against rotation and the rotating means therefore are disabled by the mechanism shown in Fig. 30. These slip carriers are locked against rotation until near the beginning of the fourteenth cycle of operation when their normal operation is continued. During the first fourteen cycles of operation the shaft 1054 (Fig. 70) is rotated. Near the beginning of the fourth step of rotation of the shaft 1054 the plate 573 (Fig. 44) is moved into the position shown in this figure. At the same time the lever 1309 (Figs. 63$^B$ and 64) is rocked to disable the totalizer engaging mechanism, as fully described above.

Let it be assumed that the clerks' perforations in the first sales slip represent clerk number "4321". During the fourth cycle of operation and after the frame 550 of the translating device has been lowered into coöperative relation with the sales slip the perforations representing the first, second and third digits of the clerk's number controls the piston heads 579 of the thousands, hundreds and tens cylinders 578 respectively (Figs. 61$^A$, 63$^A$ and 63$^B$). The piston head 579 for the units cylinder 578 remains in normal "0" position. During the next cycle of operation, that is, the fifth, the differential mechanism shown in Figs. 61$^A$, 61$^B$ and 61$^C$, is positioned under the control of the corresponding piston heads 579 whereby the number "4320" is set up on the type carriers 1060. As the clutch disk 1137 (Fig. 62) connects the bevel gear 1135 and the shaft 1133 the shaft 1066 and frame 1065 (Fig. 61$^C$) are rotated differentially and to the same extent as the distributing arm 637 to carry the type carriers over the selected detail strip 1086. During the fourth cycle of operation the fingers 793 Figs. 50$^A$ and 50$^B$) are adjusted to "0" positions so that during the fifth cycle of operation the type carriers are moved over the "0" strip (Fig. 66). During each succeeding cycle of operation the tens, hundreds and thousands type carriers are moved to the same extents and the units type carrier is moved under the control of the units automatic device shown in Fig. 72. Therefore, during the sixth cycle the type carriers print the clerk's number "4321" on the "1" detail strip. During the seventh cycle the type carriers print the clerk's number "4322" on the "2" detail strip and so on, each detail strip being headed with its appropriate number. During the fourteenth cycle of operation of the machine the normal operation of slip carriers A and B is continued; the totalizer engaging mechanism is enabled; and the plate 573 (Fig. 39) is moved to the position shown in this figure. Then during the fourteenth cycle of operation the amount perforations in the first sales slip control the piston heads 579 (Fig. 61$^A$) and the perforation representing the fourth digit "1" of the clerk's number "4321" controls the piston head 587 (Figs. 48 and 50$^B$). Then during the fifteenth cycle of operation the "1" totalizer is actuated to accumulate the amount represented by the amount perforations and the type carriers 1060 print the amount on the "1" strip. During the same cycle of operation, that is, the fifteenth, the sales slip is deposited in the "1" box 638 (Fig. 23). In like manner each of the sales slips is deposited in the proper box 638 and controls the operation of the corresponding totalizer and the printing of the amount on the corresponding detail strip.

After the fourth sorting operation the machine is prepared for printing the totals on the totalizers. The sorting lever 635 remains in its fourth sorting position, the control lever 945 is moved to its total position, and the starting lever 119 is operated as before, to set the machine in operation.

During total printing operations the shaft 1054 (Fig. 70) is given fourteen steps of movement as in the fourth sorting operations. During the fourth cycle of operation the lever 1309 (Fig. 64) is rocked to move the rounded portion of the slot in the link 1314 over the rounded portion 1006 of the pin 1003. At the same time the lever 1347 (Figs. 60 and 61$^A$) is rocked to couple the arm 1348 and the lever 1356 together. During the fourth cycle of operation the levers 903 (Fig. 61$^A$) are moved to their "9" positions, then the levers 893 are lowered and finally the levers 903 are restored to normal position to move the levers 893 and the pawls 889 to their "9" positions. During this fourth sorting operation and before the actuating racks 875 (Fig. 61$^B$) are moved out of "0" position the "0" totalizer is rocked into engagement with the actuating racks. Then during rearward movement of the racks 875 the pawls 889 (Fig. 61$^A$) are operated when the totalizer pinions arrive at "0" position and the racks are arrested in their moved positions. Then the differentially positioned type carriers 1060 (Figs. 61$^C$ and 66) are moved to print the total on the "0" detail strip. During the fifth cycle of operation the "1" totalizer is reset and the total printed on the "1" detail strip. In like manner each of the succeeding totalizers is reset and their totals printed on the appropriate detail strips. The totalizers and the detail strips are selected under the control of the units automatic device. During the fourteenth cycle of operation slip carriers A and B are rotated and as no slip is on slip carrier B the arm 159 (Fig. 6ᶜ) is operated so that at the end of the sixteenth cycle of operation the operation of the machine is stopped.

After a total printing operation the printed lists on the detail strips are torn off and properly filed.

While the form of mechanism herein shown and described, is admirably adapted to fulfil the objects primarily stated, it is to be understood that it is not intended to confine the invention to the one form of embodiment herein disclosed, for it is susceptible of embodiment in various forms all coming within the scope of the claims which follow.

What is claimed is:—

1. In a machine of the class described, the combination with a plurality of totalizers, of a set of differentially movable actuators therefor, record material, means for selecting any one of said totalizers to be actuated by the actuators, and a pneumatic system including valve controlled means controlled by said record material for controlling said selecting means.

2. In a machine of the class described, the combination with a plurality of totalizers, of a set of differentially movable actuators therefor, a frame carrying said totalizers, means for moving said frame to bring any desired one of said totalizers into coöperative relation with the actuators, and a record controlled pneumatic system for controlling said moving means.

3. In a machine of the class described, the combination with a plurality of totalizers, of a set of differentially movable actuators therefor, a frame carrying said totalizers, means for moving said frame directly from one position to another to bring any desired one of said totalizers into coöperative relation with the actuators, and a record controlled pneumatic system for controlling said moving means.

4. In a machine of the class described, the combination with a plurality of totalizers, of a set of differentially movable actuators common thereto, means including a piston cylinder for selecting the desired totalizer for operation, and a pneumatic system for moving the piston of said cylinder to control said means.

5. In a machine of the class described, the combination with a plurality of totalizers, of a set of differentially movable actuators common thereto, means including a piston cylinder for selecting the desired totalizer for operation, a pneumatic system for moving the piston of said cylinder to control said means, and record means for controlling said system.

6. In a machine of the class described, the combination with a plurality of totalizers, of a set of differentially movable actuators common thereto, means including a piston cylinder for selecting the desired totalizer for operation, and a pneumatic system for moving the piston of said cylinder differentially to control said means.

7. In a machine of the class described, the combination with a plurality of totalizers, of a set of differentially movable actuators common thereto, means including a piston cylinder for selecting the desired totalizer for operation, a pneumatic system for moving the piston of said cylinder differentially to control said means, and record controlled means for controlling said system.

8. In a machine of the class described, the combination with a plurality of totalizers, of actuating means common to the same, means including a piston cylinder for effecting relative movement between the actuating means and the totalizers to establish operative relation between the selected totalizer and the actuating means, and a pneumatic system for controlling said moving means.

9. In a machine of the class described, the combination with a plurality of totalizers, of actuating means common to the same, means including a piston cylinder for effecting relative movement between the actuating means and the totalizers to establish operative relation between the selected totalizer and the actuating means, a pneumatic system for controlling said moving means, and record means for controlling the pneumatic system.

10. In a machine of the class described, the combination with an accounting device, of a differentially movable actuator therefor, a piston cylinder, and a record controlled pneumatic system for moving the piston of said cylinder to control the extent of movement of said actuator.

11. In a machine of the class described, the combination with an accounting device, of a differentially movable actuator therefor, a piston cylinder, and a record controlled pneumatic system for moving the piston of said cylinder differentially to control the extent of movement of said actuator.

12. In a machine of the class described, the combination with an accounting device, of a differentially movable actuator therefor, a piston cylinder, and a record controlled pneumatic system for moving the piston of said cylinder preliminarily to the operation of the actuator to control the extent of movement of said actuator.

13. In a machine of the class described, the combination with an accounting device, of an actuator therefor, a piston cylinder, record controlled pneumatic means for moving the piston of the cylinder differentially from normal position, means intermediate the piston and the actuator for operating the actuator when the piston is restored to normal position, and means for restoring the piston to normal position.

14. In a machine of the class described, the combination with an accounting device, of an actuator therefor, a piston cylinder, pneumatic means for moving the piston of the cylinder differentially, means intermediate the piston and the actuator for operating the actuator when the piston is restored to normal position, and means for restoring the piston to normal position.

15. In a machine of the class described, the combination with a plurality of totalizers, of a set of differentially movable actuators common thereto, means including a piston cylinder for selecting the totalizer to be actuated, and a record controlled pneumatic system for controlling said actuators and said selecting means.

16. In a machine of the class described, the combination with a plurality of totalizers, of a set of differentially movable actuators common thereto, means including a piston cylinder for selecting the totalizer to be actuated, and a pneumatic system for controlling said actuators and said selecting means.

17. In a machine of the class described, the combination with record slips, of means controlled by the slips for sorting the same, accounting mechanism controlled by the slips as the same are sorted, and means controlled by the sorting means for disabling said accounting mechanism.

18. In a machine of the class described, the combination with record slips having perforations representing various numbers, of means controlled by said perforations for sorting and resorting the slips, operating mechanism for said means, a device for preparing the sorting means for sorting the slips in accordance with the perforations representing the digits of various denominations, accounting mechanism, and actuating mechanism therefor, driven by the operating means for the sorting means, and normally disconnected therefrom but connected thereto by said device when preparing the sorting means for sorting the slips in accordance with the perforations representing the digits of one denomination.

19. In a machine of the class described, the combination with record slips, of means controlled by the slips for sorting and resorting the same, a plurality of totalizers, common actuating mechanism for the totalizers, and means for moving the totalizers under the control of record slips, only when the latter are sorted for the last time, to bring the desired totalizers into operative relation with the actuators.

20. In a machine of the class described, the combination with record slips, of a member moved differentially under the control of said slips, distributing mechanism for sorting and resorting said slips, means for operating the distributing mechanism under the control of said member, a plurality of totalizers, common actuating means for the totalizers, means for moving the totalizers under the control of said member to select the desired totalizer for operation, a device for operating said totalizer moving means and normally disconnected from said operating means for the distributing mechanism, and means for connecting said operating means and said operating device when the record slips are sorted for the last time.

21. In a machine of the class described, the combination with record slips, of means controlled by the slips for sorting the same a plurality of times, an accounting mechanism operated differentially under the control of said slips and controlled as to operativity by the sorting means whereby said accounting mechanism will be operated during certain of the sorting operations.

22. In a machine of the class described, the combination with a main operating mechanism, of record slips, sorting mechanism operated by the main operating mechanism for sorting the slips a plurality of times in accordance to different records, accounting mechanism operated by the main operating mechanism and disconnected therefrom when the slips are sorted in accordance to certain records, and means for connecting said accounting mechanism to the main operating mechanism when the slips are sorted in accordance to a certain record.

23. In a machine of the class described, the combination with a main operating mechanism, of record slips, sorting mechanism operated by the main operating mechanism for sorting the slips a plurality of times in accordance to different records, accounting mechanism operated by the main operating mechanism and disconnected therefrom when the slips are sorted in accordance to certain records, and manipulative means for preparing the sorting mechanism for sorting the slips in accordance to the different records and for connecting said accounting mechanism and said operating mechanism when the sorting mechanism is prepared for sorting the slips in accordance to a certain record.

24. In a machine of the class described, the combination with printing means, of a fluid system including a piston cylinder for controlling relative movement between the printing mechanism and the material printed upon whereby the printing mechanism prints various lists on said material.

25. In a machine of the class described, the combination with printing means, of a fluid system including a piston cylinder for controlling relative movement between the printing mechanism and the material printed upon whereby the printing mechanism prints various lists on said material, and record means for controlling said fluid system.

26. In a machine of the class described, the combination with printing mechanism, of means for actuating the same, means for effecting relative movement between the printing mechanism and the material printed upon to print various lists, and a fluid system including a piston cylinder for controlling both of said means.

27. In a machine of the class described, the combination with printing mechanism, of means for actuating the same, means for effecting relative movement between the printing mechanism and the material printed upon to print various lists, a fluid system including a piston cylinder for controlling both of said means, and record material for controlling said fluid system.

28. In a machine of the class described, the combination with printing means, of a fluid system including a piston cylinder for controlling relative differential movement between the printing mechanism and the material printed upon whereby the printing mechanism prints various lists on said material.

29. In a machine of the class described, the combination with printing means, of a fluid system including a piston cylinder for controlling relative differential movement between the printing mechanism and the material printed upon whereby the printing mechanism prints various lists on said material, and record controlled means for controlling said fluid system.

30. In a machine of the class described, the combination with printing mechanism, of a plurality of detail strips, means for moving the printing mechanism to print on any desired detail strip, and a fluid system including a piston cylinder for controlling said means.

31. In a machine of the class described, the combination with printing mechanism, of a plurality of detail strips, means for moving the printing mechanism to print on any desired detail strip, a fluid system including a piston cylinder for controlling said means, and record means for controlling said system.

32. In a machine of the class described, the combination with printing mechanism, of a plurality of detail strips, means for effecting relative differential movement between the printing mechanism and the detail strips to print on any desired strip, and a fluid system including a piston cylinder for controlling said means.

33. In a machine of the class described, the combination with printing mechanism, of a plurality of detail strips, means for effecting relative differential movement between the printing mechanism and the detail strips to print on any desired strip, a fluid system including a piston cylinder for controlling said means, and record means for controlling said system.

34. In a machine of the class described, the combination with printing mechanism, of actuating mechanism therefor, a plurality of detail strips, means for effecting relative movement between the printing mechanism and the detail strips to print on any desired strip, and a record controlled fluid system including a piston cylinder for controlling said actuating mechanism and said moving means.

35. In a machine of the class described, the combination with printing mechanism, of means for moving the printing mechanism relative to the material printed upon to print various lists, a piston cylinder, and a pneumatic system constructed to move the piston of said cylinder and thereby control said relative movement.

36. In a machine of the class described, the combination with printing mechanism, of means for moving the printing mechanism relative to the material printed upon to print various lists, a piston cylinder, a pneumatic system constructed to move the piston of said cylinder and thereby control said relative movement, and record slips for controlling said pneumatic system.

37. In a machine of the class described, the combination with a printing mechanism, of means for moving the printing mechanism relative to the material to be printed upon to print various lists, a piston cylinder, and a pneumatic system for partially exhausting the air in said cylinder to move the piston and thereby control said relative movement.

38. In a machine of the class described, the combination with a printing mechanism, of means for moving the printing mechanism relative to the material to be printed upon to print various lists, a piston cylinder, a pneumatic system for partially exhausting the air in said cylinder to move the piston and thereby control said relative movement, and record slips for controlling said pneumatic system.

39. In a machine of the class described, the combination with printing means, movable differentially to print in different columns, of a frame and connections for moving the same, invariably moved operating means for said frame, pivot pins carried by said operating means, mechanism for selectively operating the desired pivot pin to connect the frame and operating means whereby the frame and printing means are moved differentially by said operating means.

40. In a machine of the class described, the combination with printing means, movable differentially to print in different columns, of a frame and connections for moving the same, invariably moved operating means for said frame, pivot pins carried by said means, mechanism for selectively operating the desired pivot pin to connect the frame and operating means whereby the frame and printing means are moved differentially by said operating means, and record means for controlling said selecting mechanism.

41. In a machine of the class described, the combination with printing mechanism movable differentially in either direction from normal position to print in different columns, of a frame and connections for moving the same, two members movable to invariable extents in opposite directions, pivot pins carried by each member and normally out of coöperative relation with said frame, and means for selectively moving the desired pivot pin into coöperative relation with said frame so that the frame and printing mechanism are moved differentially their extent and direction of movement being dependent upon the selected pivot pin.

42. In a machine of the class described, the combination with printing means, movable differentially to print in different columns, of a frame and connections for moving the printing means, invariably moved operating means for said frame, pivot pins carried by said operating means, spirally arranged fingers, one for each pin, for selectively operating the desired pin to connect the frame to said operating means whereby the frame and printing means are moved differentially, means for moving said fingers differentially, and means for elevating the fingers, after they have been positioned differentially, to operate the selected pin.

43. In a machine of the class described, the combination with printing means, movable differentially to print in different columns, of a frame and connections for moving the printing means, invariably moved operating means for said frame, pivot pins carried by said operating means, spirally arranged fingers, one for each pin, for selectively operating the desired pin to connect the frame to said operating means whereby the frame and printing means are moved differentially, means for moving said fingers differentially, means for elevating the fingers after they have been positioned differentially, to operate the selected pin, and record means for controlling the extent of movement of said fingers.

44. In a machine of the class described, the combination with printing means movable differentially to print in different columns of a frame and connections for moving the printing means, invariably moved operating means for said frame, pivot pins carried by said means, spirally arranged fingers for selectively operating the desired pivot pin to connect the frame to said operating means whereby the printing means is moved differentially, and a pneumatic system for controlling said means for moving the fingers differentially.

45. In a machine of the class described, the combination with record slips, of means controlled by the slips for sorting the same a plurality of times, and printing mechanism controlled by said slips and effective while the slips are being sorted for the last time.

46. In a machine of the class described, the combination with record slips, of means for sorting the slips a plurality of times, and printing mechanism rendered effective while the slips are being sorted for the last time.

47. In a machine of the class described, the combination with record slips, of means for sorting the slips a plurality of times, and printing mechanism operated under the control of the slips whereby said printing mechanism is rendered effective while the slips are being sorted for the last time.

48. In a machine of the class described, the combination with record slips, of means controlled by the slips for sorting the same a plurality of times, and printing mechanism, and means for controlling said printing mechanism whereby said printing mechanism will be rendered effective while the slips are being sorted for the last time.

49. In a machine of the class described, the combination with record slips, of means controlled by the slips for sorting the same a plurality of times, normally inoperative printing mechanism, and means for preparing said sorting mechanism for sorting the slips a plurality of times and rendering said printing mechanism operative when the sorting mechanism is prepared to sort the slips for the last time.

50. In a machine of the class described, the combination with record slips, of means controlled by the slips for sorting the same a plurality of times, normally inoperative printing mechanism controlled by said record slips, and means for preparing said sorting mechanism for sorting the slips a plurality of times and rendering said printing mechanism operative when the sorting mechanism is prepared to sort the slips for the last time.

51. In a machine of the class described, the combination with record slips, of means controlled by the slips for sorting the same a plurality of times, printing mechanism, a plurality of detail strips, and means for moving the printing mechanism under control of the record slips only when the slips are sorted for the last time to print on the desired detail strip.

52. In a machine of the class described, the combination with a main operating mechanism, of record slips, sorting mechanism operated by the main operating mechanism for sorting the slips a plurality of times, printing mechanism operated by the main operating mechanism and normally disconnected therefrom, and means for connecting said printing mechanism to the main operating mechanism when the slips are sorted for the last time.

53. In a machine of the class described, the combination with record slips, of means controlled by said slips for sorting the same a plurality of times, and printing mechanism and totalizer mechanism controlled by said slips whereby said printing mechanism and totalizer mechanism will be rendered effective while the slips are being sorted for the last time.

54. In a machine of the class described, the combination with record slips, of means for sorting the slips a plurality of times, and printing mechanism and totalizing mechanism rendered effective while the slips are being sorted for the last time.

55. In a machine of the class described, the combination with record slips, of means controlled by the slips for sorting the same a plurality of times, normally inoperative printing mechanism and totalizing mechanism controlled by said record slips, and means for preparing the sorting means for sorting the slips a plurality of times and rendering said printing mechanism and totalizing mechanism operative when the sorting mechanism is prepared to sort the slips for the last time.

56. In a machine of the class described, the combination with printing mechanism, of record material for controlling said printing mechanism for listing items, and an automatic device for controlling said printing mechanism to head the various lists of items.

57. In a machine of the class described, the combination with printing mechanism for printing items in various lists, and an automatic device for controlling said printing mechanism to head the various lists.

58. In a machine of the class described, the combination with printing mechanism of record material for controlling said printing mechanism to print items in various lists, and an automatic device for controlling in conjunction with said record material said printing mechanism to head the various lists.

59. In a machine of the class described, the combination with printing mechanism, of means for operating the same, a pneumatic system for controlling said means, record means for controlling the pneumatic system whereby the printing mechanism prints items in various lists, and an automatic device for controlling said pneumatic system whereby the printing mechanism heads the various lists.

60. In a machine of the class described, the combination with printing mechanism, of means for operating the same, a pneumatic system for controlling said means, record means for controlling the pneumatic system whereby the printing mechanism prints items in various lists, and an automatic device for controlling said pneumatic system in conjunction with said record means, whereby the printing mechanism heads the various lists.

61. In a machine of the class described, the combination with a plurality of detail strips, of record material for controlling said printing mechanism for listing items on the various detail strips, and an automatic device for controlling said printing mechanism to head the lists on the detail strips in an invariable order.

62. In a machine of the class described, the combination with recording mechanism for recording in various columns on the material to be recorded upon, and pneumatic means including a multiple valve controlled device for automatically selecting in an invariable order the columns to be recorded in.

63. In a machine of class described, the combination with printing mechanism, of a plurality of detail strips, and automatic means including a multiple valve fluid controlled device for causing relative movement between the printing mechanism and the detail strips whereby the printing mechanism prints on the various strips in an invariable succession.

64. In a machine of the class described, the combination with printing mechanism, of a plurality of detail strips, means for moving the printing mechanism into printing relation with the various detail strips, and an automatic device including multiple valve fluid controlled means for controlling said moving means whereby the printing mechanism prints on the detail strips in an invariable succession.

65. In a machine of the class described, the combination with printing mechanism, of a fluid system for controlling relative movement between the printing mechanism and the material printed upon to print in various columns, and an automatic device for controlling said system and thereby causing the printing mechanism to print in an invariable succession in the columns.

66. In a machine of the class described, the combination with printing mechanism, of a fluid system for controlling relative movement between the printing mechanism and the material printed upon to print in various columns, an automatic device for controlling said system and thereby causing the printing mechanism to print in an invariable succession in the columns, and record means for controlling said system and thereby causing the printing mechanism to print in any desired column.

67. In a machine of the class described, the combination with printing mechanism, of a plurality of detail strips, means for effecting relative movement between the printing mechanism and the detail strips, a device for controlling said moving means so that the printing mechanism prints in an invariable succession on said strips, and pneumatic means including a valve controlled device for controlling said moving means whereby the printing mechanism prints on any desired strip.

68. In a machine of the class described, the combination with printing mechanism, of means for moving the printing mechanism relative to the material to be printed upon to print in various columns, automatic means for controlling said moving means whereby the printing mechanism prints in the various columns in an invariable succession, and pneumatic means including a piston cylinder for controlling said moving means whereby the printing mechanism prints in any desired column.

69. In a machine of the class described, the combination with printing mechanism, of means for moving the printing mechanism relative to the material to be printed upon to print in various columns, fluid controlled automatic means including a piston cylinder for controlling said moving means whereby the printing mechanism prints in the various columns in an invariable succession, and record means for controlling said moving means whereby the printing mechanism prints in any desired column.

70. In a machine of the class described, the combination with recording mechanism for recording in various columns on the material to be recorded upon, of means for moving the recording mechanism relative to the material, a piston cylinder the piston of which controls said relative movement, and an automatic device for controlling movement of said piston whereby the moving means moves the recording mechanism to record in the various columns in an invariable succession.

71. In a machine of the class described, the combination with recording mechanism for recording in various columns on the material to be recorded upon, of means for moving the recording mechanism relative to the material, a piston cylinder the piston of which controls said relative movement, an automatic device for controlling movement of said piston whereby the moving means moves the recording mechanism to record in the various columns in an invariable succession, and means for controlling said piston whereby said moving means moves the recording mechanism to record in any desired column.

72. In a machine of the class described, the combination with recording mechanism for recording in various columns on the material to be recorded upon, of means for moving the recording mechanism relative to the material, a piston cylinder the piston of which controls said relative movement, an automatic device for controlling movement of said piston whereby the moving means moves the recording mechanism to record in the various columns in an invariable succession, and record slips for controlling said piston whereby said moving means moves the recording mechanism to record in any desired column.

73. In a machine of the class described, the combination with a plurality of type carriers, of actuating means therefor, mechanism for effecting relative movement between the type carriers and the material printed upon to print in various columns, record material controlling said actuating means and said mechanism so that the items on the record material are recorded in the desired columns, and an automatic device for controlling the actuation of one type carrier and said mechanism, while the record material controls the other type carriers, to head the columns.

74. In a machine of the class described, the combination with a plurality of type carriers, of actuating means therefor, mechanism for effecting relative movement between the type carriers and the material printed upon to print in various columns, means controlling said actuating means and said mechanism so that items are recorded in the desired columns, and an automatic device for controlling the actuation of one type carrier and said mechanism, while said controlling means controls the other type carriers, to head the columns.

75. In a machine of the class described, the combination with a type carrier, of means for controlling the type carrier so that it prints any desired digit in any desired one of a plurality of columns, and fluid controlled automatic means including a piston cylinder for controlling the type carrier so that it prints the digits in successive order in the columns in invariable order, one digit being printed in each column.

76. In a machine of the class described, the combination with a type carrier, of record means for controlling the type carrier so that it prints any desired digit in any one of a plurality of columns, and fluid controlled automatic means including a piston cylinder for controlling the type carrier so that it prints the digits in successive order in the columns in invariable order, one digit being printed in each column.

77. In a machine of the class described, the combination with a type carrier, of means for controlling the same to print any desired digit, and fluid controlled automatic means including a multiple valve controlled pneumatic device for controlling the same to print the digits in an invariable order.

78. In a machine of the class described, the combination with a type carrier, of record means for controlling the same to print any desired digit, and automatic means including a piston cylinder for controlling the same to print the digits in an invariable order.

79. In a machine of the class described, the combination with a type carrier, of actuating means therefor, a pneumatic system controlling the actuating means, record means controlling the pneumatic system so that the type carrier is actuated to print any desired digit, and an automatic device for controlling said system so that the type carrier is actuated to print the digits in an invariable order.

80. In a machine of the class described, the combination with record means having perforations representing clerks and amounts, of type carriers, means controlled by the clerks' perforations for effecting relative movement between the type carriers and the material printed upon to print in various columns, actuating means for the type carriers controlled by the amount perforations when said moving means is controlled by said clerks' perforations, and an automatic device for controlling said moving means to head the various columns, the actuating mechanism being controlled by the clerks' perforations and said device when the columns are headed.

81. In a machine of the class described, the combination with an accounting device, of fluid controlled actuating means therefor including a multiple valve controlled device, and record material having clerks' and amount perforations adapted to control said actuating means.

82. In a machine of the class described, the combination with an accounting device, of actuating means therefor, pneumatic means controlling said actuating means, and record material having clerks' and amount perforations adapted to control said pneumatic means and therefore said actuating means.

83. In a machine of the class described, the combination with a plurality of type carriers for printing lists of amounts and heading the lists with the clerks' numbers, of an automatic device for selecting the lists to be headed and controlling the units type carrier when the lists are headed, record material having amount perforations and clerks' perforations the amount perforations being adapted to control the type carriers to print the amounts while the clerks' perforations representing the digits in the units denomination select the lists in which the amounts are to be printed, the clerks' perforations also being adapted to control all but the units type carrier when the lists are headed.

84. In a machine of the class described, the combination with printing mechanism, of record slips for controlling the printing mechanism to print items in various lists and head the lists, means for moving the slips into and out of position to control the printing mechanism, and means for retaining the first slip in controlling position while the lists are being headed.

85. In a machine of the class described, the combination with printing mechanism, of record slips for controlling the printing mechanism to print items in various lists and head the lists, means for moving the slips into and out of position to control the printing mechanism, and means for automatically disabling said moving means while the lists are being headed.

86. In a machine of the class described, the combination with printing mechanism, of means for controlling said printing mechanism for listing items, an automatic device for controlling the printing mechanism to head the various lists, totalizing mechanism for accumulating the items printed, and means for disabling said totalizing mechanism while the lists are being headed.

87. In a machine of the class described, the combination with printing mechanism, of means for controlling said printing mechanism for listing items, a normally inoperative automatic device for controlling the printing mechanism to head the various lists, totalizing mechanism for accumulating the printed items, normally inoperative means for disabling said totalizing mechanism while the lists are being headed, and manipulative means for rendering said automatic device and said disabling means operative.

88. In a machine of the class described, the combination with printing mechanism, of means for controlling said printing mechanism for listing items, an automatic device for controlling the printing mechanism to head the various lists, totalizing means for accumulating the printed items, actuating mechanism for the totalizing means and controlled by said controlling means, a device for effecting engagement of the totalizing means and actuating mechanism, and means for disabling the engaging device while the lists are being headed.

89. In a machine of the class described, the combination with printing mechanism, of means for controlling said printing mechanism for listing items, an automatic device for controlling the printing mechanism to head the various lists, totalizing mechanism for accumulating the items printed, and means for disabling said totalizing mechanism while the lists are being headed and automatically enabling the same after the lists are headed.

90. In a machine of the class described, the combination with printing mechanism, of means for controlling said printing mechanism for listing items, a normally inoperative automatic device for controlling the printing mechanism to head the various lists, totalizing mechanism for accumulating the printed items, normally inoperative means for automatically disabling said totalizing mechanism while the lists are being headed and automatically enabling the same after the lists are headed, and manipulative means for rendering said automatic device and said disabling means operative.

91. In a machine of the class described, the combination with printing mechanism, of means for controlling said printing mechanism for listing items, an automatic device for controlling the printing mechanism to head the various lists, totalizing means, actuating mechanism for the totalizing means and controlled by said controlling means, a device for effecting engagement of the totalizing means and actuating mechanism, and means for disabling the engaging device while the lists are being headed and automatically enabling the same after the lists are headed.

92. In a machine of the class described, the combination with totalizing mechanism comprising a plurality of totalizers, of printing mechanism for printing the items entered on the totalizers in columns appropriate to the totalizers and for heading the columns, and means for automatically disabling the totalizing mechanism while the printing mechanism is heading the columns.

93. In a machine of the class described, the combination with totalizing mechanism comprising a plurality of totalizers, of printing mechanism for printing the items entered on the totalizers in columns appropriate to the totalizers and for heading the columns, and means for automatically disabling the totalizing mechanism while the printing mechanism is heading the columns and automatically enabling the same after the columns have been headed.

94. In a machine of the class described, the combination with a plurality of totalizers, of actuating mechanism therefor, means for establishing operative relation between the desired totalizer and the actuating mechanism, mechanism for printing the items entered on the totalizers in columns appropriate to the totalizers and for heading the columns, and means for automatically disabling said establishing means while the printing mechanism is heading said columns.

95. In a machine of the class described, the combination with a plurality of totalizers, of actuating mechanism therefor, means for establishing operative relation between the desired totalizer and the actuating mechanism, mechanism for printing the items entered on the totalizers in columns appropriate to the totalizers and for heading the columns, and means for automatically disabling said establishing means while the printing mechanism is heading said columns and automatically enabling the same after the columns have been headed.

96. In a machine of the class described, the combination with record slips, of sorting mechanism therefor and controlled thereby, printing mechanisms controlled by the record slips for printing in various columns as the slips are sorted, means controlling the printing mechanism for heading the various columns, and means for automatically arresting the operation of the sorting mechanism while the columns are being headed.

97. In a machine of the class described, the combination with record slips, of sorting mechanism therefor and controlled thereby, totalizing mechanism controlled by said slips as the slips are sorted, printing mechanism controlled by said slips as the slips are sorted for printing in various columns, means controlling the printing mechanism for heading the various columns, and means for automatically arresting the operation of the sorting mechanism and disabling the totalizing mechanism while the columns are being headed.

98. In a machine of the class described, the combination with record slips, of sorting mechanism for sorting the slips a plurality of times under the control of the slips, printing mechanism controlled by the slips only during the last time the slips are sorted so that the items are printed in various columns, totalizing mechanism operated under the control of the slips only while the slips are being sorted for the last time, means for enabling the printing and totalizing mechanisms while the slips are being sorted for the last time, means for controlling the printing mechanism to head the various columns, and means for arresting the operation of the sorting mechanism and disabling the totalizing mechanism while the columns are being headed.

99. In a machine of the class described, the combination with record slips, of sorting mechanism for sorting the slips a plurality of times under the control of the slips, normally inoperative printing mechanism rendered operative when the slips are sorted for the last time to print in various columns under the control of the slips, means for controlling the printing mechanism to head the various columns, and means for automatically arresting the operation of the sorting mechanism while the columns are being headed.

100. In a machine of the class described, the combination with record slips, of sorting mechanism for sorting the slips a plurality of times under the control of the slips, printing mechanism controlled by the slips only during the last time the slips are sorted so that the items are printed in various columns, totalizing mechanism operated under the control of the slips only while the slips are being sorted for the last time, means for enabling the printing and totalizing mechanisms while the slips are being sorted for the last time, means for controlling in conjunction with the first slip to be sorted the printing mechanism to head the various columns, and means for arresting the operation of the sorting mechanism and disabling the totalizing mechanism while the columns are being headed.

101. In a machine of the class described, the combination with record slips, of sorting mechanism for sorting the slips a plurality of times under the control of the slips, normally inoperative printing mechanism rendered operative when the slips are sorted for the last time to print in various columns under the control of the slips, means for controlling in conjunction with the first slip to be sorted the printing mechanism to head the various columns, and means for automatically arresting the operation of the sorting mechanism while the columns are being headed.

102. In a machine of the class described, the combination with a plurality of totalizers, of means for clearing the same, and valve controlled pneumatic means for automatically and in automatic succession selecting the totalizers for clearance.

103. In a machine of the class described, the combination with a plurality of totalizers, of actuators therefor adapted to enter items thereon and clear the same, and valve controlled pneumatic means for automatically and in automatic succession selecting the totalizers to be cleared.

104. In a machine of the class described, the combination with a plurality of totalizers, of means for clearing the same, valve controlled pneumatic means for automatically and in automatic succession selecting the totalizers for clearance, and recording mechanism for recording the totals on the totalizers as the latter are cleared.

105. In a machine of the class described, the combination with a plurality of totalizers, of means for clearing the same, pneumatically controlled means for automatically and in automatic succession selecting the totalizers for clearance, a plurality of detail strips appropriate to the totalizers, and printing mechanism under the control of said pneumatically controlled means for printing the totals on the appropriate strips as the totalizers are cleared.

106. In a machine of the class described, the combination with a plurality of totalizers, of actuators therefor adapted to enter items thereon and clear the same, valve controlled pneumatic controlled means for automatically and in automatic succession selecting the totalizers to be cleared, and recording mechanism for recording the totals on the totalizers as the latter are cleared.

107. In a machine of the class described, the combination with a plurality of totalizers, of actuators therefor, adapted to enter items thereon and clear the same, printing mechanism for printing the items entered on the totalizers in appropriate columns and the totals of the items, and pneumatically controlled means for automatically and in automatic succession selecting the totalizers to be cleared and the columns in which the totals are to be printed.

108. In a machine of the class described, the combination with a plurality of totalizers, of printing mechanism, and valve controlled pneumatic means for controlling the printing mechanism to print the totals on the totalizers automatically and in automatic succession.

109. In a machine of the class described, the combination with a plurality of totalizers, of actuating means therefor, printing means, actuating means for the printing means for printing the items entered on the totalizers and the totals thereof in columns appropriate to the totalizers, and means for controlling the printing means so that the totals on the totalizers are printed automatically and in automatic succession in the appropriate columns.

110. In a machine of the class described, the combination with a plurality of totalizers, and valve controlled pneumatic means for automatically and in automatic succession clearing said totalizers one after the other and transferring their accumulations to appropriate columns of entries on record material.

111. In a machine of the class described, the combination with a plurality of totalizers, of printing means for printing items and the totals thereof in various columns, valve controlled pneumatic means for automatically clearing said totalizers in automatic succession and transferring their totals to the printing means, and means for moving the printing means to print the totals in the appropriate columns.

112. In a machine of the class described, the combination with a plurality of totalizers, of printing means for printing items and the totals thereof in various columns appropriate to the totalizers, means for operating the totalizers and printing means when items entered on the totalizers and the totals are printed, pneumatic means for controlling the selection of the totalizers and the columns printed in, record means for controlling said pneumatic means when items are entered in the totalizers, and means for controlling said pneumatic means when the totals are printed so that the totals on the totalizers are printed automatically and in automatic succession in the appropriate columns.

113. In a machine of the class described, the combination with totalizing mechanism, of actuating means for entering items in the totalizing mechanism and clearing the same, pneumatic means for controlling the actuating means when items are entered in the totalizing mechanism, and means for controlling the actuating means independently of said pneumatic means when the totalizing mechanism is cleared.

114. In a machine of the class described, the combination with totalizing mechanism, of actuating means for entering items in the totalizing mechanism and clearing the same, pneumatic means for controlling the actuating means when items are entered in the totalizing mechanism, and means operated independently of said pneumatic means and controlled by the totalizing mechanism for controlling the actuating means when the totalizing mechanism is cleared.

115. In a machine of the class described, the combination with totalizing mechanism, of actuating means for entering items in the totalizing mechanism and clearing the same, pneumatic means for controlling the actuating means when items are entered in the totalizing mechanism, record means for controlling the pneumatic means, and means, operated independently of said pneumatic means, for controlling the actuating means when the totalizing mechanism is cleared.

116. In a machine of the class described, the combination with totalizing mechanism, of actuating means for entering items in the totalizing mechanism and clearing the same, pneumatic means for controlling the actuating means when items are entered in the totalizing mechanism, record means controlling the pneumatic means, and means operated independently of said pneumatic means and controlled by the totalizing mechanism for controlling the actuating means when the totalizing mechanism is cleared.

117. In a machine of the class described, the combination with totalizing mechanism, of actuating means for entering items in the totalizing mechanism and clearing the same, pneumatic means for controlling the actuating means when items are entered in the totalizing mechanism, means operated independently of said pneumatic means for controlling the actuating means when the totalizing mechanism is cleared, and printing mechanism for printing the items entered on the totalizers and the totals thereof.

118. In a machine of the class described, the combination with a totalizer, of actuators for entering items on the totalizer and clearing the same, members connected to the actuators and moved differentially to operate the totalizer when items are entered in the machine, means for moving said members to an invariable extent when the totalizer is cleared, and means controlled by the totalizer for disconnecting said members and said actuators when the totalizer is cleared.

119. In a machine of the class described, the combination with a totalizer, of actuators for entering items on the totalizer and clearing the same, and means moved differentially to operate the actuators when items are entered on the totalizer and to an invariable extent to operate the actuators when the totalizer is cleared.

120. In a machine of the class described, the combination with a totalizer, of actuators for entering items on the totalizer and clearing the same, means moved differentially to operate the actuators when items are entered on the totalizer and to an invariable extent to operate the actuators when the totalizer is cleared, and pneumatic means for controlling said operating means when items are entered in the totalizer.

121. In a machine of the class described, the combination with a totalizer, of actuators for entering items on the totalizer and clearing the same, means moved differentially to operate the actuators when items are entered on the totalizer and to an invariable extent to operate the actuators when the totalizer is cleared, and record means for controlling said means when items are entered on the totalizer.

122. In a machine of the class described, the combination with a totalizer, of actuators for entering items on the totalizer and clearing the same, means moved differentially to operate the actuators when items are entered on the totalizer and to an invariable extent to operate the actuators under the control of the totalizer when the totalizer is cleared, pneumatic means for controlling said operating means when items are entered on the totalizer, and means for moving said operating means independently of said pneumatic means when the totalizer is cleared.

123. In a machine of the class described, the combination with a totalizer, of actuators for entering items on the totalizer and clearing the same, devices normally connected to said actuators, members normally disconnected from said devices and moved differentially when items are entered in the totalizer, mechanism for connecting said devices and members after the members have been moved differentially when items are entered in the totalizer and before the members are moved when the totalizer is cleared, means for moving said members an invariable extent when the totalizer is cleared, and means controlled by the totalizer for operating said devices to disconnect the latter from the members when the totalizer is cleared.

124. In a machine of the class described, the combination with a totalizer, of actuators for entering items on the totalizer and clearing the same, devices normally connected to said actuator, members normally disconnected from said devices and moved differentially when items are entered in the totalizer, mechanism for operating said devices to connect the devices and members after the members have been moved differentially when items are entered in the totalizer and before the members are moved when the totalizer is cleared, means for moving said members an invariable extent when the totalizer is cleared, and means controlled by the totalizer for operating said devices to disconnect the latter from the members when the totalizer is cleared.

125. In a machine of the class described, the combination with a totalizer, of actuators for entering items on the totalizer and clearing the same, and means moved differentially to operate the actuators positively when items are entered on the totalizer and to an invariable extent to operate the actuators positively when the totalizer is cleared.

126. In a machine of the class described, the combination with a totalizer, of actuators for entering items on the totalizer and clearing the same, means moved differentially to operate the actuators positively when items are entered on the totalizer and to an invariable extent to operate the actuators positively when the totalizer is cleared, and pneumatic means for controlling said means when items are entered on the totalizer.

127. In a machine of the class described, the combination with a totalizer, of actuators for entering items on the totalizer and clearing the same, means moved differentially to operate the actuators positively when items are entered on the totalizer and to an invariable extent to operate the actuators positively when the totalizer is cleared, and record means for controlling said means when items are entered on the totalizer.

128. In a machine of the class described, the combination with a totalizer, of actuators for entering items on the totalizer and clearing the same, and means moved differentially to operate the actuators when items are entered on the totalizer and to an invariable extent to operate the actuators under the control of the totalizer when the totalizer is cleared.

129. In a machine of the class described, the combination with a totalizer, of actuators for entering items on the totalizer and clearing the same, means moved differentially to operate the actuators when items are entered on the totalizer and to an invariable extent to operate the actuators under the control of the totalizer when the totalizer is cleared, and record means for controlling said means when items are entered on the totalizer.

130. In a machine of the class described, the combination with an accounting device, of an actuator for operating the same, a member having a variable movement, means for controlling said member, a latch connecting the actuator and the member, connections whereby the accounting device may control the operation of said latch, and means for moving said member an invariable distance when the latch is controlled by the accounting device.

131. In a machine of the class described, the combination with an accounting device, of an actuator for operating the same, a member having a variable movement, means for controlling said member, a latch connecting the actuator and the member, connections whereby the accounting device may control the operation of said latch, and means for positively moving said member an invariable distance when the latch is controlled by the accounting device.

132. In a machine of the class described, the combination with a totalizer element, of a type carrier, an actuating device for operating said element and type carrier to add and print items and clear the element and print the total, and driving means for said device, having a variable movement when items are added and printed and an invariable movement when the element is cleared and the total printed.

133. In a machine of the class described, the combination with a totalizer element, of a type carrier, an actuating device for operating said element and type carrier to add and print items and clear the element and print the total, driving means for said device, having a variable movement when items are added and printed and an invariable movement when the element is cleared and the total printed, a latch connecting said device and said driving means, and connections controlled by the totalizer element for operating said latch when the totalizer element is cleared.

134. In a machine of the class described, the combination with a totalizer element, of an actuator for operating the element to add items and clear the same, driving means connected to the actuator during the complete actuation of the latter when the element is operated to add items, and means for disengaging the driving means from the actuator when the totalizer element is cleared.

135. In a machine of the class described, the combination with a totalizer element, of an actuator for operating the element to add items and clear the same, driving means connected to the actuator during the complete actuation of the latter when the element is operated to add items, and means operated by the totalizer element for disengaging the driving means from the actuator when the totalizer element is cleared.

136. In a machine of the class described, the combination with a plurality of totalizers, of actuating means therefor, means for printing the items entered on the totalizers and the totals thereof in columns appropriate to the totalizers, and common means for controlling the printing mechanism for heading the columns and for controlling the selection of the totalizers and the appropriate columns when the totals are printed.

137. In a machine of the class described, the combination with a plurality of totalizers, of actuating means therefor, means for printing the items entered on the totalizers and the totals thereof in columns appropriate to the totalizers, and a common pneumatic device for controlling the printing mechanism for heading the columns and for controlling the selection of the totalizers and the appropriate columns when totals are printed.

138. In a machine of the class described, the combination with a plurality of totalizers, of actuating mechanism therefor, means for printing the items entered on the totalizers and the totals thereof in columns appropriate to the totalizers, and common automatic means for controlling the printing mechanism for heading the columns in an invariable succession and for controlling the selection of the totalizers and the appropriate columns in an invariable succession when the totals are printed.

139. In a machine of the class described, the combination with a plurality of totalizers, of actuating mechanism therefor, means for printing the items entered on the totalizers and the totals thereof in columns appropriate to the totalizers, and common pneumatic means for automatically controlling the printing mechanism for heading the columns in an invariable succession and for controlling the selection of the totalizers and the appropriate columns in an invariable succession when the totals are printed.

140. In a machine of the class described, the combination with a plurality of totalizers, of actuating mechanism therefor, means for establishing operative relation between the desired totalizers and the actuating mechanism, means for printing the items entered on the totalizers and the totals thereof in columns appropriate to the totalizers, common means for controlling the printing mechanism for heading the columns and for controlling the selection of the totalizers for operation and the appropriate columns to be printed in when the totals are printed, and means for disabling said establishing means during the heading of the columns.

141. In a machine of the class described, the combination with a plurality of totalizers, of actuating mechanism therefor, means for establishing operative relation between the desired totalizers and the actuating mechanism, means for printing the items entered on the totalizers and the totals thereof in columns appropriate to the totalizers, common means for controlling the printing mechanism for heading the columns and for controlling the selection of the totalizers for operation and the appropriate columns to be printed in when the totals are printed, and means for automatically disabling said establishing means during the heading of the columns and enabling the same after the columns have been headed.

142. In a machine of the class described, the combination with a plurality of totalizers, of differential actuating means therefor, means for printing the items entered on the totalizer and the totals thereof in columns appropriate to the totalizers, means for controlling the printing means for heading the columns and controlling the selection of the totalizers and the appropriate columns when totals are printed, record means for controlling the actuators when items are entered in the totalizers, and means operated by the totalizers for controlling the actuators when totals are printed.

143. In a machine of the class described, the combination with a plurality of totalizers, of differential actuating means therefor, means for printing the items entered on the totalizers and the totals thereof in columns appropriate to the totalizers, pneumatic means for controlling the printing means for heading the columns and controlling the selection of the totalizers and the appropriate columns when totals are printed, record means for controlling the actuators when items are entered in the totalizers, and means operated by the totalizers for controlling the actuators when totals are printed.

144. In a machine of the class described, the combination with a plurality of totalizers, of differential actuating means therefor, means for effecting engagement and disengagement of the totalizers and actuating means, means for printing the items entered on the totalizers and the totals thereof in columns appropriate to the totalizers, means for controlling the printing means for heading the columns and for controlling the selection of the totalizers and the appropriate columns when totals are printed, record means for controlling the actuating means when items are entered on the totalizers, means operated by the totalizers for controlling the actuating means when totals are printed, and means for automatically disabling said engaging means when the columns are headed.

145. In a machine of the class described, the combination with a plurality of totalizers, of a set of differentially movable actuators therefor, means for moving any one of said totalizers into coöperative relation with the actuators, and a record control pneumatic system including valve controlled means for controlling said moving means.

146. In a machine of the class described, the combination with a plurality of totalizers, of a set of differentially movable actuators therefor, means including a piston cylinder for selecting the desired totalizers for actuation, and a pneumatic system for moving the selective totalizer into coöperative relation with the actuators.

147. In a machine of the class described, the combination with a plurality of totalizers, of a set of differentially movable actuators therefor, record material, means for selecting any one of said totalizers to be actuated by the actuators, a valve controlled pneumatic motor for operating the actuators, and means controlled by said record material for controlling said selecting means.

148. In a machine of the class described, the combination of a plurality of totalizers, of a set of differentially movable actuators therefor, a frame carrying said totalizers, means for moving said frame to bring any desired one of said totalizers into coöperation with the actuators, and a record controlled multiple valve pneumatic motor system for controlling said moving means.

149. In a machine of the class described, the combination of a plurality of totalizers, of a set of differentially movable actuators therefor, a frame carrying said totalizers, and means for moving said frame directly from one position to another to bring any desired one of said totalizers into coöperative relation with the actuators, and a record controlled multiple valve pneumatic motor means for controlling said moving means.

150. In a machine of the class described, the combination of a plurality of totalizers, of a set of differentially movable actuators common thereto, means for selecting the desired totalizer for operation, and a pneumatic system including a multiple valve controlled device to control said means.

151. In a machine of the class described, the combination of a plurality of totalizers, of a set of differentially movable actuators common thereto, means including a piston cylinder for selecting the desired totalizer for operation, and a multiple valve controlled pneumatic system for moving the piston of said cylinder differentially to control said means.

152. In a machine of the class described, the combination of a plurality of totalizers, of a set of differentially movable actuators common thereto, means including the pneumatic motor for selecting the desired totalizer for operation, and a pneumatic system for operating said motor differentially to control said means.

153. In a machine of the class described, the combination of a plurality of totalizers, of a set of differentially movable actuators common thereto, means including a multiple valve controlled pneumatic motor for selecting the desired totalizer for operation, and a pneumatic system for operating said motor differentially to control said means.

154. In a machine of the class described, the combination of a plurality of totalizers, of a set of differentially movable actuators common thereto, means including a valve controlled pneumatic motor for selecting the desired totalizer for operation, and a pneumatic system for operating said motor differentially to control said means.

155. In a machine of the class described, the combination with an accounting device, of a differentially movable actuator therefor, a pneumatic motor, and a record controlled pneumatic system for controlling the operation of said motor to control the extent of movement of said actuator.

156. In a machine of the class described, the combination of an accounting device, a differentially movable actuator therefor, a valve controlled pneumatic motor, and a record controlled pneumatic system for controlling the valve of said motor to control the extent of movement of said actuator.

157. In a machine of the class described, the combination of an accounting device, a differentially movable actuator therefor, a multiple valve controlled pneumatic motor, and a record controlled pneumatic system controlling said motor to control the extent of movement of said actuator.

158. In a machine of the class described, the combination of an accounting device, a differentially movable actuator therefor, a pneumatic motor, a plurality of valves for said motor, and a record controlled pneumatic system for controlling said valves whereby to control the extent of movement of said actuator.

159. In a machine of the class described, the combination of an accounting device, a differentially movable actuator therefor, a pneumatic motor for operating said actuator, a plurality of valves for said motor, and a record controlled pneumatic system for controlling said valves whereby to control the extent of movement of said actuator.

160. In a machine of the class described, the combination of an accounting device, an actuator therefor, a pneumatic motor, pneumatic means for controlling the operation of said motor differentially, and means intermediate the motor and the actuator for operating the actuator when the motor is returned to normal position.

161. In a machine of the class described, the combination of a plurality of totalizers, a set of differentially movable actuators therefor common thereto, means including a pneumatic motor for selecting the totalizer to be actuated and a pneumatic system for controlling said actuators and said selecting means.

162. In a machine of the class described, the combination of printing means movable relative to the material to be printed upon, a movable valve controlled fluid system and fluid controlled actuating means for effecting relative movement between the printing mechanism and the material printed upon, whereby the printing mechanism prints various lists on said material.

163. In a machine of the class described, the combination of printing means movable relative to the material to be printed upon, a valve controlled fluid system for controlling relative movement between the printing mechanism and the material printed upon whereby the printing mechanism may print various lists on said material, and means for controlling the valves of said fluid system.

164. In a machine of the class described, the combination of printing mechanism, a plurality of detail strips, means for moving the printing mechanism to print on any desired detail strip, and a valve controlled fluid system for controlling said means.

In testimony whereof we affix our signatures.

FRED M. CARROLL.
RICHARD M. BLAKELY.